(12) United States Patent
Matsuda et al.

(10) Patent No.: US 12,509,184 B2
(45) Date of Patent: Dec. 30, 2025

(54) ELECTRIC DEVICE OF HUMAN-POWERED VEHICLE

(71) Applicant: SHIMANO INC., Sakai (JP)

(72) Inventors: Hiroshi Matsuda, Sakai (JP); Tomohiro Kondo, Sakai (JP); Toru Takayanagi, Sakai (JP)

(73) Assignee: SHIMANO INC., Sakai (JP)

( * ) Notice: Subject to any disclaimer, the term of this patent is extended or adjusted under 35 U.S.C. 154(b) by 231 days.

(21) Appl. No.: 18/451,806

(22) Filed: Aug. 17, 2023

(65) Prior Publication Data

US 2025/0058851 A1 Feb. 20, 2025

(51) Int. Cl.
*B62M 25/08* (2006.01)
*B62J 45/00* (2020.01)

(52) U.S. Cl.
CPC ............. *B62M 25/08* (2013.01); *B62J 45/00* (2020.02)

(58) Field of Classification Search
CPC ................................ B62M 25/08; B62J 45/00
See application file for complete search history.

(56) References Cited

U.S. PATENT DOCUMENTS

| | | | | |
|---|---|---|---|---|
| 6,144,859 | A * | 11/2000 | LaDue | G08B 21/22 455/511 |
| 7,761,212 | B2 * | 7/2010 | Takebayashi | H04L 12/403 482/57 |
| 7,941,170 | B2 * | 5/2011 | Maeda | H04L 5/023 455/452.2 |
| 8,095,123 | B2 * | 1/2012 | Gray | A61B 5/4839 455/418 |
| 9,037,097 | B2 * | 5/2015 | Kim | H04B 1/44 455/552.1 |
| 2005/0223840 | A1 | 10/2005 | Takamoto | |
| 2009/0102628 | A1 | 4/2009 | Takebayashi | |
| 2019/0193801 | A1 * | 6/2019 | Hara | B62K 23/00 |
| 2020/0170060 | A1 | 5/2020 | Inoue et al. | |
| 2021/0284284 | A1 | 9/2021 | Ho | |
| 2022/0371688 | A1 | 11/2022 | Lin et al. | |

(Continued)

FOREIGN PATENT DOCUMENTS

CN 114572339 6/2022

*Primary Examiner* — Gertrude Arthur Jeanglaude
(74) *Attorney, Agent, or Firm* — MORI & WARD, LLP

(57) ABSTRACT

An electric device comprises wireless communicator circuitry and electronic controller circuitry. The wireless communicator circuitry is configured to wirelessly communicate with first wireless communicator circuitry of a first electric device using a first communication protocol. The wireless communicator circuitry is configured to wirelessly communicate with second wireless communicator circuitry of a second electric device using a second communication protocol. The electronic controller circuitry is configured to control the wireless communicator circuitry to wirelessly transmit a first signal using the first communication protocol. The electronic controller circuitry is configured to execute pairing between the electric device and the first electric device based on a first response signal wirelessly transmitted from the first wireless communicator circuitry of the first electric device. The electronic controller circuitry is configured to control the wireless communicator circuitry to wirelessly transmit a second signal using the second communication protocol regardless of the first response signal.

22 Claims, 72 Drawing Sheets

(56) References Cited

U.S. PATENT DOCUMENTS

2023/0013264 A1    1/2023  Hahn
2023/0109945 A1*  4/2023  Garnica ................... B62J 45/20
                                                             701/51

* cited by examiner

FIG. 4
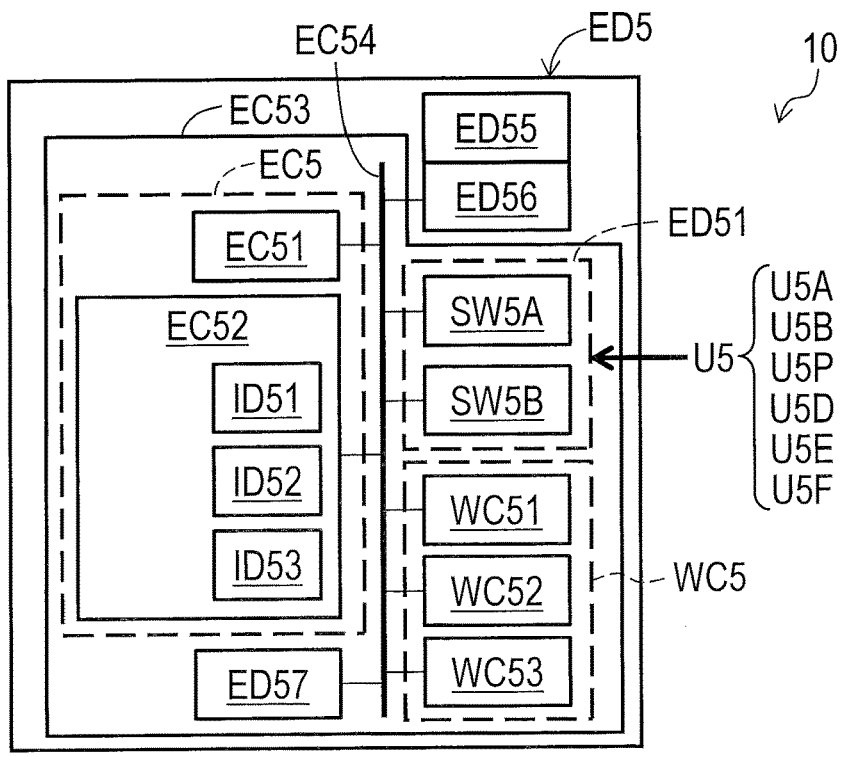
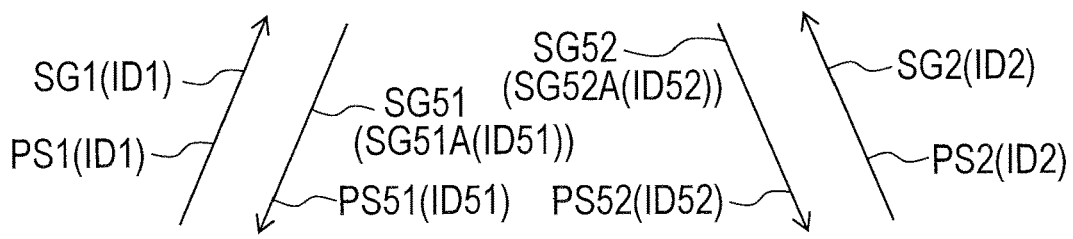
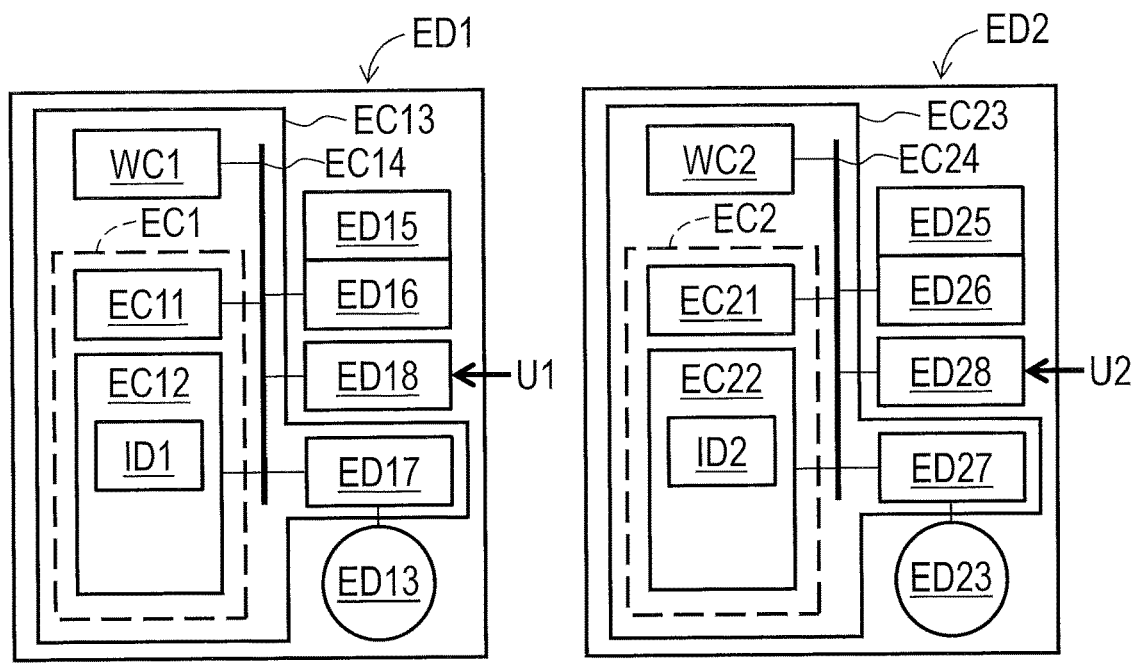

FIG. 5
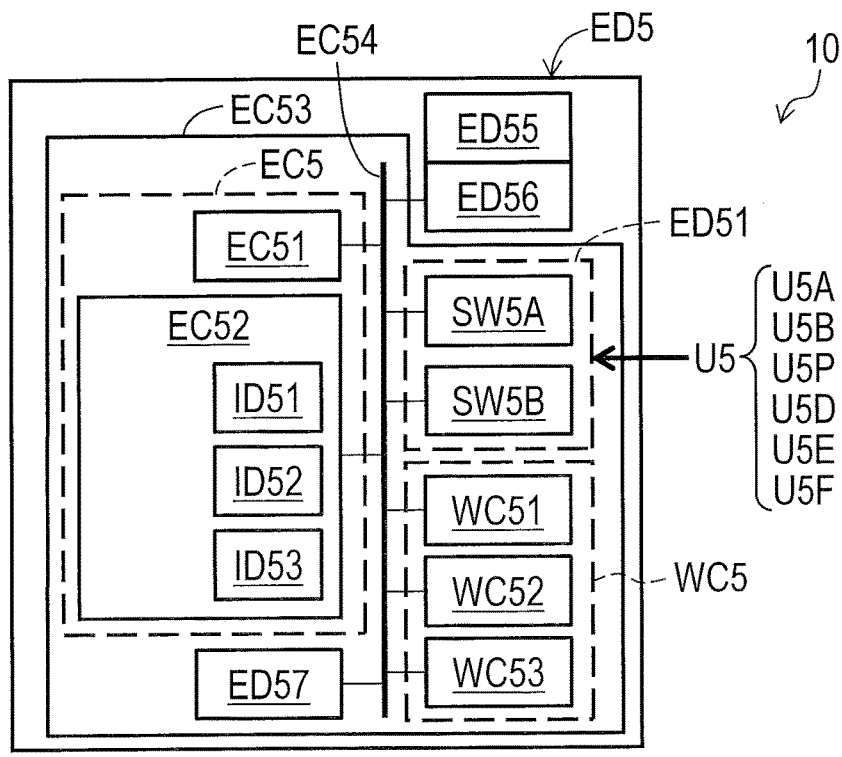
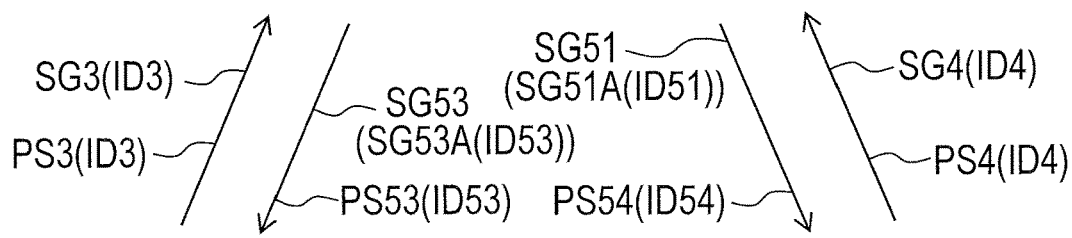
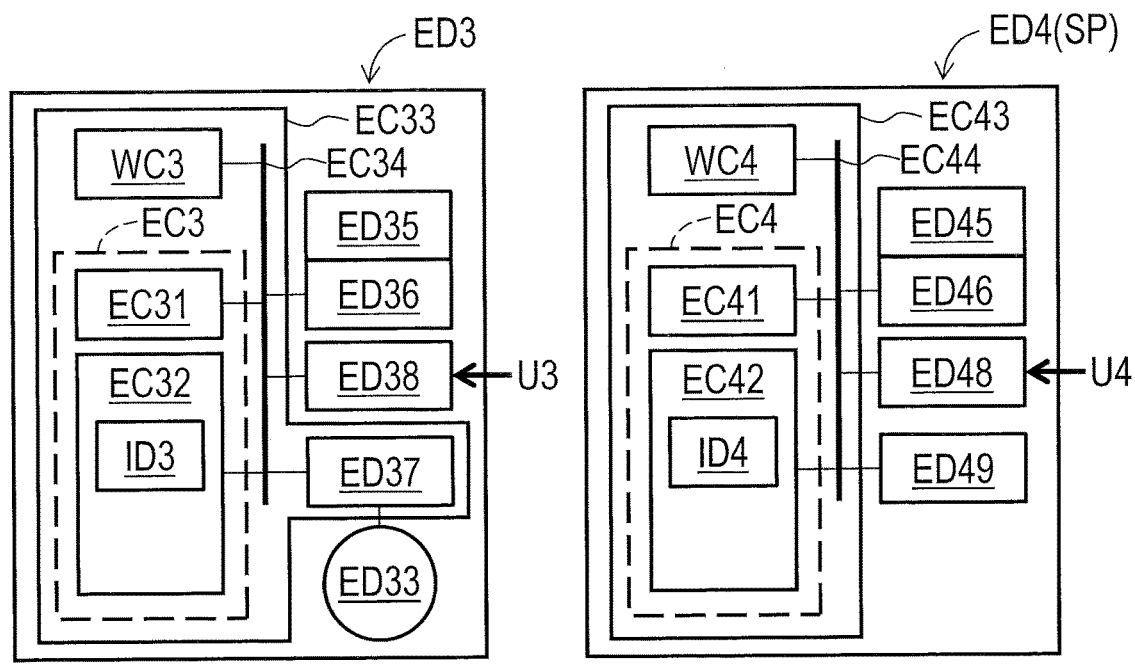

FIG. 27
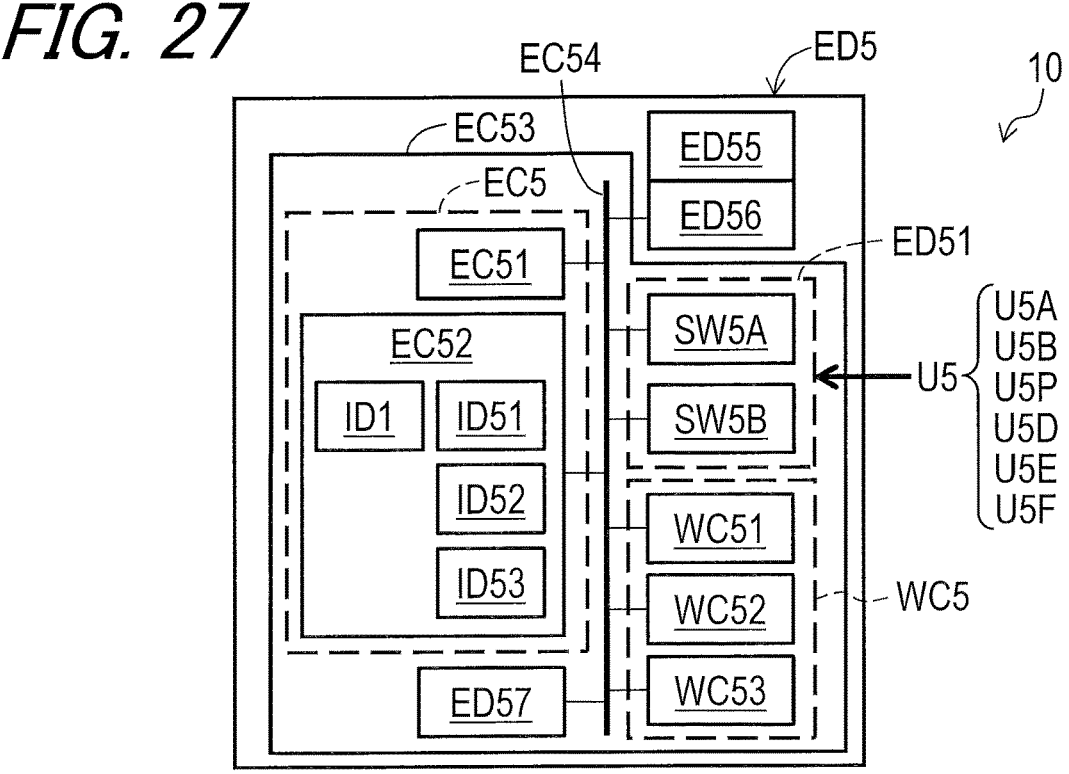
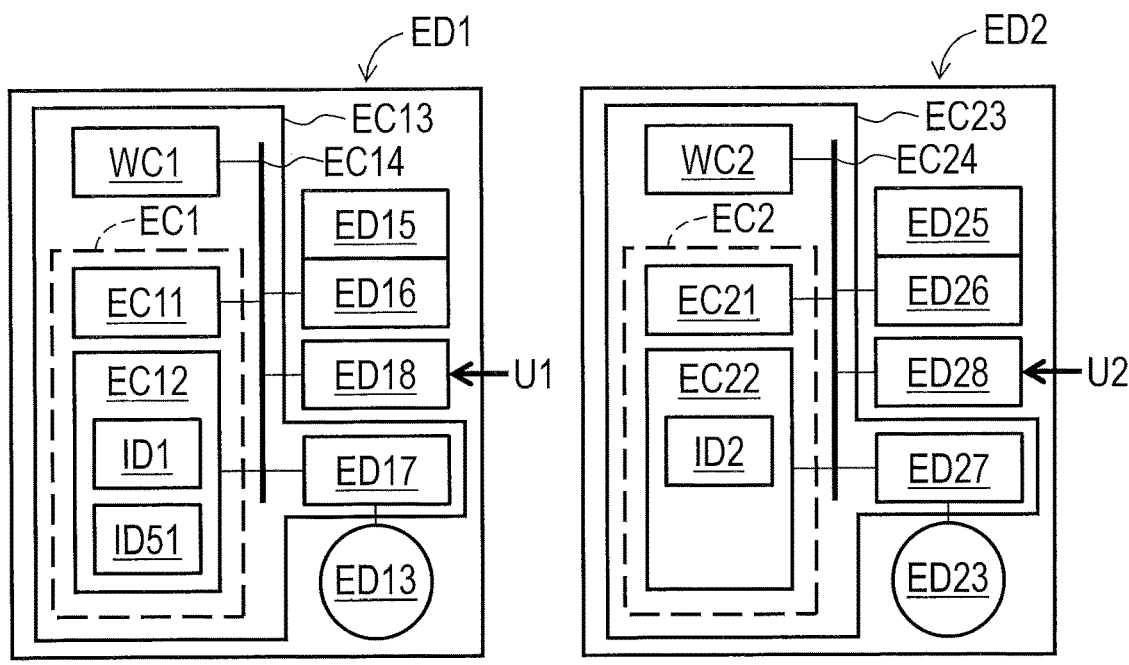

FIG. 29
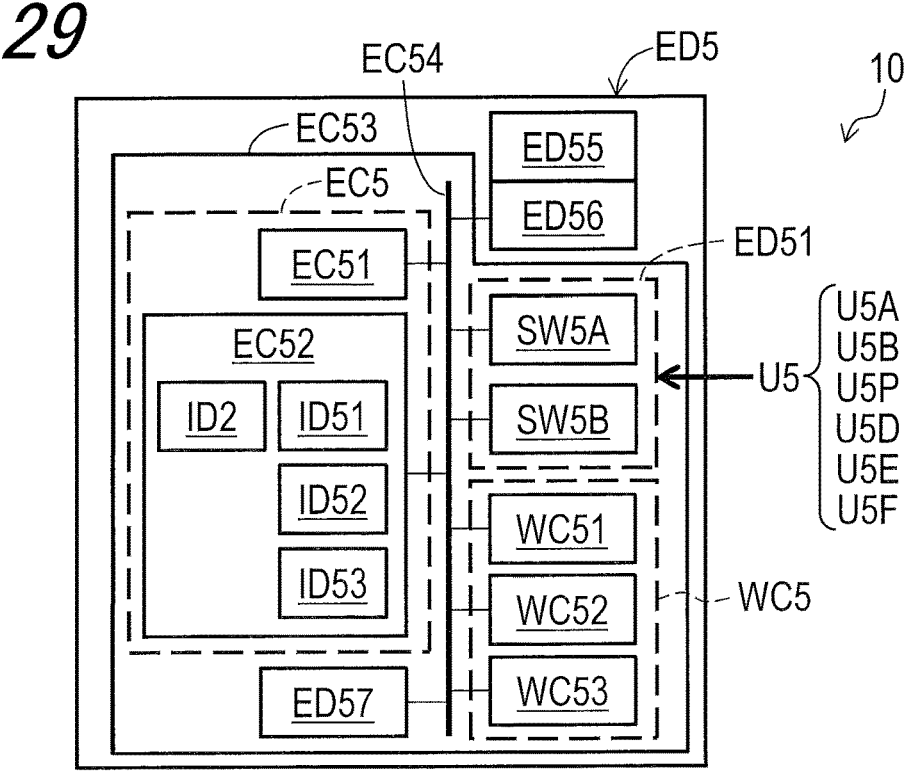
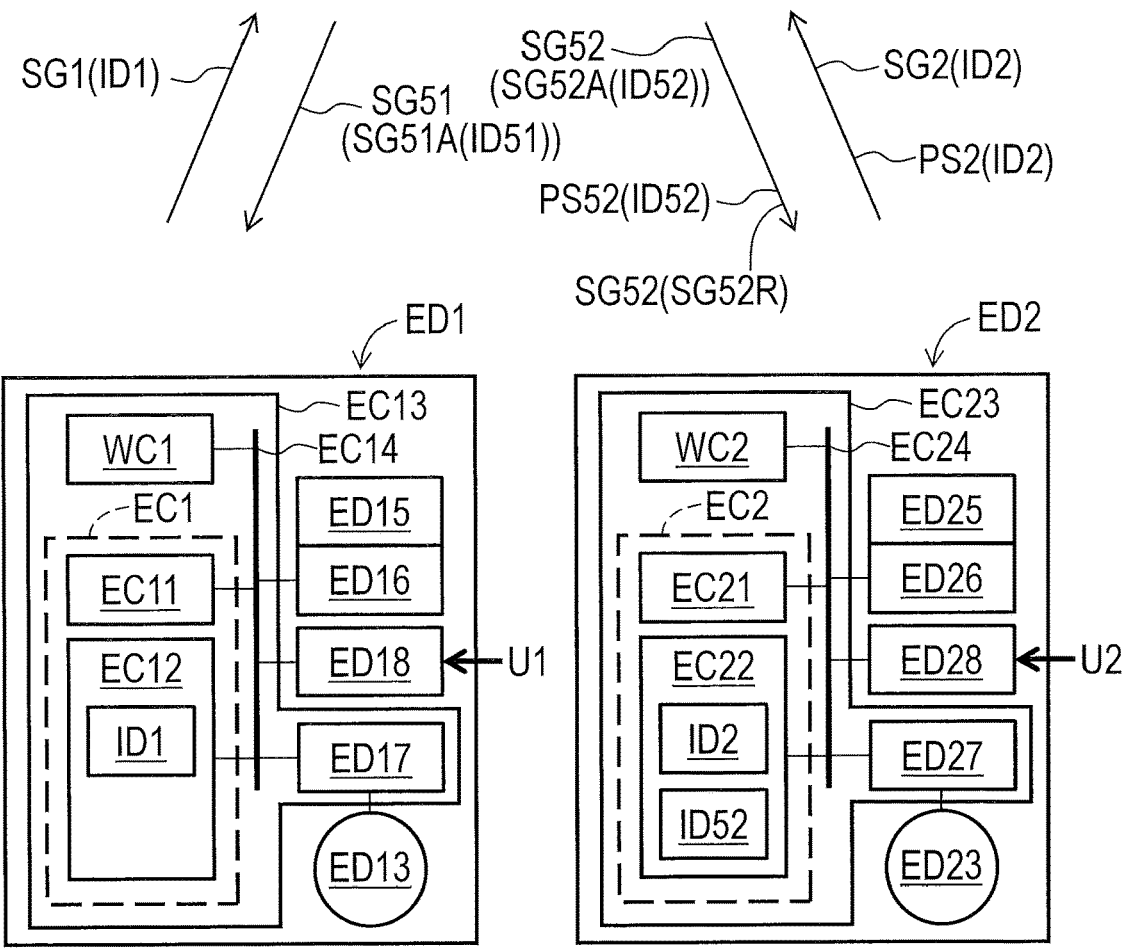

FIG. 31
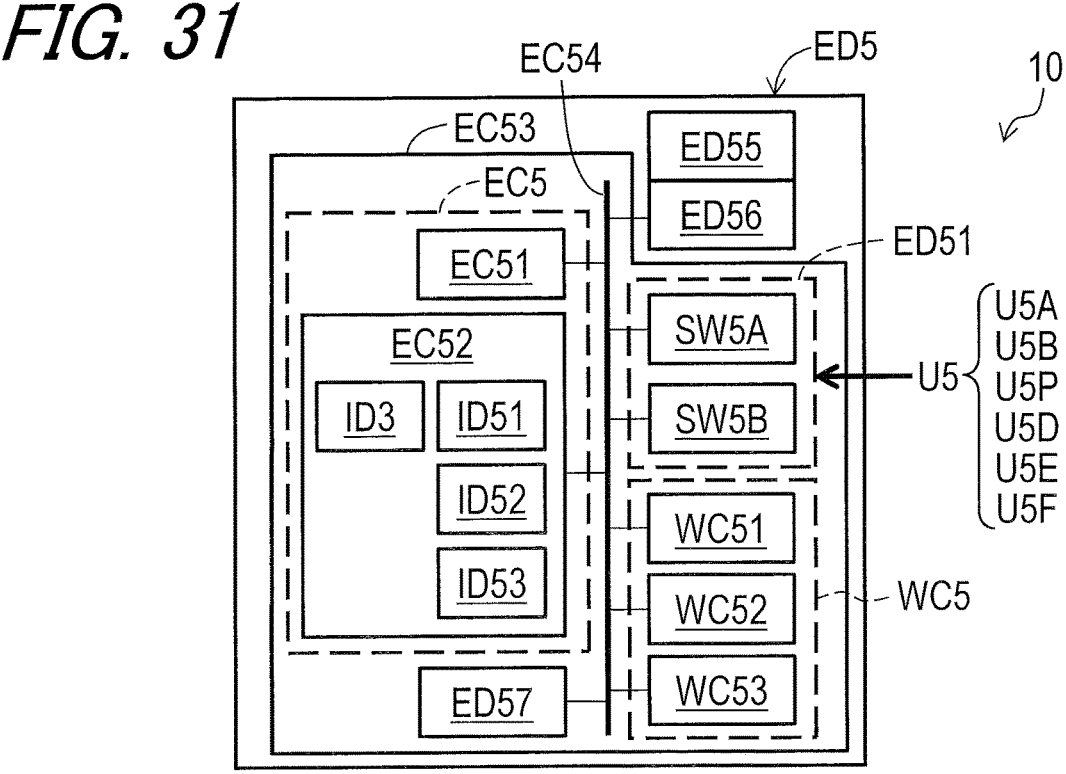
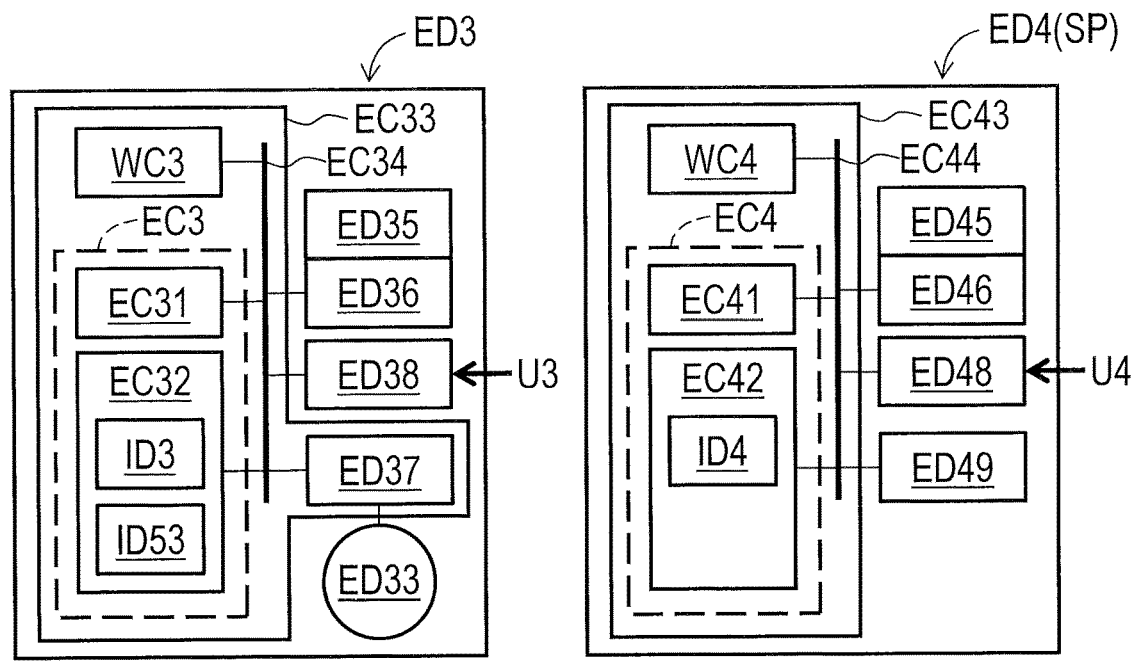

FIG. 33
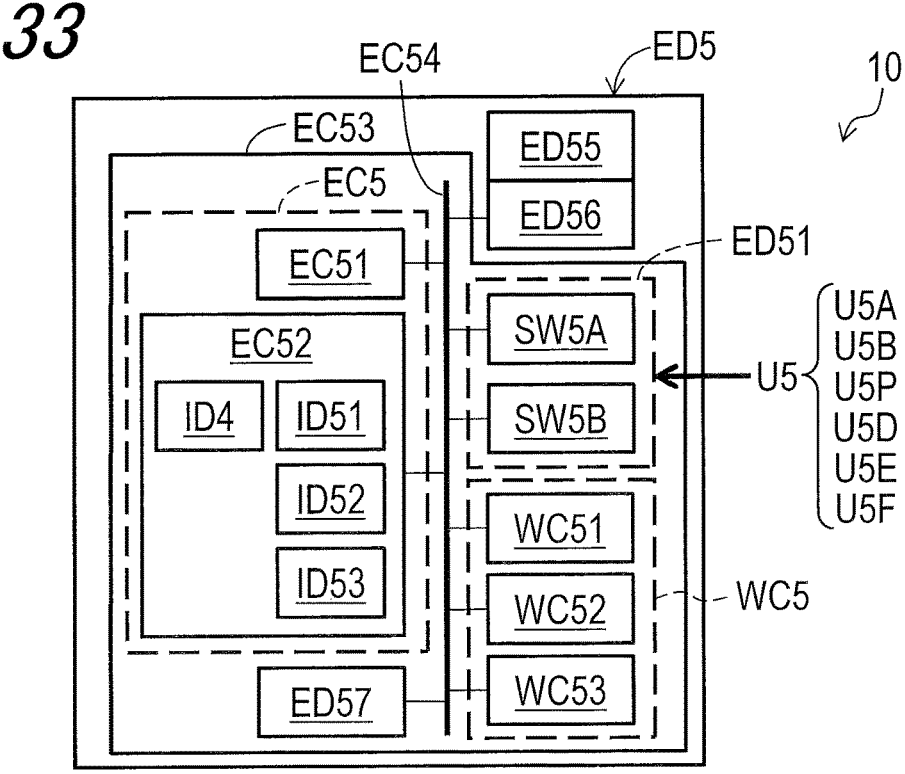
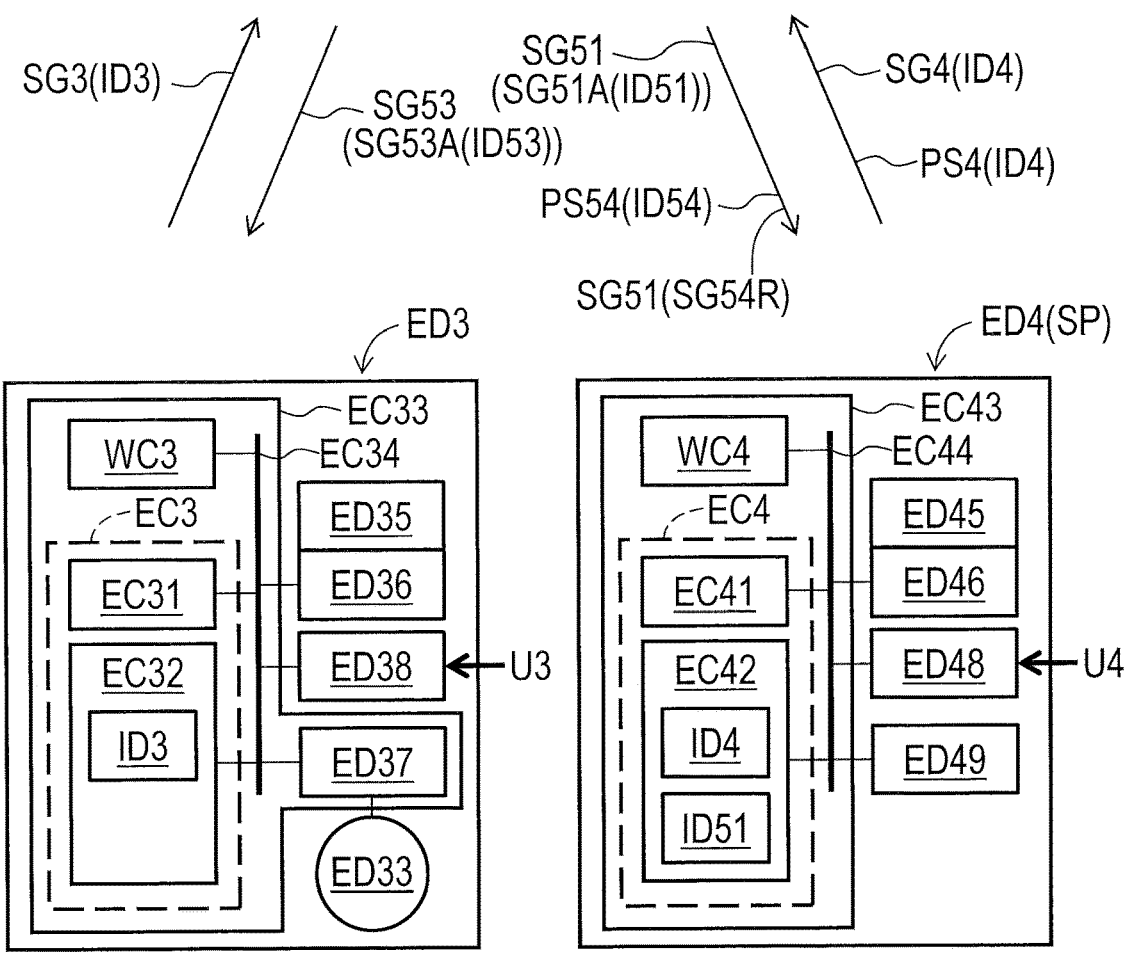

| MAXIMUM NUMBER | ED1 | ED2 | ED3 | ED4 | FIGS PATTERNS |
|---|---|---|---|---|---|
| 1 | SG51A | SG52A | SG53A | SG51A | ↓t  FIG. 7 |
|   | PAIRED | SG52B | SG53B | - |  |
| 1 | SG51A | SG52A | SG53A | SG51A | ↓t  FIG. 11 |
|   | SG51B | PAIRED | SG53B | SG51B |  |
| 1 | SG51A | SG52A | SG53A | SG51A | ↓t  FIG. 15 |
|   | SG51B | SG52B | PAIRED | SG51B |  |
| 1 | SG51A | SG52A | SG53A | SG51A | ↓t  FIG. 19 |
|   | - | SG52B | SG53B | PAIRED |  |
| 2 | SG51A | SG52A | SG53A | SG51A | ↓t  FIG. 8 PT11 |
|   | PAIRED | SG52A | SG53A | - |  |
|   | PAIRED | PAIRED | SG53B | - |  |
| 2 | SG51A | SG52A | SG53A | SG51A | ↓t  FIG. 9 PT12 |
|   | PAIRED | SG52A | SG53A | - |  |
|   | PAIRED | SG52B | PAIRED | - |  |
| 2 | SG51A | SG52A | SG53A | SG51A | ↓t  FIG. 10 PT13 |
|   | PAIRED | SG52A | SG53A | SG51A |  |
|   | PAIRED | SG52B | SG53B | PAIRED |  |

*FIG. 58*

| MAXIMUM NUMBER | ED1 | ED2 | ED3 | ED4 | FIGS PATTERNS |
|---|---|---|---|---|---|
| 2 | SG51A | SG52A | SG53A | SG51A | ↓t FIG. 13 PT21 |
|  | SG51A | PAIRED | SG53A | SG51A | |
|  | SG51B | PAIRED | PAIRED | SG51B | |
| 2 | SG51A | SG52A | SG53A | SG51A | ↓t FIG. 14 PT22 |
|  | SG51A | PAIRED | SG53A | SG51A | |
|  | - | PAIRED | SG53B | PAIRED | |
| 2 | SG51A | SG52A | SG53A | SG51A | ↓t FIG. 12 PT23 |
|  | SG51A | PAIRED | SG53A | SG51A | |
|  | PAIRED | PAIRED | SG53B | - | |
| 2 | SG51A | SG52A | SG53A | SG51A | ↓t FIG. 18 PT31 |
|  | SG51A | SG52A | PAIRED | SG51A | |
|  | - | SG52B | PAIRED | PAIRED | |
| 2 | SG51A | SG52A | SG53A | SG51A | ↓t FIG. 16 PT32 |
|  | SG51A | SG52A | PAIRED | SG51A | |
|  | PAIRED | SG52B | PAIRED | - | |
| 2 | SG51A | SG52A | SG53A | SG51A | ↓t FIG. 17 PT33 |
|  | SG51A | SG52A | PAIRED | SG51A | |
|  | SG51B | PAIRED | PAIRED | SG51B | |

*FIG. 59*

| MAXIMUM NUMBER | ED1 | ED2 | ED3 | ED4 | FIGS PATTERNS |
|---|---|---|---|---|---|
| 2 | SG51A | SG52A | SG53A | SG51A | ↓ t FIG. 20 PT41 |
| | SG51A | SG52A | SG53A | PAIRED | |
| | PAIRED | SG52B | SG53B | PAIRED | |
| 2 | SG51A | SG52A | SG53A | SG51A | ↓ t FIG. 21 PT42 |
| | SG51A | SG52A | SG53A | PAIRED | |
| | - | PAIRED | SG53B | PAIRED | |
| 2 | SG51A | SG52A | SG53A | SG51A | ↓ t FIG. 22 PT43 |
| | SG51A | SG52A | SG53A | PAIRED | |
| | - | SG52B | PAIRED | PAIRED | |

FIG. 60

| MAXIMUM NUMBER | ED1 | ED2 | ED3 | ED4 | FIGS PATTERNS |
|---|---|---|---|---|---|
| 1 | SG51A | SG52A | SG53A | SG51A | ↓t FIG. 35 |
|   | PAIRED | SG52A | SG53A | - | |
| 1 | SG51A | SG52A | SG53A | SG51A | ↓t FIG. 36 |
|   | SG51A | PAIRED | SG53A | SG51A | |
| 1 | SG51A | SG52A | SG53A | SG51A | ↓t FIG. 37 |
|   | SG51A | SG52A | PAIRED | SG51A | |
| 1 | SG51A | SG52A | SG53A | SG51A | ↓t FIG. 38 |
|   | - | SG52A | SG53A | PAIRED | |
| 2 | SG51A | SG52A | SG53A | SG51A | ↓t PT11A |
|   | PAIRED | SG52A | SG53A | SG51A | |
|   | PAIRED | PAIRED | SG53A | - | |
| 2 | SG51A | SG52A | SG53A | SG51A | ↓t PT12A |
|   | PAIRED | SG52A | SG53A | SG51A | |
|   | PAIRED | SG52A | PAIRED | - | |
| 2 | SG51A | SG52A | SG53A | SG51A | ↓t PT13A |
|   | PAIRED | SG52A | SG53A | SG51A | |
|   | PAIRED | - | - | PAIRED | |

*FIG. 61*

| MAXIMUM NUMBER | ED1 | ED2 | ED3 | ED4 | FIGS PATTERNS |
|---|---|---|---|---|---|
| 2 | SG51A | SG52A | SG53A | SG51A | ↓t PT21A |
| | SG51A | PAIRED | SG53A | SG51A | |
| | - | PAIRED | PAIRED | - | |
| 2 | SG51A | SG52A | SG53A | SG51A | ↓t PT22A |
| | SG51A | PAIRED | SG53A | SG51A | |
| | - | PAIRED | - | PAIRED | |
| 2 | SG51A | SG52A | SG53A | SG51A | ↓t PT23A |
| | SG51A | PAIRED | SG53A | SG51A | |
| | PAIRED | PAIRED | - | - | |
| 2 | SG51A | SG52A | SG53A | SG51A | ↓t PT31A |
| | SG51A | SG52A | PAIRED | SG51A | |
| | - | - | PAIRED | PAIRED | |
| 2 | SG51A | SG52A | SG53A | SG51A | ↓t PT32A |
| | SG51A | SG52A | PAIRED | SG51A | |
| | PAIRED | - | PAIRED | - | |
| 2 | SG51A | SG52A | SG53A | SG51A | ↓t PT33A |
| | SG51A | SG52A | PAIRED | SG51A | |
| | - | PAIRED | PAIRED | - | |

*FIG. 62*

| MAXIMUM NUMBER | ED1 | ED2 | ED3 | ED4 | FIGS PATTERNS |
|---|---|---|---|---|---|
| 2 | SG51A | SG52A | SG53A | SG51A | ↓t PT41A |
|   | SG51A | SG52A | SG53A | PAIRED |   |
|   | PAIRED | - | - | PAIRED |   |
| 2 | SG51A | SG52A | SG53A | SG51A | ↓t PT42A |
|   | SG51A | SG52A | SG53A | PAIRED |   |
|   | - | PAIRED | - | PAIRED |   |
| 2 | SG51A | SG52A | SG53A | SG51A | ↓t PT43A |
|   | SG51A | SG52A | SG53A | PAIRED |   |
|   | - | - | PAIRED | PAIRED |   |

FIG. 63

| MAXIMUM NUMBER | ED1 | ED2 | ED3 | ED4 | FIGS PATTERNS |
|---|---|---|---|---|---|
| 1 | PAIRED | - | - | - | ↓t FIG. 28 |
|   | SG51R | - | - | - | |
| 1 | - | PAIRED | - | - | ↓t FIG. 30 |
|   | - | SG52R | - | - | |
| 1 | - | - | PAIRED | - | ↓t FIG. 32 |
|   | - | - | SG53R | - | |
| 1 | - | - | - | PAIRED | ↓t FIG. 34 |
|   | - | - | - | SG54R | |
| 2 | PAIRED | PAIRED | - | - | ↓t |
|   | SG51R | SG52R | - | - | |
| 2 | PAIRED | - | PAIRED | - | ↓t |
|   | SG51R | - | SG53R | - | |
| 2 | PAIRED | - | - | PAIRED | ↓t |
|   | SG51R | - | - | SG54R | |
| 2 | - | PAIRED | PAIRED | - | ↓t |
|   | - | SG52R | SG53R | - | |
| 2 | - | PAIRED | - | PAIRED | ↓t |
|   | - | SG52R | - | SG54R | |
| 2 | - | - | PAIRED | PAIRED | ↓t |
|   | - | - | SG53R | SG54R | |

FIG. 64

| MAXIMUM NUMBER | ED1 | ED2 | ED3 | ED4 | FIGS PATTERNS |
|---|---|---|---|---|---|
| 1 | PAIRED | - | - | - | ↓t FIG. 16 |
|   | SG51R | - | - | - |   |
| 1 | - | PAIRED | - | - | ↓t FIG. 18 |
|   | - | SG52R | - | - |   |
| 1 | - | - | PAIRED | - | ↓t FIG. 20 |
|   | - | - | - | - |   |
| 1 | - | - | - | PAIRED | ↓t FIG. 22 |
|   | - | - | - | SG54R |   |
| 2 | PAIRED | PAIRED | - | - | ↓t |
|   | SG51R | SG52R | - | - |   |
| 2 | PAIRED | - | PAIRED | - | ↓t |
|   | SG51R | - | - | - |   |
| 2 | PAIRED | - | - | PAIRED | ↓t |
|   | SG51R | - | - | SG54R |   |
| 2 | - | PAIRED | PAIRED | - | ↓t |
|   | - | SG52R | - | - |   |
| 2 | - | PAIRED | - | PAIRED | ↓t |
|   | - | SG52R | - | SG54R |   |
| 2 | - | - | PAIRED | PAIRED | ↓t |
|   | - | - | - | SG54R |   |

*FIG. 65*

| | |
|---|---|
| SW5A (NORMAL PRESS) | UPSHIFTING |
| SW5B (NORMAL PRESS) | DOWNSHIFTING |
| SW5A (LONG PRESS) | DISPLAYING REMAINING LEVEL OF ELECTRIC POWER SOURCE |
| SW5B (LONG PRESS) | STARTING PAIRING MODE |
| SW5A + SW5B | INDICATING COMMUNICATION PROTOCOL |
| | INDICATING WIRELESS CONNECTION STATE |

FIG. 72

ELECTRIC DEVICE OF HUMAN-POWERED VEHICLE

BACKGROUND

Technical Field

The present invention relates to an electric device of a human-powered vehicle.

Background Information

A human-powered vehicle includes electric devices. The electric devices wirelessly communicate. In a case where electric devices use different communication protocols, the human-powered vehicle cannot use such electric devices in its system. One of objects of the present disclosure is to improve the usability of the electric device.

SUMMARY

In accordance with a first aspect of the present invention, an electric device of a human-powered vehicle comprises wireless communicator circuitry and electronic controller circuitry. The wireless communicator circuitry is configured to wirelessly communicate with first wireless communicator circuitry of a first electric device using a first communication protocol. The wireless communicator circuitry is configured to wirelessly communicate with second wireless communicator circuitry of a second electric device using a second communication protocol. The electronic controller circuitry is configured to control the wireless communicator circuitry to wirelessly transmit a first signal using the first communication protocol. The electronic controller circuitry is configured to execute pairing between the electric device and the first electric device based on a first response signal. The first response signal is wirelessly transmitted from the first wireless communicator circuitry of the first electric device. The electronic controller circuitry is configured to control the wireless communicator circuitry to wirelessly transmit a second signal using the second communication protocol regardless of the first response signal.

With the electric device according to the first aspect, it is possible to execute pairing using at least one of the first communication protocol and the second communication protocol. Thus, it is possible to improve usability of the electric device.

In accordance with a second aspect of the present invention, an electric device of a human-powered vehicle comprises wireless communicator circuitry and electronic controller circuitry. The wireless communicator circuitry is configured to wirelessly communicate with first wireless communicator circuitry of a first electric device using a first communication protocol. The wireless communicator circuitry is configured to wirelessly communicate with second wireless communicator circuitry of a second electric device using a second communication protocol. The electronic controller circuitry is configured to control the wireless communicator circuitry to wirelessly transmit a first signal using the first communication protocol. The electronic controller circuitry is configured to execute pairing between the electric device and the first electric device based on a first response signal. The first response signal is wirelessly transmitted from the first wireless communicator circuitry of the first electric device. The electronic controller circuitry is configured to control the wireless communicator circuitry to wirelessly transmit a second signal using the second communication protocol after the wireless communicator circuitry is received the first response signal.

With the electric device according to the second aspect, it is possible to execute pairing using at least one of the first communication protocol and the second communication protocol. Thus, it is possible to improve usability of the electric device.

In accordance with a third aspect of the present invention, the electric device according to the first or second aspect is configured so that the electronic controller circuitry is configured to control the wireless communicator circuitry to wirelessly transmit the second signal using the second communication protocol in a case where a condition is satisfied. The condition is free of whether the wireless communicator circuitry receives the first response signal.

With the electric device according to the third aspect, it is possible to reliably execute pairing using at least one of the first communication protocol and the second communication protocol. Thus, it is possible to reliably improve usability of the electric device.

In accordance with a fourth aspect of the present invention, the electric device according to any one of the first to third aspects is configured so that the electronic controller circuitry is configured to control the wireless communicator circuitry to wirelessly transmit the first signal repeatedly using the first communication protocol at a first number of times or for a first period regardless of whether the electronic controller circuitry receives the first response signal.

With the electric device according to the fourth aspect, it is possible to save power consumption of the electric device while improving the usability of the electric device.

In accordance with a fifth aspect of the present invention, the electric device according to any one of the first to fourth aspects is configured so that the electronic controller circuitry is configured to control the wireless communicator circuitry to wirelessly transmit the second signal repeatedly using the second communication protocol at a second number of times or for a second period regardless of whether the electronic controller circuitry receives the first response signal.

With the electric device according to the fifth aspect, it is possible to reliably execute pairing using at least one of the first communication protocol and the second communication protocol. Thus, it is possible to reliably improve usability of the electric device.

In accordance with a sixth aspect of the present invention, the electric device according to the fifth aspect is configured so that the second signal includes a second request signal and a second restriction signal different from the second request signal. The electronic controller circuitry is configured to control the wireless communicator circuitry to wirelessly transmit the second request signal to inform the second electric device that the electric device is ready to be paired with the second electric device. The electronic controller circuitry is configured to control the wireless communicator circuitry to wirelessly transmit the second request signal before the electronic controller circuitry is received the first response signal. The electronic controller circuitry is configured to control the wireless communicator circuitry to wirelessly transmit the second restriction signal after the electronic controller circuitry receives the first response signal.

With the electric device according to the sixth aspect, it is possible to inform the second electric device that the electric device is ready to be paired with the second electric device using the second restriction signal. Thus, it is possible to save power consumption of the second electric device while improving the usability of the electric device.

In accordance with a seventh aspect of the present invention, the electric device according to any one of the first to sixth aspects is configured so that the electronic controller circuitry is configured to control the wireless communicator circuitry to stop transmitting the first signal in response to receipt of the first response signal before the wireless communicator circuitry completes transmitting the first signal repeatedly at the first number of times or for the first period.

With the electric device according to the seventh aspect, it is possible to save power consumption of the electric device while improving the usability of the electric device.

In accordance with an eighth aspect of the present invention, the electric device according to any one of the first to seventh aspects is configured so that the electronic controller circuitry is configured to execute pairing between the electric device and the second electric device based on a second response signal. The second response signal is wirelessly transmitted from the second wireless communicator circuitry of the second electric device.

With the electric device according to the eighth aspect, it is possible to reliably execute pairing using at least one of the first communication protocol and the second communication protocol. Thus, it is possible to reliably improve usability of the electric device.

In accordance with a ninth aspect of the present invention, the electric device according to the eighth aspect is configured so that the electronic controller circuitry is configured to control the wireless communicator circuitry to wirelessly transmit the second signal using the second communication protocol regardless of the second response signal.

With the electric device according to the ninth aspect, it is possible to more reliably execute pairing using at least one of the first communication protocol and the second communication protocol. Thus, it is possible to improve usability of the electric device more reliably.

In accordance with a tenth aspect of the present invention, the electric device according to the eighth or ninth aspect is configured so that the electronic controller circuitry is configured to control the wireless communicator circuitry to stop transmitting the second signal in response to receipt of the second response signal before the wireless communicator circuitry completes transmitting the second signal repeatedly at the second number of times or for the second period.

With the electric device according to the tenth aspect, it is possible to save power consumption of the electric device while improving the usability of the electric device.

In accordance with an eleventh aspect of the present invention, the electric device according to any one of the eighth to tenth aspects is configured so that the electronic controller circuitry is configured to be paired with the first electric device based on the first response signal. The electronic controller circuitry is configured to be paired, after receipt of the first response signal, with the second electric device based on the second response signal.

With the electric device according to the eleventh aspect, it is possible to execute pairing using both the first communication protocol and the second communication protocol. Thus, it is possible to reliably improve usability of the electric device more reliably.

In accordance with a twelfth aspect of the present invention, the electric device according to any one of the eighth to eleventh aspects is configured so that the wireless communicator circuitry is configured to wirelessly communicate with third wireless communicator circuitry of a third electric device using a third communication protocol. The electronic controller circuitry is configured to control the wireless communicator circuitry to wirelessly transmit a third signal using the third communication protocol regardless of the first response signal.

With the electric device according to the twelfth aspect, it is possible to more reliably execute pairing using at least one of the first communication protocol and the second communication protocol. Thus, it is possible to improve usability of the electric device more reliably.

In accordance with a thirteenth aspect of the present invention, the electric device according to the twelfth aspect is configured so that the electronic controller circuitry is configured to control the wireless communicator circuitry to stop transmitting at least one of the second signal and the third signal in response to receipt of at least one of the second response signal and the third response signal. The electronic controller circuitry is configured to control the wireless communicator circuitry to keep wirelessly transmitting the first signal using the first communication protocol after the wireless communicator circuitry stops transmitting the second signal.

With the electric device according to the thirteenth aspect, it is possible to save power consumption of the electric device while improving the usability of the electric device.

In accordance with a fourteenth aspect of the present invention, the electric device according to any one of the first to thirteenth aspects is configured so that the electronic controller circuitry is configured to control the wireless communicator circuitry to wirelessly communicate with an external device using the first communication protocol. The electronic controller circuitry is configured to control the wireless communicator circuitry to wirelessly transmit the first signal repeatedly using the first communication protocol at a first number of times or for a first period regardless of receipt of the first response signal.

With the electric device according to the fourteenth aspect, it is possible to execute pairing between the electric device and the external device using the first communication protocol. Thus, it is possible to reliably improve usability of the electric device more reliably.

In accordance with a fifteenth aspect of the present invention, the electric device according to any one of the first to fourteenth aspects further comprises a user interface configured to receive a pairing user input. The electronic controller circuitry is configured to control the wireless communicator circuitry to start wireless transmission of the first signal in response to the pairing user input.

With the electric device according to the fifteenth aspect, it is possible to reliably improve the usability of the electric device.

In accordance with a sixteenth aspect of the present invention, the electric device according to the fifteenth aspect is configured so that the electronic controller circuitry is configured to control the wireless communicator circuitry to start wireless transmission of the second signal in response to the pairing user input.

With the electric device according to the sixteenth aspect, it is possible to more reliably improve the usability of the electric device.

In accordance with a seventeenth aspect of the present invention, the electric device according to the sixteenth aspect is configured so that the electronic controller circuitry is configured to control the wireless communicator circuitry to start wireless transmission of the second signal in response to the pairing user input at a timing different from a timing of a start of the wireless transmission of the first signal.

With the electric device according to the seventeenth aspect, it is possible to distribute the processing load of the electric device. Thus, it is possible to improve the processing speed of the electric device.

In accordance with an eighteenth aspect of the present invention, the electric device according to any one of the first to fourteenth aspects further comprises a user interface configured to receive a repairing user input. The electronic controller circuitry is configured to control the wireless communicator circuitry to wirelessly transmit the first signal without transmitting the second signal in response to the repairing user input in a case where the electric device is paired with the first electric device.

With the electric device according to the eighteenth aspect, it is possible to execute repairing between the electric device and the first electric device paired with the electric device while saving power consumption of the electric device.

In accordance with a nineteenth aspect of the present invention, the electric device according to any one of the first to fourteenth aspects further comprises a user interface configured to receive a reset user input. The electronic controller circuitry is configured to store pairing information indicative of another electric device which is paired with the electric device. The electronic controller circuitry is configured to reset the pairing information in response to the reset user input.

With the electric device according to the nineteenth aspect, it is possible to execute pairing from an initial state.

In accordance with a twentieth aspect of the present invention, the electric device according to any one of the first to nineteenth aspects further comprises an indicator configured to indicate protocol information indicative of a communication protocol used in the electric device.

With the electric device according to the twentieth aspect, it is possible to inform the user which communication protocol is used in the electric device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 4 and 5 are schematic block diagrams of electric devices of the control system illustrated in FIG. 2.

FIG. 27 is a schematic block diagram of the electric devices of the control system illustrated in FIG. 2 in the case where the electric device is paired with the first electric device.

FIG. 29 is a schematic block diagram of the electric devices of the control system illustrated in FIG. 2 in the case where the electric device is paired with the second electric device.

FIG. 31 is a schematic block diagram of the electric devices of the control system illustrated in FIG. 2 in the case where the electric device is paired with the third electric device.

FIG. 33 is a schematic block diagram of the electric devices of the control system illustrated in FIG. 2 in the case where the electric device is paired with the fourth electric device.

FIGS. 58 to 60 are lists showing the pairing process between the electric devices in accordance with a modification.

FIGS. 61 to 63 are lists showing the pairing process between the electric devices in accordance with a modification.

FIG. 64 is a list showing the repairing process between the electric devices in accordance with a modification.

FIG. 65 is a list showing the repairing process between the electric devices in accordance with a modification.

FIG. 72 is a schematic diagram showing a relationship between a user input and at least two assignments of the user interface.

DESCRIPTION OF THE EMBODIMENTS

Figure 1:
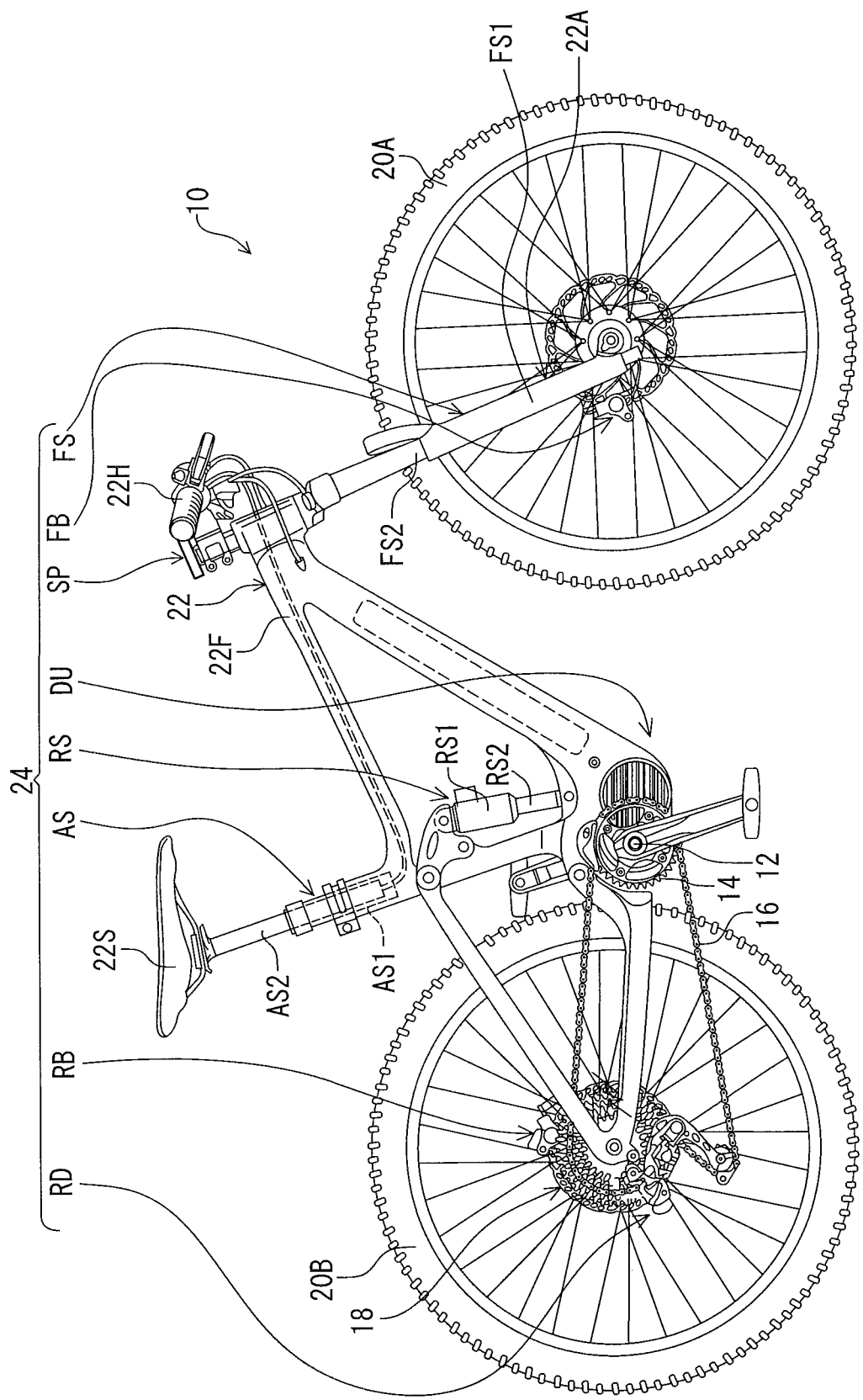
FIG. 1 is a side elevational view of a human-powered vehicle including a control system in accordance with one of embodiments.

The embodiments will now be described with reference to the accompanying drawings, wherein like reference numerals designate corresponding or identical elements throughout the various drawings.

As seen in FIG. 1, a human-powered vehicle 10 includes a crank 12, a sprocket 14, a chain 16, a sprocket assembly 18, a wheel 20A, a wheel 20B, and a vehicle body 22. The vehicle body 22 includes, for example, a frame 22F, a handlebar 22H, a front fork 22A, and a saddle 22S. The crank 12 is rotatably coupled to the vehicle body 22. The crank 12 is rotatable relative to the vehicle body 22 during pedaling. The sprocket 14 is coupled to the crank 12. The sprocket assembly 18 is rotatably coupled to the vehicle body 22. The chain 16 is engaged with the sprocket 14 and the sprocket assembly 18. The sprocket assembly 18 is coupled to the wheel 20A to transmit a pedaling force from the crank 12 to the wheel 20A via the sprocket 14 and the chain 16. The sprocket 14 can include at least two sprockets if needed or desired.

As seen in FIG. 1, the human-powered vehicle 10 includes a control system 24. The control system 24 of the human-powered vehicle 10 comprises an electric device FS. The electric device FS is configured to be mounted to the vehicle body 22 of the human-powered vehicle 10.

The electric device FS includes a suspension. The electric device FS is configured to absorb shocks or vibrations generated by riding on rough terrain. The electric device FS is installed in the front fork 22A. The electric device FS is configured to absorb shocks or vibrations transmitted from the wheel 20A. The electric device FS includes a first longitudinal member FS1 and a second longitudinal member FS2. The first longitudinal member FS1 and the second longitudinal member FS2 are relatively movable.

Figure 2:
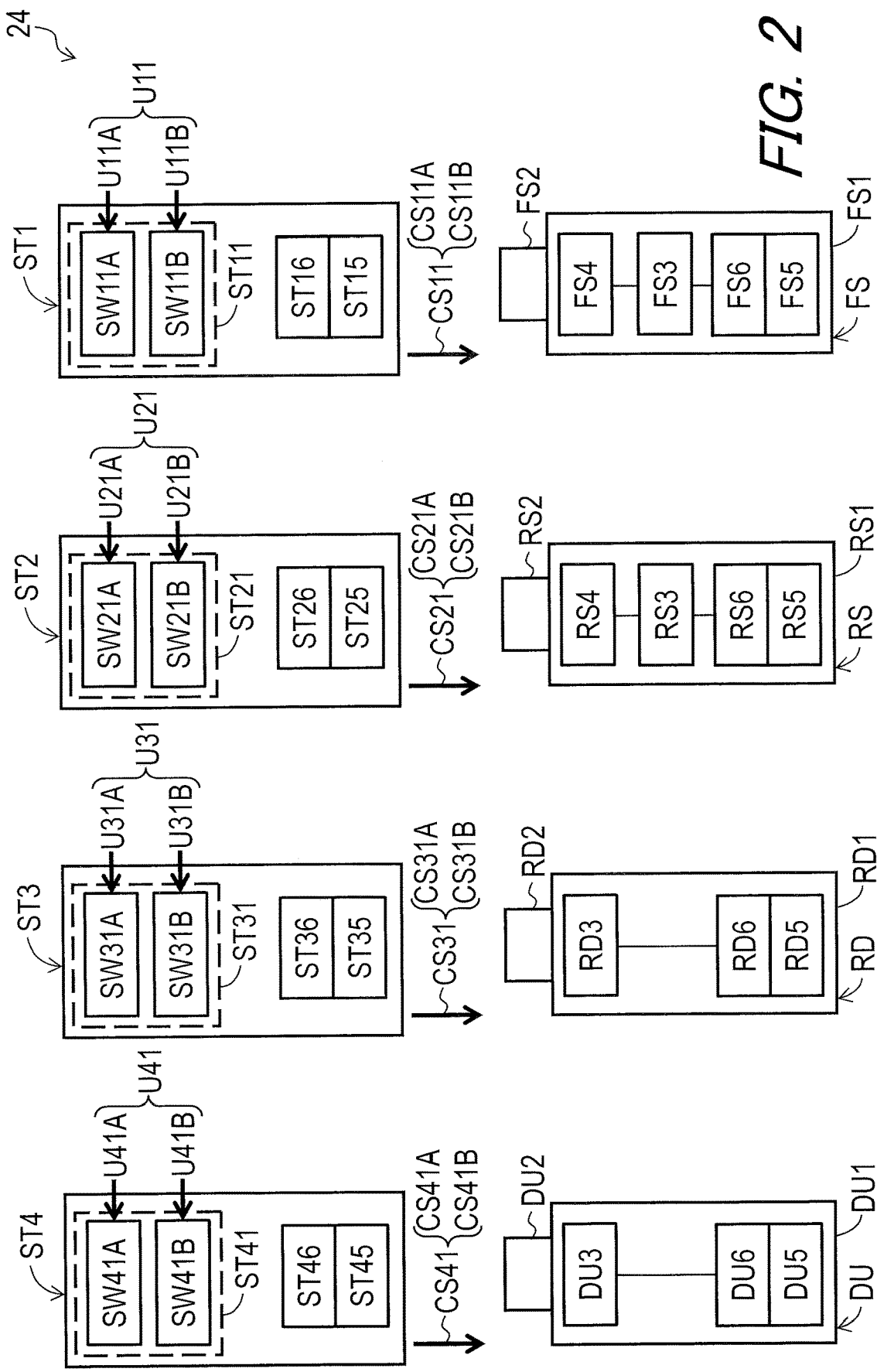
FIGS. 2 and 3 are schematic block diagrams of the control system of the human-powered vehicle illustrated in FIG. 1.

As seen in FIG. 2, the electric device FS of the human-powered vehicle 10 comprises an electric actuator FS3. The electric actuator FS3 is configured to generate an actuation force. Examples of the electric actuator FS3 include an electric motor.

The electric device FS includes a state changing structure FS4 configured to change the state of the electric device FS between a first state and a second state. The electric actuator FS3 is configured to actuate the state changing structure FS4 to change the state of the electric device FS between the first state and the second state. For example, the state changing structure FS4 includes a valve unit.

For example, the state changing structure FS4 is configured to allow the first longitudinal member FS1 and the second longitudinal member FS2 to relatively move in the first state. The state changing structure FS4 is configured to restrict the first longitudinal member FS1 and the second longitudinal member FS2 from relatively moving in the second state.

The electric device FS comprises an electric power source FS5 and a power source holder FS6. The electric power source FS5 is configured to supply electricity to the electric actuator FS3. The power source holder FS6 is configured to detachably and reattachably hold the electric power source FS5. The electric power source FS5 is configured to be detachably and reattachably attached to the power source holder FS6. The power source holder FS6 is electrically connected to the electric actuator FS3. The electric power source FS5 is configured to supply electricity to the electric actuator FS3 via the power source holder FS6. Examples of the electric power source FS5 includes a primary battery and a secondary battery.

As seen in FIG. 1, the control system 24 of the human-powered vehicle 10 comprises an electric device RS. The electric device RS is configured to be mounted to the vehicle body 22 of the human-powered vehicle 10.

The electric device RS includes a suspension. The electric device RS is configured to absorb shocks or vibrations generated by riding on rough terrain. The electric device RS is configured to absorb shocks or vibrations transmitted from the wheel 20B. The electric device RS includes a first longitudinal member RS1 and a second longitudinal member RS2. The first longitudinal member RS1 and the second longitudinal member RS2 are relatively movable.

As seen in FIG. 2, the electric device RS of the human-powered vehicle 10 comprises an electric actuator RS3. The electric actuator RS3 is configured to generate an actuation force. Examples of the electric actuator RS3 include an electric motor.

The electric device RS includes a state changing structure RS4 configured to change the state of the electric device RS between a first state and a second state. The electric actuator RS3 is configured to actuate the state changing structure RS4 to change the state of the electric device RS between the first state and the second state. For example, the state changing structure RS4 includes a valve unit.

The state changing structure RS4 is configured to allow the first longitudinal member RS1 and the second longitudinal member RS2 to relatively move in the first state. The state changing structure RS4 is configured to restrict the first longitudinal member RS1 and the second longitudinal member RS2 from relatively moving in the second state.

The electric device RS comprises an electric power source RS5 and a power source holder RS6. The electric power source RS5 is configured to supply electricity to the electric actuator RS3. The power source holder RS6 is configured to detachably and reattachably hold the electric power source RS5. The electric power source RS5 is configured to be detachably and reattachably attached to the power source holder RS6. The power source holder RS6 is electrically connected to the electric actuator RS3. The electric power source RS5 is configured to supply electricity to the electric actuator RS3 via the power source holder RS6. Examples of the electric power source RS5 includes a primary battery and a secondary battery.

As seen in FIG. 1, the control system 24 of the human-powered vehicle 10 comprises an electric device RD. The electric device RD is configured to be mounted to the vehicle body 22 of the human-powered vehicle 10.

The electric device RD includes a gear changer. The electric device RD is configured to change a gear ratio of the human-powered vehicle 10. The gear ratio is a ratio of a rotational speed of the sprocket assembly 18 to a rotational speed of the sprocket 14. The electric device RD is configured to shift the chain 16 relative to the sprocket assembly 18. In the present embodiment, the electric device RD includes a rear derailleur. However, the electric device RD can include another type of gear changer if needed or desired. Examples of another type of gear changer include a front derailleur and an internal-gear hub.

As seen in FIG. 2, the electric device RD further comprises a base member RD1 and a movable member RD2. The base member RD1 is mountable to the vehicle body 22 of the human-powered vehicle 10. The movable member RD2 is movable relative to the base member RD1. For example, the movable member RD2 includes a chain guide and a linkage. The chain guide is contactable with the chain 16. The linkage movably couples the base member RD1 and the chain guide. The electric actuator RD3 is at least partially provided to at least one of the base member RD1 and the movable member RD2.

The electric device RD of the human-powered vehicle 10 comprises an electric actuator RD3. The electric actuator RD3 is configured to generate an actuation force. Examples of the electric actuator RD3 include an electric motor. The electric actuator RD3 is coupled to at least one of the base member RD1 and the movable member RD2 to move the movable member RD2 relative to the base member RD1.

The electric device RD comprises an electric power source RD5 and a power source holder RD6. The electric power source RD5 is configured to supply electricity to the electric actuator RD3. The power source holder RD6 is configured to detachably and reattachably hold the electric power source RD5. The electric power source RD5 is configured to be detachably and reattachably attached to the power source holder RD6. The power source holder RD6 is electrically connected to the electric actuator RD3. The electric power source RD5 is configured to supply electricity to the electric actuator RD3 via the power source holder RD6. Examples of the electric power source RD5 includes a primary battery and a secondary battery.

As seen in FIG. 1, the control system 24 of the human-powered vehicle 10 comprises an electric device DU. The electric device DU is configured to be mounted to the vehicle body 22 of the human-powered vehicle 10.

The electric device DU includes an assist driving unit. The electric device DU is configured to assist propulsion of the human-powered vehicle 10. The electric device DU is configured to change an assist ratio depending on a human power applied to the human-powered vehicle 10.

As seen in FIG. 2, the electric device DU of the human-powered vehicle 10 comprises an electric actuator DU3. The electric actuator DU3 is configured to generate an actuation force. Examples of the electric actuator DU3 include an electric motor. The electric actuator DU3 is configured to apply the actuation force to the human-powered vehicle 10 to assist propulsion of the human-powered vehicle 10.

The electric device DU comprises an electric power source DU5 and a power source holder DU6. The electric power source DU5 is configured to supply electricity to the electric actuator DU3. The power source holder DU6 is configured to detachably and reattachably hold the electric power source DU5. The electric power source DU5 is configured to be detachably and reattachably attached to the power source holder DU6. The power source holder DU6 is electrically connected to the electric actuator DU3. The electric power source DU5 is configured to supply electricity to the electric actuator DU3 via the power source holder DU6. Examples of the electric power source DU5 includes a primary battery and a secondary battery.

As seen in FIG. 1, the control system 24 of the human-powered vehicle 10 comprises an electric device FB. The electric device FB is configured to be mounted to the vehicle body 22 of the human-powered vehicle 10.

The electric device FB includes a braking device. The electric device FB is configured to apply a braking force to the human-powered vehicle 10. The electric device FB is configured to apply a braking force to the wheel 20A.

Figure 3:
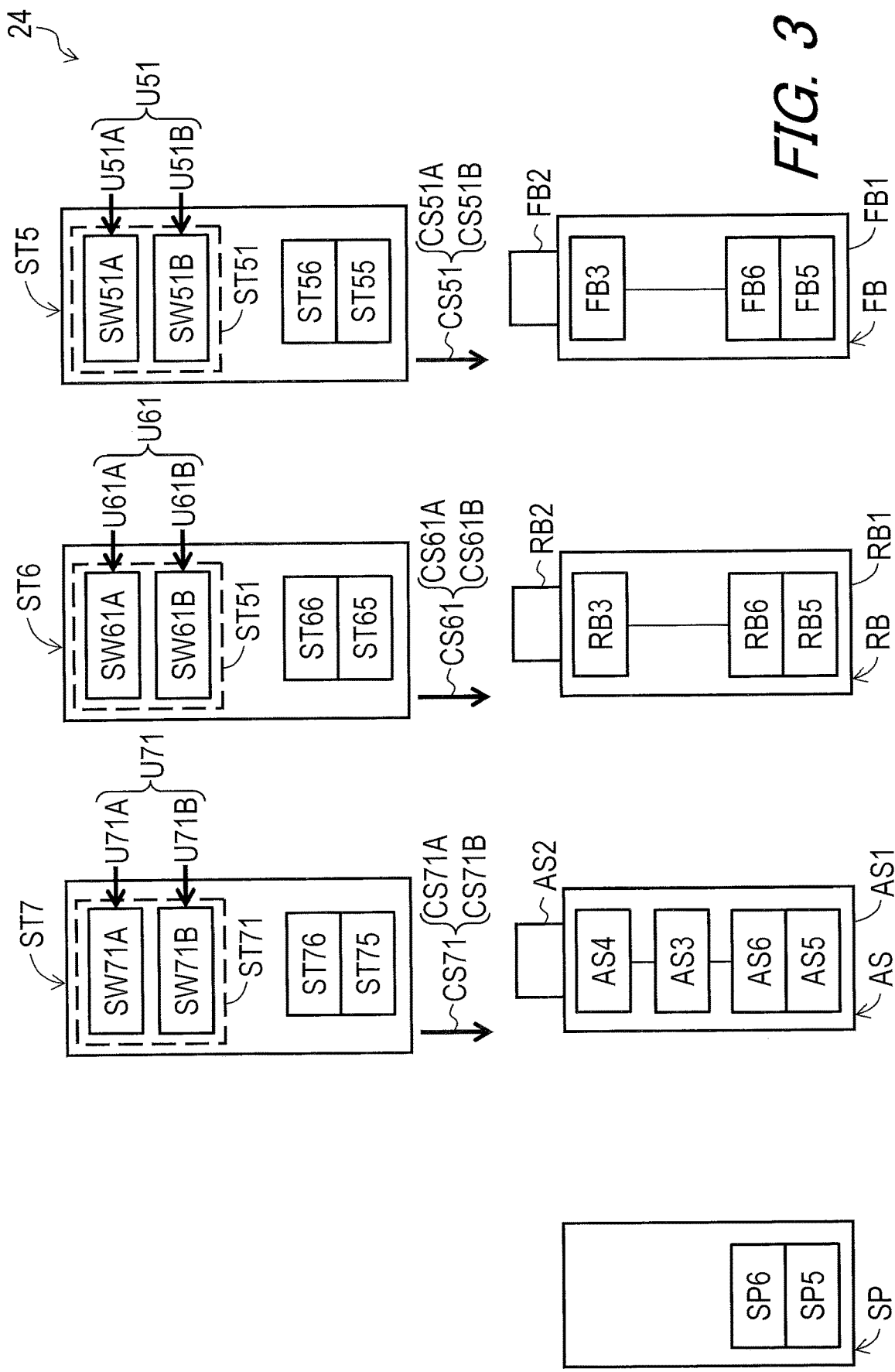

As seen in FIG. 3, the electric device FB further comprises a base member FB1 and a movable member FB2. The base member FB1 is mountable to the vehicle body 22 of the human-powered vehicle 10. The movable member FB2 is movable relative to the base member FB1. For example, the movable member FB2 includes a brake pad. The movable member FB2 is slidably contactable with the wheel 20A. The electric device FB of the human-powered vehicle 10 comprises an electric actuator FB3. The electric actuator FB3 is configured to generate an actuation force. Examples of the electric actuator FB3 include an electric motor. The electric actuator FB3 is configured to move the movable member FB2 relative to the base member FB1. The electric actuator FB3 is configured to apply the actuation force to the human-powered vehicle 10 as the braking force via the movable member FB2.

The electric device FB comprises an electric power source FB5 and a power source holder FB6. The electric power source FB5 is configured to supply electricity to the electric actuator FB3. The power source holder FB6 is configured to detachably and reattachably hold the electric power source FB5. The electric power source FB5 is configured to be detachably and reattachably attached to the power source holder FB6. The power source holder FB6 is electrically connected to the electric actuator FB3. The electric power source FB5 is configured to supply electricity to the electric actuator FB3 via the power source holder FB6. Examples of the electric power source FB5 includes a primary battery and a secondary battery.

As seen in FIG. 1, the control system 24 of the human-powered vehicle 10 comprises an electric device RB. The electric device RB is configured to be mounted to the vehicle body 22 of the human-powered vehicle 10.

The electric device RB includes a braking device. The electric device RB is configured to apply a braking force to the human-powered vehicle 10. The electric device RB is configured to apply a braking force to the wheel 20B.

As seen in FIG. 3, the electric device RB further comprises a base member RB1 and a movable member RB2. The base member RB1 is mountable to the vehicle body 22 of the human-powered vehicle 10. The movable member RB2 is movable relative to the base member RB1. For example, the movable member RB2 includes a brake pad. The movable member RB2 is slidably contactable with the wheel 20A. The electric device RB of the human-powered vehicle 10 comprises an electric actuator RB3. The electric actuator RB3 is configured to generate an actuation force. Examples of the electric actuator RB3 include an electric motor. The electric actuator RB3 is configured to move the movable member RB2 relative to the base member RB1. The electric actuator RB3 is configured to apply the actuation force to the human-powered vehicle 10 as the braking force via the movable member RB2.

The electric device RB comprises an electric power source RB5 and a power source holder RB6. The electric power source RB5 is configured to supply electricity to the electric actuator RB3. The power source holder RB6 is configured to detachably and reattachably hold the electric power source RB5. The electric power source RB5 is configured to be detachably and reattachably attached to the power source holder RB6. The power source holder RB6 is electrically connected to the electric actuator RB3. The electric power source RB5 is configured to supply electricity to the electric actuator RB3 via the power source holder RB6. Examples of the electric power source RB5 includes a primary battery and a secondary battery.

As seen in FIG. 1, the control system 24 of the human-powered vehicle 10 comprises an electric device AS. The electric device AS is configured to be mounted to the vehicle body 22 of the human-powered vehicle 10.

The electric device AS includes an adjustable seatpost. The electric device AS is configured to change a height of the saddle 22S relative to the frame 22F. The electric device AS has an adjustable state and a locked state. The electric device AS allows the user to change the height of the saddle 22S in the adjustable state. The electric device AS is locked to maintain the height of the saddle 22S in the locked state. The electric device AS is configured to change the state of the electric device AS between the adjustable state and the locked state. The electric device AS includes a first longitudinal member AS1 and a second longitudinal member AS2. The first longitudinal member AS1 and the second longitudinal member AS2 are relatively movable.

As seen in FIG. 3, the electric device AS of the human-powered vehicle 10 comprises an electric actuator AS3. The electric actuator AS3 is configured to generate an actuation force. Examples of the electric actuator AS3 include an electric motor. The actuation force changes the state of the electric device AS between the first state and the second state.

The electric device AS includes a state changing structure AS4 configured to change the state of the electric device AS between the adjustable state and the locked state. The electric actuator AS3 is configured to actuate the state changing structure AS4 to change the state of the electric device AS between the adjustable state and the locked state. For example, the state changing structure AS4 includes a valve unit.

The state changing structure AS4 is configured to allow the first longitudinal member AS1 and the second longitudinal member AS2 to relatively move in the adjustable state. The state changing structure AS4 is configured to restrict the first longitudinal member AS1 and the second longitudinal member AS2 from relatively moving in the locked state.

The electric device AS comprises an electric power source AS5 and a power source holder AS6. The electric power source AS5 is configured to supply electricity to the electric actuator AS3. The power source holder AS6 is configured to detachably and reattachably hold the electric power source AS5. The electric power source AS5 is configured to be detachably and reattachably attached to the power source holder AS6. The power source holder AS6 is electrically connected to the electric actuator AS3. The electric power source AS5 is configured to supply electricity to the electric actuator AS3 via the power source holder AS6. Examples of the electric power source AS5 includes a primary battery and a secondary battery.

As seen in FIG. 3, the control system 24 comprises an electric device SP. The electric device SP is configured to be mounted to the vehicle body 22 of the human-powered vehicle 10. For example, the electric device SP includes at least one of a smartphone and a cycle computer. The electric device SP is configured to display information relating to the human-powered vehicle 10. However, the electric device SP can include structures other than the smartphone and the cycle computer if needed or desired. The electric device SP can also be referred to as an external device SP.

The electric device SP comprises a third electric power source SP5 and a third power source holder SP6. The third power source holder SP6 is configured to detachably and reattachably hold the third electric power source SP5. The third electric power source SP5 is configured to be detachably and reattachably attached to the third power source holder SP6. Examples of the third electric power source SP5 includes a primary battery and a secondary battery.

The human-powered vehicle 10 can include another electric device other than the electric devices FS, RS, RD, DU, FB, RB, AS, and SP if needed or desired. At least one of the electric devices FS, RS, RD, DU, FB, RB, AS, and SP can be omitted from the human-powered vehicle 10 if needed or desired.

As seen in FIG. 2, the control system 24 of the human-powered vehicle 10 comprises an electric device ST1. The electric device ST1 is configured to be mounted to the vehicle body 22 (see e.g., FIG. 1) of the human-powered vehicle 10. The electric device ST1 is configured to operate the electric device FS. The electric device ST1 can be mounted to parts other than the handlebar 22H (see e.g., FIG. 1) if needed or desired. The electric device ST1 can also be referred to as an operating device ST1.

The electric device ST1 of the human-powered vehicle 10 comprises a user interface ST11. The user interface ST11 is configured to receive a user input U11. The user input U11 includes at least one of user inputs U11A and U11B. For example, the user interface ST11 includes an electric switch SW11A configured to be activated by the user input U11A. The user interface ST11 includes an electric switch SW11B configured to be activated by the user input U11B. The user input U11A includes a press of the electric switch SW11A. The user input U11B includes a press of the electric switch SW11B. The user interface ST11 can include structures other than the electric switch SW11A or SW11B if needed or desired. One of the electric switches SW11A and SW11B can be omitted from the user interface ST11 if needed or desired.

The user input U11 includes concurrent receipts of the user inputs U11A and U11B. The user input U11 includes concurrent presses of the electric switches SW11A and SW11B. The user input U11 includes a normal press, a long press, or multiple presses of the electric switch SW11A. The user input U11 includes a normal press, a long press, or multiple presses of the electric switch SW11B.

The electric device ST1 is configured to operate the electric device FS in response to the user input U11. The electric device ST1 is configured to generate a control signal CS11 in response to the user input U11. The electric device ST1 is configured to generate a control signal CS11A in response to the user input U11A. The electric device ST1 is configured to generate a control signal CS11B in response to the user input U11B.

The electric device FS has a first state and a second state. For example, the electric device FS is configured to absorb shocks or vibrations generated by riding on rough terrain in the first state. The electric device FS is configured to be free of absorbing shocks or vibrations generated by riding on rough terrain in the second state. The electric device FS can be configured to have a first stroke in the first state while the electric device FS can be configured to have a second stroke different from the first stroke in the second state. The electric device FS can be configured to have a first damper performance in the first state while the electric device FS can be configured to have a second damper performance different from the first damper performance in the second state. The electric device FS is configured to change the state of the electric device FS between the first state and the second state in response to the control signal CS11. The electric device FS is configured to change the state of the electric device FS between the first state and the second state in response to the control signal CS11A or CA11B. The control signal CS11 indicates changing of the state of the electric device FS. The control signal CS11A or CA11B indicates changing of the state of the electric device FS.

The electric device ST1 comprises an electric power source ST15 and a power source holder ST16. The power source holder ST16 is configured to detachably and reattachably hold the electric power source ST15. The electric power source ST15 is configured to be detachably and reattachably attached to the power source holder ST16. Examples of the electric power source ST15 includes a primary battery and a secondary battery.

As seen in FIG. 2, the control system 24 of the human-powered vehicle 10 comprises an electric device ST2. The electric device ST2 is configured to be mounted to the vehicle body 22 (see e.g., FIG. 1) of the human-powered vehicle 10. The electric device ST2 is configured to operate the electric device RS. The electric device ST2 can be mounted to parts other than the handlebar 22H (see e.g., FIG. 1) if needed or desired. The electric device ST2 can also be referred to as an operating device ST2.

The electric device ST2 of the human-powered vehicle 10 comprises a user interface ST21. The user interface ST21 is configured to receive a user input U21. The user input U21 includes at least one of user inputs U21A and U21B. For example, the user interface ST21 includes an electric switch SW21A configured to be activated by the user input U21A. The user interface ST21 includes an electric switch SW21B configured to be activated by the user input U21B. The user input U21A includes a press of the electric switch SW21A. The user input U21B includes a press of the electric switch SW21B. The user interface ST21 can include structures other than the electric switch SW21A or SW21B if needed or desired. One of the electric switches SW21A and SW21B can be omitted from the user interface ST21 if needed or desired.

The user input U21 includes concurrent receipts of the user inputs U21A and U21B. The user input U21 includes concurrent presses of the electric switches SW21A and SW21B. The user input U21 includes a normal press, a long press, or multiple presses of the electric switch SW21A. The user input U21 includes a normal press, a long press, or multiple presses of the electric switch SW21B.

The electric device ST2 is configured to operate the electric device RS in response to the user input U21. The electric device ST2 is configured to generate a control signal CS21 in response to the user input U21. The electric device ST2 is configured to generate a control signal CS21A in response to the user input U21A. The electric device ST2 is configured to generate a control signal CS21B in response to the user input U21B.

The electric device RS has a first state and a second state. For example, the electric device RS is configured to absorb shocks or vibrations generated by riding on rough terrain in the first state. The electric device RS is configured to be free of absorbing shocks or vibrations generated by riding on rough terrain in the second state. The electric device RS can be configured to have a first stroke in the first state while the electric device RS can be configured to have a second stroke different from the first stroke in the second state. The electric device RS can be configured to have a first damper performance in the first state while the electric device RS can be configured to have a second damper performance different from the first damper performance in the second state. The electric device RS is configured to change the state of the electric device RS between the first state and the second state in response to the control signal CS21. The electric device RS is configured to change the state of the electric device RS between the first state and the second state in response to the control signal CS21A or CS21B. The control signal CS21 indicates changing of the state of the electric device RS. The control signal CS21A or CA21B indicates changing of the state of the electric device RS.

The electric device ST2 comprises an electric power source ST25 and a power source holder ST26. The power source holder ST26 is configured to detachably and reattachably hold the electric power source ST25. The electric power source ST25 is configured to be detachably and reattachably attached to the power source holder ST26. Examples of the electric power source ST25 includes a primary battery and a secondary battery.

As seen in FIG. 2, the control system 24 of the human-powered vehicle 10 comprises an electric device ST3. The electric device ST3 is configured to be mounted to the vehicle body 22 (see e.g., FIG. 1) of the human-powered vehicle 10. The electric device ST3 is configured to operate the electric device RD. The electric device ST3 can be mounted to parts other than the handlebar 22H (see e.g., FIG. 1) if needed or desired. The electric device ST3 can also be referred to as an operating device ST3.

The electric device ST3 of the human-powered vehicle 10 comprises a user interface ST31. The user interface ST31 is configured to receive a user input U31. The user input U31 includes at least one of user inputs U31A and U31B. For example, the user interface ST31 includes an electric switch SW31A configured to be activated by the user input U31A. The user interface ST31 includes an electric switch SW31B configured to be activated by the user input U31B. The user input U31A includes a press of the electric switch SW31A. The user input U31B includes a press of the electric switch SW31B. The user interface ST31 can include structures other than the electric switch SW31A or SW31B if needed or desired. One of the electric switches SW31A and SW31B can be omitted from the user interface ST31 if needed or desired.

The user input U31 includes concurrent receipts of the user inputs U31A and U31B. The user input U31 includes concurrent presses of the electric switches SW31A and SW31B. The user input U31 includes a normal press, a long press, or multiple presses of the electric switch SW31A. The user input U31 includes a normal press, a long press, or multiple presses of the electric switch SW31B.

The electric device ST3 is configured to operate the electric device RD in response to the user input U31. The electric device ST3 is configured to generate a control signal CS31 in response to the user input U31. The electric device ST3 is configured to generate a control signal CS31A in response to the user input U31A. The electric device ST3 is configured to generate a control signal CS31B in response to the user input U31B.

The electric device RD is configured to change the gear ratio in response to the control signal CS31. The electric device RD is configured to change the gear ratio in response to the control signal CS31A or CS31B. For example, the control signal CS31A indicates one of upshifting and downshifting of the electric device RD. The control signal CS31B indicates the other of upshifting and downshifting of the electric device RD.

The electric device ST3 comprises an electric power source ST35 and a power source holder ST36. The power source holder ST36 is configured to detachably and reattachably hold the electric power source ST35. The electric power source ST35 is configured to be detachably and reattachably attached to the power source holder ST36. Examples of the electric power source ST35 includes a primary battery and a secondary battery.

As seen in FIG. 2, the control system 24 of the human-powered vehicle 10 comprises an electric device ST4. The electric device ST4 is configured to be mounted to the vehicle body 22 (see e.g., FIG. 1) of the human-powered vehicle 10. The electric device ST4 is configured to operate the electric device FS. The electric device ST4 can be mounted to parts other than the handlebar 22H (see e.g., FIG. 1) if needed or desired. The electric device ST4 can also be referred to as an operating device ST4.

The electric device ST4 of the human-powered vehicle 10 comprises a user interface ST41. The user interface ST41 is configured to receive a user input U41. The user input U41 includes at least one of user inputs U41A and U41B. For example, the user interface ST41 includes an electric switch SW41A configured to be activated by the user input U41A. The user interface ST41 includes an electric switch SW41B configured to be activated by the user input U41B. The user input U41A includes a press of the electric switch SW41A. The user input U41B includes a press of the electric switch SW41B. The user interface ST41 can include structures other than the electric switch SW41A or SW41B if needed or desired. One of the electric switches SW41A and SW41B can be omitted from the user interface ST41 if needed or desired.

The user input U41 includes concurrent receipts of the user inputs U41A and U41B. The user input U41 includes concurrent presses of the electric switches SW41A and SW41B. The user input U41 includes a normal press, a long press, or multiple presses of the electric switch SW41A. The user input U41 includes a normal press, a long press, or multiple presses of the electric switch SW41B.

The electric device ST4 is configured to operate the electric device DU in response to the user input U41. The electric device ST4 is configured to generate a control signal CS41 in response to the user input U41. The electric device ST4 is configured to generate a control signal CS41A in response to the user input U41A. The electric device ST4 is configured to generate a control signal CS41B in response to the user input U41B. The electric device DU is configured to change the assist ratio which is a ratio of the assist driving force to the human power applied to the human-powered vehicle 10 in response to the control signal CS41. The electric device DU is configured to change the assist ratio which is a ratio of the assist driving force to the human power applied to the human-powered vehicle 10 in response to the control signal CS41A or CS41B. The electric device DU includes at least two assist ratios. The electric device DU is configured to change the assist ratio between the at least two assist ratios in response to the control signal CS41. The electric device DU is configured to change the assist ratio between the at least two assist ratios in response to the control signal CS41A or CA41B.

The electric device ST4 comprises an electric power source ST45 and a power source holder ST46. The power source holder ST46 is configured to detachably and reattachably hold the electric power source ST45. The electric power source ST45 is configured to be detachably and reattachably attached to the power source holder ST46. Examples of the electric power source ST45 includes a primary battery and a secondary battery.

As seen in FIG. 2, the control system 24 of the human-powered vehicle 10 comprises an electric device ST5. The electric device ST5 is configured to be mounted to the vehicle body 22 (see e.g., FIG. 1) of the human-powered vehicle 10. The electric device ST5 is configured to operate the electric device FS. The electric device ST5 can be mounted to parts other than the handlebar 22H (see e.g., FIG. 1) if needed or desired. The electric device ST5 can also be referred to as an operating device ST5.

The electric device ST5 of the human-powered vehicle 10 comprises a user interface ST51. The user interface ST51 is configured to receive a user input U51. The user input U51 includes at least one of user inputs U51A and U51B. For example, the user interface ST51 includes an electric switch SW51A configured to be activated by the user input U51A. The user interface ST51 includes an electric switch SW51B configured to be activated by the user input U51B. The user input U51A includes a press of the electric switch SW51A. The user input U51B includes a press of the electric switch SW51B. The user interface ST51 can include structures other than the electric switch SW51A or SW51B if needed or desired. One of the electric switches SW51A and SW51B can be omitted from the user interface ST51 if needed or desired.

The user input U51 includes concurrent receipts of the user inputs U51A and U51B. The user input U51 includes concurrent presses of the electric switches SW51A and SW51B. The user input U51 includes a normal press, a long press, or multiple presses of the electric switch SW51A. The user input U51 includes a normal press, a long press, or multiple presses of the electric switch SW51B.

The electric device ST5 is configured to operate the electric device FB in response to the user input U51. The electric device ST5 is configured to generate a control signal CS51 in response to the user input U51. The electric device ST5 is configured to generate a control signal CS51A in response to the user input U51A. The electric device ST5 is configured to generate a control signal CS51B in response to the user input U51B. The electric device FB is configured to apply the braking force to the human-powered vehicle 10 in response to the control signal CS51. The electric device FB is configured to apply the braking force to the human-powered vehicle 10 in response to the control signal CS51A or CS51B.

The electric device ST5 comprises an electric power source ST55 and a power source holder ST56. The power source holder ST56 is configured to detachably and reattachably hold the electric power source ST55. The electric power source ST55 is configured to be detachably and reattachably attached to the power source holder ST56. Examples of the electric power source ST55 includes a primary battery and a secondary battery.

As seen in FIG. 2, the control system 24 of the human-powered vehicle 10 comprises an electric device ST6. The electric device ST6 is configured to be mounted to the vehicle body 22 (see e.g., FIG. 1) of the human-powered vehicle 10. The electric device ST6 is configured to operate the electric device RB. The electric device ST6 can be mounted to parts other than the handlebar 22H (see e.g., FIG. 1) if needed or desired. The electric device ST6 can also be referred to as an operating device ST6.

The electric device ST6 of the human-powered vehicle 10 comprises a user interface ST61. The user interface ST61 is configured to receive a user input U61. The user input U61 includes at least one of user inputs U61A and U61B. For example, the user interface ST61 includes an electric switch SW61A configured to be activated by the user input U61A. The user interface ST61 includes an electric switch SW61B configured to be activated by the user input U61B. The user input U61A includes a press of the electric switch SW61A. The user input U61B includes a press of the electric switch SW61B. The user interface ST61 can include structures other than the electric switch SW61A or SW61B if needed or desired. One of the electric switches SW61A and SW61B can be omitted from the user interface ST61 if needed or desired.

The user input U61 includes concurrent receipts of the user inputs U61A and U61B. The user input U61 includes concurrent presses of the electric switches SW61A and SW61B. The user input U61 includes a normal press, a long press, or multiple presses of the electric switch SW61A. The user input U61 includes a normal press, a long press, or multiple presses of the electric switch SW61B.

The electric device ST6 is configured to operate the electric device RB in response to the user input U61. The electric device ST6 is configured to generate a control signal CS61 in response to the user input U61. The electric device ST6 is configured to generate a control signal CS61A in response to the user input U61A. The electric device ST6 is configured to generate a control signal CS61B in response to the user input U61B. The electric device RB is configured to apply the braking force to the human-powered vehicle 10 in response to the control signal CS61. The electric device RB is configured to apply the braking force to the human-powered vehicle 10 in response to the control signal CS61A or CS61B.

The electric device ST6 comprises an electric power source ST65 and a power source holder ST66. The power source holder ST66 is configured to detachably and reattachably hold the electric power source ST65. The electric power source ST65 is configured to be detachably and reattachably attached to the power source holder ST66. Examples of the electric power source ST65 includes a primary battery and a secondary battery.

As seen in FIG. 2, the control system 24 of the human-powered vehicle 10 comprises an electric device ST7. The electric device ST7 is configured to be mounted to the vehicle body 22 (see e.g., FIG. 1) of the human-powered vehicle 10. The electric device ST7 is configured to operate the electric device AS. The electric device ST7 can be mounted to parts other than the handlebar 22H (see e.g., FIG. 1) if needed or desired. The electric device ST7 can also be referred to as an operating device ST7.

The electric device ST7 of the human-powered vehicle 10 comprises a user interface ST71. The user interface ST71 is configured to receive a user input U71. The user input U71 includes at least one of user inputs U71A and U71B. For example, the user interface ST71 includes an electric switch SW71A configured to be activated by the user input U71A. The user interface ST71 includes an electric switch SW71B configured to be activated by the user input U71B. The user input U71A includes a press of the electric switch SW71A. The user input U71B includes a press of the electric switch SW71B. The user interface ST71 can include structures other than the electric switch SW71A or SW71B if needed or desired. One of the electric switches SW71A and SW71B can be omitted from the user interface ST71 if needed or desired.

The user input U71 includes concurrent receipts of the user inputs U71A and U71B. The user input U71 includes concurrent presses of the electric switches SW71A and SW71B. The user input U71 includes a normal press, a long press, or multiple presses of the electric switch SW71A. The user input U71 includes a normal press, a long press, or multiple presses of the electric switch SW71B.

The electric device ST7 is configured to operate the electric device AS in response to the user input U71. The electric device ST7 is configured to generate a control signal CS7 in response to the user input U71. The electric device ST7 is configured to generate a control signal CS7A in response to the user input U71A. The electric device ST7 is configured to generate a control signal CS7B in response to the user input U71B. The electric device AS is configured to the state of the electric device AS between the adjustable state and the locked state in response to the control signal CS7. The electric device AS is configured to the state of the electric device AS between the adjustable state and the locked state in response to the control signal CS7A. The electric device AS is configured to the state of the electric device AS between the adjustable state and the locked state in response to the control signal CS7B.

The electric device ST7 comprises an electric power source ST75 and a power source holder ST76. The power source holder ST76 is configured to detachably and reattachably hold the electric power source ST75. The electric power source ST75 is configured to be detachably and reattachably attached to the power source holder ST76. Examples of the electric power source ST75 includes a primary battery and a secondary battery.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 10 with facing a handlebar or steering. Examples of the user's standard position include a saddle and a seat. Accordingly, these terms, as utilized to describe the electric devices FS, RS, RD, DU, FB, RB, AS, and SP, the electric devices ST1, ST2, ST3, ST4, ST5, ST6, and ST7, or other devices, should be interpreted relative to the human-powered vehicle 10 equipped with the electric devices FS, RS, RD, DU, FB, RB, AS, and SP, the electric devices ST1, ST2, ST3, ST4, ST5, ST6, and ST7, or other devices as used in an upright riding position on a horizontal surface.

One of the electric devices FS, RS, RD, DU, FB, RB, AS, SP, ST1, ST2, ST3, ST4, ST5, ST6, and ST7 can also be referred to as a first electric device ED1. Another of the electric devices FS, RS, RD, DU, FB, RB, AS, SP, ST1, ST2, ST3, ST4, ST5, ST6, and ST7 can also be referred to as a second electric device ED2. Another of the electric devices FS, RS, RD, DU, FB, RB, AS, SP, ST1, ST2, ST3, ST4, ST5, ST6, and ST7 can also be referred to as a third electric device ED3. Another of the electric devices FS, RS, RD, DU, FB, RB, AS, SP, ST1, ST2, ST3, ST4, ST5, ST6, and ST7 can also be referred to as a fourth electric device ED4. Another of the electric devices FS, RS, RD, DU, FB, RB, AS, SP, ST1, ST2, ST3, ST4, ST5, ST6, and ST7 can also be referred to as an electric device ED5.

One of the electric actuators FS3, RS3, RD3, DU3, FB3, RB3, and AS3 can also be referred to as a first electric actuator ED13 of the first electric device ED1. Another of the electric actuators FS3, RS3, RD3, DU3, FB3, RB3, and AS3 can also be referred to as a second electric actuator ED23 of the second electric device ED2. Another of the electric actuators FS3, RS3, RD3, DU3, FB3, RB3, and AS3 can also be referred to as a third electric actuator ED33 of the third electric device ED3.

One of the electric power sources FS5, RS5, RD5, DU5, FB5, RB5, and AS5 can also be referred to as a first electric power source ED15 of the first electric device ED1. Another of the electric power sources FS5, RS5, RD5, DU5, FB5, RB5, and AS5 can also be referred to as a second electric power source ED25 of the second electric device ED2. Another of the electric power sources FS5, RS5, RD5, DU5, FB5, RB5, and AS5 can also be referred to as a third electric power source ED35 of the third electric device ED3. Another of the electric power sources FS5, RS5, RD5, DU5, FB5, RB5, and AS5 can also be referred to as a fourth electric power source ED45 of the fourth electric device ED4.

One of the power source holders FS6, RS6, RD6, DU6, FB6, RB6, and AS6 can also be referred to as a first power source holder ED16 of the first electric device ED1. Another of the power source holders FS6, RS6, RD6, DU6, FB6, RB6, and AS6 can also be referred to as a second power source holder ED26 of the second electric device ED2. Another of the power source holders FS6, RS6, RD6, DU6, FB6, RB6, and AS6 can also be referred to as a third power source holder ED36 of the third electric device ED3. Another of the power source holders FS6, RS6, RD6, DU6, FB6, RB6, and AS6 can also be referred to as a fourth power source holder ED46 of the fourth electric device ED4.

One of the user interfaces ST11, ST21, ST31, ST41, ST51, ST61, and ST71 can also be referred to as a user interface ED51 of the electric device ED5. One of the user inputs U11, U21, U31, U41, U51, U61, and U71 can also be referred to as a user input U5. One of the user inputs U11A, U21A, U31A, U41A, U51A, U61A, and U71A can also be referred to as a user input U5A. One of the user inputs U11B, U21B, U31B, U41B, U51B, U61B, and U71B can also be referred to as a user input U5B.

One of the electric switches SW11A, SW21A, SW31A, SW41A, SW51A, SW61A, and SW71A can also be referred to as an electric switch SW5A. One of the electric switches SW11B, SW21B, SW31B, SW41B, SW51B, SW61B, and SW71B can also be referred to as an electric switch SW5B.

One of the control signals CS11, CS21, CS31, CS41, CS51, CS61, and CS71 can also be referred to as a control signal CS5. One of the control signals CS11A, CS21A, CS31A, CS41A, CS51A, CS61A, and CS71A can also be referred to as a control signal CS5A. One of the control signals CS11B, CS21B, CS31B, CS41B, CS51B, CS61B, and CS71B can also be referred to as a control signal CS5B.

One of the user interfaces ST11, ST21, ST31, ST41, ST51, ST61, and ST71 can also be referred to as a user interface ED51 of the electric device ED5. One of the electric power sources ST15, ST25, ST35, ST45, ST55, ST65, and ST75 can also be referred to as an electric power source ED55 of the electric device ED5. One of the power source holders ST16, ST26, ST36, ST46, ST56, ST66, and ST76 can also be referred to as a power source holder ED56 of the electric device ED5.

As seen in FIG. 4, the first electric device ED1 includes first wireless communicator circuitry WC1. The first wireless communicator circuitry WC1 is configured to wirelessly communicate with another wireless communicator circuitry using a first communication protocol.

The second electric device ED2 includes second wireless communicator circuitry WC2. The second wireless communicator circuitry WC2 is configured to wirelessly communicate with another wireless communicator circuitry using a second communication protocol. The second communication protocol is different from the first communication protocol.

As seen in FIG. 5, the third electric device ED3 includes third wireless communicator circuitry WC3. The third wireless communicator circuitry WC3 is configured to wirelessly communicate with another wireless communicator circuitry using a third communication protocol. The third communication protocol is different from each of the first communication protocol and the second communication protocol.

The fourth electric device ED4 includes fourth wireless communicator circuitry WC4. The fourth wireless communicator circuitry WC4 is configured to wirelessly communicate with another wireless communicator circuitry using the first communication protocol. The fourth wireless communicator circuitry WC4 can be configured to wirelessly communicate with another wireless communicator circuitry using a communication protocol other than the first communication protocol if needed or desired.

As seen in FIGS. 4 and 5, the electric device ED5 of the human-powered vehicle 10 comprises wireless communicator circuitry WC5. The wireless communicator circuitry WC5 is configured to wirelessly communicate with another wireless communicator circuitry using at least one of the first communication protocol, the second communication protocol, and the third communication protocol.

As seen in FIG. 4, the wireless communicator circuitry WC5 is configured to wirelessly communicate with the first wireless communicator circuitry WC1 of the first electric device ED1 using the first communication protocol. The wireless communicator circuitry WC5 is configured to wirelessly communicate with the second wireless communicator circuitry WC2 of the second electric device ED2 using the second communication protocol.

As seen in FIG. 5, the wireless communicator circuitry WC5 is configured to wirelessly communicate with the third wireless communicator circuitry WC3 of the third electric device ED3 using the third communication protocol. The wireless communicator circuitry WC5 is configured to wirelessly communicate with the fourth wireless communicator circuitry WC4 of the fourth electric device ED4 using the first communication protocol.

The term "wireless communicator" or "wireless communicator circuitry" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, each of the first wireless communicator circuitry WC1, the second wireless communicator circuitry WC2, the third wireless communicator circuitry WC3, the fourth wireless communicator circuitry WC4, and the wireless communicator circuitry WC5 is configured to at least receive a wireless signal. For example, each of the first wireless communicator circuitry WC1, the second wireless communicator circuitry WC2, the third wireless communicator circuitry WC3, the fourth wireless communicator circuitry WC4, and the wireless communicator circuitry WC5 includes a two-way wireless transceiver that conducts two-way wireless communications using the wireless receiver for wirelessly receiving signals and a wireless transmitter for wirelessly transmitting signals.

In the present embodiment, the first wireless communicator circuitry WC1, the second wireless communicator circuitry WC2, the third wireless communicator circuitry WC3, the fourth wireless communicator circuitry WC4, and the wireless communicator circuitry WC5 can use radio frequency (RF) signals, ultra-wide band communication signals, radio frequency identification (RFID), Wi-Fi (registered trademark), Zigbee (registered trademark), ANT+ (registered trademark), or Bluetooth (registered trademark) or any other type of communication protocols suitable for short range wireless communications as understood in the human-powered vehicle field.

It should also be understood that each of the first wireless communicator circuitry WC1, the second wireless communicator circuitry WC2, the third wireless communicator circuitry WC3, the fourth wireless communicator circuitry WC4, and the wireless communicator circuitry WC5 can transmit the signals at a particular or randomly selected frequency and/or with an identifier such as a particular code, to distinguish the wireless control signal from other wireless control signals. In this way, each of the first electric device ED1, the second electric device ED2, the third electric device ED3, the fourth electric device ED4, and the electric device ED5 can recognize which control signals are to be acted upon and which control signals are not to be acted upon. Thus, each of the first electric device ED1, the second electric device ED2, the third electric device ED3, the fourth electric device ED4, and the electric device ED5 can ignore the control signals from other wireless communicators of other electric devices.

As seen in FIG. 4, the first wireless communicator circuitry WC1 includes a signal transmitting circuit or circuitry, a signal receiving circuit or circuitry, and an antenna. The first wireless communicator circuitry WC1 is configured to superimpose digital signals on carrier wave using the first communication protocol to wirelessly transmit signals. In the present embodiment, the first wireless communicator circuitry WC1 is configured to encrypt signals using a cryptographic key to generate encrypted wireless signals. The first wireless communicator circuitry WC1 is configured to transmit wireless signals via the antenna.

The first wireless communicator circuitry WC1 is configured to receive wireless signals via the antenna. In the present embodiment, the first wireless communicator circuitry WC1 is configured to decode the wireless signals to recognize signals transmitted from other wireless communicators. The first wireless communicator circuitry WC1 is configured to decrypt the wireless signals using the cryptographic key.

As seen in FIG. 4, the second wireless communicator circuitry WC2 includes a signal transmitting circuit or circuitry, a signal receiving circuit or circuitry, and an antenna. The second wireless communicator circuitry WC2 is configured to superimpose digital signals on carrier wave using the second communication protocol to wirelessly transmit signals. In the present embodiment, the second wireless communicator circuitry WC2 is configured to encrypt signals using a cryptographic key to generate encrypted wireless signals. The second wireless communicator circuitry WC2 is configured to transmit wireless signals via the antenna.

The second wireless communicator circuitry WC2 is configured to receive wireless signals via the antenna. In the present embodiment, the second wireless communicator circuitry WC2 is configured to decode the wireless signals to recognize signals transmitted from other wireless communicators. The second wireless communicator circuitry WC2 is configured to decrypt the wireless signals using the cryptographic key.

As seen in FIG. 5, the third wireless communicator circuitry WC3 includes a signal transmitting circuit or circuitry, a signal receiving circuit or circuitry, and an antenna. The third wireless communicator circuitry WC3 is configured to superimpose digital signals on carrier wave using the third communication protocol to wirelessly transmit signals. In the present embodiment, the third wireless communicator circuitry WC3 is configured to encrypt signals using a cryptographic key to generate encrypted wireless signals. The third wireless communicator circuitry WC3 is configured to transmit wireless signals via the antenna.

The third wireless communicator circuitry WC3 is configured to receive wireless signals via the antenna. In the present embodiment, the third wireless communicator circuitry WC3 is configured to decode the wireless signals to recognize signals transmitted from other wireless communicators. The third wireless communicator circuitry WC3 is configured to decrypt the wireless signals using the cryptographic key.

As seen in FIG. 5, the fourth wireless communicator circuitry WC4 includes a signal transmitting circuit or circuitry, a signal receiving circuit or circuitry, and an antenna. The fourth wireless communicator circuitry WC4 is configured to superimpose digital signals on carrier wave using the first communication protocol to wirelessly transmit signals. In the present embodiment, the fourth wireless communicator circuitry WC4 is configured to encrypt signals using a cryptographic key to generate encrypted wireless signals. The fourth wireless communicator circuitry WC4 is configured to transmit wireless signals via the antenna.

The fourth wireless communicator circuitry WC4 is configured to receive wireless signals via the antenna. In the present embodiment, the fourth wireless communicator circuitry WC4 is configured to decode the wireless signals to recognize signals transmitted from other wireless communicators. The fourth wireless communicator circuitry WC4 is configured to decrypt the wireless signals using the cryptographic key.

As seen in FIG. 4, the wireless communicator circuitry WC5 includes a signal transmitting circuit or circuitry, a signal receiving circuit or circuitry, and an antenna. The wireless communicator circuitry WC5 is configured to superimpose digital signals on carrier wave using at least one of the first communication protocol, the second communication protocol, and the third communication protocol to wirelessly transmit signals. In the present embodiment, the wireless communicator circuitry WC5 is configured to encrypt signals using a cryptographic key to generate encrypted wireless signals. The wireless communicator circuitry WC5 is configured to transmit wireless signals via the antenna.

The wireless communicator circuitry WC5 is configured to receive wireless signals via the antenna. In the present embodiment, the wireless communicator circuitry WC5 is configured to decode the wireless signals to recognize signals transmitted from other wireless communicators. The wireless communicator circuitry WC5 is configured to decrypt the wireless signals using the cryptographic key.

As seen in FIG. 4, the wireless communicator circuitry WC5 includes a wireless communicator WC51. The wireless communicator WC51 is configured to wirelessly communicate with the first wireless communicator circuitry WC1 of the first electric device ED1 using the first communication protocol. The wireless communicator WC51 is configured to wirelessly communicate with the fourth wireless communicator circuitry WC4 of the fourth electric device ED4 using the first communication protocol.

The wireless communicator WC51 includes a signal transmitting circuit or circuitry, a signal receiving circuit or circuitry, and an antenna. The wireless communicator WC51 is configured to superimpose digital signals on carrier wave using a predetermined wireless communication protocol to wirelessly transmit signals. In the present embodiment, the wireless communicator WC51 is configured to encrypt signals using a cryptographic key to generate encrypted wireless signals. The wireless communicator WC51 is configured to transmit wireless signals via the antenna.

The wireless communicator WC51 is configured to receive wireless signals via the antenna. In the present embodiment, the wireless communicator WC51 is configured to decode the wireless signals to recognize signals transmitted from other wireless communicators. The wireless communicator WC51 is configured to decrypt the wireless signals using the cryptographic key.

As seen in FIG. 4, the wireless communicator circuitry WC5 includes a wireless communicator WC52. The wireless communicator WC52 is configured to wirelessly communicate with the second wireless communicator circuitry WC2 of the second electric device ED2 using the second communication protocol.

The wireless communicator WC52 includes a signal transmitting circuit or circuitry, a signal receiving circuit or circuitry, and an antenna. The wireless communicator WC52 is configured to superimpose digital signals on carrier wave using a predetermined wireless communication protocol to wirelessly transmit signals. In the present embodiment, the wireless communicator WC52 is configured to encrypt signals using a cryptographic key to generate encrypted wireless signals. The wireless communicator WC52 is configured to transmit wireless signals via the antenna.

The wireless communicator WC52 is configured to receive wireless signals via the antenna. In the present embodiment, the wireless communicator WC52 is configured to decode the wireless signals to recognize signals transmitted from other wireless communicators. The wireless communicator WC52 is configured to decrypt the wireless signals using the cryptographic key.

As seen in FIG. 5, the wireless communicator circuitry WC5 includes a wireless communicator WC53. The wireless communicator WC53 is configured to wirelessly communicate with the third wireless communicator circuitry WC3 of the third electric device ED3 using the third communication protocol.

The wireless communicator WC53 includes a signal transmitting circuit or circuitry, a signal receiving circuit or circuitry, and an antenna. The wireless communicator WC53 is configured to superimpose digital signals on carrier wave using a predetermined wireless communication protocol to wirelessly transmit signals. In the present embodiment, the wireless communicator WC53 is configured to encrypt signals using a cryptographic key to generate encrypted wireless signals. The wireless communicator WC53 is configured to transmit wireless signals via the antenna.

The wireless communicator WC53 is configured to receive wireless signals via the antenna. In the present embodiment, the wireless communicator WC53 is configured to decode the wireless signals to recognize signals transmitted from other wireless communicators. The wireless communicator WC53 is configured to decrypt the wireless signals using the cryptographic key.

In the present embodiment, the wireless communicators WC51, WC52, and WC53 are separate communicators. However, at least two of the wireless communicators WC51, WC52, and WC53 can be at least partially integrated as a single wireless communicator if needed or desired.

As seen in FIG. 4, the first electric device ED1 of the human-powered vehicle 10 comprises first electronic controller circuitry EC1. The first electronic controller circuitry EC1 is configured to control the first wireless communicator circuitry WC1 to wirelessly communicate with another communicator circuitry such as the wireless communicator circuitry WC5. The first electronic controller circuitry EC1 is configured to control the first wireless communicator circuitry WC1 to wirelessly communicate with the wireless communicator WC51 using the first communication protocol. The first wireless communicator circuitry WC1 is configured to be paired with another wireless communicator such as the wireless communicator circuitry WC5 through a pairing process. The first wireless communicator circuitry WC1 is configured to be paired with another wireless communicator such as the wireless communicator WC51 through the pairing process using the first communication protocol.

The first electronic controller circuitry EC1 includes a processor EC11. The first electronic controller circuitry EC1 includes a memory EC12. The processor EC11 is coupled to the memory EC12. The memory EC12 is coupled to the processor EC11. The first electric device ED1 includes a circuit board EC13 and a system bus EC14. The processor EC11 and the memory EC12 are electrically mounted on the circuit board EC13. The processor EC11 is electrically connected to the memory EC12 via the circuit board EC13 and the system bus EC14. The memory EC12 is electrically connected to the processor EC11 via the circuit board EC13 and the system bus EC14. For example, the first electronic controller circuitry EC1 includes a semiconductor. The processor EC11 includes a semiconductor. The memory EC12 includes a semiconductor. However, the first electronic controller circuitry EC1 can be free of a semiconductor if needed or desired. The processor EC11 can be free of a semiconductor if needed or desired. The memory EC12 can be free of a semiconductor if needed or desired.

For example, the processor EC11 includes at least one of a central processing unit (CPU), a micro processing unit (MPU), and a memory controller. The memory EC12 is electrically connected to the processor EC11. For example, the memory EC12 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC12 includes storage areas each having an address. The processor EC11 is configured to control the memory EC12 to store data in the storage areas of the memory EC12 and reads data from the storage areas of the memory EC12. The processor EC11 can also be referred to as a hardware processor EC11 or a processor circuit or circuitry EC11. The memory EC12 can also be referred to as a hardware memory EC12 or a memory circuit or circuitry EC12. The memory EC12 can also be referred to as a computer-readable storage medium EC12.

The first electronic controller circuitry EC1 is configured to execute at least one control algorithm of the first electric device ED1. For example, the first electronic controller circuitry EC1 is programed to execute at least one control algorithm of the first electric device ED1. The memory EC12 stores at least one program including at least one program instruction. The at least one program is read into the processor EC11, and thereby the at least one control algorithm of the first electric device ED1 is executed based on the at least one program. The first electronic controller circuitry EC1 can also be referred to as a first electronic controller EC1.

The structure of the first electronic controller circuitry EC1 is not limited to the above structure. The structure of the first electronic controller circuitry EC1 is not limited to the above structure. The structure of the first electronic controller circuitry EC1 is not limited to the processor EC11 and the memory EC12. The first electronic controller circuitry EC1 can be realized by hardware alone or a combination of hardware and software. In the present embodiment, the processor EC11 and the memory EC12 are integrated as a single chip such as an application specific integrated circuit (ASIC) or a field programmable gate array (FPGA). However, the processor EC11 and the memory EC12 can be separate chips if needed or desired. The first electronic controller circuitry EC1 can include the processor EC11, the memory EC12, the circuit board EC13, and the system bus EC14 if needed or desired. The first electronic controller circuitry EC1 can be at least two electronic controllers which are separately provided.

The first electronic controller circuitry EC1 can include at least two electronic controllers which are separately provided. The at least one control algorithm of the first electric device ED1 can be executed by the at least two electronic controllers if needed or desired. The first electronic controller circuitry EC1 can include at least two hardware processors which are separately provided. The first electronic controller circuitry EC1 can include at least two hardware memories which are separately provided. The at least one control algorithm of the first electric device ED1 can be executed by the at least two hardware processors if needed or desired. The at least one control algorithm of the first electric device ED1 can be stored in the at least two hardware memories if needed or desired. The first electronic controller circuitry EC1 can include at least two circuit boards which are separately provided if needed or desired. The first electronic controller circuitry EC1 can include at least two system buses which are separately provided if needed or desired.

As seen in FIG. 4, the first wireless communicator circuitry WC1 is electrically mounted on the circuit board EC13. The first wireless communicator circuitry WC1 is electrically mounted on the circuit board EC13. The first wireless communicator circuitry WC1 is electrically connected to the processor EC11 and the memory EC12 with the circuit board EC13 and the system bus EC14. However, the first wireless communicator circuitry WC1 can be electrically mounted on another circuit board in a case where the first electronic controller circuitry EC1 includes at least two circuit boards. the first wireless communicator circuitry WC1 can be electrically mounted on another circuit board in a case where the first electronic controller circuitry EC1 includes at least two circuit boards. The first wireless communicator circuitry WC1 can be electrically mounted on an electric component other than a circuit board.

At least one of the processor EC11, the memory EC12, and the first wireless communicator circuitry WC1 can be integrally provided with another of the processor EC11, the memory EC12, and the first wireless communicator circuitry WC1 as a single chip if needed or desired. At least one of the processor EC11, the memory EC12, and the first wireless communicator circuitry WC1 can be a separate chip from another of the processor EC11, the memory EC12, and the first wireless communicator circuitry WC1 if needed or desired.

The first electric device ED1 includes a first user interface ED18. The first user interface ED18 is configured to receive a first user input U1. The first user interface ED18 is electrically connected to the first electronic controller circuitry EC1. The first electronic controller circuitry EC1 is configured to recognize the first user input U1 received by the first user interface ED18. For example, the first user interface ED18 includes an electric switch configured to be activated in response to the first user input U1. The first user interface ED18 can be omitted from the first electric device ED1 if needed or desired.

As seen in FIG. 4, the second electric device ED2 of the human-powered vehicle 10 comprises second electronic controller circuitry EC2. The second electronic controller circuitry EC2 is configured to control the second wireless communicator circuitry WC2 to wirelessly communicate with another communicator circuitry such as the wireless communicator circuitry WC5. The second electronic controller circuitry EC2 is configured to control the second wireless communicator circuitry WC2 to wirelessly communicate with the wireless communicator WC52 using the second communication protocol. The second wireless communicator circuitry WC2 is configured to be paired with another wireless communicator such as the wireless communicator circuitry WC5 through a pairing process. The second wireless communicator circuitry WC2 is configured to be paired with another wireless communicator such as the wireless communicator WC52 through the pairing process using the second communication protocol.

The second electronic controller circuitry EC2 includes a processor EC21. The second electronic controller circuitry EC2 includes a memory EC22. The processor EC21 is coupled to the memory EC22. The memory EC22 is coupled to the processor EC21. The second electric device ED2 includes a circuit board EC23 and a system bus EC24. The processor EC21 and the memory EC22 are electrically mounted on the circuit board EC23. The processor EC21 is electrically connected to the memory EC22 via the circuit board EC23 and the system bus EC24. The memory EC22 is electrically connected to the processor EC21 via the circuit board EC23 and the system bus EC24. For example, the second electronic controller circuitry EC2 includes a semiconductor. The processor EC21 includes a semiconductor. The memory EC22 includes a semiconductor. However, the second electronic controller circuitry EC2 can be free of a semiconductor if needed or desired. The processor EC21 can be free of a semiconductor if needed or desired. The memory EC22 can be free of a semiconductor if needed or desired.

For example, the processor EC21 includes at least one of a central processing unit (CPU), a micro processing unit (MPU), and a memory controller. The memory EC22 is electrically connected to the processor EC21. For example, the memory EC22 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC22 includes storage areas each having an address. The processor EC21 is configured to control the memory EC22 to store data in the storage areas of the memory EC22 and reads data from the storage areas of the memory EC22. The processor EC21 can also be referred to as a hardware processor EC21 or a processor circuit or circuitry EC21. The memory EC22 can also be referred to as a hardware memory EC22 or a memory circuit or circuitry EC22. The memory EC22 can also be referred to as a computer-readable storage medium EC22.

The second electronic controller circuitry EC2 is configured to execute at least one control algorithm of the second electric device ED2. For example, the second electronic controller circuitry EC2 is programed to execute at least one control algorithm of the second electric device ED2. The memory EC22 stores at least one program including at least one program instruction. The at least one program is read into the processor EC21, and thereby the at least one control algorithm of the second electric device ED2 is executed based on the at least one program. The second electronic controller circuitry EC2 can also be referred to as a second electronic controller EC2.

The structure of the second electronic controller circuitry EC2 is not limited to the above structure. The structure of the second electronic controller circuitry EC2 is not limited to the above structure. The structure of the second electronic controller circuitry EC2 is not limited to the processor EC21 and the memory EC22. The second electronic controller circuitry EC2 can be realized by hardware alone or a combination of hardware and software. In the present embodiment, the processor EC21 and the memory EC22 are integrated as a single chip such as an application specific integrated circuit (ASIC) or a field programmable gate array (FPGA). However, the processor EC21 and the memory EC22 can be separate chips if needed or desired. The second electronic controller circuitry EC2 can include the processor EC21, the memory EC22, the circuit board EC23, and the system bus EC24 if needed or desired. The second electronic controller circuitry EC2 can be at least two electronic controllers which are separately provided.

The second electronic controller circuitry EC2 can include at least two electronic controllers which are separately provided. The at least one control algorithm of the second electric device ED2 can be executed by the at least two electronic controllers if needed or desired. The second electronic controller circuitry EC2 can include at least two hardware processors which are separately provided. The second electronic controller circuitry EC2 can include at least two hardware memories which are separately provided. The at least one control algorithm of the second electric device ED2 can be executed by the at least two hardware processors if needed or desired. The at least one control algorithm of the second electric device ED2 can be stored in the at least two hardware memories if needed or desired. The second electronic controller circuitry EC2 can include at least two circuit boards which are separately provided if needed or desired. The second electronic controller circuitry EC2 can include at least two system buses which are separately provided if needed or desired.

As seen in FIG. 4, the second wireless communicator circuitry WC2 is electrically mounted on the circuit board EC23. The second wireless communicator circuitry WC2 is electrically mounted on the circuit board EC23. The second wireless communicator circuitry WC2 is electrically connected to the processor EC21 and the memory EC22 with the circuit board EC23 and the system bus EC24. However, the second wireless communicator circuitry WC2 can be electrically mounted on another circuit board in a case where the second electronic controller circuitry EC2 includes at least two circuit boards. the second wireless communicator circuitry WC2 can be electrically mounted on another circuit board in a case where the second electronic controller circuitry EC2 includes at least two circuit boards. The second wireless communicator circuitry WC2 can be electrically mounted on an electric component other than a circuit board.

At least one of the processor EC21, the memory EC22, and the second wireless communicator circuitry WC2 can be integrally provided with another of the processor EC21, the memory EC22, and the second wireless communicator circuitry WC2 as a single chip if needed or desired. At least one of the processor EC21, the memory EC22, and the second wireless communicator circuitry WC2 can be a separate chip from another of the processor EC21, the memory EC22, and the second wireless communicator circuitry WC2 if needed or desired.

The second electric device ED2 includes a second user interface ED28. The second user interface ED28 is configured to receive a second user input U2. The second user interface ED28 is electrically connected to the second electronic controller circuitry EC2. The second electronic controller circuitry EC2 is configured to recognize the second user input U2 received by the second user interface ED28. For example, the second user interface ED28 includes an electric switch configured to be activated in response to the second user input U2. The second user interface ED28 can be omitted from the second electric device ED2 if needed or desired.

As seen in FIG. 5, the third electric device ED3 of the human-powered vehicle 10 comprises third electronic controller circuitry EC3. The third electronic controller circuitry EC3 is configured to control the third wireless communicator circuitry WC3 to wirelessly communicate with another communicator circuitry such as the wireless communicator circuitry WC5. The third electronic controller circuitry EC3 is configured to control the third wireless communicator circuitry WC3 to wirelessly communicate with the wireless communicator WC53 using the third communication protocol. The third wireless communicator circuitry WC3 is configured to be paired with another wireless communicator such as the wireless communicator circuitry WC5 through a pairing process. The third wireless communicator circuitry WC3 is configured to be paired with another wireless communicator such as the wireless communicator WC53 through the pairing process using the third communication protocol.

The third electronic controller circuitry EC3 includes a processor EC31. The third electronic controller circuitry EC3 includes a memory EC32. The processor EC31 is coupled to the memory EC32. The memory EC32 is coupled to the processor EC31. The third electric device ED3 includes a circuit board EC33 and a system bus EC34. The processor EC31 and the memory EC32 are electrically mounted on the circuit board EC33. The processor EC31 is electrically connected to the memory EC32 via the circuit board EC33 and the system bus EC34. The memory EC32 is electrically connected to the processor EC31 via the circuit board EC33 and the system bus EC34. For example, the third electronic controller circuitry EC3 includes a semiconductor. The processor EC31 includes a semiconductor. The memory EC32 includes a semiconductor. However, the third electronic controller circuitry EC3 can be free of a semiconductor if needed or desired. The processor EC31 can be free of a semiconductor if needed or desired. The memory EC32 can be free of a semiconductor if needed or desired.

For example, the processor EC31 includes at least one of a central processing unit (CPU), a micro processing unit (MPU), and a memory controller. The memory EC32 is electrically connected to the processor EC31. For example, the memory EC32 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC32 includes storage areas each having an address. The processor EC31 is configured to control the memory EC32 to store data in the storage areas of the memory EC32 and reads data from the storage areas of the memory EC32. The processor EC31 can also be referred to as a hardware processor EC31 or a processor circuit or circuitry EC31. The memory EC32 can also be referred to as a hardware memory EC32 or a memory circuit or circuitry EC32. The memory EC32 can also be referred to as a computer-readable storage medium EC32.

The third electronic controller circuitry EC3 is configured to execute at least one control algorithm of the third electric device ED3. For example, the third electronic controller circuitry EC3 is programed to execute at least one control algorithm of the third electric device ED3. The memory EC32 stores at least one program including at least one program instruction. The at least one program is read into the processor EC31, and thereby the at least one control algorithm of the third electric device ED3 is executed based on the at least one program. The third electronic controller circuitry EC3 can also be referred to as a third electronic controller EC3.

The structure of the third electronic controller circuitry EC3 is not limited to the above structure. The structure of the third electronic controller circuitry EC3 is not limited to the above structure. The structure of the third electronic controller circuitry EC3 is not limited to the processor EC31 and the memory EC32. The third electronic controller circuitry EC3 can be realized by hardware alone or a combination of hardware and software. In the present embodiment, the processor EC31 and the memory EC32 are integrated as a single chip such as an application specific integrated circuit (ASIC) or a field programmable gate array (FPGA). However, the processor EC31 and the memory EC32 can be separate chips if needed or desired. The third electronic controller circuitry EC3 can include the processor EC31, the memory EC32, the circuit board EC33, and the system bus EC34 if needed or desired. The third electronic controller circuitry EC3 can be at least two electronic controllers which are separately provided.

The third electronic controller circuitry EC3 can include at least two electronic controllers which are separately provided. The at least one control algorithm of the third electric device ED3 can be executed by the at least two electronic controllers if needed or desired. The third electronic controller circuitry EC3 can include at least two hardware processors which are separately provided. The third electronic controller circuitry EC3 can include at least two hardware memories which are separately provided. The at least one control algorithm of the third electric device ED3 can be executed by the at least two hardware processors if needed or desired. The at least one control algorithm of the third electric device ED3 can be stored in the at least two hardware memories if needed or desired. The third electronic controller circuitry EC3 can include at least two circuit boards which are separately provided if needed or desired. The third electronic controller circuitry EC3 can include at least two system buses which are separately provided if needed or desired.

As seen in FIG. 5, the third wireless communicator circuitry WC3 is electrically mounted on the circuit board EC33. The third wireless communicator circuitry WC3 is electrically mounted on the circuit board EC33. The third wireless communicator circuitry WC3 is electrically connected to the processor EC31 and the memory EC32 with the circuit board EC33 and the system bus EC34. However, the third wireless communicator circuitry WC3 can be electrically mounted on another circuit board in a case where the third electronic controller circuitry EC3 includes at least two circuit boards. the third wireless communicator circuitry WC3 can be electrically mounted on another circuit board in a case where the third electronic controller circuitry EC3 includes at least two circuit boards. The third wireless communicator circuitry WC3 can be electrically mounted on an electric component other than a circuit board.

At least one of the processor EC31, the memory EC32, and the third wireless communicator circuitry WC3 can be integrally provided with another of the processor EC31, the memory EC32, and the third wireless communicator circuitry WC3 as a single chip if needed or desired. At least one of the processor EC31, the memory EC32, and the third wireless communicator circuitry WC3 can be a separate chip from another of the processor EC31, the memory EC32, and the third wireless communicator circuitry WC3 if needed or desired.

The third electric device ED3 includes a third user interface ED38. The third user interface ED38 is configured to receive a third user input U3. The third user interface ED38 is electrically connected to the third electronic controller circuitry EC3. The third electronic controller circuitry EC3 is configured to recognize the third user input U3 received by the third user interface ED38. For example, the third user interface ED38 includes an electric switch configured to be activated in response to the third user input U3. The third user interface ED38 can be omitted from the third electric device ED3 if needed or desired.

As seen in FIG. 5, the fourth electric device ED4 of the human-powered vehicle 10 comprises fourth electronic controller circuitry EC4. The fourth electronic controller circuitry EC4 is configured to control the fourth wireless communicator circuitry WC4 to wirelessly communicate with another communicator circuitry such as the wireless communicator circuitry WC5. The fourth electronic controller circuitry EC4 is configured to control the fourth wireless communicator circuitry WC4 to wirelessly communicate with the wireless communicator WC51 using the first communication protocol. The fourth wireless communicator circuitry WC4 is configured to be paired with another wireless communicator such as the wireless communicator circuitry WC5 through a pairing process. The fourth wireless communicator circuitry WC4 is configured to be paired with another wireless communicator such as the wireless communicator WC51 through the pairing process using the first communication protocol.

The fourth electronic controller circuitry EC4 includes a processor EC41. The fourth electronic controller circuitry EC4 includes a memory EC42. The processor EC41 is coupled to the memory EC42. The memory EC42 is coupled to the processor EC41. The fourth electric device ED4 includes a circuit board EC43 and a system bus EC44. The processor EC41 and the memory EC42 are electrically mounted on the circuit board EC43. The processor EC41 is electrically connected to the memory EC42 via the circuit board EC43 and the system bus EC44. The memory EC42 is electrically connected to the processor EC41 via the circuit board EC43 and the system bus EC44. For example, the fourth electronic controller circuitry EC4 includes a semiconductor. The processor EC41 includes a semiconductor. The memory EC42 includes a semiconductor. However, the fourth electronic controller circuitry EC4 can be free of a semiconductor if needed or desired. The processor EC41 can be free of a semiconductor if needed or desired. The memory EC42 can be free of a semiconductor if needed or desired.

For example, the processor EC41 includes at least one of a central processing unit (CPU), a micro processing unit (MPU), and a memory controller. The memory EC42 is electrically connected to the processor EC41. For example, the memory EC42 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC42 includes storage areas each having an address. The processor EC41 is configured to control the memory EC42 to store data in the storage areas of the memory EC42 and reads data from the storage areas of the memory EC42. The processor EC41 can also be referred to as a hardware processor EC41 or a processor circuit or circuitry EC41. The memory EC42 can also be referred to as a hardware memory EC42 or a memory circuit or circuitry EC42. The memory EC42 can also be referred to as a computer-readable storage medium EC42.

The fourth electronic controller circuitry EC4 is configured to execute at least one control algorithm of the fourth electric device ED4. For example, the fourth electronic controller circuitry EC4 is programed to execute at least one control algorithm of the fourth electric device ED4. The memory EC42 stores at least one program including at least one program instruction. The at least one program is read into the processor EC41, and thereby the at least one control algorithm of the fourth electric device ED4 is executed based on the at least one program. The fourth electronic controller circuitry EC4 can also be referred to as a fourth electronic controller EC4.

The structure of the fourth electronic controller circuitry EC4 is not limited to the above structure. The structure of the fourth electronic controller circuitry EC4 is not limited to the above structure. The structure of the fourth electronic controller circuitry EC4 is not limited to the processor EC41 and the memory EC42. The fourth electronic controller circuitry EC4 can be realized by hardware alone or a combination of hardware and software. In the present embodiment, the processor EC41 and the memory EC42 are integrated as a single chip such as an application specific integrated circuit (ASIC) or a field programmable gate array (FPGA). However, the processor EC41 and the memory EC42 can be separate chips if needed or desired. The fourth electronic controller circuitry EC4 can include the processor EC41, the memory EC42, the circuit board EC43, and the system bus EC44 if needed or desired. The fourth electronic controller circuitry EC4 can be at least two electronic controllers which are separately provided.

The fourth electronic controller circuitry EC4 can include at least two electronic controllers which are separately provided. The at least one control algorithm of the fourth electric device ED4 can be executed by the at least two electronic controllers if needed or desired. The fourth electronic controller circuitry EC4 can include at least two hardware processors which are separately provided. The fourth electronic controller circuitry EC4 can include at least two hardware memories which are separately provided. The at least one control algorithm of the fourth electric device ED4 can be executed by the at least two hardware processors if needed or desired. The at least one control algorithm of the fourth electric device ED4 can be stored in the at least two hardware memories if needed or desired. The fourth electronic controller circuitry EC4 can include at least two circuit boards which are separately provided if needed or desired. The fourth electronic controller circuitry EC4 can include at least two system buses which are separately provided if needed or desired.

As seen in FIG. 5, the fourth wireless communicator circuitry WC4 is electrically mounted on the circuit board EC43. The fourth wireless communicator circuitry WC4 is electrically mounted on the circuit board EC43. The fourth wireless communicator circuitry WC4 is electrically connected to the processor EC41 and the memory EC42 with the circuit board EC43 and the system bus EC44. However, the fourth wireless communicator circuitry WC4 can be electrically mounted on another circuit board in a case where the fourth electronic controller circuitry EC4 includes at least two circuit boards. the fourth wireless communicator circuitry WC4 can be electrically mounted on another circuit board in a case where the fourth electronic controller circuitry EC4 includes at least two circuit boards. The fourth wireless communicator circuitry WC4 can be electrically mounted on an electric component other than a circuit board.

At least one of the processor EC41, the memory EC42, and the fourth wireless communicator circuitry WC4 can be integrally provided with another of the processor EC41, the memory EC42, and the fourth wireless communicator circuitry WC4 as a single chip if needed or desired. At least one of the processor EC41, the memory EC42, and the fourth wireless communicator circuitry WC4 can be a separate chip from another of the processor EC41, the memory EC42, and the fourth wireless communicator circuitry WC4 if needed or desired.

The fourth electric device ED4 includes a fourth user interface ED48 and a display unit ED49. The fourth user interface ED48 is configured to receive a fourth user input U4. The fourth user interface ED48 is electrically connected to the fourth electronic controller circuitry EC4. The fourth electronic controller circuitry EC4 is configured to recognize the fourth user input U4 received by the fourth user interface ED48. The display unit ED49 is electrically connected to the fourth electronic controller circuitry EC4. The fourth electronic controller circuitry EC4 is configured to control the display unit ED49 to display information relating to the human-powered vehicle 10. For example, the fourth user interface ED48 includes a touch screen provided on the display unit ED49 configured to receive the fourth user input U4. The fourth user interface ED48 can be omitted from the fourth electric device ED4 if needed or desired.

As seen in FIGS. 4 and 5, the electric device ED5 of the human-powered vehicle 10 comprises electronic controller circuitry EC5. The electronic controller circuitry EC5 is configured to control the wireless communicator circuitry WC5 to wirelessly communicate with at least one of the first wireless communicator circuitry WC1, the second wireless communicator circuitry WC2, the third wireless communicator circuitry WC3, and the fourth wireless communicator circuitry WC4.

The electronic controller circuitry EC5 is configured to control the wireless communicator WC51 to wirelessly communicate with at least one of the first wireless communicator circuitry WC1 and the fourth wireless communicator circuitry WC4. The electronic controller circuitry EC5 is configured to control the second wireless communicator WC52 to wirelessly communicate with the second wireless communicator circuitry WC2. The electronic controller circuitry EC5 is configured to control the wireless communicator WC53 to wirelessly communicate with the third wireless communicator circuitry WC3.

The electronic controller circuitry EC5 includes a processor EC51. The electronic controller circuitry EC5 includes a memory EC52. The processor EC51 is coupled to the memory EC52. The memory EC52 is coupled to the processor EC51. The electric device ED5 includes a circuit board EC53 and a system bus EC54. The processor EC51 and the memory EC52 are electrically mounted on the circuit board EC53. The processor EC51 is electrically connected to the memory EC52 via the circuit board EC53 and the system bus EC54. The memory EC52 is electrically connected to the processor EC51 via the circuit board EC53 and the system bus EC54. For example, the electronic controller circuitry EC5 includes a semiconductor. The processor EC51 includes a semiconductor. The memory EC52 includes a semiconductor. However, the electronic controller circuitry EC5 can be free of a semiconductor if needed or desired. The processor EC51 can be free of a semiconductor if needed or desired. The memory EC52 can be free of a semiconductor if needed or desired.

For example, the processor EC51 includes at least one of a central processing unit (CPU), a micro processing unit (MPU), and a memory controller. The memory EC52 is electrically connected to the processor EC51. For example, the memory EC52 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The memory EC52 includes storage areas each having an address. The processor EC51 is configured to control the memory EC52 to store data in the storage areas of the memory EC52 and reads data from the storage areas of the memory EC52. The processor EC51 can also be referred to as a hardware processor EC51 or a processor circuit or circuitry EC51. The memory EC52 can also be referred to as a hardware memory EC52 or a memory circuit or circuitry EC52. The memory EC52 can also be referred to as a computer-readable storage medium EC52.

The electronic controller circuitry EC5 is configured to execute at least one control algorithm of the electric device ED5. For example, the electronic controller circuitry EC5 is programed to execute at least one control algorithm of the electric device ED5. The memory EC52 stores at least one program including at least one program instruction. The at least one program is read into the processor EC51, and thereby the at least one control algorithm of the electric device ED5 is executed based on the at least one program. The electronic controller circuitry EC5 can also be referred to as an electronic controller EC5. The electronic controller circuitry EC5 can also be referred to as an electronic hardware controller circuit or circuitry EC5.

The structure of the electronic controller circuitry EC5 is not limited to the above structure. The structure of the electronic controller circuitry EC5 is not limited to the processor EC51 and the memory EC52. The electronic controller circuitry EC5 can be realized by hardware alone or a combination of hardware and software. In the present embodiment, the processor EC51 and the memory EC52 are integrated as a single chip such as an application specific integrated circuit (ASIC) or a field programmable gate array (FPGA). However, the processor EC51 and the memory EC52 can be separate chips if needed or desired. The electronic controller circuitry EC5 can include the processor EC51, the memory EC52, the circuit board EC53, and the system bus EC54 if needed or desired. The electronic controller circuitry EC5 can be at least two electronic controllers which are separately provided.

The electronic controller circuitry EC5 can include at least two electronic controllers which are separately provided. The at least one control algorithm of the electric device ED5 can be executed by the at least two electronic controllers if needed or desired. The electronic controller circuitry EC5 can include at least two hardware processors which are separately provided. The electronic controller circuitry EC5 can include at least two hardware memories which are separately provided. The at least one control algorithm of the electric device ED5 can be executed by the at least two hardware processors if needed or desired. The at least one control algorithm of the electric device ED5 can be stored in the at least two hardware memories if needed or desired. The electronic controller circuitry EC5 can include at least two circuit boards which are separately provided if needed or desired. The electronic controller circuitry EC5 can include at least two system buses which are separately provided if needed or desired.

The wireless communicator circuitry WC5 is electrically mounted on the circuit board EC53. The wireless communicator circuitry WC5 is electrically mounted on the circuit board EC53. The wireless communicator circuitry WC5 is electrically connected to the processor EC51 and the memory EC52 with the circuit board EC53 and the system bus EC54. However, the wireless communicator circuitry WC5 can be electrically mounted on another circuit board in a case where the electronic controller circuitry EC5 includes at least two circuit boards. the wireless communicator circuitry WC5 can be electrically mounted on another circuit board in a case where the electronic controller circuitry EC5 includes at least two circuit boards. The wireless communicator circuitry WC5 can be electrically mounted on an electric component other than a circuit board.

At least one of the processor EC51, the memory EC52, and the wireless communicator circuitry WC5 can be integrally provided with another of the processor EC51, the memory EC52, and the wireless communicator circuitry WC5 as a single chip if needed or desired. At least one of the processor EC51, the memory EC52, and the wireless communicator circuitry WC5 can be a separate chip from another of the processor EC51, the memory EC52, and the wireless communicator circuitry WC5 if needed or desired.

As seen in FIG. 4, the electronic controller circuitry EC5 is configured to control the wireless communicator circuitry WC5 to wirelessly transmit a first signal SG51 using the first communication protocol. The electronic controller circuitry EC5 is configured to control the wireless communicator WC51 to wirelessly transmit the first signal SG51 using the first communication protocol.

In the present embodiment, the user interface ED51 is configured to receive a pairing user input U5P. The electronic controller circuitry EC5 is configured to control the wireless communicator circuitry WC5 to start wireless transmission of the first signal SG51 in response to the pairing user input USP. The electronic controller circuitry EC5 is configured to control the wireless communicator circuitry WC5 to start wireless transmission of the first signal SG51 using the first communication protocol in response to the pairing user input USP. The electronic controller circuitry EC5 is configured to control the first wireless communicator circuitry WC51 to start wireless transmission of the first signal SG51 using the first communication protocol in response to the pairing user input U5P.

The user input U5 includes the pairing user input USP. The pairing user input U5P is different from each of the user inputs USA and USB. In the present embodiment, the pairing user input U5P includes concurrent presses of the electric switches SW5A and SW5B. The concurrent presses of the electric switches SW5A and SW5B includes a case where one of the electric switches SW5A and SW5B is pressed while the other of the electric switches SW5A and SW5B is pressed. However, the pairing user input U5P can include another user input other than the concurrent presses of the electric switches SW5A and SW5B if needed or desired.

Figure 6:
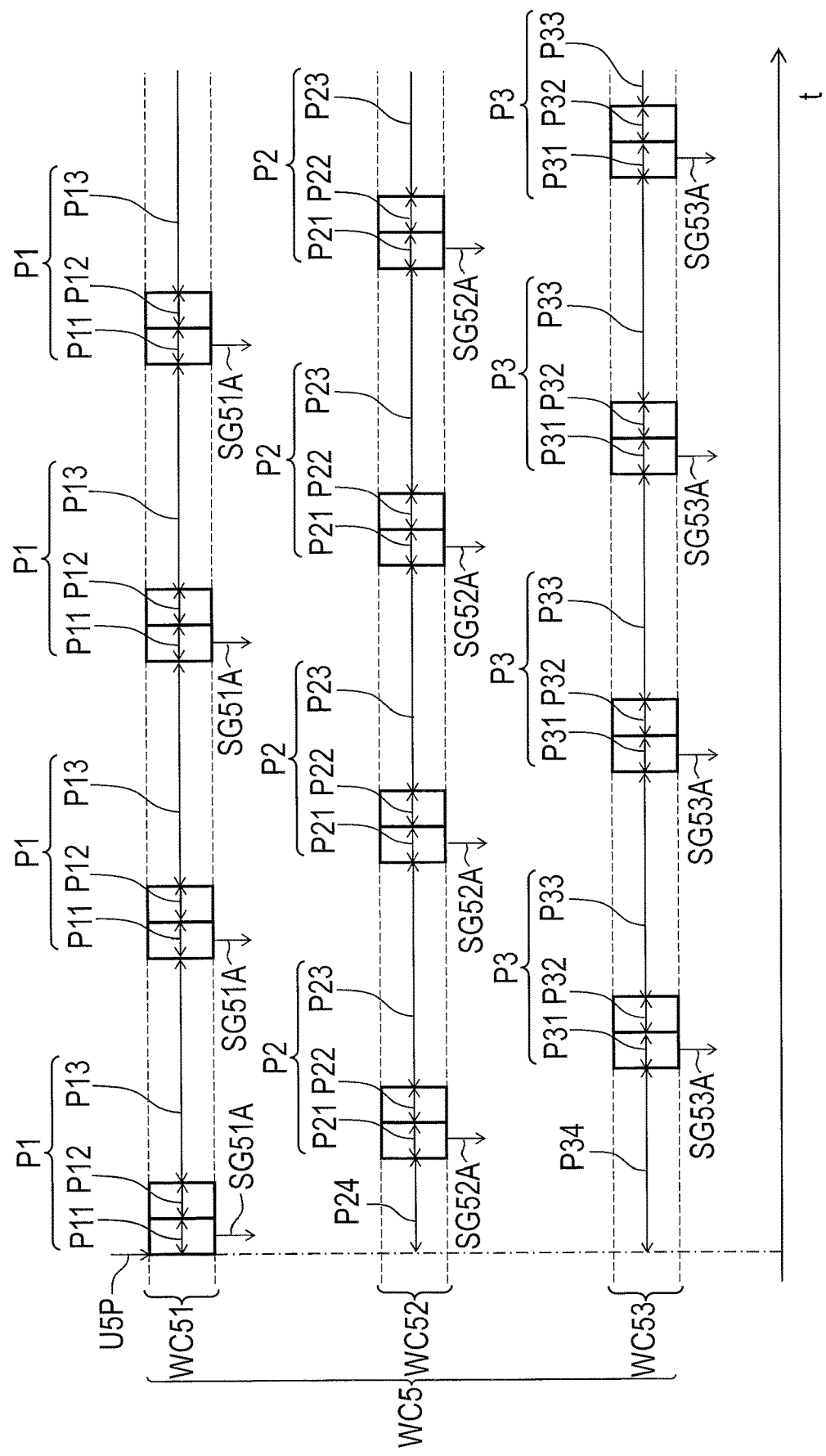
FIG. 6 is a schematic time chart showing a pairing process of the electric devices of the control system illustrated in FIG. 2 in an advertise or broadcast process.

As seen in FIGS. 4 and 6, the electronic controller circuitry EC5 is configured to control the wireless communicator circuitry WC5 to wirelessly transmit the first signal SG51 repeatedly using the first communication protocol at a first number of times or for a first period. In the present embodiment, the electronic controller circuitry EC5 is configured to control the wireless communicator WC51 to wirelessly transmit the first signal SG51 repeatedly using the first communication protocol at the first number of times. However, the electronic controller circuitry EC5 can be configured to control the wireless communicator circuitry WC5 to wirelessly transmit the first signal SG51 repeatedly using the first communication protocol for the first period if needed or desired.

The electronic controller circuitry EC5 is configured to control the wireless communicator circuitry WC5 to wirelessly transmit the first signal SG51 during a first transmission period P11 in response to the pairing user input U5P. The electronic controller circuitry EC5 is configured to control the wireless communicator circuitry WC5 to stop wirelessly transmitting the first signal SG51 in a case where the first transmission period P11 ends. The first signal SG51 includes at least one signal. The electronic controller circuitry EC5 is configured to scan a response signal via the wireless communicator circuitry WC5 during a first scanning period P12 after the first transmission period P11. The electronic controller circuitry EC5 is configured to wait for a first waiting period P13 after the first scanning period P12 ends.

A first advertise period P1 includes the first transmission period P11, the first scanning period P12, and the first waiting period P13. The electronic controller circuitry EC5 is configured to execute, using the wireless communicator circuitry WC5, the first advertise period P1 repeatedly at the first number of times or for the first period.

As seen in FIG. 4, the electronic controller circuitry EC5 is configured to execute pairing between the electric device ED5 and the first electric device ED1 based on a first response signal SG1. The electronic controller circuitry EC5 is configured to be paired with the first electric device ED1 based on the first response signal SG1. The first response signal SG1 is wirelessly transmitted from the first wireless communicator circuitry WC1 of the first electric device ED1. The electronic controller circuitry EC5 is configured to execute pairing between the wireless communicator WC51 and the first wireless communicator circuitry WC1 based on the first response signal SG1. The first wireless communicator circuitry WC1 of the first electric device ED1 is configured to wirelessly transmit the first response signal SG1.

In the present embodiment, the first electronic controller circuitry EC1 is configured to control the first wireless communicator circuitry WC1 to wirelessly transmit the first response signal SG1 in response to the first signal SG51. However, the first electronic controller circuitry EC1 can be configured to control the first wireless communicator circuitry WC1 to wirelessly transmit the first response signal SG1 in a case where another condition unrelated to the first response signal SG1 is satisfied if needed or desired.

For example, the first signal SG51 includes an advertisement signal having no specified recipient. The first signal SG51 includes pairing information ID51 of the wireless communicator circuitry WC5. The pairing information ID51 includes information relating to the wireless communicator WC51. The pairing information ID51 includes at least one of identification information and cryptographic key information. The identification information includes a unique number indicating the electric device ED5. Examples of the unique number include an address of the electric device ED5. The cryptographic key information includes a cryptographic key. Another wireless communicator encrypts information using the cryptographic key information, and the wireless communicator circuitry WC5 decrypts the encrypted information using the cryptographic key information. The cryptographic key information of the pairing information ID51 corresponds to the first communication protocol.

In the present embodiment, the first signal SG51 includes a first request signal SG51A. The first request signal SG51A includes the advertisement signal having no specified recipient. The first request signal SG51A includes the pairing information ID51 of the wireless communicator circuitry WC5. In the present embodiment, for example, the first request signal SG51A includes the identification information of the pairing information ID51. The electronic controller circuitry EC5 is configured to control the wireless communicator circuitry WC5 to wirelessly transmit the first request signal SG51A to inform the first electric device ED1 that the electric device ED5 is ready to be paired with the first electric device ED1. The electronic controller circuitry EC5 is configured to control the wireless communicator circuitry WC5 to wirelessly transmit the first request signal SG51A before the electronic controller circuitry EC5 receives the first response signal SG1. The first electronic controller circuitry EC1 is configured to recognize, based on the first request signal SG51A, that the electric device ED5 is ready to be paired with the first electric device ED1.

The first wireless communicator circuitry WC1 is configured to detect the first signal SG51 wirelessly transmitted from the wireless communicator circuitry WC5 during pairing. The first electronic controller circuitry EC1 is configured to store the identification information of the pairing information ID51 included in the first signal SG51 in the first memory EC12 in the case where the first electronic controller circuitry EC1 detects the first signal SG51. Thus, the first memory EC12 is configured to store the pairing information ID51 of the electric device ED5 received during pairing. The first memory EC12 is configured to store the pairing information ID51 of the electric device ED5 received during pairing executed between the first electric device ED1 and the electric device ED5.

The first electronic controller circuitry EC1 is configured to control the first wireless communicator circuitry WC1 to wirelessly transmit the first response signal SG1 in a case where the first electronic controller circuitry EC1 detects the first signal SG51. The first response signal SG1 includes first pairing information ID1 of the first electric device ED1. The first pairing information ID1 includes at least one of first identification information and first cryptographic key information. In the present embodiment, for example, the first response signal SG1 includes the first identification information of the first pairing information ID1. The first identification information includes a unique number indicating the first electric device ED1. Examples of the unique number include an address of the first electric device ED1. The first cryptographic key information includes a first cryptographic key. Another wireless communicator encrypts information using the first cryptographic key information, and the first wireless communicator circuitry WC1 decrypts the encrypted information using the first cryptographic key information. The first electronic controller circuitry EC1 is configured to store the first pairing information ID1 in the first memory EC12. The first pairing information ID1 can also be referred to as pairing information ID1. The first cryptographic key information corresponds to the first communication protocol.

In the present embodiment, the first electronic controller circuitry EC1 is configured to control the first wireless communicator circuitry WC1 to wirelessly transmit the first response signal SG1 in response to the first signal SG51. However, the first electronic controller circuitry EC1 can be configured to control the first wireless communicator circuitry WC1 to wirelessly transmit the first response signal SG1 in response to another trigger other than the first signal SG51 if needed or desired.

Examples of the other trigger includes the first user input U1 received by the first user interface ED18 and power-on caused by attachment of the first electric power source ED15. Examples of the first user input U1 include at least one of the start of the pairing mode, the power-on of the first electric device ED1, and the power-off of the first electric device ED1. In such modifications, the first wireless communicator circuitry WC1 does not wirelessly transmit the first response signal SG1 when receiving the first signal SG51. Transmissions of signals can be executed between the first wireless communicator circuitry WC1 and the wireless communicator circuitry WC5 until the first user interface ED18 receives the first user input U1 after the first wireless communicator circuitry WC1 wirelessly receives the first signal SG51.

The wireless communicator circuitry WC5 is configured to detect the first response signal SG1 wirelessly transmitted from the first wireless communicator circuitry WC1 during pairing. The electronic controller circuitry EC5 is configured to store the first identification information of the first pairing information ID1 included in the first response signal SG1 in the memory EC52 in the case where the electronic controller circuitry EC5 detects the first response signal SG1. Thus, the memory EC52 is configured to store first pairing information ID1 of the first electric device ED1 received during pairing. The memory EC52 is configured to store the first pairing information ID1 of the first electric device ED1 received during pairing executed between the first electric device ED1 and the electric device ED5.

The electronic controller circuitry EC5 is configured to control, based on the first response signal SG1, the wireless communicator circuitry WC5 to wirelessly transmit a pairing signal PS51. The pairing signal PS51 includes at least one of the identification information and the cryptographic key information of the pairing information ID51. In the present embodiment, for example, the pairing signal PS51 includes the cryptographic key information of the pairing information ID51.

The first wireless communicator circuitry WC1 is configured to detect the pairing signal PS51. The first electronic controller circuitry EC1 is configured to store the cryptographic key information of the pairing information ID51 included in the pairing signal PS51 in the first memory EC12 in the case where the first electronic controller circuitry EC1 detects the pairing signal PS51. Namely, the first memory EC12 is configured to store the cryptographic key information of the pairing information ID51. The first electronic controller circuitry EC1 is configured to encrypts information using the cryptographic key information and to wirelessly transmit the encrypted information. The first electronic controller circuitry EC1 is configured to decrypts, using the cryptographic key information, the encrypted information wirelessly transmitted from the electric device ED5.

The first electronic controller circuitry EC1 is configured to control, based on the pairing signal PS51, the first wireless communicator circuitry WC1 to wirelessly transmit a first pairing response signal PS1. The first pairing response signal PS1 includes at least one of the first identification information and the first cryptographic key information of the first pairing information ID1. In the present embodiment, for example, the first pairing response signal PS1 includes the first cryptographic key information of the first pairing information ID1. The electronic controller circuitry EC5 is configured to control the wireless communicator circuitry WC5 to scan the first pairing response signal PS1 after transmitting the first request signal SG51A for the first scanning period P12.

The wireless communicator circuitry WC5 is configured to detect the first pairing response signal PS1. The electronic controller circuitry EC5 is configured to store the first cryptographic key information of the first pairing information ID1 included in the first pairing response signal PS1 in the memory EC52 in the case where the electronic controller circuitry EC5 detects the first pairing response signal PS1. Namely, the memory EC52 is configured to store the first cryptographic key information of the pairing information ID51. The electronic controller circuitry EC5 is configured to encrypts information using the first cryptographic key information and to wirelessly transmit the encrypted information. The electronic controller circuitry EC5 is configured to decrypts, using the first cryptographic key information, the encrypted information wirelessly transmitted from the first electric device ED1.

Accordingly, the first wireless communicator circuitry WC1 and the wireless communicator circuitry WC5 are paired during pairing. The first memory EC12 stores the pairing information ID51 in a first paired state where the first wireless communicator circuitry WC1 and the wireless communicator circuitry WC5 are paired. The memory EC52 stores the first pairing information ID1 in the first paired state where the first wireless communicator circuitry WC1 and the wireless communicator circuitry WC5 are paired.

In a first connection state where the first wireless communicator circuitry WC1 and the wireless communicator circuitry WC5 are paired and where the first wireless communicator circuitry WC1 and the wireless communicator circuitry WC5 are wirelessly connected, the first wireless communicator circuitry WC1 recognizes signals wirelessly transmitted from the wireless communicator circuitry WC5, and the wireless communicator circuitry WC5 recognizes signals wirelessly transmitted from the first wireless communicator circuitry WC1. The first connection state includes the first paired state. The pairing process executed between the first electric device ED1 and the electric device ED5 is not limited to the above process.

As seen in FIG. 4, the electronic controller circuitry EC5 is configured to control the wireless communicator circuitry WC5 to wirelessly transmit a second signal SG52 using the second communication protocol. The electronic controller circuitry EC5 is configured to control the wireless communicator WC52 to wirelessly transmit the second signal SG52 using the second communication protocol.

In the present embodiment, the electronic controller circuitry EC5 is configured to control the wireless communicator circuitry WC5 to start wireless transmission of the second signal SG52 in response to the pairing user input U5P. The electronic controller circuitry EC5 is configured to control the wireless communicator circuitry WC5 to start wireless transmission of the second signal SG52 using the second communication protocol in response to the pairing user input U5P. The electronic controller circuitry EC5 is configured to control the second wireless communicator circuitry WC52 to start wireless transmission of the second signal SG52 using the second communication protocol in response to the pairing user input U5P.

As seen in FIGS. 4 and 6, the electronic controller circuitry EC5 is configured to control the wireless communicator circuitry WC5 to wirelessly transmit the second signal SG52 repeatedly using the second communication protocol at a second number of times or for a second period. In the present embodiment, the electronic controller circuitry EC5 is configured to control the wireless communicator WC52 to wirelessly transmit the second signal SG52 repeatedly using the second communication protocol at the second number of times. However, the electronic controller circuitry EC5 can be configured to control the wireless communicator circuitry WC5 to wirelessly transmit the second signal SG52 repeatedly using the second communication protocol for the second period if needed or desired.

The electronic controller circuitry EC5 is configured to control the wireless communicator circuitry WC5 to wirelessly transmit the second signal SG52 during a second transmission period P21 in response to the pairing user input USP. The electronic controller circuitry EC5 is configured to control the wireless communicator circuitry WC5 to stop wirelessly transmitting the second signal SG52 in a case where the second transmission period P21 ends. The second signal SG52 includes at least one signal. The electronic controller circuitry EC5 is configured to scan a response signal via the wireless communicator circuitry WC5 during a second scanning period P22 after the second transmission period P21. The electronic controller circuitry EC5 is configured to wait for a second waiting period P23 after the second scanning period P22 ends.

A second advertise period P2 includes the second transmission period P21, the second scanning period P22, and the second waiting period P23. The electronic controller circuitry EC5 is configured to execute, using the wireless communicator circuitry WC5, the second advertise period P2 repeatedly at the second number of times or for the second period.

As seen in FIG. 4, the electronic controller circuitry EC5 is configured to execute pairing between the electric device ED5 and the second electric device ED2 based on a second response signal SG2. The electronic controller circuitry EC5 is configured to be paired with the second electric device ED2 based on the second response signal SG2. The second response signal SG2 is wirelessly transmitted from the second wireless communicator circuitry WC2 of the second electric device ED2. The electronic controller circuitry EC5 is configured to execute pairing between the wireless communicator WC52 and the second wireless communicator circuitry WC2 based on the second response signal SG2. The second wireless communicator circuitry WC2 of the second electric device ED2 is configured to wirelessly transmit the second response signal SG2.

In the present embodiment, the second electronic controller circuitry EC2 is configured to control the second wireless communicator circuitry WC2 to wirelessly transmit the second response signal SG2 in response to the second signal SG52. However, the second electronic controller circuitry EC2 can be configured to control the second wireless communicator circuitry WC2 to wirelessly transmit the second response signal SG2 in a case where another condition unrelated to the second response signal SG2 if needed or desired.

For example, the second signal SG52 includes an advertisement signal having no specified recipient. The second signal SG52 includes pairing information ID52 of the wireless communicator circuitry WC5. The pairing information ID52 includes information relating to the wireless communicator WC52. The pairing information ID52 includes at least one of identification information and cryptographic key information. The identification information includes a unique number indicating the electric device ED5. Examples of the unique number include an address of the electric device ED5. The cryptographic key information includes a cryptographic key. Another wireless communicator encrypts information using the cryptographic key information, and the wireless communicator circuitry WC5 decrypts the encrypted information using the cryptographic key information. The cryptographic key information of the pairing information ID52 corresponds to the second communication protocol.

In the present embodiment, the second signal SG52 includes a second request signal SG52A. The second request signal SG52A includes the advertisement signal having no specified recipient. The second request signal SG52A includes the pairing information ID52 of the wireless communicator circuitry WC5. In the present embodiment, for example, the second request signal SG52A includes the identification information of the pairing information ID52. The electronic controller circuitry EC5 is configured to control the wireless communicator circuitry WC5 to wirelessly transmit the second request signal SG52A to inform the second electric device ED2 that the electric device ED5 is ready to be paired with the second electric device ED2. The electronic controller circuitry EC5 is configured to control the wireless communicator circuitry WC5 to wirelessly transmit the second request signal SG52A before the electronic controller circuitry EC5 receives the first response signal SG1. The second electronic controller circuitry EC2 is configured to recognize, based on the second request signal SG52A, that the electric device ED5 is ready to be paired with the second electric device ED2.

The second wireless communicator circuitry WC2 is configured to detect the second signal SG52 wirelessly transmitted from the wireless communicator circuitry WC5 during pairing. The second electronic controller circuitry EC2 is configured to store the identification information of the pairing information ID52 included in the second signal SG52 in the second memory EC22 in the case where the second electronic controller circuitry EC2 detects the second signal SG52. Thus, the second memory EC22 is configured to store the pairing information ID52 of the electric device ED5 received during pairing. The second memory EC22 is configured to store the pairing information ID52 of the electric device ED5 received during pairing executed between the second electric device ED2 and the electric device ED5.

The second electronic controller circuitry EC2 is configured to control the second wireless communicator circuitry WC2 to wirelessly transmit the second response signal SG2 in a case where the second electronic controller circuitry EC2 detects the second signal SG52. The second response signal SG2 includes second pairing information ID2 of the second electric device ED2. The second pairing information ID2 includes at least one of second identification information and second cryptographic key information. In the present embodiment, for example, the second response signal SG2 includes the second identification information of the second pairing information ID2. The second identification information includes a unique number indicating the second electric device ED2. Examples of the unique number include an address of the second electric device ED2. The second cryptographic key information includes a second cryptographic key. Another wireless communicator encrypts information using the second cryptographic key information, and the second wireless communicator circuitry WC2 decrypts the encrypted information using the second cryptographic key information. The second electronic controller circuitry EC2 is configured to store the second pairing information ID2 in the second memory EC22. The second pairing information ID2 can also be referred to as pairing information ID2. The second cryptographic key information corresponds to the second communication protocol.

In the present embodiment, the second electronic controller circuitry EC2 is configured to control the second wireless communicator circuitry WC2 to wirelessly transmit the second response signal SG2 in response to the second signal SG52. However, the second electronic controller circuitry EC2 can be configured to control the second wireless communicator circuitry WC2 to wirelessly transmit the second response signal SG2 in response to another trigger other than the second signal SG52 if needed or desired.

Examples of the other trigger includes the second user input U2 received by the second user interface ED28 and power-on caused by attachment of the second electric power source ED25. Examples of the second user input U2 include at least one of the start of the pairing mode, the power-on of the second electric device ED2, and the power-off of the second electric device ED2. In such modifications, the second wireless communicator circuitry WC2 does not wirelessly transmit the second response signal SG2 when receiving the second signal SG52. Transmissions of signals can be executed between the second wireless communicator circuitry WC2 and the wireless communicator circuitry WC5 until the second user interface ED28 receives the second user input U2 after the second wireless communicator circuitry WC2 wirelessly receives the second signal SG52.

The wireless communicator circuitry WC5 is configured to detect the second response signal SG2 wirelessly transmitted from the second wireless communicator circuitry WC2 during pairing. The electronic controller circuitry EC5 is configured to store the second identification information of the second pairing information ID2 included in the second response signal SG2 in the memory EC52 in the case where the electronic controller circuitry EC5 detects the second response signal SG2. Thus, the memory EC52 is configured to store second pairing information ID2 of the second electric device ED2 received during pairing. The memory EC52 is configured to store the second pairing information ID2 of the second electric device ED2 received during pairing executed between the second electric device ED2 and the electric device ED5.

The electronic controller circuitry EC5 is configured to control, based on the second response signal SG2, the wireless communicator circuitry WC5 to wirelessly transmit a pairing signal PS52. The pairing signal PS52 includes at least one of the identification information and the cryptographic key information of the pairing information ID52. In the present embodiment, for example, the pairing signal PS52 includes the cryptographic key information of the pairing information ID52.

The second wireless communicator circuitry WC2 is configured to detect the pairing signal PS52. The second electronic controller circuitry EC2 is configured to store the cryptographic key information of the pairing information ID52 included in the pairing signal PS52 in the second memory EC22 in the case where the second electronic controller circuitry EC2 detects the pairing signal PS52. Namely, the second memory EC22 is configured to store the cryptographic key information of the pairing information ID52. The second electronic controller circuitry EC2 is configured to encrypts information using the cryptographic key information and to wirelessly transmit the encrypted information. The second electronic controller circuitry EC2 is configured to decrypts, using the cryptographic key information, the encrypted information wirelessly transmitted from the electric device ED5.

The second electronic controller circuitry EC2 is configured to control, based on the pairing signal PS52, the second wireless communicator circuitry WC2 to wirelessly transmit a second pairing response signal PS2. The second pairing response signal PS2 includes at least one of the second identification information and the second cryptographic key information of the second pairing information ID2. In the present embodiment, for example, the second pairing response signal PS2 includes the second cryptographic key information of the second pairing information ID2. The electronic controller circuitry EC5 is configured to control the wireless communicator circuitry WC5 to scan the second pairing response signal PS2 after transmitting the second request signal SG52A for the second scanning period P22.

The wireless communicator circuitry WC5 is configured to detect the second pairing response signal PS2. The electronic controller circuitry EC5 is configured to store the second cryptographic key information of the second pairing information ID2 included in the second pairing response signal PS2 in the memory EC52 in the case where the electronic controller circuitry EC5 detects the second pairing response signal PS2. Namely, the memory EC52 is configured to store the second cryptographic key information of the pairing information ID52. The electronic controller circuitry EC5 is configured to encrypts information using the second cryptographic key information and to wirelessly transmit the encrypted information. The electronic controller circuitry EC5 is configured to decrypts, using the second cryptographic key information, the encrypted information wirelessly transmitted from the second electric device ED2.

Accordingly, the second wireless communicator circuitry WC2 and the wireless communicator circuitry WC5 are paired during pairing. The second memory EC22 stores the pairing information ID52 in a second paired state where the second wireless communicator circuitry WC2 and the wireless communicator circuitry WC5 are paired. The memory EC52 stores the second pairing information ID2 in the second paired state where the second wireless communicator circuitry WC2 and the wireless communicator circuitry WC5 are paired.

In a second connection state where the second wireless communicator circuitry WC2 and the wireless communicator circuitry WC5 are paired and where the second wireless communicator circuitry WC2 and the wireless communicator circuitry WC5 are wirelessly connected, the second wireless communicator circuitry WC2 recognizes signals wirelessly transmitted from the wireless communicator circuitry WC5, and the wireless communicator circuitry WC5 recognizes signals wirelessly transmitted from the second wireless communicator circuitry WC2. The second connection state includes the second paired state. The pairing process executed between the second electric device ED2 and the electric device ED5 is not limited to the above process. The pairing process executed between the second electric device ED2 and the electric device ED5 is not limited to the above process.

As seen in FIG. 5, the electronic controller circuitry EC5 is configured to control the wireless communicator circuitry WC5 to wirelessly transmit a third signal SG53 using the third communication protocol. The electronic controller circuitry EC5 is configured to control the wireless communicator WC53 to wirelessly transmit the third signal SG53 using the third communication protocol.

In the present embodiment, the electronic controller circuitry EC5 is configured to control the wireless communicator circuitry WC5 to start wireless transmission of the third signal SG53 in response to the pairing user input USP. The electronic controller circuitry EC5 is configured to control the wireless communicator circuitry WC5 to start wireless transmission of the third signal SG53 using the third communication protocol in response to the pairing user input USP. The electronic controller circuitry EC5 is configured to control the third wireless communicator circuitry WC53 to start wireless transmission of the third signal SG53 using the third communication protocol in response to the pairing user input U5P.

As seen in FIGS. 5 and 6, the electronic controller circuitry EC5 is configured to control the wireless communicator circuitry WC5 to wirelessly transmit the third signal SG53 repeatedly using the third communication protocol at a third number of times or for a third period. In the present embodiment, the electronic controller circuitry EC5 is configured to control the wireless communicator WC53 to wirelessly transmit the third signal SG53 repeatedly using the third communication protocol at the third number of times. However, the electronic controller circuitry EC5 can be configured to control the wireless communicator circuitry WC5 to wirelessly transmit the third signal SG53 repeatedly using the third communication protocol for the third period if needed or desired.

The electronic controller circuitry EC5 is configured to control the wireless communicator circuitry WC5 to wirelessly transmit the third signal SG53 during a third transmission period P31 in response to the pairing user input USP. The electronic controller circuitry EC5 is configured to control the wireless communicator circuitry WC5 to stop wirelessly transmitting the third signal SG53 in a case where the third transmission period P31 ends. The third signal SG53 includes at least one signal. The electronic controller circuitry EC5 is configured to scan a response signal via the wireless communicator circuitry WC5 during a third scanning period P32 after the third transmission period P31. The electronic controller circuitry EC5 is configured to wait for a third waiting period P33 after the third scanning period P32 ends.

A third advertise period P3 includes the third transmission period P31, the third scanning period P32, and the third waiting period P33. The electronic controller circuitry EC5 is configured to execute, using the wireless communicator circuitry WC5, the third advertise period P3 repeatedly at the third number of times or for the third period.

As seen in FIG. 5, the electronic controller circuitry EC5 is configured to execute pairing between the electric device ED5 and the third electric device ED3 based on a third response signal SG3. The electronic controller circuitry EC5 is configured to be paired with the third electric device ED3 based on the third response signal SG3. The third response signal SG3 is wirelessly transmitted from the third wireless communicator circuitry WC3 of the third electric device ED3. The electronic controller circuitry EC5 is configured to execute pairing between the wireless communicator WC53 and the third wireless communicator circuitry WC3 based on the third response signal SG3. The third wireless communicator circuitry WC3 of the third electric device ED3 is configured to wirelessly transmit the third response signal SG3.

In the present embodiment, the third electronic controller circuitry EC3 is configured to control the third wireless communicator circuitry WC3 to wirelessly transmit the third response signal SG3 in response to the third signal SG53. However, the third electronic controller circuitry EC3 can be configured to control the third wireless communicator circuitry WC3 to wirelessly transmit the third response signal SG3 in a case where another condition unrelated to the third response signal SG3 if needed or desired.

For example, the third signal SG53 includes an advertisement signal having no specified recipient. The third signal SG53 includes pairing information ID53 of the wireless communicator circuitry WC5. The pairing information ID53 includes information relating to the wireless communicator WC53. The pairing information ID53 includes at least one of identification information and cryptographic key information. The identification information includes a unique number indicating the electric device ED5. Examples of the unique number include an address of the electric device ED5. The cryptographic key information includes a cryptographic key. Another wireless communicator encrypts information using the cryptographic key information, and the wireless communicator circuitry WC5 decrypts the encrypted information using the cryptographic key information. The cryptographic key information of the pairing information ID53 corresponds to the third communication protocol.

In the present embodiment, the third signal SG53 includes a third request signal SG53A. The third request signal SG53A includes the advertisement signal having no specified recipient. The third request signal SG53A includes the pairing information ID53 of the wireless communicator circuitry WC5. In the present embodiment, for example, the third request signal SG53A includes the identification information of the pairing information ID53. The electronic controller circuitry EC5 is configured to control the wireless communicator circuitry WC5 to wirelessly transmit the third request signal SG53A to inform the third electric device ED3 that the electric device ED5 is ready to be paired with the third electric device ED3. The electronic controller circuitry EC5 is configured to control the wireless communicator circuitry WC5 to wirelessly transmit the third request signal SG53A before the electronic controller circuitry EC5 receives the third response signal SG3. The third electronic controller circuitry EC3 is configured to recognize, based on the third request signal SG53A, that the electric device ED5 is ready to be paired with the third electric device ED3.

The third wireless communicator circuitry WC3 is configured to detect the third signal SG53 wirelessly transmitted from the wireless communicator circuitry WC5 during pairing. The third electronic controller circuitry EC3 is configured to store the identification information of the pairing information ID53 included in the third signal SG53 in the third memory EC32 in the case where the third electronic controller circuitry EC3 detects the third signal SG53. Thus, the third memory EC32 is configured to store the pairing information ID53 of the electric device ED5 received during pairing. The third memory EC32 is configured to store the pairing information ID53 of the electric device ED5 received during pairing executed between the third electric device ED3 and the electric device ED5.

The third electronic controller circuitry EC3 is configured to control the third wireless communicator circuitry WC3 to wirelessly transmit the third response signal SG3 in a case where the third electronic controller circuitry EC3 detects the third signal SG53. The third response signal SG3 includes third pairing information ID3 of the third electric device ED3. The third pairing information ID3 includes at least one of third identification information and third cryptographic key information. In the present embodiment, for example, the third response signal SG3 includes the third identification information of the third pairing information ID3. The third identification information includes a unique number indicating the third electric device ED3. Examples of the unique number include an address of the third electric device ED3. The third cryptographic key information includes a third cryptographic key. Another wireless communicator encrypts information using the third cryptographic key information, and the third wireless communicator circuitry WC3 decrypts the encrypted information using the third cryptographic key information. The third electronic controller circuitry EC3 is configured to store the third pairing information ID3 in the third memory EC32. The third pairing information ID3 can also be referred to as pairing information ID3. The third cryptographic key information corresponds to the third communication protocol.

In the present embodiment, the third electronic controller circuitry EC3 is configured to control the third wireless communicator circuitry WC3 to wirelessly transmit the third response signal SG3 in response to the third signal SG53. However, the third electronic controller circuitry EC3 can be configured to control the third wireless communicator circuitry WC3 to wirelessly transmit the third response signal SG3 in response to another trigger other than the third signal SG53 if needed or desired.

Examples of the other trigger includes the third user input U3 received by the third user interface ED38 and power-on caused by attachment of the electric power source RD5. Examples of the third user input U3 include at least one of the start of the pairing mode, the power-on, and the power-off. In such modifications, the third wireless communicator circuitry WC3 does not wirelessly transmit the third response signal SG3 when receiving the third signal SG53. Transmissions of signals can be executed between the third wireless communicator circuitry WC3 and the wireless communicator circuitry WC5 until the third user interface ED38 receives the third user input U3 after the third wireless communicator circuitry WC3 wirelessly receives the third signal SG53.

The wireless communicator circuitry WC5 is configured to detect the third response signal SG3 wirelessly transmitted from the third wireless communicator circuitry WC3 during pairing. The electronic controller circuitry EC5 is configured to store the third identification information of the third pairing information ID3 included in the third response signal SG3 in the third memory EC52 in the case where the electronic controller circuitry EC5 detects the third response signal SG3. Thus, the third memory EC52 is configured to store third pairing information ID3 of the third electric device ED3 received during pairing. The third memory EC52 is configured to store the third pairing information ID3 of the third electric device ED3 received during pairing executed between the third electric device ED3 and the electric device ED5.

The electronic controller circuitry EC5 is configured to control, based on the third response signal SG3, the wireless communicator circuitry WC5 to wirelessly transmit a pairing signal PS53. The pairing signal PS53 includes at least one of the identification information and the cryptographic key information of the pairing information ID53. In the present embodiment, for example, the pairing signal PS53 includes the cryptographic key information of the pairing information ID53.

The third wireless communicator circuitry WC3 is configured to detect the pairing signal PS53. The third electronic controller circuitry EC3 is configured to store the cryptographic key information of the pairing information ID53 included in the pairing signal PS53 in the third memory EC32 in the case where the third electronic controller circuitry EC3 detects the pairing signal PS53. Namely, the third memory EC32 is configured to store the cryptographic key information of the pairing information ID53. The third electronic controller circuitry EC3 is configured to encrypts information using the cryptographic key information and to wirelessly transmit the encrypted information. The third electronic controller circuitry EC3 is configured to decrypts, using the cryptographic key information, the encrypted information wirelessly transmitted from the electric device ED5.

The third electronic controller circuitry EC3 is configured to control, based on the pairing signal PS53, the third wireless communicator circuitry WC3 to wirelessly transmit a third pairing response signal PS3. The third pairing response signal PS3 includes at least one of the third identification information and the third cryptographic key information of the third pairing information ID3. In the present embodiment, for example, the third pairing response signal PS3 includes the third cryptographic key information of the third pairing information ID3. The electronic controller circuitry EC5 is configured to control the wireless communicator circuitry WC5 to scan the third pairing response signal PS3 after transmitting the third request signal SG53A for the third scanning period P32.

The wireless communicator circuitry WC5 is configured to detect the third pairing response signal PS3. The electronic controller circuitry EC5 is configured to store the third cryptographic key information of the third pairing information ID3 included in the third pairing response signal PS3 in the memory EC52 in the case where the electronic controller circuitry EC5 detects the third pairing response signal PS3. Namely, the memory EC52 is configured to store the third cryptographic key information of the pairing information ID53. The electronic controller circuitry EC5 is configured to encrypts information using the third cryptographic key information and to wirelessly transmit the encrypted information. The electronic controller circuitry EC5 is configured to decrypts, using the third cryptographic key information, the encrypted information wirelessly transmitted from the third electric device ED3.

Accordingly, the third wireless communicator circuitry WC3 and the wireless communicator circuitry WC5 are paired during pairing. The third memory EC32 stores the pairing information ID53 in a third paired state where the third wireless communicator circuitry WC3 and the wireless communicator circuitry WC5 are paired. The memory EC52 stores the third pairing information ID3 in the third paired state where the third wireless communicator circuitry WC3 and the wireless communicator circuitry WC5 are paired.

In a third connection state where the third wireless communicator circuitry WC3 and the wireless communicator circuitry WC5 are paired and where the third wireless communicator circuitry WC3 and the wireless communicator circuitry WC5 are wirelessly connected, the third wireless communicator circuitry WC3 recognizes signals wirelessly transmitted from the wireless communicator circuitry WC5, and the wireless communicator circuitry WC5 recognizes signals wirelessly transmitted from the third wireless communicator circuitry WC3. The third connection state includes the third paired state. The pairing process executed between the third electric device ED3 and the electric device ED5 is not limited to the above process. The pairing process executed between the third electric device ED3 and the electric device ED5 is not limited to the above process.

As seen in FIG. 5, the electronic controller circuitry EC5 is configured to execute pairing between the electric device ED5 and the fourth electric device ED4 based on a fourth response signal SG4. The electronic controller circuitry EC5 is configured to be paired with the fourth electric device ED4 based on the fourth response signal SG4. The fourth response signal SG4 is wirelessly transmitted from the fourth wireless communicator circuitry WC4 of the fourth electric device ED4. The electronic controller circuitry EC5 is configured to execute pairing between the wireless communicator WC51 and the fourth wireless communicator circuitry WC4 based on the fourth response signal SG4. The fourth wireless communicator circuitry WC4 of the fourth electric device ED4 is configured to wirelessly transmit the fourth response signal SG4.

In the present embodiment, the fourth electronic controller circuitry EC4 is configured to control the fourth wireless communicator circuitry WC4 to wirelessly transmit the fourth response signal SG4 in response to the first signal SG51. However, the fourth electronic controller circuitry EC4 can be configured to control the fourth wireless communicator circuitry WC4 to wirelessly transmit the fourth response signal SG4 in a case where another condition unrelated to the fourth response signal SG4 is satisfied if needed or desired.

The fourth wireless communicator circuitry WC4 is configured to detect the first signal SG51 wirelessly transmitted from the wireless communicator circuitry WC5 during pairing. The fourth electronic controller circuitry EC4 is configured to store the identification information of the pairing information ID51 included in the first signal SG51 in the fourth memory EC42 in the case where the fourth electronic controller circuitry EC4 detects the first signal SG51. Thus, the fourth memory EC42 is configured to store the pairing information ID51 of the electric device ED5 received during pairing. The fourth memory EC42 is configured to store the pairing information ID51 of the electric device ED5 received during pairing executed between the fourth electric device ED4 and the electric device ED5.

The fourth electronic controller circuitry EC4 is configured to control the fourth wireless communicator circuitry WC4 to wirelessly transmit the fourth response signal SG4 in a case where the fourth electronic controller circuitry EC4 detects the first signal SG51. The fourth response signal SG4 includes fourth pairing information ID4 of the fourth electric device ED4. The fourth pairing information ID4 includes at least one of fourth identification information and fourth cryptographic key information. In the present embodiment, for example, the fourth response signal SG4 includes the fourth identification information of the fourth pairing information ID4. The fourth identification information includes a unique number indicating the fourth electric device ED4. Examples of the unique number include an address of the fourth electric device ED4. The fourth cryptographic key information includes a fourth cryptographic key. Another wireless communicator encrypts information using the fourth cryptographic key information, and the fourth wireless communicator circuitry WC4 decrypts the encrypted information using the fourth cryptographic key information. The fourth electronic controller circuitry EC4 is configured to store the fourth pairing information ID4 in the fourth memory EC42. The fourth pairing information ID4 can also be referred to as pairing information ID4. The fourth cryptographic key information corresponds to the first communication protocol.

In the present embodiment, the fourth electronic controller circuitry EC4 is configured to control the fourth wireless communicator circuitry WC4 to wirelessly transmit the fourth response signal SG4 in response to the first signal SG51. However, the fourth electronic controller circuitry EC4 can be configured to control the fourth wireless communicator circuitry WC4 to wirelessly transmit the fourth response signal SG4 in response to another trigger other than the first signal SG51 if needed or desired.

Examples of the other trigger includes the fourth user input U4 received by the fourth user interface ED48 and power-on caused by attachment of the fourth electric power source ED45. Examples of the fourth user input U4 include at least one of the start of the pairing mode, the power-on of the fourth electric device ED4, and the power-off of the fourth electric device ED4. In such modifications, the fourth wireless communicator circuitry WC4 does not wirelessly transmit the fourth response signal SG4 when receiving the first signal SG51. Transmissions of signals can be executed between the fourth wireless communicator circuitry WC4 and the wireless communicator circuitry WC5 until the fourth user interface ED48 receives the fourth user input U4 after the fourth wireless communicator circuitry WC4 wirelessly receives the first signal SG51.

The wireless communicator circuitry WC5 is configured to detect the fourth response signal SG4 wirelessly transmitted from the fourth wireless communicator circuitry WC4 during pairing. The electronic controller circuitry EC5 is configured to store the first identification information of the fourth pairing information ID4 included in the fourth response signal SG4 in the memory EC52 in the case where the electronic controller circuitry EC5 detects the fourth response signal SG4. Thus, the memory EC52 is configured to store fourth pairing information ID4 of the fourth electric device ED4 received during pairing. The memory EC52 is configured to store the fourth pairing information ID4 of the fourth electric device ED4 received during pairing executed between the fourth electric device ED4 and the electric device ED5.

The electronic controller circuitry EC5 is configured to control, based on the fourth response signal SG4, the wireless communicator circuitry WC5 to wirelessly transmit a pairing signal PS54. The pairing signal PS54 includes the identification information and the cryptographic key information of the pairing information ID51. In the present embodiment, for example, the pairing signal PS54 includes the cryptographic key information of the pairing information ID51.

The fourth wireless communicator circuitry WC4 is configured to detect the pairing signal PS54. The fourth electronic controller circuitry EC4 is configured to store the cryptographic key information of the pairing information ID51 included in the pairing signal PS54 in the fourth memory EC42 in the case where the fourth electronic controller circuitry EC4 detects the pairing signal PS54. Namely, the fourth memory EC42 is configured to store the cryptographic key information of the pairing information ID51. The fourth electronic controller circuitry EC4 is configured to encrypts information using the cryptographic key information and to wirelessly transmit the encrypted information. The fourth electronic controller circuitry EC4 is configured to decrypts, using the cryptographic key information, the encrypted information wirelessly transmitted from the electric device ED5.

The fourth electronic controller circuitry EC4 is configured to control, based on the pairing signal PS54, the fourth wireless communicator circuitry WC4 to wirelessly transmit a fourth pairing response signal PS4. The fourth pairing response signal PS4 includes at least one of the first identification information and the first cryptographic key information of the fourth pairing information ID4. In the present embodiment, for example, the fourth pairing response signal PS4 includes the first cryptographic key information of the fourth pairing information ID4. The electronic controller circuitry EC5 is configured to control the wireless communicator circuitry WC5 to scan the fourth pairing response signal PS4 after transmitting the first request signal SG51A for the first scanning period P12.

The wireless communicator circuitry WC5 is configured to detect the fourth pairing response signal PS4. The electronic controller circuitry EC5 is configured to store the first cryptographic key information of the fourth pairing information ID4 included in the fourth pairing response signal PS4 in the memory EC52 in the case where the electronic controller circuitry EC5 detects the fourth pairing response signal PS4. Namely, the memory EC52 is configured to store the first cryptographic key information of the pairing information ID51. The electronic controller circuitry EC5 is configured to encrypts information using the first cryptographic key information and to wirelessly transmit the encrypted information. The electronic controller circuitry EC5 is configured to decrypts, using the first cryptographic key information, the encrypted information wirelessly transmitted from the fourth electric device ED4.

Accordingly, the fourth wireless communicator circuitry WC4 and the wireless communicator circuitry WC5 are paired during pairing. The fourth memory EC42 stores the pairing information ID51 in a fourth paired state where the fourth wireless communicator circuitry WC4 and the wireless communicator circuitry WC5 are paired. The memory EC52 stores the fourth pairing information ID4 in the fourth paired state where the fourth wireless communicator circuitry WC4 and the wireless communicator circuitry WC5 are paired.

In a fourth connection state where the fourth wireless communicator circuitry WC4 and the wireless communicator circuitry WC5 are paired and where the fourth wireless communicator circuitry WC4 and the wireless communicator circuitry WC5 are wirelessly connected, the fourth wireless communicator circuitry WC4 recognizes signals wirelessly transmitted from the wireless communicator circuitry WC5, and the wireless communicator circuitry WC5 recognizes signals wirelessly transmitted from the fourth wireless communicator circuitry WC4. The fourth connection state includes the fourth paired state. The pairing process executed between the fourth electric device ED4 and the electric device ED5 is not limited to the above process.

In the present embodiment, the electronic controller circuitry EC5 is configured to store a maximum number of at least one electric device which is paired with the electric device ED5 in the same period. The electronic controller circuitry EC5 is configured to manage a total number of at least one electric device which is paired with the electric device ED5 in the same period based on the maximum number. The electronic controller circuitry EC5 is configured to store the maximum number in the memory EC52.

For example, the electronic controller circuitry EC5 is configured to be paired with only one of the first electric device ED1, the second electric device ED2, the third electric device ED3, and the fourth electric device ED4 in the same period in a case where the maximum number is one. The electronic controller circuitry EC5 is configured to be paired with one or two of the first electric device ED1, the second electric device ED2, the third electric device ED3, and the fourth electric device ED4 in the same period in a case where the maximum number is two. The electronic controller circuitry EC5 is configured to be paired with one, two, or three of the first electric device ED1, the second electric device ED2, the third electric device ED3, and the fourth electric device ED4 in the same period in a case where the maximum number is three. The electronic controller circuitry EC5 is configured to be paired with one, two, three, or four of the first electric device ED1, the second electric device ED2, the third electric device ED3, and the fourth electric device ED4 in the same period in a case where the maximum number is four.

In the present embodiment, the maximum number is one. Thus, the electronic controller circuitry EC5 is configured to be paired with only one of the first electric device ED1, the second electric device ED2, the third electric device ED3, and the fourth electric device ED4 in the same period. However, the maximum number is not limited to one. The maximum number can be changed by the user via the user interface ED51 or another device which is configured to be electrically connected to the electric device ED5 if needed or desired.

In the present embodiment, the wireless communicator circuitry WC5 is configured to wirelessly communicate with another wireless communicator circuitry using only one of the first communication protocol, the second communication protocol, and the third communication protocol at the same time. The electronic controller circuitry EC5 is configured to control only one of the wireless communicator WC51, the wireless communicator WC52, and the wireless communicator WC53 to wirelessly communicate with another wireless communicator circuitry using corresponding one of the first communication protocol, the second communication protocol, and the third communication protocol at the same time. However, the wireless communicator circuitry WC5 can be configured to wirelessly communicate with another wireless communicator circuitry using at least two of the first communication protocol, the second communication protocol, and the third communication protocol at the same time if needed or desired. The electronic controller circuitry EC5 can be configured to control at least two of the wireless communicator WC51, the wireless communicator WC52, and the wireless communicator WC53 to wirelessly communicate with another wireless communicator circuitry using at least two of the first communication protocol, the second communication protocol, and the third communication protocol at the same time if needed or desired.

As seen in FIG. 6, the electronic controller circuitry EC5 is configured to execute, using the wireless communicator circuitry WC5, the first advertise period P1 repeatedly at the first number of times or for the first period in a case where the electronic controller circuitry EC5 does not detect the first response signal SG1 in each of the first scanning periods P12 of the first advertise periods P1.

Figure 7:
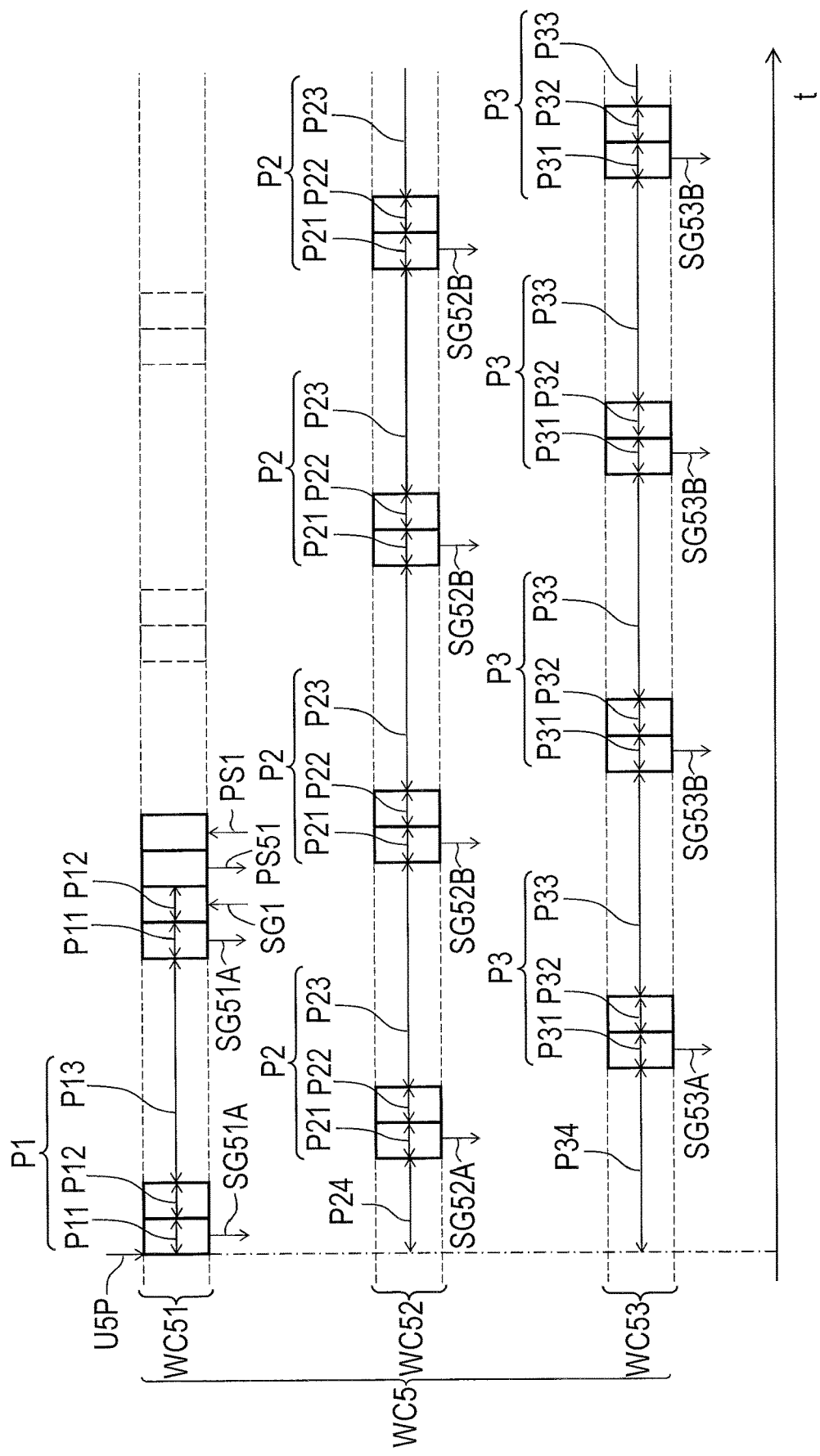
FIG. 7 is a schematic time chart showing the pairing process of the electric devices of the control system illustrated in FIG. 2 in a case where an electric device is paired with a first electric device.

As seen in FIG. 7, however, the electronic controller circuitry EC5 is configured to control the wireless communicator circuitry WC5 to stop transmitting the first signal SG51 in response to receipt of the first response signal SG1. The electronic controller circuitry EC5 is configured to control the wireless communicator circuitry WC5 to stop transmitting the first signal SG51 in response to receipt of the first response signal SG1 before the wireless communicator circuitry WC5 completes transmitting the first signal SG51 repeatedly at the first number of times or for the first period. The electronic controller circuitry EC5 is configured to control the wireless communicator circuitry WC5 to stop transmitting the first signal SG51 in a case where the electronic controller circuitry EC5 detects the first response signal SG1 in the first scanning period P12. However, the electronic controller circuitry EC5 can be configured to control the wireless communicator circuitry WC5 to keep wirelessly transmitting the first signal SG51 repeatedly at the first number of times or for the first period after receipt of the first response signal SG1 if needed or desired.

In the present embodiment, the electronic controller circuitry EC5 is configured to be free of being paired, after receipt of the first pairing response signal PS1, with the second electric device ED2 based on the second response signal SG2 which is wirelessly transmitted from the second wireless communicator circuitry WC2 of the second electric device ED2 in response to receipt of the second request signal SG52A. The electronic controller circuitry EC5 is configured to be free of being paired, after receipt of the first pairing response signal PS1, with the third electric device ED3 based on the third response signal SG3 which is wirelessly transmitted from the third wireless communicator circuitry WC3 of the third electric device ED3 in response to receipt of the third request signal SG53A. The electronic controller circuitry EC5 is configured to be free of being paired, after receipt of the first pairing response signal PS1, with the fourth electric device ED4 based on the fourth response signal SG4 which is wirelessly transmitted from the fourth wireless communicator circuitry WC4 of the fourth electric device ED4 in response to receipt of the first request signal SG51A.

Figure 8:
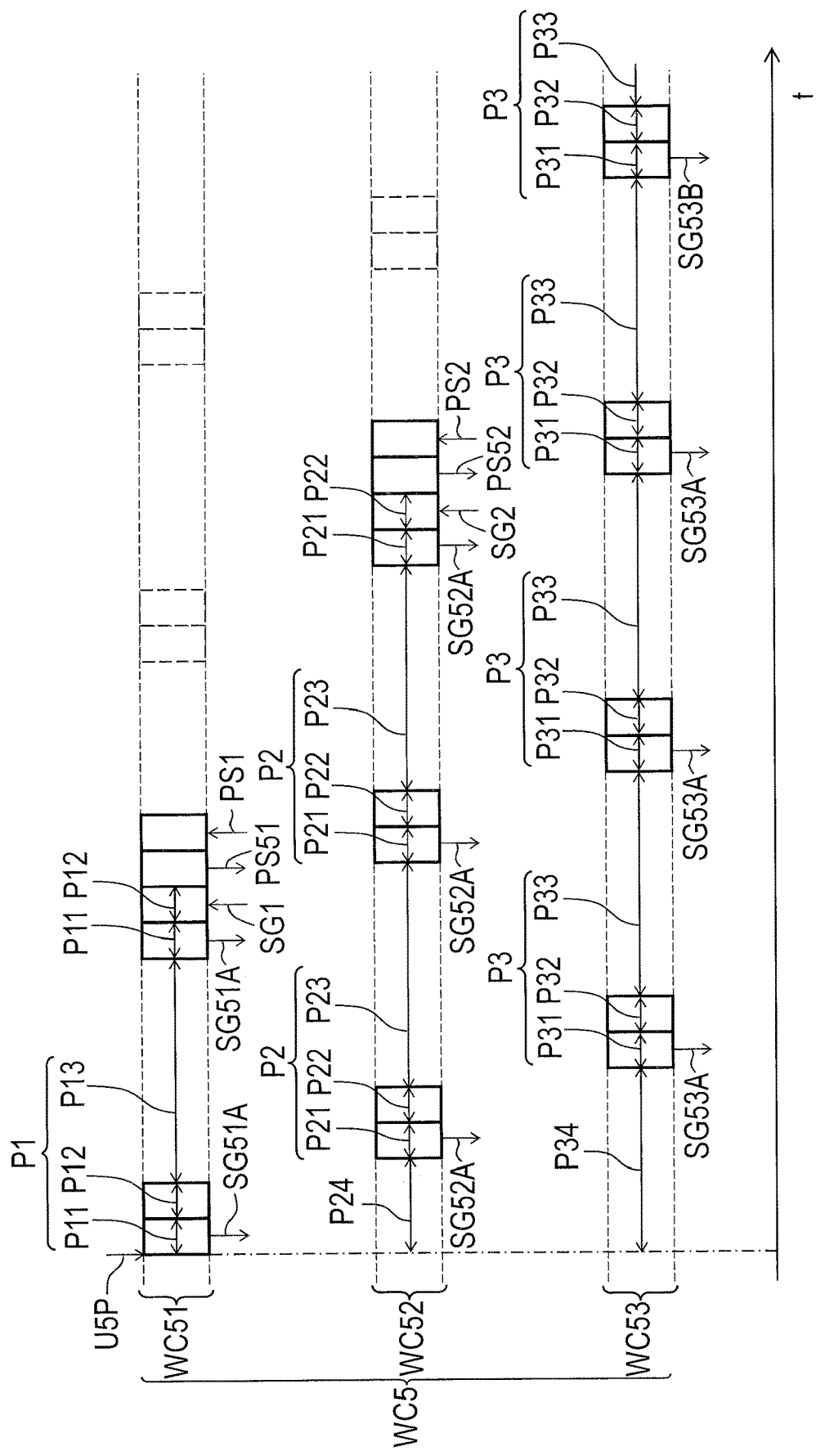
FIGS. 8 to 10 are schematic time charts showing a pairing process of an electric device in accordance with a modification in a case where the electric device is paired with the first electric device and another electric device.
Figure 9:
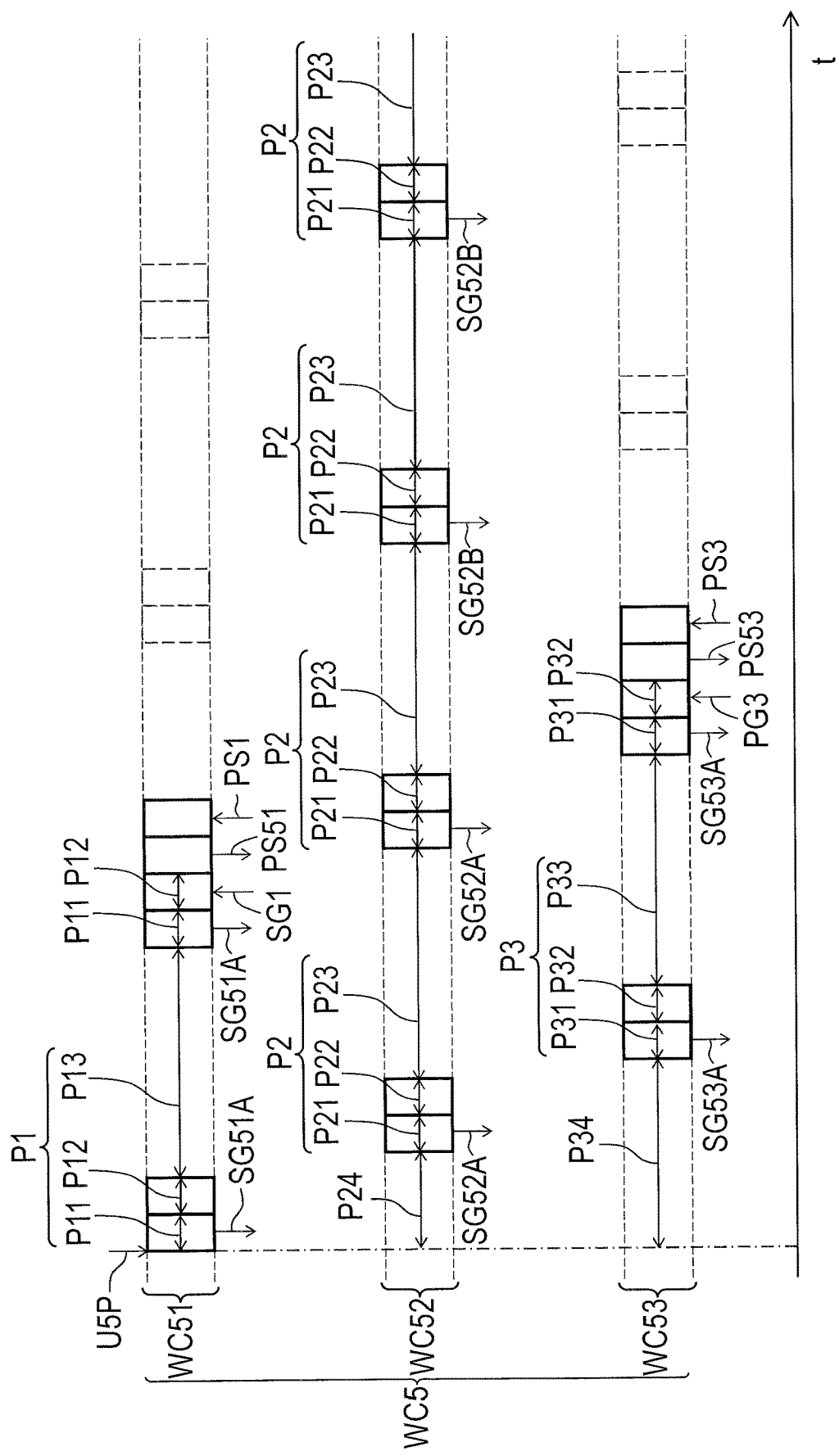
Figure 10:
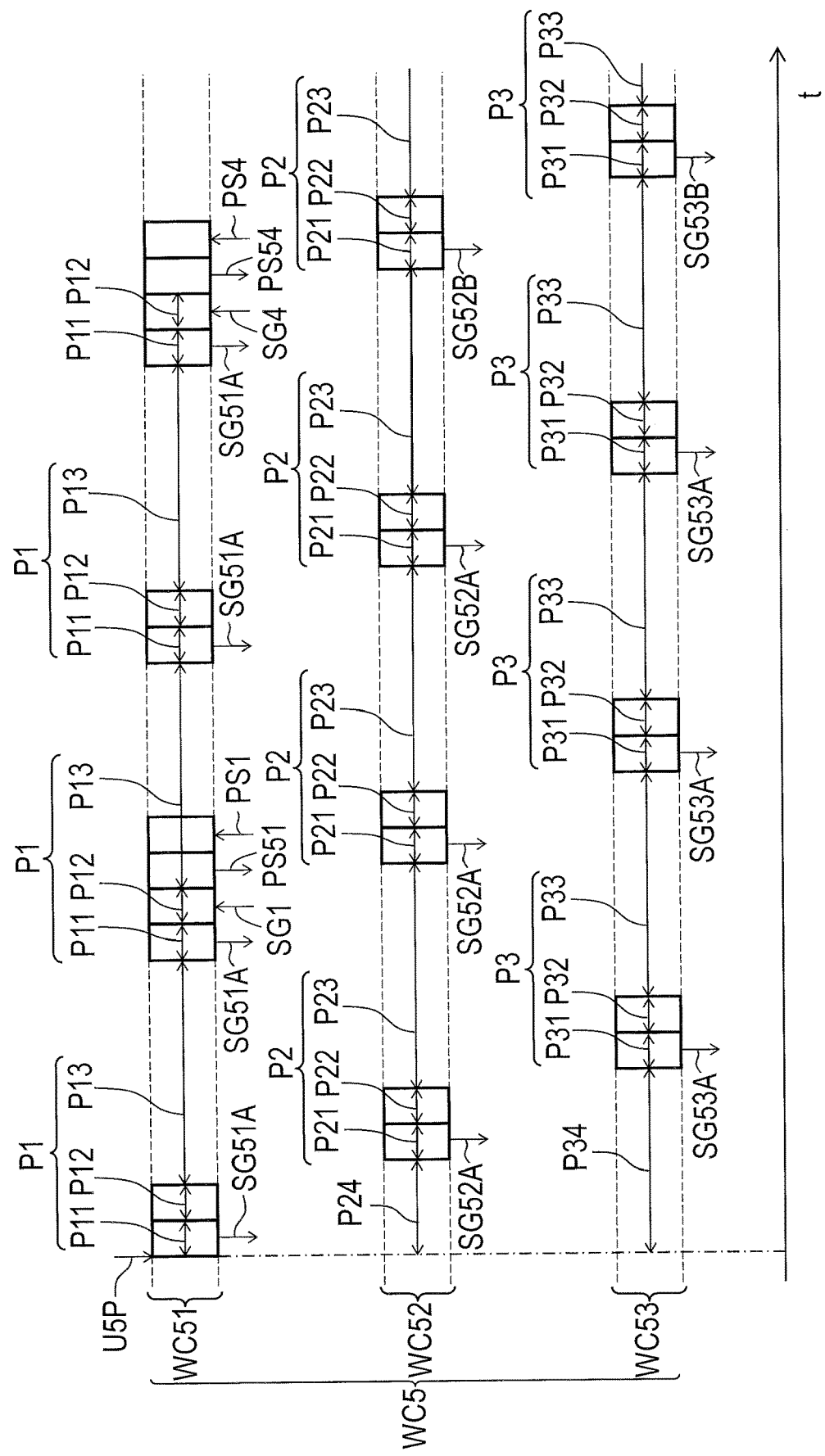

As seen in FIG. 8, however, the electronic controller circuitry EC5 can be configured to be paired, after receipt of the first pairing response signal PS1, with the second electric device ED2 based on the second response signal SG2 if needed or desired. As seen in FIG. 9, the electronic controller circuitry EC5 can be configured to be paired, after receipt of the first pairing response signal PS1, with the third electric device ED3 based on the third response signal SG3 if needed or desired. As seen in FIG. 10, the electronic controller circuitry EC5 can be configured to be paired, after receipt of the first pairing response signal PS1, with the fourth electric device ED4 based on the fourth response signal SG4 if needed or desired. The modifications depicted in FIGS. 8 to 10 will be described in detail later.

As seen in FIGS. 6 and 7, the electronic controller circuitry EC5 is configured to control the wireless communicator circuitry WC5 to wirelessly transmit the second signal SG52 using the second communication protocol regardless of the first response signal SG1. The electronic controller circuitry EC5 is configured to control the wireless communicator circuitry WC5 to wirelessly transmit the second signal SG52 repeatedly using the second communication protocol at the second number of times or for the second period regardless of whether the electronic controller circuitry EC5 receives the first response signal SG1. In the present embodiment, the electronic controller circuitry EC5 is configured to control the wireless communicator circuitry WC5 to wirelessly transmit the second signal SG52 using the second communication protocol after the wireless communicator circuitry WC5 receives the first response signal SG1.

The electronic controller circuitry EC5 is configured to control the wireless communicator circuitry WC5 to keep wirelessly transmitting the second signal SG52 using the second communication protocol after the wireless communicator circuitry WC5 stops transmitting the first signal SG51. The electronic controller circuitry EC5 is configured to control the wireless communicator circuitry WC5 to keep wirelessly transmitting the second signal SG52 using the second communication protocol after the electronic controller circuitry EC5 detects the first response signal SG1 in the first scanning period P12 in a case where the wireless communicator circuitry WC5 starts to wirelessly transmit the second signal SG52 before or when the wireless communicator circuitry WC5 receives the first response signal SG1. The electronic controller circuitry EC5 is configured to control the wireless communicator circuitry WC5 to wirelessly transmit the second signal SG52 using the second communication protocol after the electronic controller circuitry EC5 detects the first response signal SG1 in the first scanning period P12 in a case where the wireless communicator circuitry WC5 receives the first response signal SG1 before or when the wireless communicator circuitry WC5 starts to wirelessly transmit the second signal SG52.

The electronic controller circuitry EC5 is configured to control the wireless communicator circuitry WC5 to wirelessly transmit the second signal SG52 using the second communication protocol in a case where a condition is satisfied. In the present embodiment, the condition is free of whether the wireless communicator circuitry WC5 receives the first response signal SG1. The electronic controller circuitry EC5 is configured to control the wireless communicator circuitry WC5 to wirelessly transmit the second signal SG52 using the second communication protocol in a case where a second waiting period P24 elapses from the pairing user input USP. The condition is satisfied in the case where the second waiting period P24 elapses from the pairing user input U5P. However, the condition is not limited to the above condition. The condition can include whether the wireless communicator circuitry WC5 receives the first response signal SG1.

As seen in FIGS. 6 and 7, the electronic controller circuitry EC5 is configured to control the wireless communicator circuitry WC5 to wirelessly transmit the third signal SG53 using the third communication protocol regardless of the first response signal SG1. The electronic controller circuitry EC5 is configured to control the wireless communicator circuitry WC5 to wirelessly transmit the third signal SG53 repeatedly using the third communication protocol at the third number of times or for the third period regardless of whether the electronic controller circuitry EC5 receives the first response signal SG1. In the present embodiment, the electronic controller circuitry EC5 is configured to control the wireless communicator circuitry WC5 to wirelessly transmit the third signal SG53 using the third communication protocol after the wireless communicator circuitry WC5 receives the first response signal SG1.

The electronic controller circuitry EC5 is configured to control the wireless communicator circuitry WC5 to keep wirelessly transmitting the third signal SG53 using the third communication protocol after the wireless communicator circuitry WC5 stops transmitting the first signal SG51. The electronic controller circuitry EC5 is configured to control the wireless communicator circuitry WC5 to keep wirelessly transmitting the third signal SG53 using the third communication protocol after the electronic controller circuitry EC5 detects the first response signal SG1 in the first scanning period P12 in a case where the wireless communicator circuitry WC5 starts to wirelessly transmit the third signal SG53 before or when the wireless communicator circuitry WC5 receives the first response signal SG1. The electronic controller circuitry EC5 is configured to control the wireless communicator circuitry WC5 to wirelessly transmit the third signal SG53 using the third communication protocol after the electronic controller circuitry EC5 detects the first response signal SG1 in the first scanning period P12 in a case where the wireless communicator circuitry WC5 receives the first response signal SG1 before or when the wireless communicator circuitry WC5 starts to wirelessly transmit the third signal SG53.

The electronic controller circuitry EC5 is configured to control the wireless communicator circuitry WC5 to wirelessly transmit the third signal SG53 using the second communication protocol in a case where a condition is satisfied. In the present embodiment, the condition is free of whether the wireless communicator circuitry WC5 receives the first response signal SG1. The electronic controller circuitry EC5 is configured to control the wireless communicator circuitry WC5 to wirelessly transmit the third signal SG53 using the second communication protocol in a case where a third waiting period P34 elapses from the pairing user input USP. The condition is satisfied in the case where the third waiting period P34 elapses from the pairing user input USP. The third waiting period P34 is different from the second waiting period P24. The third waiting period P34 is longer than the second waiting period P24. However, the condition is not limited to the above condition. The condition can include whether the wireless communicator circuitry WC5 receives the first response signal SG1. The third waiting period P34 can be equal to or shorter than the second waiting period P24 if needed or desired.

As seen in FIG. 6, the electronic controller circuitry EC5 is configured to control the wireless communicator circuitry WC5 to start wireless transmission of the second signal SG52 in response to the pairing user input UP at a timing different from a timing of a start of the wireless transmission of the first signal SG51. The electronic controller circuitry EC5 is configured to control the wireless communicator circuitry WC5 to start wireless transmission of the third signal SG53 in response to the pairing user input U5P at a timing different from the timing of the start of the wireless transmission of the first signal SG51. The electronic controller circuitry EC5 is configured to control the wireless communicator circuitry WC5 to start wireless transmission of the third signal SG53 in response to the pairing user input U5P at a timing different from the timing of the start of the wireless transmission of the second signal SG52.

However, the electronic controller circuitry EC5 can be configured to control the wireless communicator circuitry WC5 to start wireless transmission of the second signal SG52 in response to the pairing user input USP at the same timing as the timing of the start of the wireless transmission of the first signal SG51 if needed or desired. The electronic controller circuitry EC5 can be configured to control the wireless communicator circuitry WC5 to start wireless transmission of the third signal SG53 in response to the pairing user input USP at the same timing as the timing of the start of the wireless transmission of the first signal SG51 if needed or desired. The electronic controller circuitry EC5 can be configured to control the wireless communicator circuitry WC5 to start wireless transmission of the third signal SG53 in response to the pairing user input USP at the same timing as the timing of the start of the wireless transmission of the second signal SG52 if needed or desired.

As seen in FIG. 6, the electronic controller circuitry EC5 is configured to execute, using the wireless communicator circuitry WC5, the second advertise period P2 repeatedly at the second number of times or for the second period in a case where the electronic controller circuitry EC5 does not detect the second response signal SG2 in each of the second scanning periods P22 of the second advertise periods P2.

Figure 11:
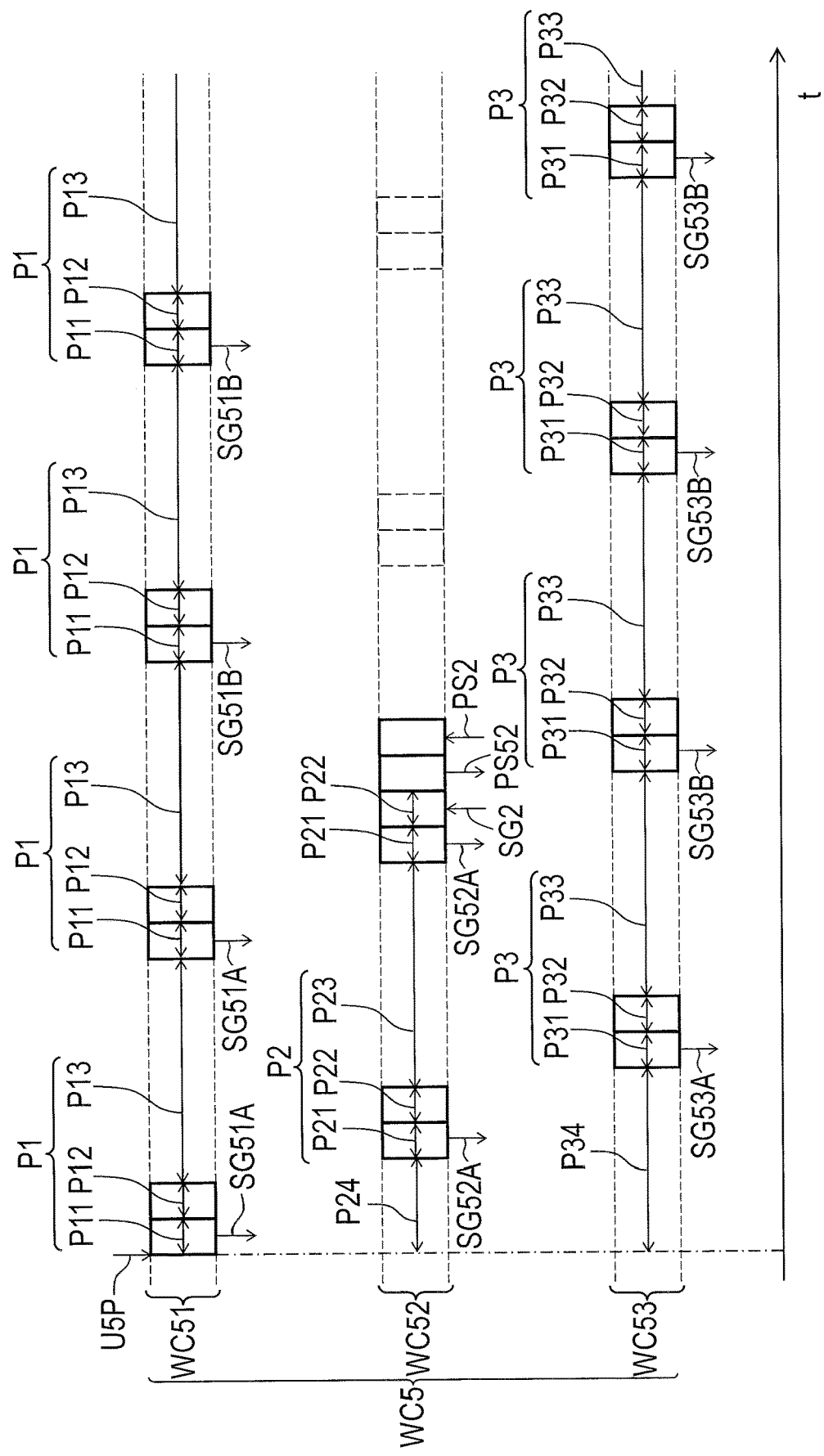
FIG. 11 is a schematic time chart showing the pairing process of the electric devices of the control system illustrated in FIG. 2 in a case where the electric device is paired with a second electric device.

As seen in FIG. 11, however, the electronic controller circuitry EC5 is configured to control the wireless communicator circuitry WC5 to stop transmitting the second signal SG52 in response to receipt of the second response signal SG2. The electronic controller circuitry EC5 is configured to control the wireless communicator circuitry WC5 to stop transmitting the second signal SG52 in response to receipt of the second response signal SG2 before the wireless communicator circuitry WC5 completes transmitting the second signal SG52 repeatedly at the second number of times or for the second period. The electronic controller circuitry EC5 is configured to control the wireless communicator circuitry WC5 to stop transmitting the second signal SG52 in a case where the electronic controller circuitry EC5 detects the second response signal SG2 in the second scanning period P22. However, the electronic controller circuitry EC5 can be configured to control the wireless communicator circuitry WC5 to keep wirelessly transmitting the second signal SG52 repeatedly at the second number of times or for the second period after receipt of the second response signal SG2 if needed or desired.

In the present embodiment, the electronic controller circuitry EC5 is configured to be free of being paired, after receipt of the second pairing response signal PS2, with the first electric device ED1 based on the first response signal SG1 which is wirelessly transmitted from the first wireless communicator circuitry WC1 of the first electric device ED1 in response to receipt of the first request signal SG51A. The electronic controller circuitry EC5 is configured to be free of being paired, after receipt of the second pairing response signal PS2, with the third electric device ED3 based on the third response signal SG3 which is wirelessly transmitted from the third wireless communicator circuitry WC3 of the third electric device ED3 in response to receipt of the third request signal SG53A. The electronic controller circuitry EC5 is configured to be free of being paired, after receipt of the second pairing response signal PS2, with the fourth electric device ED4 based on the fourth response signal SG4 which is wirelessly transmitted from the fourth wireless communicator circuitry WC4 of the fourth electric device ED4 in response to receipt of the first request signal SG51A.

Figure 12:
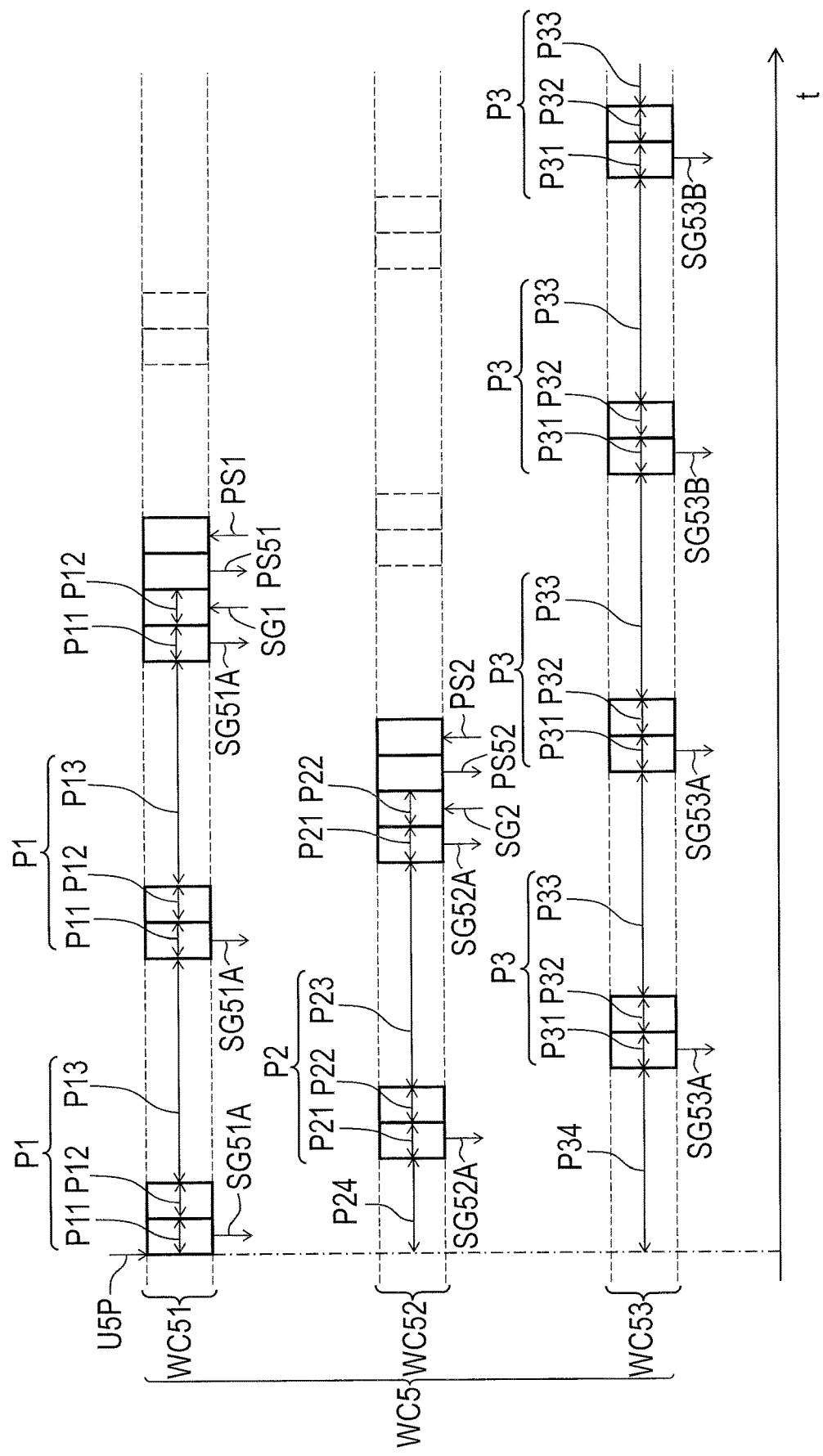
FIGS. 12 to 14 are schematic time charts showing a pairing process of an electric device in accordance with a modification in a case where the electric device is paired with the second electric device and another electric device.
Figure 13:
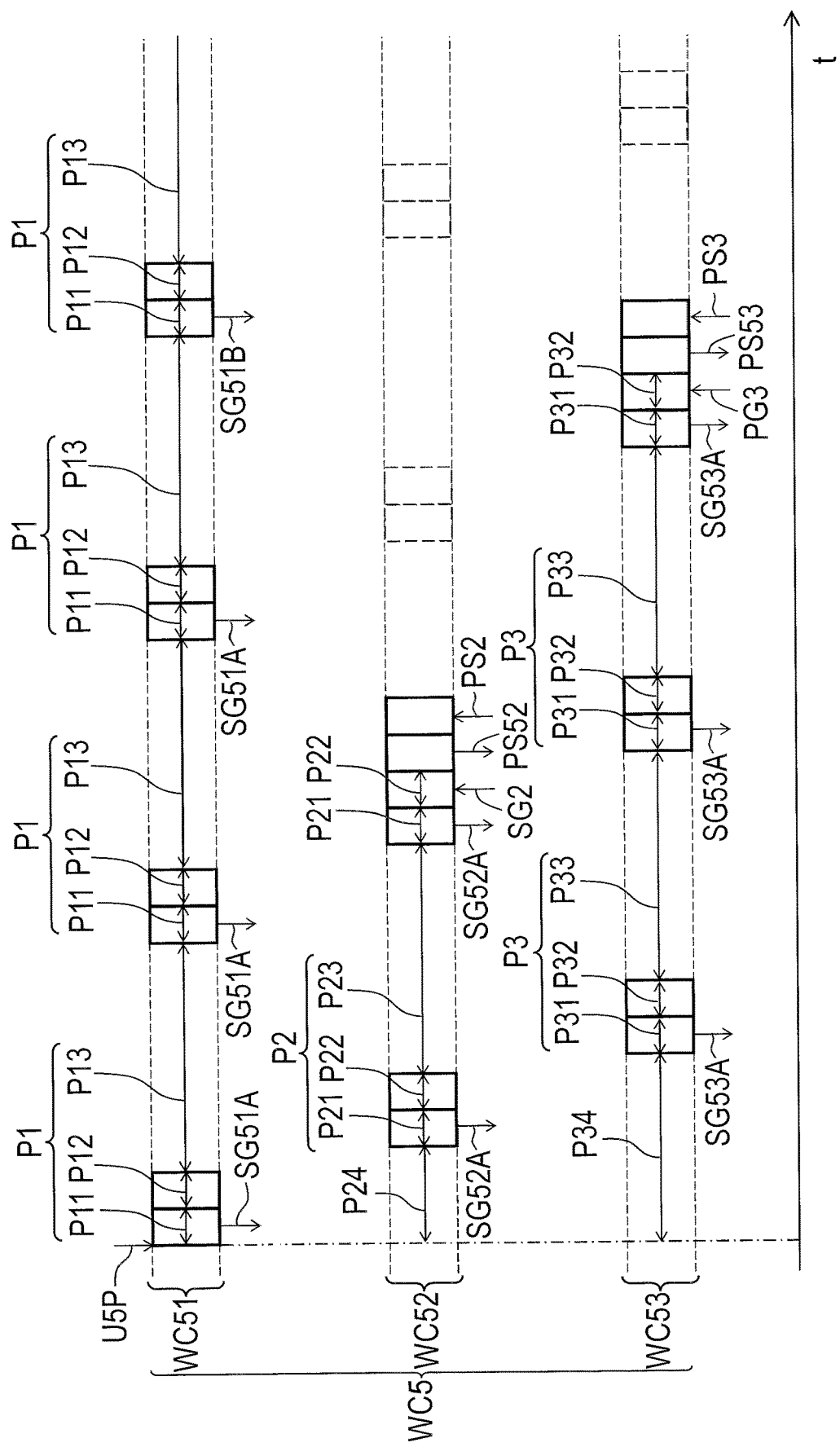
Figure 14:
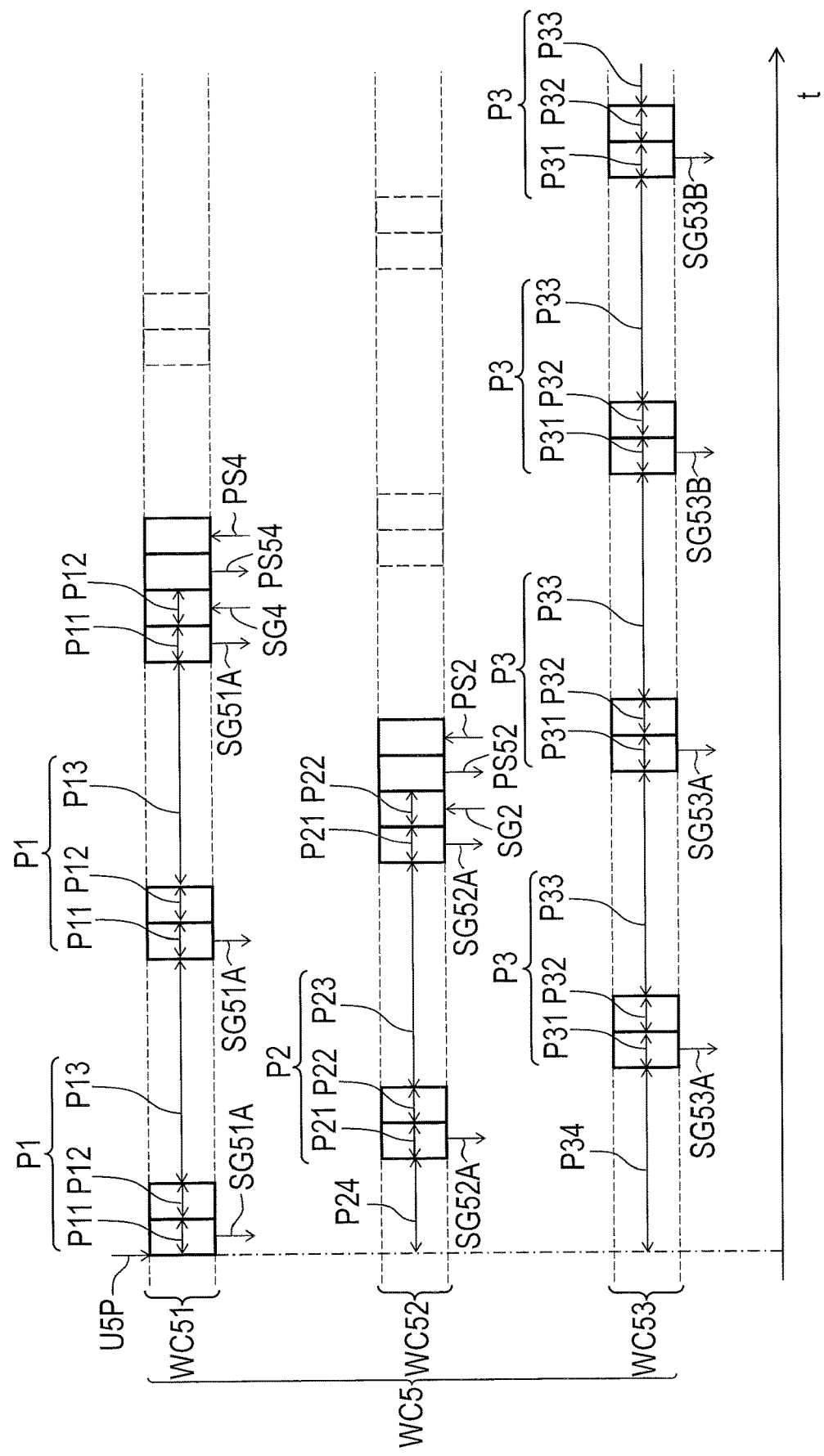

As seen in FIG. 12, however, the electronic controller circuitry EC5 can be configured to being paired, after receipt of the second pairing response signal PS2, with the first electric device ED1 based on the first response signal SG1 if needed or desired. As seen in FIG. 13, the electronic controller circuitry EC5 can be configured to be paired, after receipt of the second pairing response signal PS2, with the third electric device ED3 based on the third response signal SG3 if needed or desired. As seen in FIG. 14, the electronic controller circuitry EC5 can be configured to be paired, after receipt of the second pairing response signal PS2, with the fourth electric device ED4 based on the fourth response signal SG4 if needed or desired. The modifications depicted in FIGS. 12 to 14 will be described in detail later.

As seen in FIGS. 6 and 11, the electronic controller circuitry EC5 is configured to control the wireless communicator circuitry WC5 to wirelessly transmit the first signal SG51 using the first communication protocol regardless of the second response signal SG2. The electronic controller circuitry EC5 is configured to control the wireless communicator circuitry WC5 to wirelessly transmit the first signal SG51 repeatedly using the first communication protocol at the first number of times or for the first period regardless of whether the electronic controller circuitry EC5 receives the second response signal SG2. In the present embodiment, the electronic controller circuitry EC5 is configured to control the wireless communicator circuitry WC5 to wirelessly transmit the first signal SG51 using the first communication protocol after the wireless communicator circuitry WC5 receives the second response signal SG2.

The electronic controller circuitry EC5 is configured to control the wireless communicator circuitry WC5 to keep wirelessly transmitting the first signal SG51 using the first communication protocol after the wireless communicator circuitry WC5 stops transmitting the second signal SG52. The electronic controller circuitry EC5 is configured to control the wireless communicator circuitry WC5 to keep wirelessly transmitting the first signal SG51 using the first communication protocol after the electronic controller circuitry EC5 detects the second response signal SG2 in the second scanning period P22 in a case where the wireless communicator circuitry WC5 starts to wirelessly transmit the first signal SG51 before or when the wireless communicator circuitry WC5 receives the second response signal SG2. The electronic controller circuitry EC5 is configured to control the wireless communicator circuitry WC5 to wirelessly transmit the first signal SG51 using the first communication protocol after the electronic controller circuitry EC5 detects the second response signal SG2 in the second scanning period P22 in a case where the wireless communicator circuitry WC5 receives the second response signal SG2 before or when the wireless communicator circuitry WC5 starts to wirelessly transmit the first signal SG51.

The electronic controller circuitry EC5 is configured to control the wireless communicator circuitry WC5 to wirelessly transmit the first signal SG51 using the first communication protocol in a case where a condition is satisfied. In the present embodiment, the condition is free of whether the wireless communicator circuitry WC5 receives the second response signal SG2. The electronic controller circuitry EC5 is configured to control the wireless communicator circuitry WC5 to wirelessly transmit the first signal SG51 using the first communication protocol in response to the pairing user input U5P. However, the condition is not limited to the above condition. The condition can include whether the wireless communicator circuitry WC5 receives the second response signal SG2.

As seen in FIGS. 6 and 11, the electronic controller circuitry EC5 is configured to control the wireless communicator circuitry WC5 to wirelessly transmit the third signal SG53 using the third communication protocol regardless of the second response signal SG2. The electronic controller circuitry EC5 is configured to control the wireless communicator circuitry WC5 to wirelessly transmit the third signal SG53 repeatedly using the third communication protocol at the third number of times or for the third period regardless of whether the electronic controller circuitry EC5 receives the second response signal SG2. In the present embodiment, the electronic controller circuitry EC5 is configured to control the wireless communicator circuitry WC5 to wirelessly transmit the third signal SG53 using the third communication protocol after the wireless communicator circuitry WC5 receives the second response signal SG2.

The electronic controller circuitry EC5 is configured to control the wireless communicator circuitry WC5 to keep wirelessly transmitting the third signal SG53 using the third communication protocol after the wireless communicator circuitry WC5 stops transmitting the second signal SG52. The electronic controller circuitry EC5 is configured to control the wireless communicator circuitry WC5 to keep wirelessly transmitting the third signal SG53 using the second communication protocol after the electronic controller circuitry EC5 detects the second response signal SG2 in the second scanning period P22 in a case where the wireless communicator circuitry WC5 starts to wirelessly transmit the third signal SG53 before or when the wireless communicator circuitry WC5 receives the second response signal SG2. The electronic controller circuitry EC5 is configured to control the wireless communicator circuitry WC5 to wirelessly transmit the third signal SG53 using the second communication protocol after the electronic controller circuitry EC5 detects the second response signal SG2 in the second scanning period P22 in a case where the wireless communicator circuitry WC5 receives the second response signal SG2 before or when the wireless communicator circuitry WC5 starts to wirelessly transmit the third signal SG53.

The electronic controller circuitry EC5 is configured to control the wireless communicator circuitry WC5 to wirelessly transmit the third signal SG53 using the third communication protocol in a case where a condition is satisfied. In the present embodiment, the condition is free of whether the wireless communicator circuitry WC5 receives the second response signal SG2. The electronic controller circuitry EC5 is configured to control the wireless communicator circuitry WC5 to wirelessly transmit the third signal SG53 using the third communication protocol in a case where the third waiting period P34 elapses from the pairing user input USP. However, the condition is not limited to the above condition. The condition can include whether the wireless communicator circuitry WC5 receives the second response signal SG2.

As seen in FIG. 6, the electronic controller circuitry EC5 is configured to execute, using the wireless communicator circuitry WC5, the third advertise period P3 repeatedly at the third number of times or for the third period in a case where the electronic controller circuitry EC5 does not detect the third response signal SG3 in each of the third scanning periods P32 of the third advertise periods P3.

Figure 15:
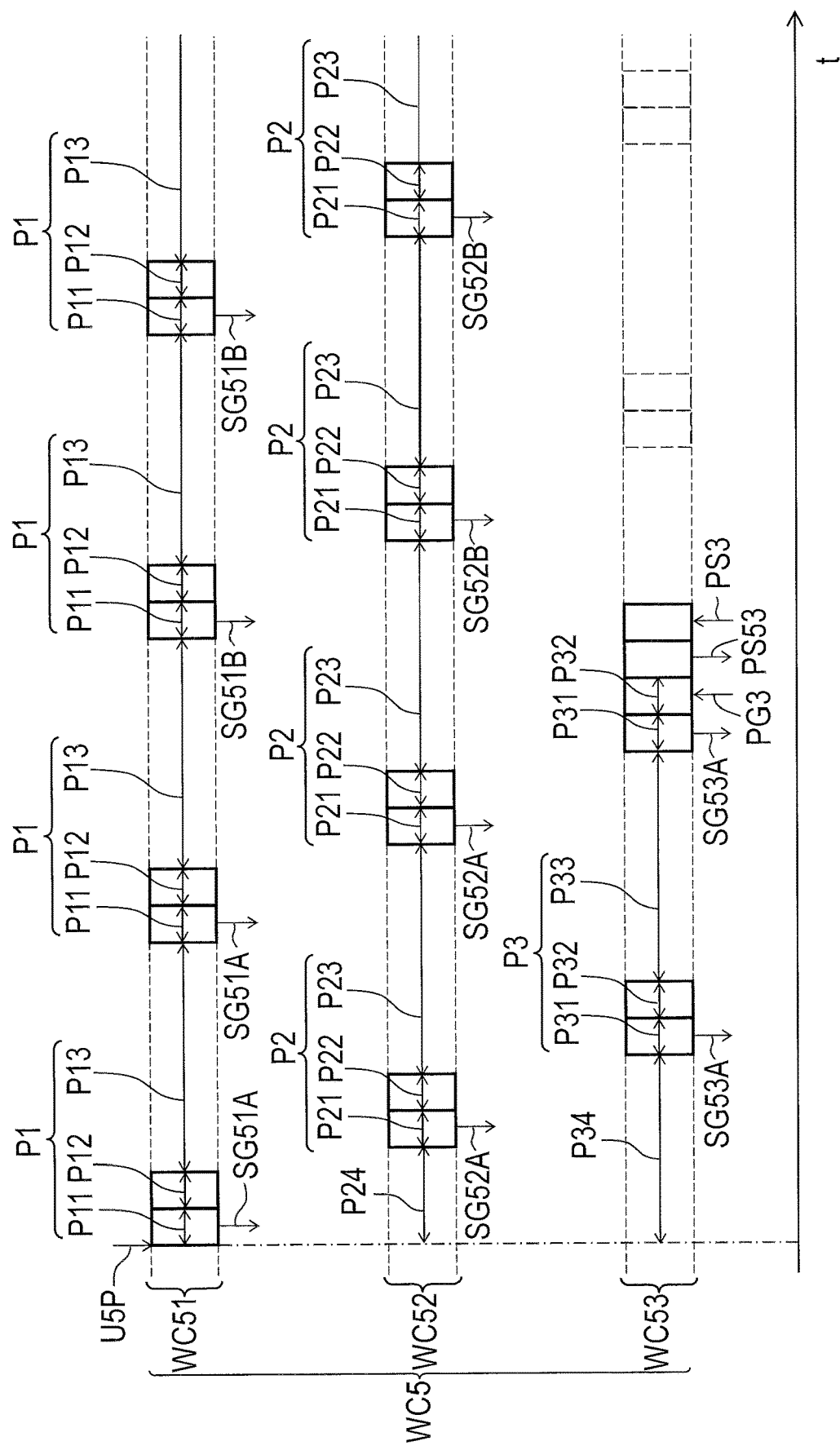
FIG. 15 is a schematic time chart showing the pairing process of the electric devices of the control system illustrated in FIG. 2 in a case where the electric device is paired with a third electric device.

As seen in FIG. 15, however, the electronic controller circuitry EC5 is configured to control the wireless communicator circuitry WC5 to stop transmitting the third signal SG53 in response to receipt of the third response signal SG3. The electronic controller circuitry EC5 is configured to control the wireless communicator circuitry WC5 to stop transmitting the third signal SG53 in response to receipt of the third response signal SG3 before the wireless communicator circuitry WC5 completes transmitting the third signal SG53 repeatedly at the third number of times or for the third period. The electronic controller circuitry EC5 is configured to control the wireless communicator circuitry WC5 to stop transmitting the third signal SG53 in a case where the electronic controller circuitry EC5 detects the third response signal SG3 in the third scanning period P32. However, the electronic controller circuitry EC5 can be configured to control the wireless communicator circuitry WC5 to keep wirelessly transmitting the third signal SG53 repeatedly at the third number of times or for the third period after receipt of the third response signal SG3 if needed or desired.

In the present embodiment, the electronic controller circuitry EC5 is configured to be free of being paired, after receipt of the third pairing response signal PS3, with the first electric device ED1 based on the first response signal SG1 which is wirelessly transmitted from the first wireless communicator circuitry WC1 of the first electric device ED1 in response to receipt of the first request signal SG51A. The electronic controller circuitry EC5 is configured to be free of being paired, after receipt of the third pairing response signal PS3, with the second electric device ED2 based on the second response signal SG2 which is wirelessly transmitted from the second wireless communicator circuitry WC2 of the second electric device ED2 in response to receipt of the second request signal SG52A. The electronic controller circuitry EC5 is configured to be free of being paired, after receipt of the third pairing response signal PS3, with the fourth electric device ED4 based on the fourth response signal SG4 which is wirelessly transmitted from the fourth wireless communicator circuitry WC4 of the fourth electric device ED4 in response to receipt of the first request signal SG51A.

Figure 16:
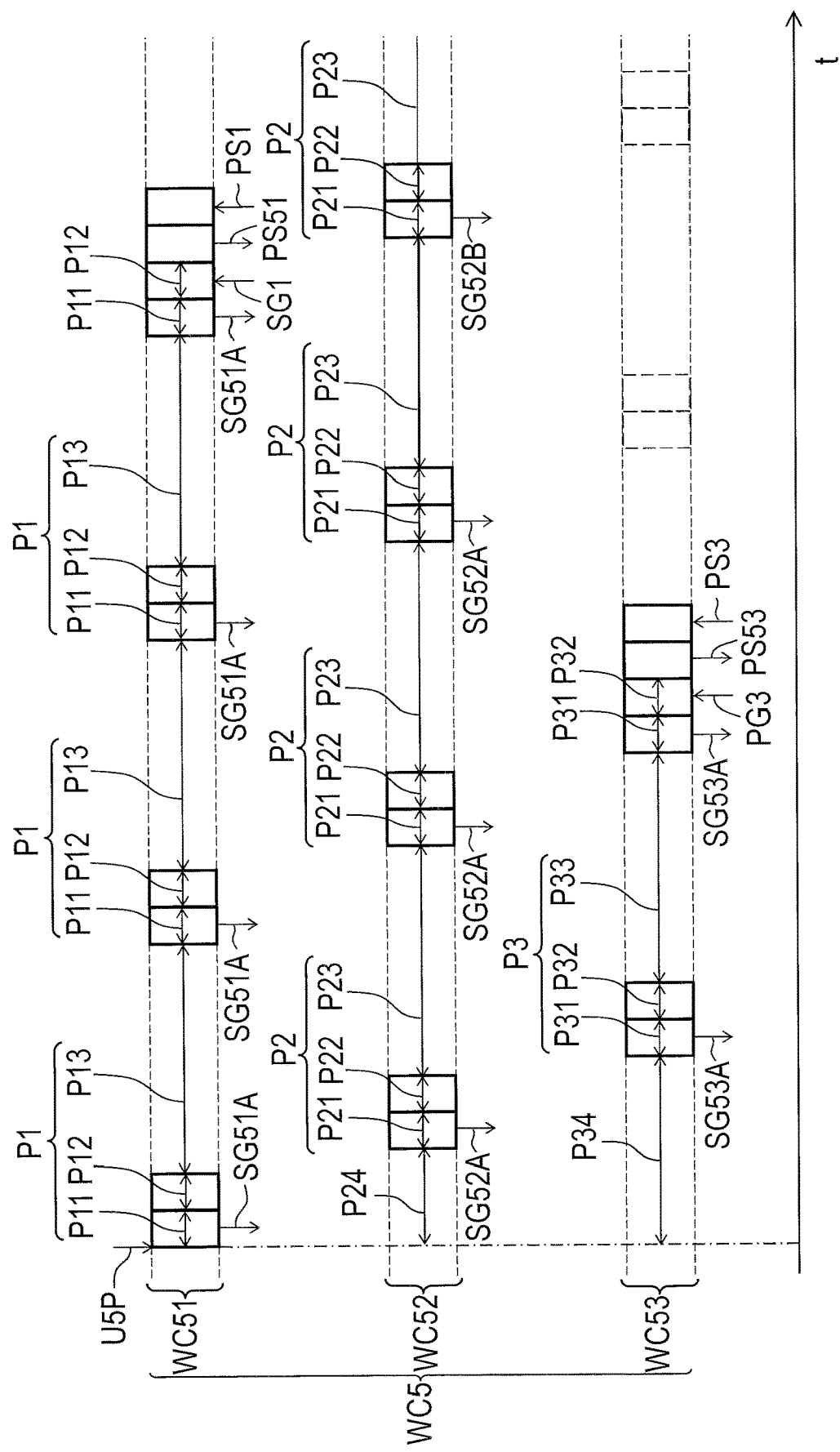
FIGS. 16 to 18 are schematic time charts showing a pairing process of an electric device in accordance with a modification in a case where the electric device is paired with the third electric device and another electric device.
Figure 17:
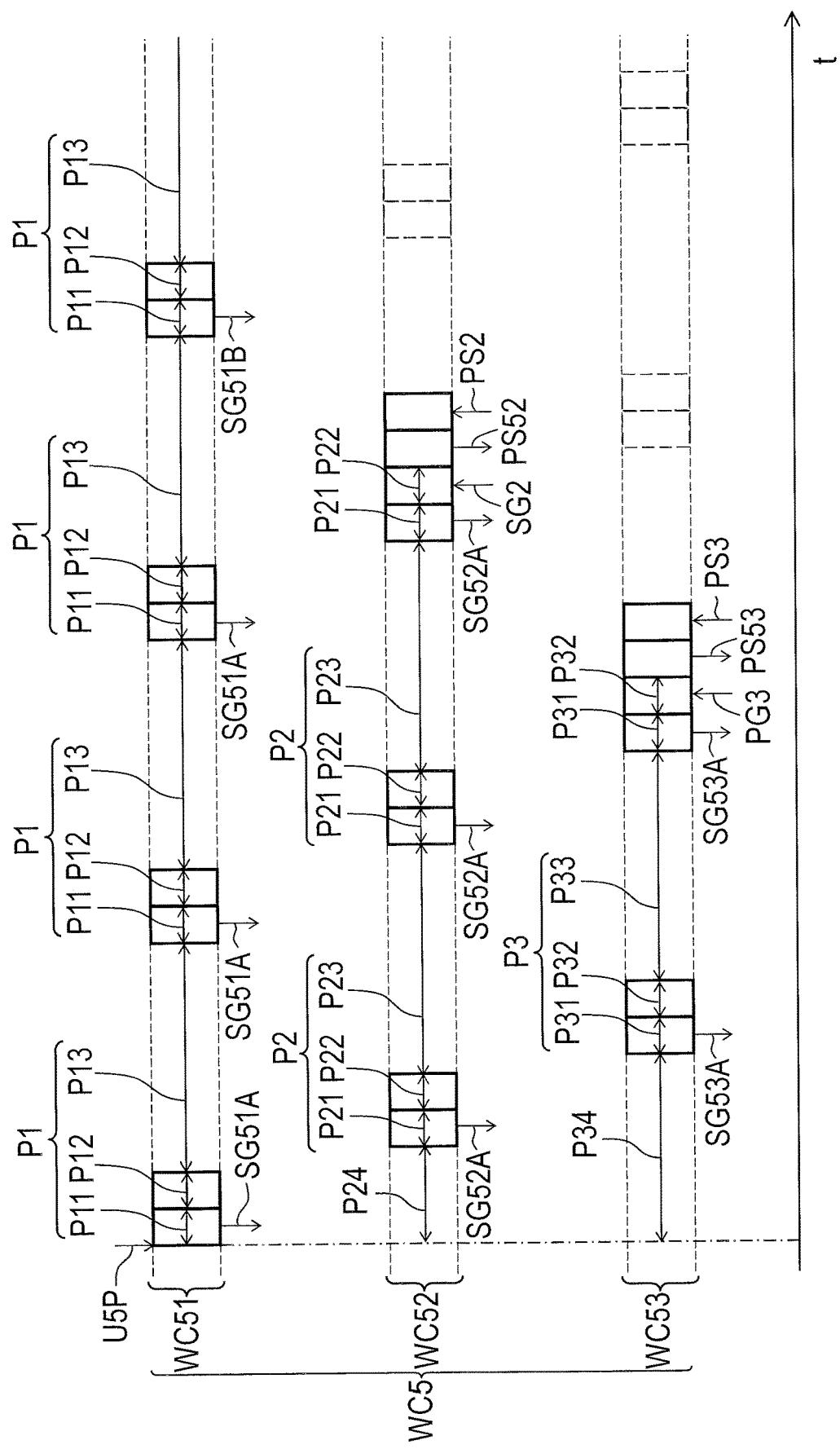
Figure 18:
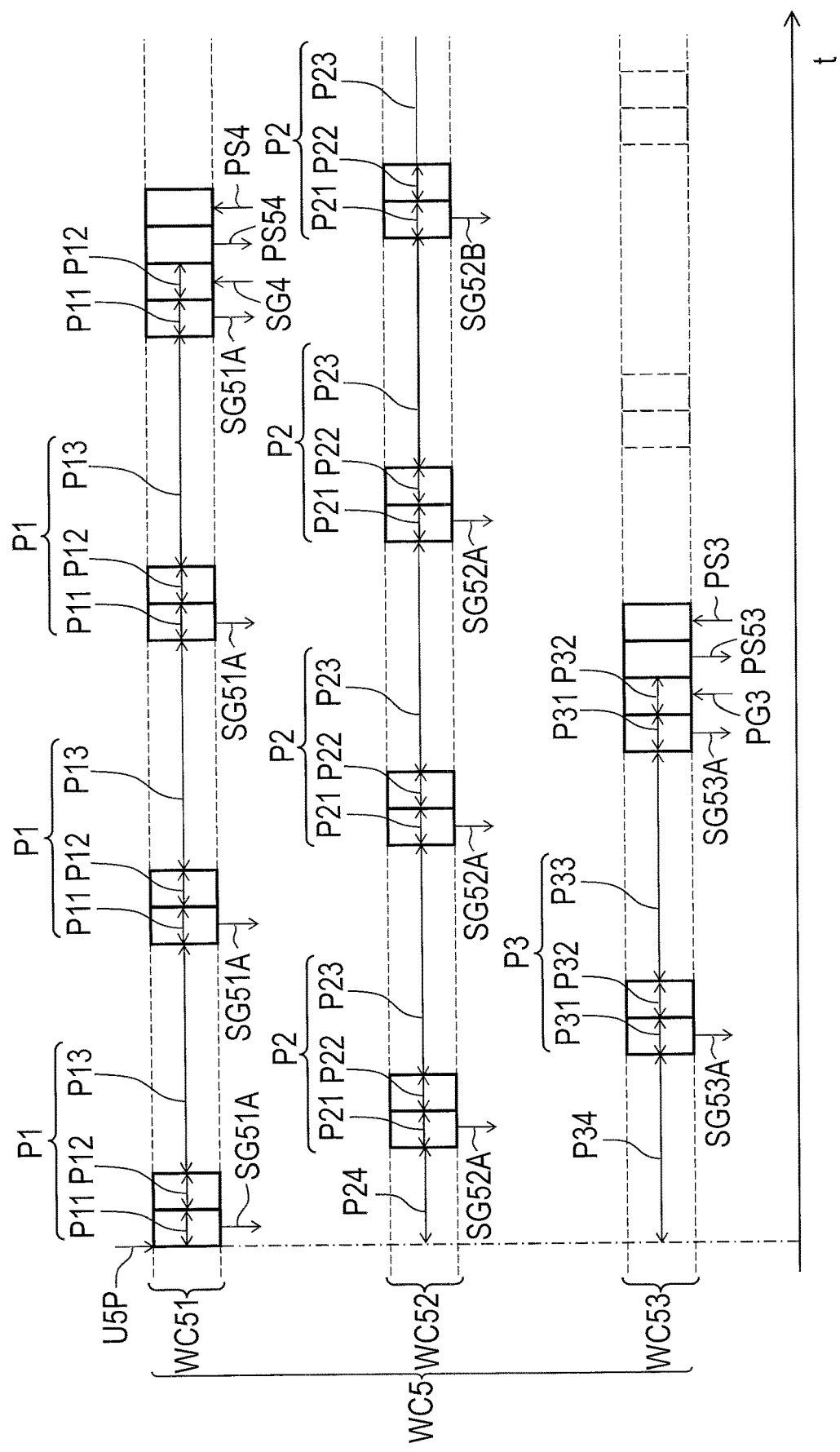

As seen in FIG. 16, however, the electronic controller circuitry EC5 can be configured to be paired, after receipt of the third pairing response signal PS3, with the first electric device ED1 based on the first response signal SG1 if needed or desired. As seen in FIG. 17, the electronic controller circuitry EC5 can be configured to being paired, after receipt of the third pairing response signal PS3, with the second electric device ED2 based on the second response signal SG2 if needed or desired. As seen in FIG. 18, the electronic controller circuitry EC5 can be configured to be paired, after receipt of the third pairing response signal PS3, with the fourth electric device ED4 based on the fourth response signal SG4 if needed or desired. The modifications depicted in FIGS. 16 to 18 will be described in detail later.

As seen in FIGS. 6 and 15, the electronic controller circuitry EC5 is configured to control the wireless communicator circuitry WC5 to wirelessly transmit the first signal SG51 using the first communication protocol regardless of the third response signal SG3. The electronic controller circuitry EC5 is configured to control the wireless communicator circuitry WC5 to wirelessly transmit the first signal SG51 repeatedly using the first communication protocol at the first number of times or for the first period regardless of whether the electronic controller circuitry EC5 receives the third response signal SG3. In the present embodiment, the electronic controller circuitry EC5 is configured to control the wireless communicator circuitry WC5 to wirelessly transmit the first signal SG51 using the first communication protocol after the wireless communicator circuitry WC5 receives the third response signal SG3.

The electronic controller circuitry EC5 is configured to control the wireless communicator circuitry WC5 to keep wirelessly transmitting the first signal SG51 using the first communication protocol after the wireless communicator circuitry WC5 stops transmitting the third signal SG53. The electronic controller circuitry EC5 is configured to control the wireless communicator circuitry WC5 to keep wirelessly transmitting the first signal SG51 using the first communication protocol after the electronic controller circuitry EC5 detects the third response signal SG3 in the third scanning period P32 in a case where the wireless communicator circuitry WC5 starts to wirelessly transmit the first signal SG51 before or when the wireless communicator circuitry WC5 receives the third response signal SG3. The electronic controller circuitry EC5 is configured to control the wireless communicator circuitry WC5 to wirelessly transmit the first signal SG51 using the first communication protocol after the electronic controller circuitry EC5 detects the third response signal SG3 in the third scanning period P32 in a case where the wireless communicator circuitry WC5 receives the third response signal SG3 before or when the wireless communicator circuitry WC5 starts to wirelessly transmit the first signal SG51.

The electronic controller circuitry EC5 is configured to control the wireless communicator circuitry WC5 to wirelessly transmit the first signal SG51 using the first communication protocol in a case where a condition is satisfied. In the present embodiment, the condition is free of whether the wireless communicator circuitry WC5 receives the third response signal SG3. The electronic controller circuitry EC5 is configured to control the wireless communicator circuitry WC5 to wirelessly transmit the first signal SG51 using the first communication protocol in response to the pairing user input USP. However, the condition is not limited to the above condition. The condition can include whether the wireless communicator circuitry WC5 receives the third response signal SG3.

As seen in FIGS. 6 and 15, the electronic controller circuitry EC5 is configured to control the wireless communicator circuitry WC5 to wirelessly transmit the second signal SG52 using the third communication protocol regardless of the third response signal SG3. The electronic controller circuitry EC5 is configured to control the wireless communicator circuitry WC5 to wirelessly transmit the second signal SG52 repeatedly using the second communication protocol at the second number of times or for the second period regardless of whether the electronic controller circuitry EC5 receives the third response signal SG3. In the present embodiment, the electronic controller circuitry EC5 is configured to control the wireless communicator circuitry WC5 to wirelessly transmit the second signal SG52 using the third communication protocol after the wireless communicator circuitry WC5 receives the third response signal SG3.

The electronic controller circuitry EC5 is configured to control the wireless communicator circuitry WC5 to keep wirelessly transmitting the second signal SG52 using the second communication protocol after the wireless communicator circuitry WC5 stops transmitting the third signal SG53. The electronic controller circuitry EC5 is configured to control the wireless communicator circuitry WC5 to keep wirelessly transmitting the second signal SG52 using the second communication protocol after the electronic controller circuitry EC5 detects the third response signal SG3 in the third scanning period P32 in a case where the wireless communicator circuitry WC5 starts to wirelessly transmit the second signal SG52 before or when the wireless communicator circuitry WC5 receives the third response signal SG3. The electronic controller circuitry EC5 is configured to control the wireless communicator circuitry WC5 to wirelessly transmit the second signal SG52 using the second communication protocol after the electronic controller circuitry EC5 detects the third response signal SG3 in the third scanning period P32 in a case where the wireless communicator circuitry WC5 receives the third response signal SG3 before or when the wireless communicator circuitry WC5 starts to wirelessly transmit the second signal SG52.

The electronic controller circuitry EC5 is configured to control the wireless communicator circuitry WC5 to wirelessly transmit the second signal SG52 using the second communication protocol in a case where a condition is satisfied. In the present embodiment, the condition is free of whether the wireless communicator circuitry WC5 receives the third response signal SG3. The electronic controller circuitry EC5 is configured to control the wireless communicator circuitry WC5 to wirelessly transmit the second signal SG52 using the second communication protocol in a case where the second waiting period P24 elapses from the pairing user input USP. However, the condition is not limited to the above condition. The condition can include whether the wireless communicator circuitry WC5 receives the third response signal SG3.

Figure 19:
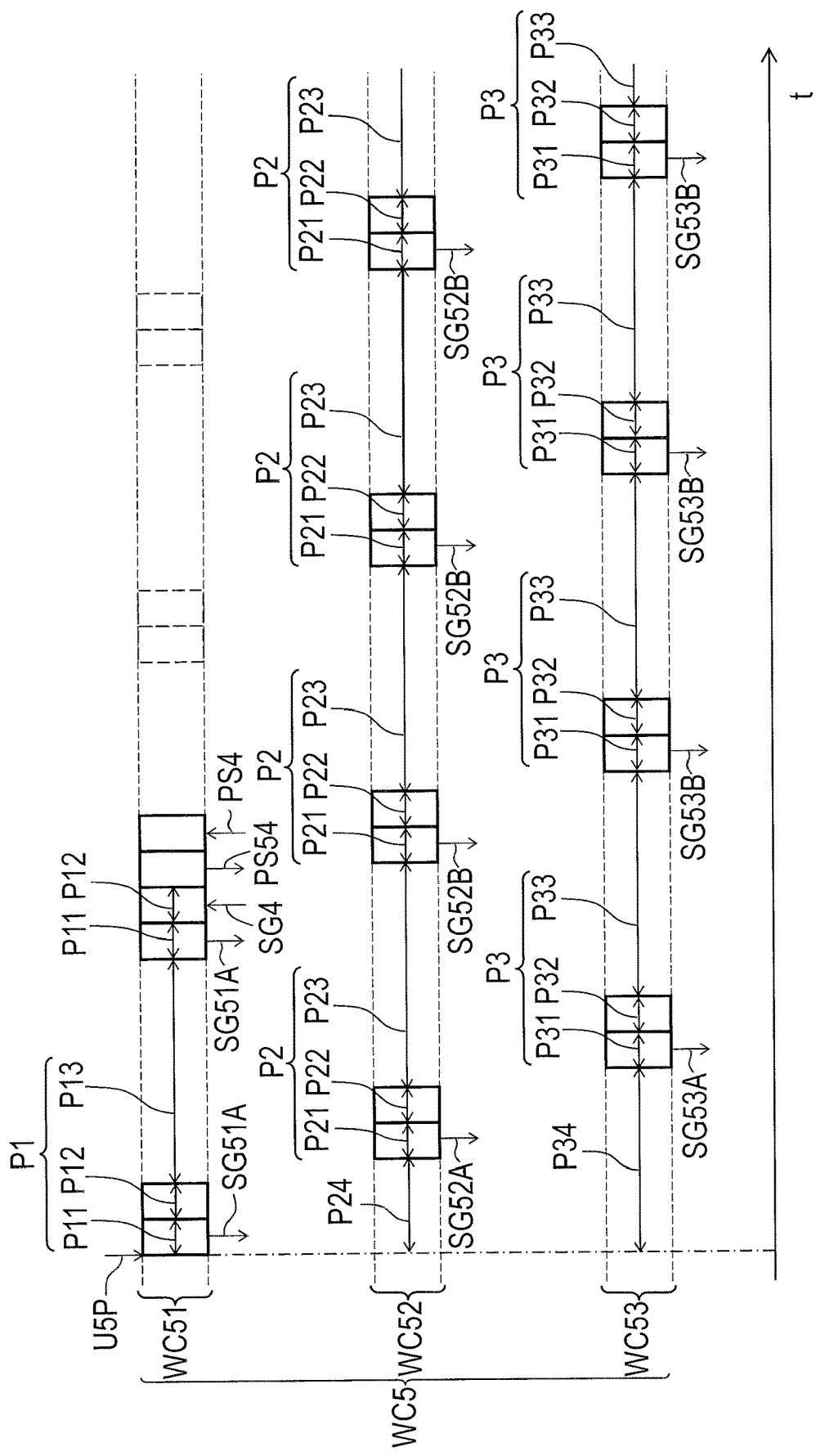
FIG. 19 is a schematic time chart showing the pairing process of the electric devices of the control system illustrated in FIG. 2 in a case where the electric device is paired with a fourth electric device.

As seen in FIG. 19, however, the electronic controller circuitry EC5 is configured to control the wireless communicator circuitry WC5 to stop transmitting the first signal SG51 in response to receipt of the fourth response signal SG4. The electronic controller circuitry EC5 is configured to control the wireless communicator circuitry WC5 to stop transmitting the first signal SG51 in response to receipt of the fourth response signal SG4 before the wireless communicator circuitry WC5 completes transmitting the first signal SG51 repeatedly at the first number of times or for the first period. The electronic controller circuitry EC5 is configured to control the wireless communicator circuitry WC5 to stop transmitting the first signal SG51 in a case where the electronic controller circuitry EC5 detects the fourth response signal SG4 in the first scanning period P12. However, the electronic controller circuitry EC5 can be configured to control the wireless communicator circuitry WC5 to keep wirelessly transmitting the first signal SG51 repeatedly at the first number of times or for the first period after receipt of the fourth response signal SG4 if needed or desired.

In the present embodiment, the electronic controller circuitry EC5 is configured to be free of being paired, after receipt of the fourth pairing response signal PS4, with the first electric device ED1 based on the first response signal SG1 which is wirelessly transmitted from the first wireless communicator circuitry WC1 of the first electric device ED1 in response to receipt of the first request signal SG51A. The electronic controller circuitry EC5 is configured to be free of being paired, after receipt of the fourth pairing response signal PS4, with the second electric device ED2 based on the second response signal SG2 which is wirelessly transmitted from the second wireless communicator circuitry WC2 of the second electric device ED2 in response to receipt of the second request signal SG52A. The electronic controller circuitry EC5 is configured to be free of being paired, after receipt of the fourth pairing response signal PS4, with the third electric device ED3 based on the third response signal SG3 which is wirelessly transmitted from the third wireless communicator circuitry WC3 of the third electric device ED3 in response to receipt of the third request signal SG53A.

Figure 20:
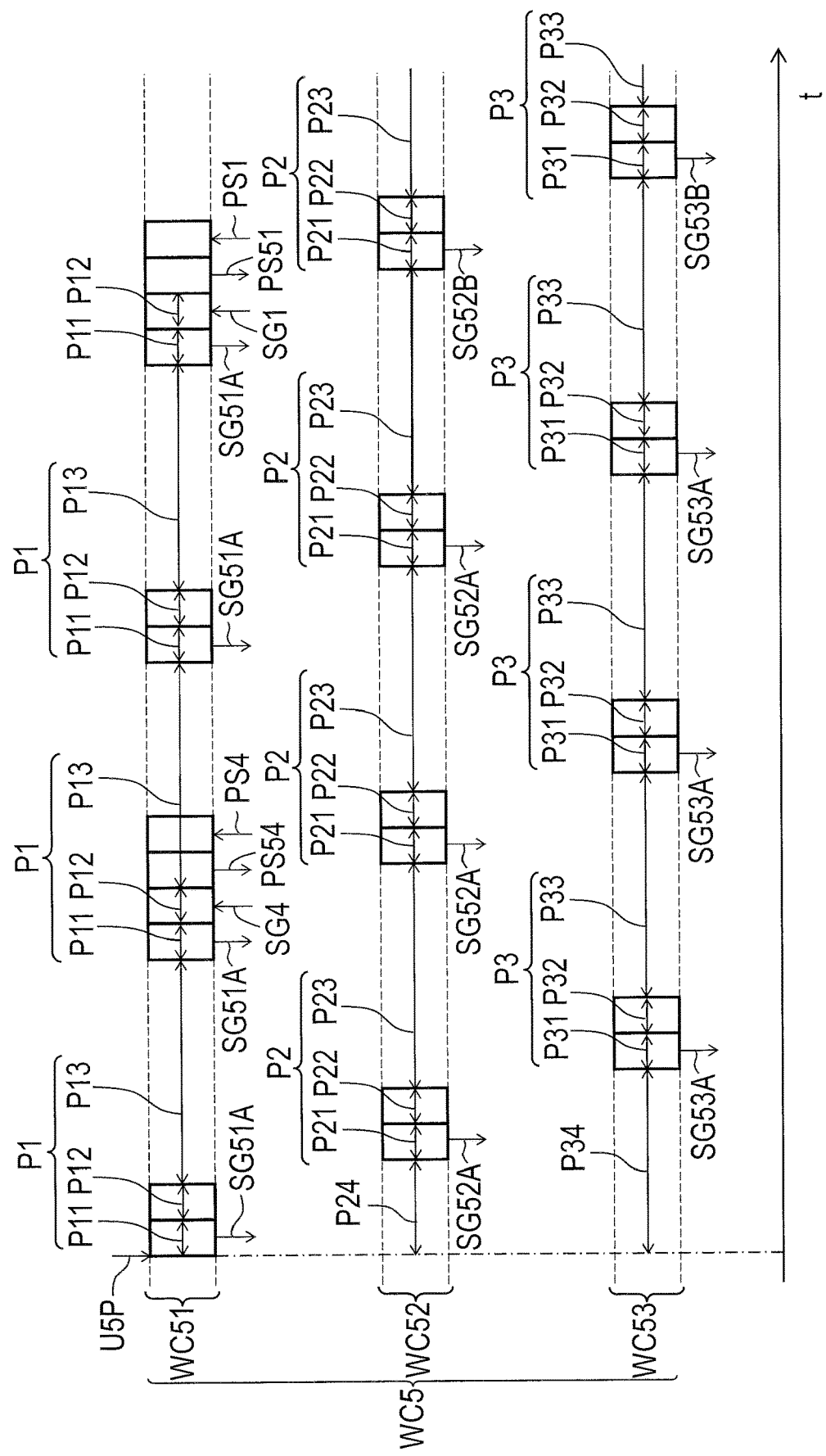
FIGS. 20 to 22 are schematic time charts showing a pairing process of an electric device in accordance with a modification in a case where the electric device is paired with the fourth electric device and another electric device.
Figure 21:
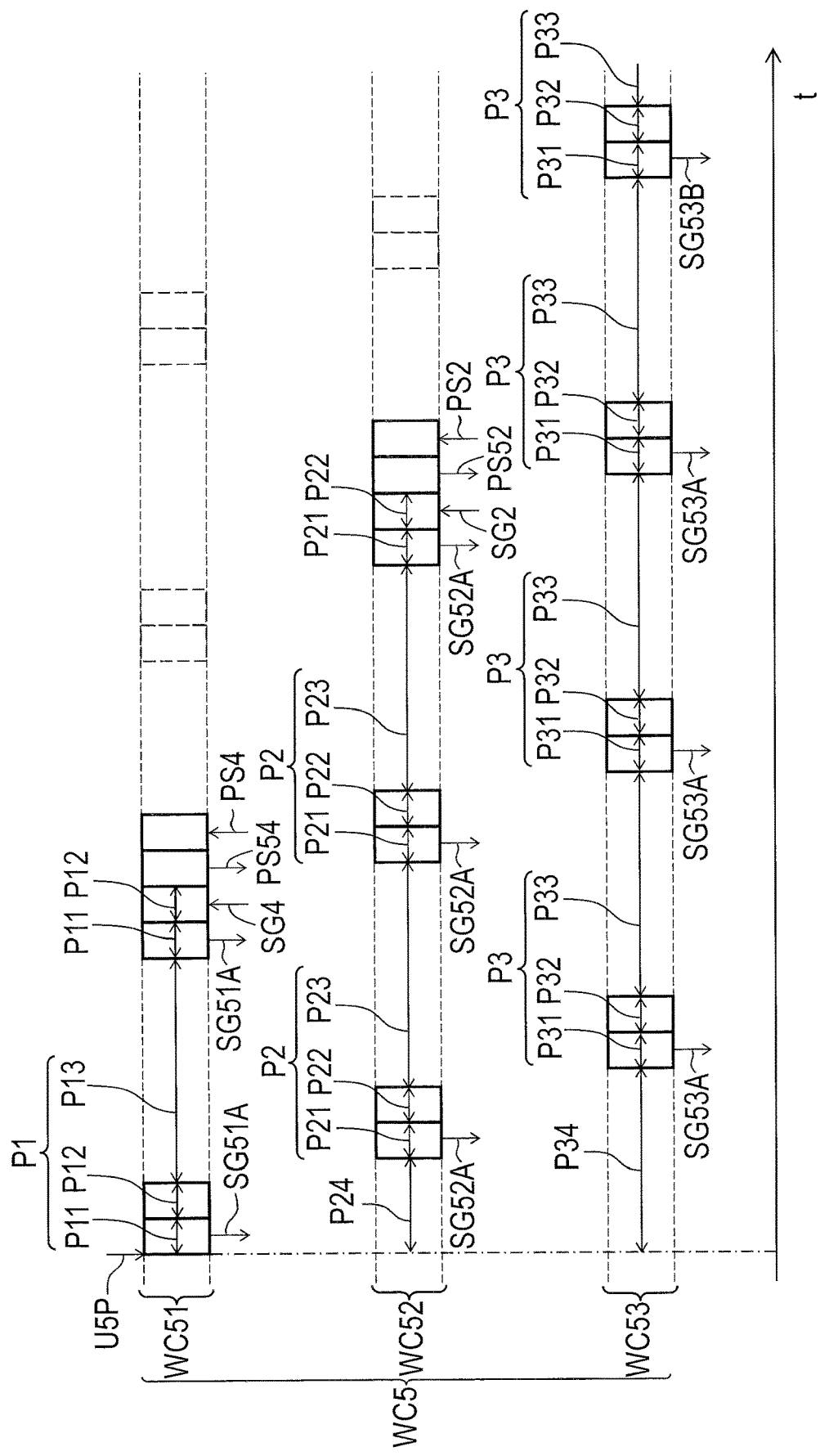
Figure 22:
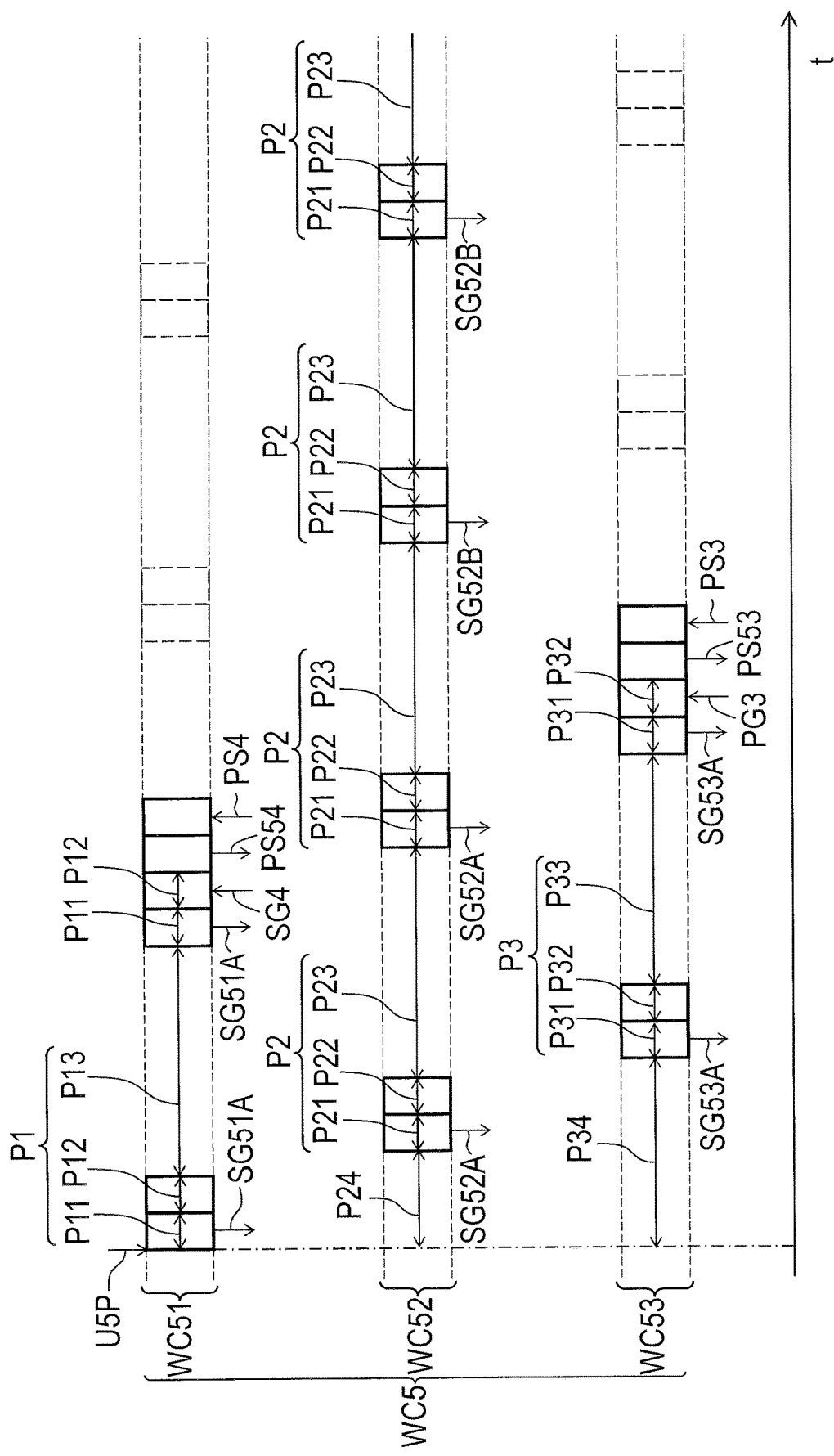

As seen in FIG. 20, however, the electronic controller circuitry EC5 can be configured to be paired, after receipt of the fourth pairing response signal PS4, with the first electric device ED1 based on the first response signal SG1 if needed or desired. As seen in FIG. 21, the electronic controller circuitry EC5 can be configured to being paired, after receipt of the fourth pairing response signal PS4, with the second electric device ED2 based on the second response signal SG2 if needed or desired. As seen in FIG. 22, the electronic controller circuitry EC5 can be configured to be paired, after receipt of the fourth pairing response signal PS4, with the third electric device ED3 based on the third response signal SG3 if needed or desired. The modifications depicted in FIGS. 20 to 22 will be described in detail later.

As seen in FIGS. 6 and 19, the electronic controller circuitry EC5 is configured to control the wireless communicator circuitry WC5 to wirelessly transmit the second signal SG52 using the second communication protocol regardless of the fourth response signal SG4. The electronic controller circuitry EC5 is configured to control the wireless communicator circuitry WC5 to wirelessly transmit the second signal SG52 repeatedly using the second communication protocol at the second number of times or for the second period regardless of whether the electronic controller circuitry EC5 receives the fourth response signal SG4. In the present embodiment, the electronic controller circuitry EC5 is configured to control the wireless communicator circuitry WC5 to wirelessly transmit the second signal SG52 using the second communication protocol after the wireless communicator circuitry WC5 receives the fourth response signal SG4.

The electronic controller circuitry EC5 is configured to control the wireless communicator circuitry WC5 to keep wirelessly transmitting the second signal SG52 using the second communication protocol after the wireless communicator circuitry WC5 stops transmitting the first signal SG51. The electronic controller circuitry EC5 is configured to control the wireless communicator circuitry WC5 to keep wirelessly transmitting the second signal SG52 using the second communication protocol after the electronic controller circuitry EC5 detects the fourth response signal SG4 in the first scanning period P12 in a case where the wireless communicator circuitry WC5 starts to wirelessly transmit the second signal SG52 before or when the wireless communicator circuitry WC5 receives the fourth response signal SG4. The electronic controller circuitry EC5 is configured to control the wireless communicator circuitry WC5 to wirelessly transmit the second signal SG52 using the second communication protocol after the electronic controller circuitry EC5 detects the fourth response signal SG4 in the first scanning period P12 in a case where the wireless communicator circuitry WC5 receives the fourth response signal SG4 before or when the wireless communicator circuitry WC5 starts to wirelessly transmit the second signal SG52.

The electronic controller circuitry EC5 is configured to control the wireless communicator circuitry WC5 to wirelessly transmit the second signal SG52 using the second communication protocol in a case where the condition is satisfied. In the present embodiment, the condition is free of whether the wireless communicator circuitry WC5 receives the fourth response signal SG4. The electronic controller circuitry EC5 is configured to control the wireless communicator circuitry WC5 to wirelessly transmit the second signal SG52 using the second communication protocol in a case where a second waiting period P24 elapses from the pairing user input USP. The condition is satisfied in the case where the second waiting period P24 elapses from the pairing user input U5P. However, the condition is not limited to the above condition. The condition can include whether the wireless communicator circuitry WC5 receives the fourth response signal SG4.

As seen in FIGS. 6 and 19, the electronic controller circuitry EC5 is configured to control the wireless communicator circuitry WC5 to wirelessly transmit the third signal SG53 using the third communication protocol regardless of the fourth response signal SG4. The electronic controller circuitry EC5 is configured to control the wireless communicator circuitry WC5 to wirelessly transmit the third signal SG53 repeatedly using the third communication protocol at the third number of times or for the third period regardless of whether the electronic controller circuitry EC5 receives the fourth response signal SG4. In the present embodiment, the electronic controller circuitry EC5 is configured to control the wireless communicator circuitry WC5 to wirelessly transmit the third signal SG53 using the third communication protocol after the wireless communicator circuitry WC5 receives the fourth response signal SG4.

The electronic controller circuitry EC5 is configured to control the wireless communicator circuitry WC5 to keep wirelessly transmitting the third signal SG53 using the third communication protocol after the wireless communicator circuitry WC5 stops transmitting the first signal SG51. The electronic controller circuitry EC5 is configured to control the wireless communicator circuitry WC5 to keep wirelessly transmitting the third signal SG53 using the third communication protocol after the electronic controller circuitry EC5 detects the fourth response signal SG4 in the first scanning period P12 in a case where the wireless communicator circuitry WC5 starts to wirelessly transmit the third signal SG53 before or when the wireless communicator circuitry WC5 receives the fourth response signal SG4. The electronic controller circuitry EC5 is configured to control the wireless communicator circuitry WC5 to wirelessly transmit the third signal SG53 using the third communication protocol after the electronic controller circuitry EC5 detects the fourth response signal SG4 in the first scanning period P12 in a case where the wireless communicator circuitry WC5 receives the fourth response signal SG4 before or when the wireless communicator circuitry WC5 starts to wirelessly transmit the third signal SG53.

The electronic controller circuitry EC5 is configured to control the wireless communicator circuitry WC5 to wirelessly transmit the third signal SG53 using the third communication protocol in a case where a condition is satisfied. In the present embodiment, the condition is free of whether the wireless communicator circuitry WC5 receives the fourth response signal SG4. The electronic controller circuitry EC5 is configured to control the wireless communicator circuitry WC5 to wirelessly transmit the third signal SG53 using the third communication protocol in a case where a third waiting period P34 elapses from the pairing user input USP. The condition is satisfied in the case where the third waiting period P34 elapses from the pairing user input USP. The third waiting period P34 is different from the second waiting period P24. The third waiting period P34 is longer than the second waiting period P24. However, the condition is not limited to the above condition. The condition can include whether the wireless communicator circuitry WC5 receives the fourth response signal SG4. The third waiting period P34 can be equal to or shorter than the second waiting period P24 if needed or desired.

In the present embodiment, as seen in FIG. 7, the electronic controller circuitry EC5 is configured to control the wireless communicator circuitry WC5 to stop transmitting the first signal SG51 in response to receipt of the first response signal SG1 before the wireless communicator circuitry WC5 completes transmitting the first signal SG51 repeatedly at the first number of times or for the first period.

Figure 23:
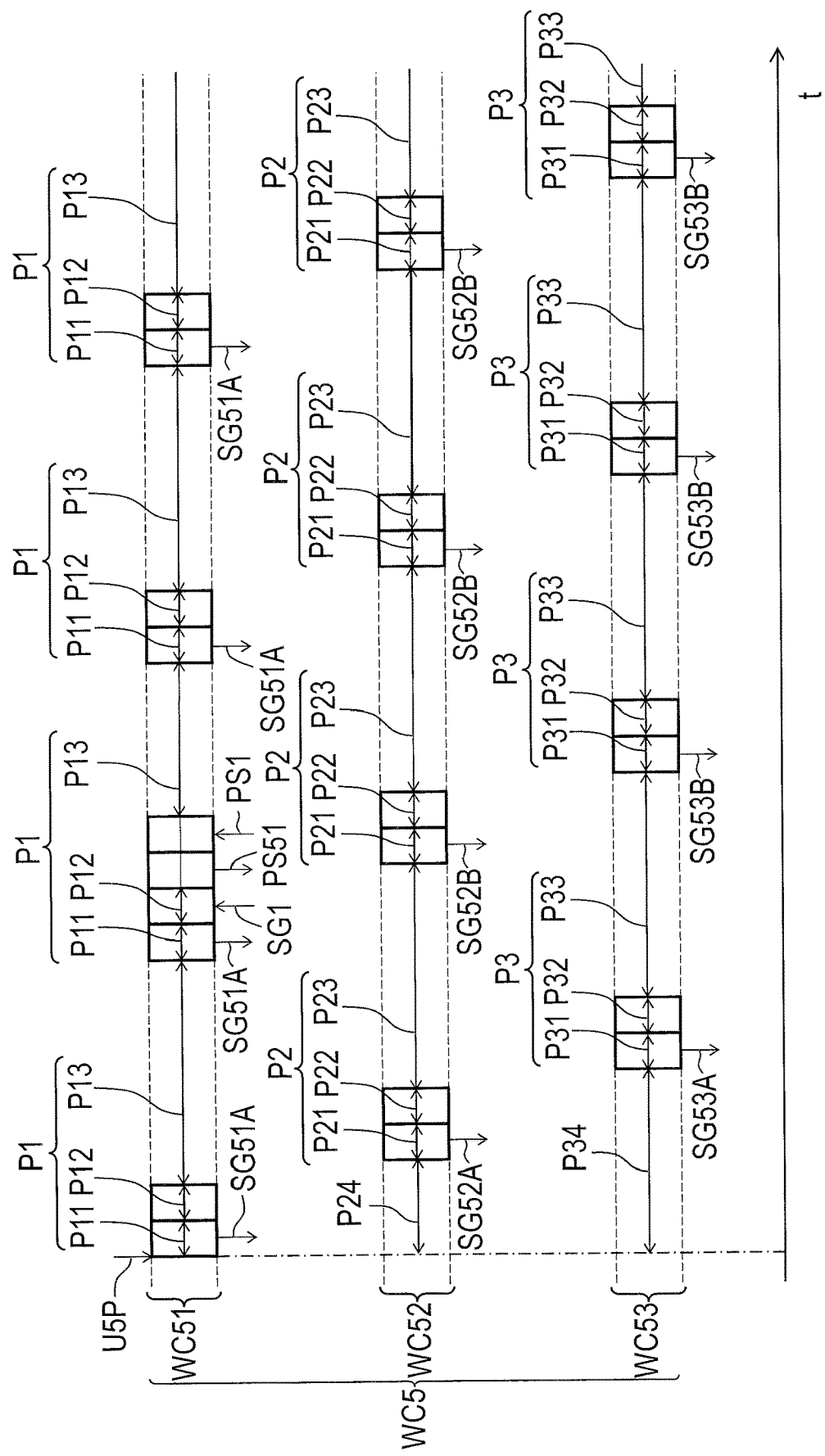
FIG. 23 is a schematic time chart showing a pairing process of an electric devices in accordance with a modification in a case where the electric device is paired with the first electric device and another electric device.

As seen in FIG. 23, however, the electronic controller circuitry EC5 can be configured to control the wireless communicator circuitry WC5 to wirelessly transmit the first signal SG51 using the first communication protocol regardless of the first response signal SG1 if needed or desired. The electronic controller circuitry EC5 can be configured to control the wireless communicator circuitry WC5 to wirelessly transmit the first signal SG51 repeatedly using the first communication protocol at the first number of times or for the first period regardless of whether the electronic controller circuitry EC5 receives the first response signal SG1 if needed or desired.

In the present embodiment, as seen in FIGS. 11 and 15, the electronic controller circuitry EC5 is configured to control the wireless communicator circuitry WC5 to stop transmitting at least one of the second signal SG52 and the third signal SG53 in response to receipt of at least one of the second response signal SG2 and the third response signal SG3. As seen in FIG. 11, the electronic controller circuitry EC5 is configured to control the wireless communicator circuitry WC5 to stop transmitting the second signal SG52 in response to receipt of the second response signal SG2. The electronic controller circuitry EC5 is configured to control the wireless communicator circuitry WC5 to stop transmitting the second signal SG52 in response to receipt of the second response signal SG2 before the wireless communicator circuitry WC5 completes transmitting the second signal SG52 repeatedly at the second number of times or for the second period. As seen in FIG. 15, the electronic controller circuitry EC5 is configured to control the wireless communicator circuitry WC5 to stop transmitting the third signal SG53 in response to receipt of the third response signal SG3. The electronic controller circuitry EC5 is configured to control the wireless communicator circuitry WC5 to stop transmitting the third signal SG53 in response to receipt of the third response signal SG3 before the wireless communicator circuitry WC5 completes transmitting the third signal SG53 repeatedly at the third number of times or for the third period.

Figure 24:
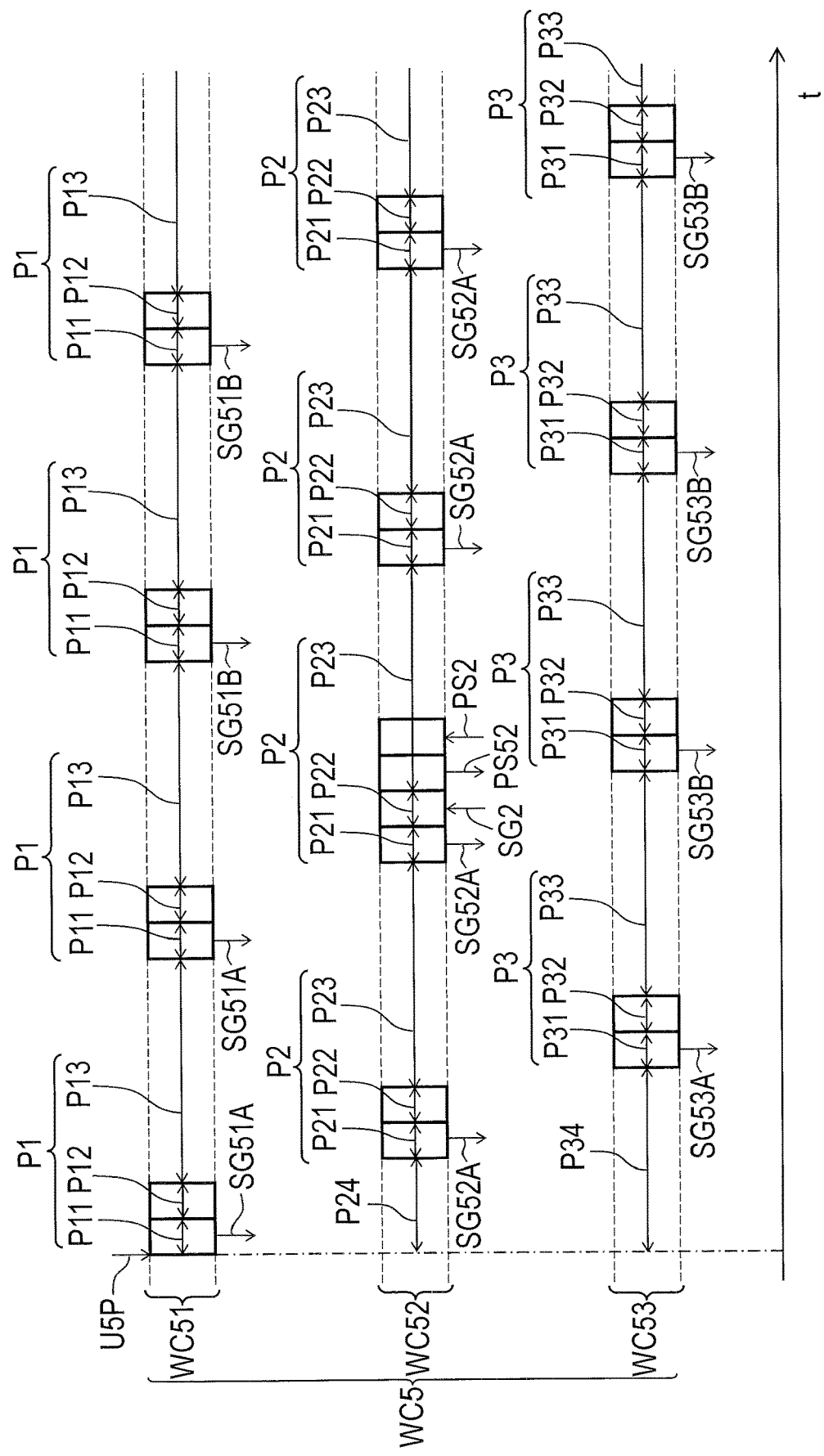
FIG. 24 is a schematic time chart showing the pairing process of the electric devices in accordance with the modification in a case where the electric device is paired with the second electric device and another electric device.

As seen in FIG. 24, however, the electronic controller circuitry EC5 can be configured to control the wireless communicator circuitry WC5 to wirelessly transmit the second signal SG52 using the second communication protocol regardless of the second response signal SG2 if needed or desired. The electronic controller circuitry EC5 can be configured to control the wireless communicator circuitry WC5 to wirelessly transmit the second signal SG52 repeatedly using the second communication protocol at the second number of times or for the second period regardless of whether the electronic controller circuitry EC5 receives the second response signal SG2 if needed or desired.

Figure 25:
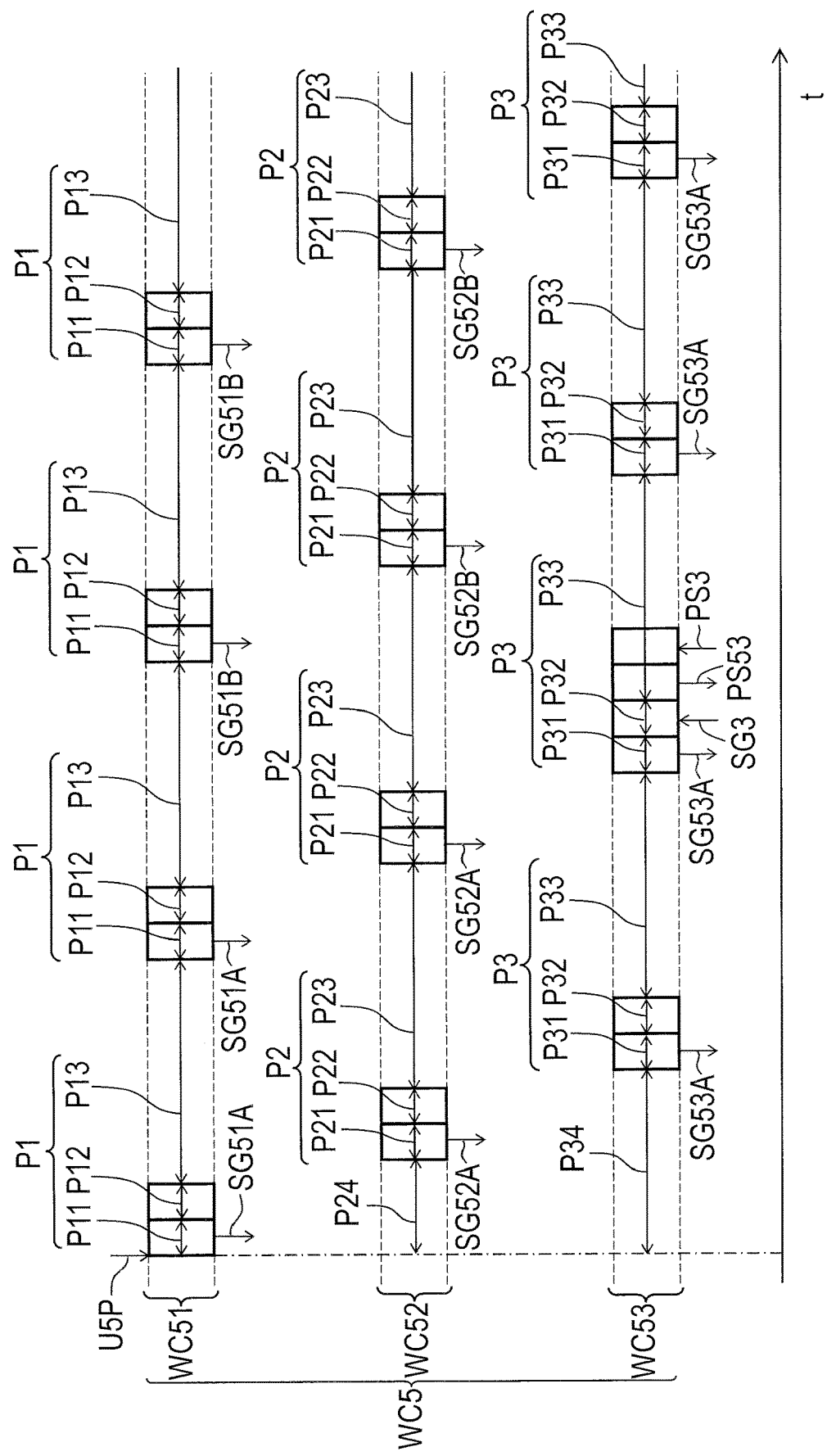
FIG. 25 is a schematic time chart showing the pairing process of the electric devices in accordance with the modification in a case where the electric device is paired with the third electric device and another electric device.

As seen in FIG. 25, the electronic controller circuitry EC5 can be configured to control the wireless communicator circuitry WC5 to wirelessly transmit the third signal SG53 using the third communication protocol regardless of the third response signal SG3 if needed or desired. The electronic controller circuitry EC5 can be configured to control the wireless communicator circuitry WC5 to wirelessly transmit the third signal SG53 repeatedly using the third communication protocol at the third number of times or for the third period regardless of whether the electronic controller circuitry EC5 receives the third response signal SG3 if needed or desired.

In the present embodiment, as seen in FIG. 19, the electronic controller circuitry EC5 is configured to control the wireless communicator circuitry WC5 to stop transmitting the first signal SG51 in response to receipt of the fourth response signal SG4 before the wireless communicator circuitry WC5 completes transmitting the first signal SG51 repeatedly at the first number of times or for the first period.

Figure 26:
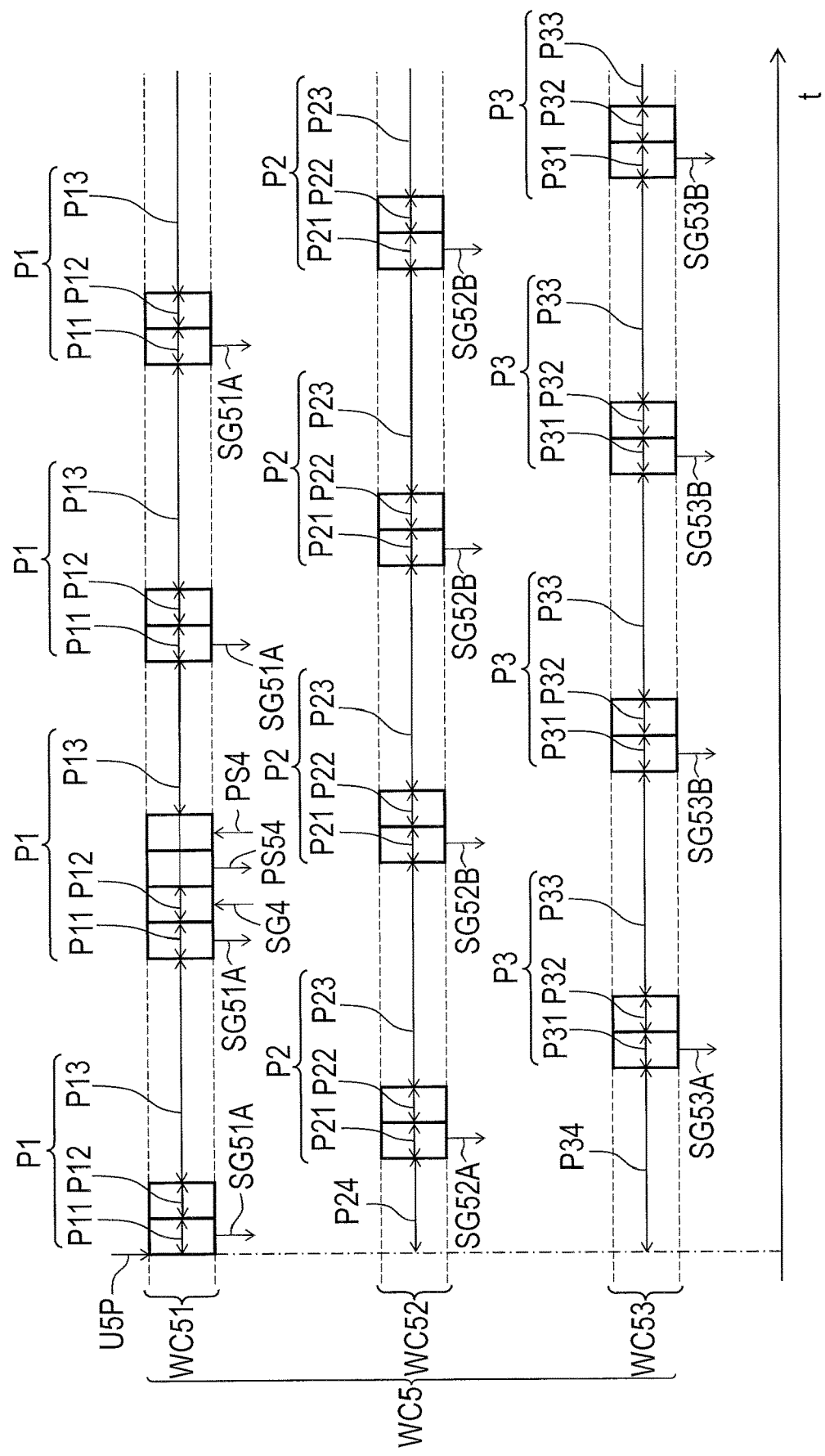
FIG. 26 is a schematic time chart showing the pairing process of the electric devices in accordance with the modification in a case where the electric device is paired with the fourth electric device and another electric device.

As seen in FIG. 26, however, the electronic controller circuitry EC5 can be configured to control the wireless communicator circuitry WC5 to wirelessly transmit the first signal SG51 using the first communication protocol regardless of the fourth response signal SG4 if needed or desired. The electronic controller circuitry EC5 can be configured to control the wireless communicator circuitry WC5 to wirelessly transmit the first signal SG51 repeatedly using the first communication protocol at the first number of times or for the first period regardless of whether the electronic controller circuitry EC5 receives the fourth response signal SG4 if needed or desired.

As seen in FIG. 27, in the first paired state, the electronic controller circuitry EC5 stores the first pairing information ID1 of the first electric device ED1, and the first electronic controller circuitry EC1 stores the pairing information ID51 of the electric device ED5. In the first connection state, the first wireless communicator circuitry WC1 recognizes signals wirelessly transmitted from the wireless communicator circuitry WC5, and the wireless communicator circuitry WC5 recognizes signals wirelessly transmitted from the first wireless communicator circuitry WC1.

The electric device ED5 is configured to be, in response to a disconnection operation, in a first disconnection state where the first wireless communicator circuitry WC1 and the wireless communicator circuitry WC5 are paired and where the first wireless communicator circuitry WC1 and the wireless communicator circuitry WC5 are wirelessly disconnected. In the first disconnection state, the electronic controller circuitry EC5 stores the first pairing information ID1 of the first electric device ED1, and the first electronic controller circuitry EC1 stores the pairing information ID51 of the electric device ED5. In the first disconnection state, however, the first wireless communicator circuitry WC1 does not recognize signals wirelessly transmitted from the wireless communicator circuitry WC5, and the wireless communicator circuitry WC5 does not recognize signals wirelessly transmitted from the first wireless communicator circuitry WC1. The first disconnection state includes the first paired state.

For example, the disconnection operation includes at least one of detaching the electric power source ED55 from the power source holder ED56, turning the electric device ED5 off, receiving a user disconnection input by the user interface ED51, detaching the first electric power source ED15 from the first power source holder ED16, turning the first electric device ED1 off, receiving a user disconnection input by the first user interface ED18, and separating one of the electric device ED5 and the first electric device ED1 from the other of the electric device ED5 and the first electric device ED1 beyond a maximum communication distance.

In the present embodiment, the first number of times, the second number of times, and the third number of times are equal and set as a reference number of times NT0. The first period, the second period, and the third period are equal and set as a reference period TM0. However, at least one of the first number of times, the second number of times, and the third number of times can be different from another of the first number of times, the second number of times, and the third number of times if needed or desired. At least one of the first period, the second period, and the third period can be different from another of the first period, the second period, and the third period if needed or desired.

Figure 28:
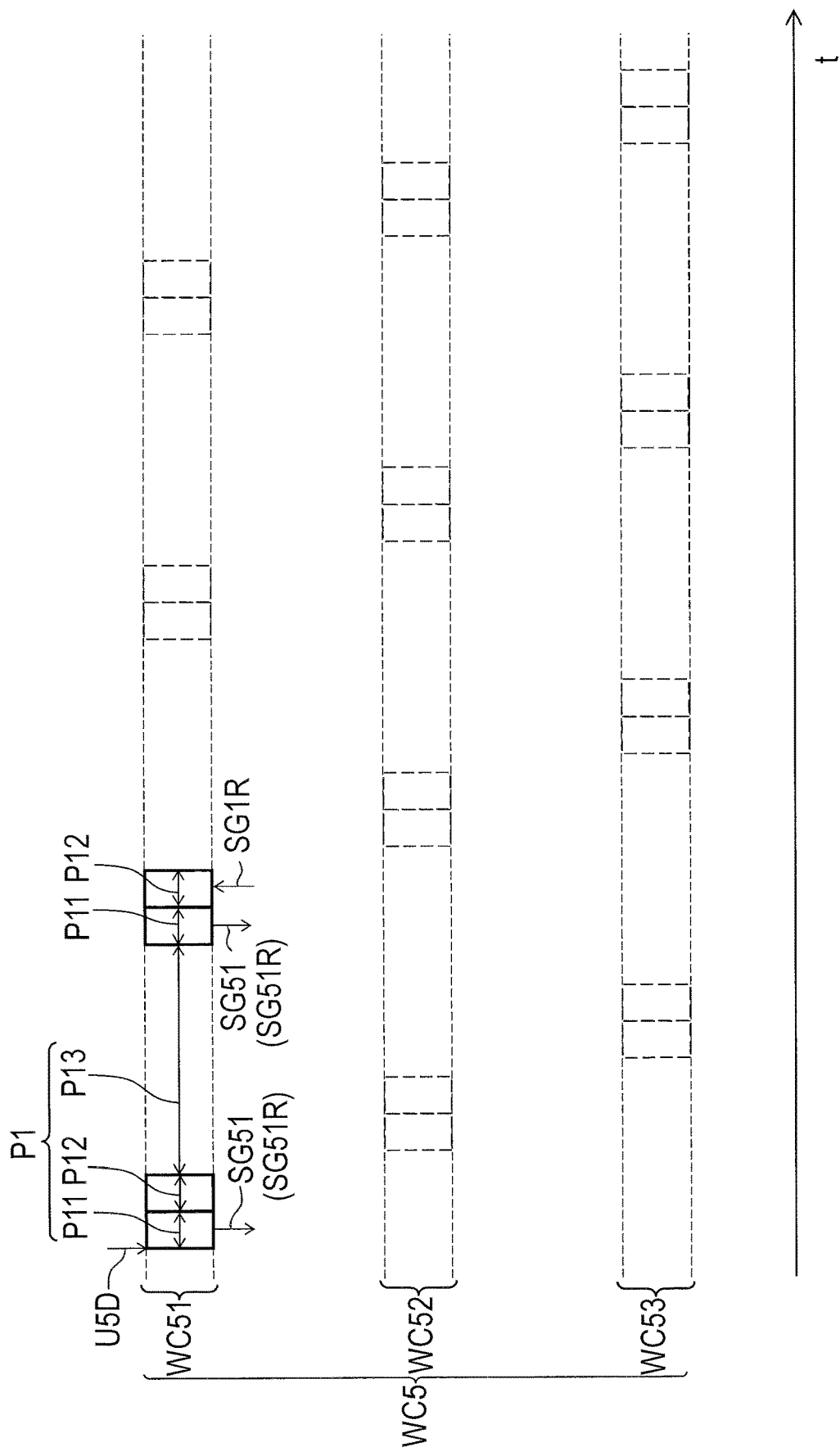
FIG. 28 is a schematic time chart showing a repairing process of the electric devices of the control system illustrated in FIG. 2 in the case where the electric device is paired with the first electric device.

As seen in FIGS. 27 and 28, the user interface ED51 is configured to receive a repairing user input USD. The electronic controller circuitry EC5 is configured to execute repairing between the first electric device ED1 and the electric device ED5 which are paired in response to the repairing user input USD in the first disconnection state.

The user input U5 includes the repairing user input USD. In the present embodiment, the repairing user input USD is different from each of the user inputs USA and USB. The repairing user input USD is identical to the pairing user input U5P. However, the repairing user input USD can be identical to at least one of the user inputs USA and USB if needed or desired. The repairing user input USD can be different from the pairing user input U5P if needed or desired.

For example, the repairing user input USD includes concurrent presses of the electric switches SW5A and SW5B. The concurrent presses of the electric switches SW5A and SW5B includes a case where one of the electric switches SW5A and SW5B is pressed while the other of the electric switches SW5A and SW5B is pressed. However, the repairing user input USD can include another user input other than the concurrent presses of the electric switches SW5A and SW5B if needed or desired.

The electronic controller circuitry EC5 is configured to control the wireless communicator circuitry WC5 to wirelessly transmit the first signal SG51 without transmitting the second signal SG52 in response to the repairing user input USD in a case where the electric device ED5 is paired with the first electric device ED1. The electronic controller circuitry EC5 is configured to control the wireless communicator circuitry WC5 to wirelessly transmit the first signal SG51 without transmitting the third signal SG53 in response to the repairing user input USD in the case where the electric device ED5 is paired with the first electric device ED1.

The first signal SG51 includes a first repairing signal SG51R. The first repairing signal SG51R can have a specified recipient such as the first electric device ED1. For example, the first repairing signal SG51R includes repairing information indicative of repairing between the first electric device ED1 and the electric device ED5. The first repairing signal SG51R can include at least one of the identification information and the cryptographic key information of the pairing information ID51. In the present embodiment, the first repairing signal SG51R is identical to the first request signal SG51A. However, the first repairing signal SG51R can be different from the first request signal SG51A if needed or desired.

The electronic controller circuitry EC5 is configured to control the wireless communicator circuitry WC5 to wirelessly transmit the first repairing signal SG51R without transmitting the second signal SG52 and the third signal SG53 in response to the repairing user input USD in the first disconnection state where the first wireless communicator circuitry WC1 and the wireless communicator circuitry WC5 are paired and where the first wireless communicator circuitry WC1 and the wireless communicator circuitry WC5 are wirelessly disconnected. However, the electronic controller circuitry EC5 can be configured to control the wireless communicator circuitry WC5 to wirelessly transmit at least one of the second signal SG52 and the third signal SG53 along with the first repairing signal SG51R in response to the repairing user input USD in the first disconnection state if needed or desired.

The first electronic controller circuitry EC1 is configured to detect the first signal SG51 via the first wireless communicator circuitry WC1 in the first disconnection state. The first electronic controller circuitry EC1 is configured to detect the first repairing signal SG51R via the first wireless communicator circuitry WC1 in the first disconnection state. The first electronic controller circuitry EC1 is configured to recognize that the electric device ED5 is ready to reconnect with the first electric device ED1 based on in the first repairing signal SG51R.

The first electronic controller circuitry EC1 is configured to control the first wireless communicator circuitry WC1 to wirelessly transmit a first repairing response signal SG1R in response to the first repairing signal SG51R. The first repairing response signal SG1R includes repairing information indicative of repairing between the first electric device ED1 and the electric device ED5. The first repairing response signal SG1R can include at least one of the first identification information and the first cryptographic key information of the first pairing information ID1. In the present embodiment, the first repairing response signal SG1R is identical to the first response signal SG1. However, the first repairing response signal SG1R can be different from the first response signal SG1 if needed or desired.

The electronic controller circuitry EC5 is configured to detect the first repairing response signal SG1R via the first wireless communicator circuitry WC1 in the first disconnection state. The electronic controller circuitry EC5 is configured to recognize that the first electric device ED1 is ready to reconnect with the electric device ED5 based on in the first repairing response signal SG1R. Thus, the first electric device ED1 and the electric device ED5 are reconnected and enters the first connection state.

The first repairing signal SG51R can be used to execute pairing between the electric device ED5 and another first electric device which uses the first communication protocol in a case where the first electric device ED1 is replaced with the other first electric device. As with the pairing between the electric device ED5 and the first electric device ED1, for example, the first response signal SG1, the first pairing signal PS51, and the first pairing response signal PS1 are used to execute pairing between the electric device ED5 and the other first electric device.

As seen in FIG. 29, in the second paired, the electronic controller circuitry EC5 stores the second pairing information ID2 of the second electric device ED2, and the second electronic controller circuitry EC2 stores the pairing information ID52 of the electric device ED5. In the second connection state, the second wireless communicator circuitry WC2 recognizes signals wirelessly transmitted from the wireless communicator circuitry WC5, and the wireless communicator circuitry WC5 recognizes signals wirelessly transmitted from the second wireless communicator circuitry WC2.

The electric device ED5 is configured to be, in response to a disconnection operation, in a second disconnection state where the second wireless communicator circuitry WC2 and the wireless communicator circuitry WC5 are paired and where the second wireless communicator circuitry WC2 and the wireless communicator circuitry WC5 are wirelessly disconnected. In the second disconnection state, the electronic controller circuitry EC5 stores the second pairing information ID2 of the second electric device ED2, and the second electronic controller circuitry EC2 stores the pairing information ID52 of the electric device ED5. In the second disconnection state, however, the second wireless communicator circuitry WC2 does not recognize signals wirelessly transmitted from the wireless communicator circuitry WC5, and the wireless communicator circuitry WC5 does not recognize signals wirelessly transmitted from the second wireless communicator circuitry WC2. The second disconnection state includes the second paired state.

For example, the disconnection operation includes at least one of detaching the electric power source ED55 from the power source holder ED56, turning the electric device ED5 off, receiving a user disconnection input by the user interface ED51, detaching the second electric power source ED25 from the second power source holder ED26, turning the second electric device ED2 off, receiving a user disconnection input by the second user interface ED28, and separating one of the electric device ED5 and the second electric device ED2 from the other of the electric device ED5 and the second electric device ED2 beyond a maximum communication distance.

Figure 30:
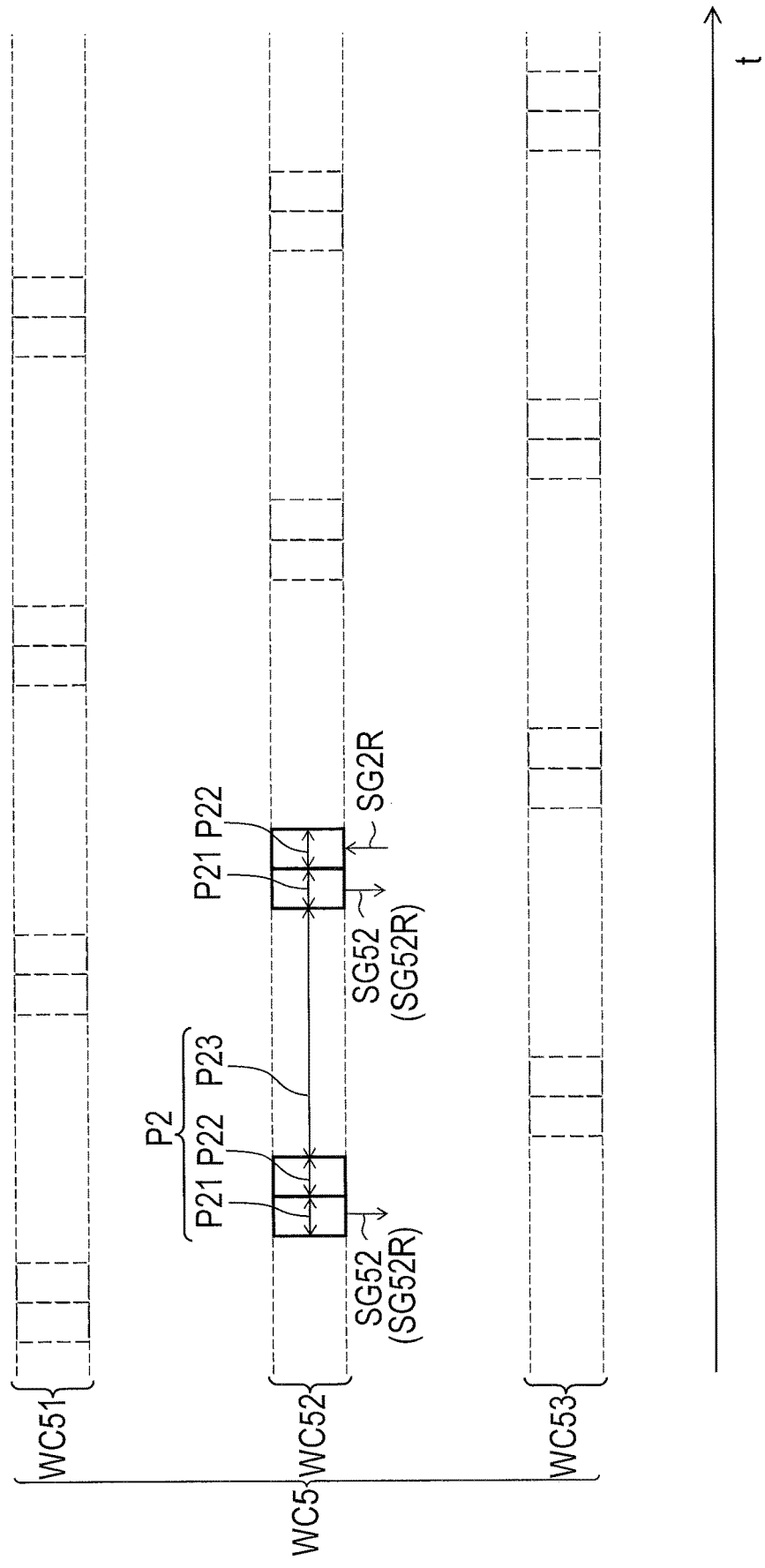
FIG. 30 is a schematic time chart showing the repairing process of the electric devices of the control system illustrated in FIG. 2 in the case where the electric device is paired with the second electric device.

As seen in FIGS. 29 and 30, the electronic controller circuitry EC5 is configured to execute repairing between the second electric device ED2 and the electric device ED5 which are paired in response to the repairing user input USD in the second disconnection state.

The electronic controller circuitry EC5 is configured to control the wireless communicator circuitry WC5 to wirelessly transmit the second signal SG52 without transmitting the first signal SG51 in response to the repairing user input USD in a case where the electric device ED5 is paired with the second electric device ED2. The electronic controller circuitry EC5 is configured to control the wireless communicator circuitry WC5 to wirelessly transmit the second signal SG52 without transmitting the third signal SG53 in response to the repairing user input USD in the case where the electric device ED5 is paired with the second electric device ED2.

The second signal SG52 includes a second repairing signal SG52R. The second repairing signal SG52R can have a specified recipient such as the second electric device ED2. For example, the second repairing signal SG52R includes repairing information indicative of repairing between the second electric device ED2 and the electric device ED5. The second repairing signal SG52R can include at least one of the identification information and the cryptographic key information of the pairing information ID52. In the present embodiment, the second repairing signal SG52R is identical to the second request signal SG52A. However, the second repairing signal SG52R can be different from the second request signal SG52A if needed or desired.

The electronic controller circuitry EC5 is configured to control the wireless communicator circuitry WC5 to wirelessly transmit the second repairing signal SG52R without transmitting the first signal SG51 and the third signal SG53 in response to the repairing user input USD in the second disconnection state where the second wireless communicator circuitry WC2 and the wireless communicator circuitry WC5 are paired and where the second wireless communicator circuitry WC2 and the wireless communicator circuitry WC5 are wirelessly disconnected. However, the electronic controller circuitry EC5 can be configured to control the wireless communicator circuitry WC5 to wirelessly transmit at least one of the first signal SG51 and the third signal SG53 along with the second repairing signal SG52R in response to the repairing user input USD in the second disconnection state if needed or desired.

The second electronic controller circuitry EC2 is configured to detect the second signal SG52 via the second wireless communicator circuitry WC2 in the second disconnection state. The second electronic controller circuitry EC2 is configured to detect the second repairing signal SG52R via the second wireless communicator circuitry WC2 in the second disconnection state. The second electronic controller circuitry EC2 is configured to recognize that the electric device ED5 is ready to reconnect with the second electric device ED2 based on in the second repairing signal SG52R.

The second electronic controller circuitry EC2 is configured to control the second wireless communicator circuitry WC2 to wirelessly transmit a second repairing response signal SG2R in response to the second repairing signal SG52R. The second repairing response signal SG2R includes repairing information indicative of repairing between the second electric device ED2 and the electric device ED5. The second repairing response signal SG2R can include at least one of the second identification information and the second cryptographic key information of the second pairing information ID2. In the present embodiment, the second repairing response signal SG2R is identical to the second response signal SG2. However, the second repairing response signal SG2R can be different from the second response signal SG2 if needed or desired.

The electronic controller circuitry EC5 is configured to detect the second repairing response signal SG2R via the second wireless communicator circuitry WC2 in the second disconnection state. The electronic controller circuitry EC5 is configured to recognize that the second electric device ED2 is ready to reconnect with the electric device ED5 based on in the second repairing response signal SG2R. Thus, the second electric device ED2 and the electric device ED5 are reconnected and enters the second connection state.

The second repairing signal SG52R can be used to execute pairing between the electric device ED5 and another second electric device which uses the second communication protocol in a case where the second electric device ED2 is replaced with the other second electric device. As with the pairing between the electric device ED5 and the second electric device ED2, for example, the second response signal SG2, the second pairing signal PS52, and the second pairing response signal PS2 are used to execute pairing between the electric device ED5 and the other second electric device.

As seen in FIG. 31, in the third paired state, the electronic controller circuitry EC5 stores the third pairing information ID3 of the third electric device ED3, and the third electronic controller circuitry EC3 stores the pairing information ID52 of the electric device ED5. In the third connection state where the third wireless communicator circuitry WC3 and the wireless communicator circuitry WC5 are paired and where the third wireless communicator circuitry WC3 and the wireless communicator circuitry WC5 are wirelessly connected, the third wireless communicator circuitry WC3 recognizes signals wirelessly transmitted from the wireless communicator circuitry WC5, and the wireless communicator circuitry WC5 recognizes signals wirelessly transmitted from the third wireless communicator circuitry WC3.

The electric device ED5 is configured to be, in response to a disconnection operation, in a third disconnection state where the third wireless communicator circuitry WC3 and the wireless communicator circuitry WC5 are paired and where the third wireless communicator circuitry WC3 and the wireless communicator circuitry WC5 are wirelessly disconnected. In the third disconnection state, the electronic controller circuitry EC5 stores the third pairing information ID3 of the third electric device ED3, and the third electronic controller circuitry EC3 stores the pairing information ID52 of the electric device ED5. In the third disconnection state, however, the third wireless communicator circuitry WC3 does not recognize signals wirelessly transmitted from the wireless communicator circuitry WC5, and the wireless communicator circuitry WC5 does not recognize signals wirelessly transmitted from the third wireless communicator circuitry WC3. The third disconnection state includes the third paired state.

For example, the disconnection operation includes at least one of detaching the electric power source ED55 from the power source holder ED56, turning the electric device ED5 off, receiving a user disconnection input by the third user interface ED38, detaching the third electric power source ED35 from the third power source holder ED36, turning the third electric device ED3 off, receiving a user disconnection input by the third user interface ED38, and separating one of the electric device ED5 and the third electric device ED3 from the other of the electric device ED5 and the third electric device ED3 beyond a maximum communication distance.

Figure 32:
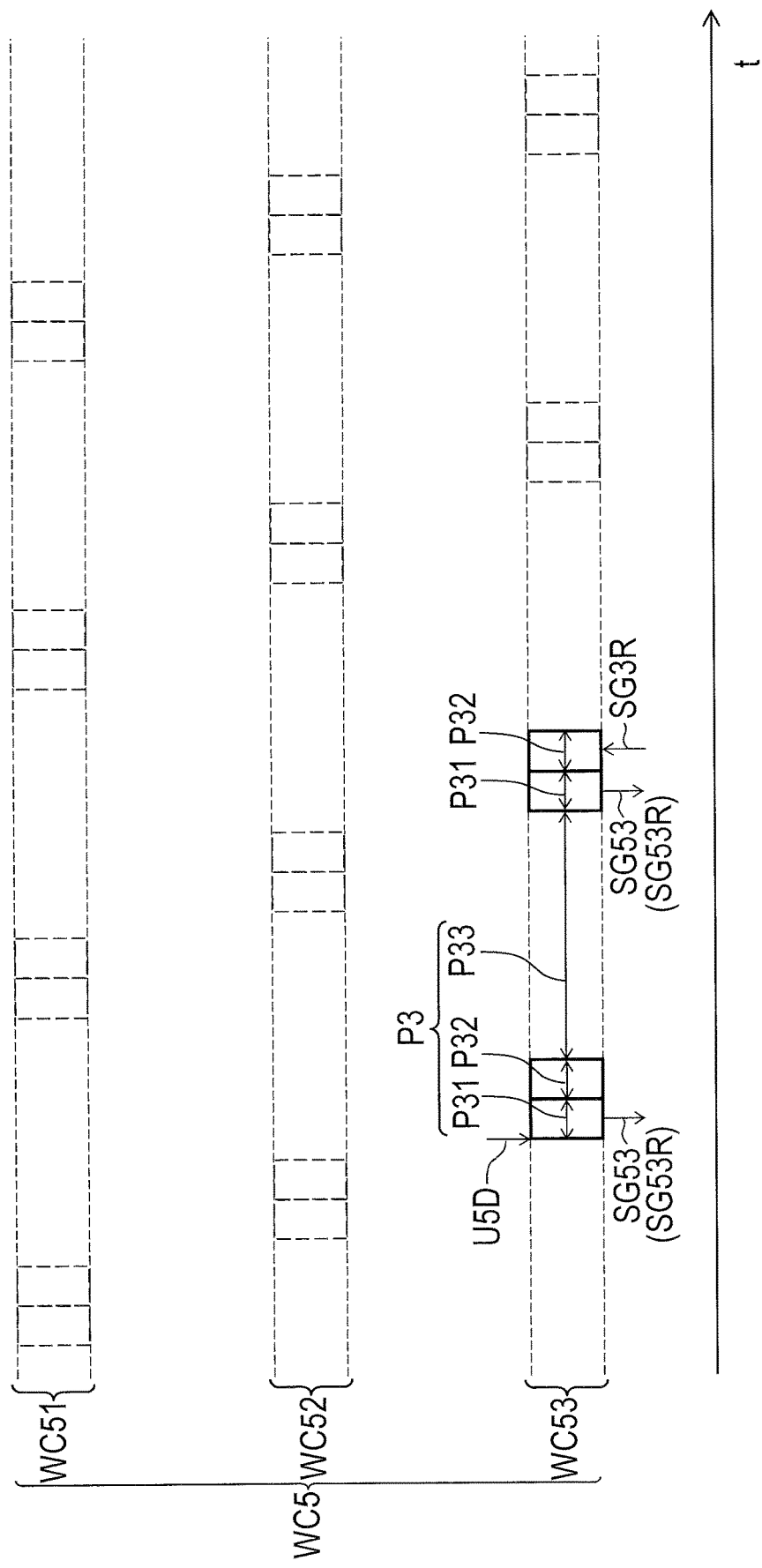
FIG. 32 is a schematic time chart showing the repairing process of the electric devices of the control system illustrated in FIG. 2 in the case where the electric device is paired with the third electric device.

As seen in FIGS. 31 and 32, the electronic controller circuitry EC5 is configured to execute repairing between the third electric device ED3 and the electric device ED5 which are paired in response to the repairing user input USD in the third disconnection state.

The electronic controller circuitry EC5 is configured to control the wireless communicator circuitry WC5 to wirelessly transmit the third signal SG53 without transmitting the first signal SG51 in response to the repairing user input USD in a case where the electric device ED5 is paired with the third electric device ED3. The electronic controller circuitry EC5 is configured to control the wireless communicator circuitry WC5 to wirelessly transmit the third signal SG53 without transmitting the second signal SG52 in response to the repairing user input USD in the case where the electric device ED5 is paired with the third electric device ED3.

The third signal SG53 includes a third repairing signal SG53R. The third repairing signal SG53R can have a specified recipient such as the third electric device ED3. For example, the third repairing signal SG53R includes repairing information indicative of repairing between the third electric device ED3 and the electric device ED5. The third repairing signal SG53R can include at least one of the identification information and the cryptographic key information of the pairing information ID53. In the present embodiment, the third repairing signal SG53R is identical to the third request signal SG53A. However, the third repairing signal SG53R can be different from the third request signal SG53A if needed or desired.

The electronic controller circuitry EC5 is configured to control the wireless communicator circuitry WC5 to wirelessly transmit the third repairing signal SG53R without transmitting the first signal SG51 and the second signal SG52 in response to the repairing user input USD in the third disconnection state where the third wireless communicator circuitry WC3 and the wireless communicator circuitry WC5 are paired and where the third wireless communicator circuitry WC3 and the wireless communicator circuitry WC5 are wirelessly disconnected. However, the electronic controller circuitry EC5 can be configured to control the wireless communicator circuitry WC5 to wirelessly transmit at least one of the first signal SG51 and the second signal SG52 along with the third repairing signal SG53R in response to the repairing user input USD in the third disconnection state if needed or desired.

The third electronic controller circuitry EC3 is configured to detect the third signal SG53 via the third wireless communicator circuitry WC3 in the third disconnection state. The third electronic controller circuitry EC3 is configured to detect the third repairing signal SG53R via the third wireless communicator circuitry WC3 in the third disconnection state. The third electronic controller circuitry EC3 is configured to recognize that the electric device ED5 is ready to reconnect with the third electric device ED3 based on in the third repairing signal SG53R.

The third electronic controller circuitry EC3 is configured to control the third wireless communicator circuitry WC3 to wirelessly transmit a third repairing response signal SG3R in response to the third repairing signal SG53R. The third repairing response signal SG3R includes repairing information indicative of repairing between the third electric device ED3 and the electric device ED5. The third repairing response signal SG3R can include at least one of the third identification information and the third cryptographic key information of the third pairing information ID3. In the present embodiment, the third repairing response signal SG3R is identical to the third response signal SG3. However, the third repairing response signal SG3R can be different from the third response signal SG3 if needed or desired.

The electronic controller circuitry EC5 is configured to detect the third repairing response signal SG3R via the third wireless communicator circuitry WC3 in the third disconnection state. The electronic controller circuitry EC5 is configured to recognize that the third electric device ED3 is ready to reconnect with the electric device ED5 based on in the third repairing response signal SG3R. Thus, the third electric device ED3 and the electric device ED5 are reconnected and enters the third connection state.

The third repairing signal SG53R can be used to execute pairing between the electric device ED5 and another third electric device which uses the third communication protocol in a case where the third electric device ED3 is replaced with the other third electric device. As with the pairing between the electric device ED5 and the third electric device ED3, for example, the third response signal SG3, the third pairing signal PS53, and the third pairing response signal PS3 are used to execute pairing between the electric device ED5 and the other third electric device.

As seen in FIG. 33, in the fourth paired state, the electronic controller circuitry EC5 stores the fourth pairing information ID4 of the fourth electric device ED4, and the fourth electronic controller circuitry EC4 stores the pairing information ID51 of the electric device ED5. In the fourth connection state where the fourth wireless communicator circuitry WC4 and the wireless communicator circuitry WC5 are paired and where the fourth wireless communicator circuitry WC4 and the wireless communicator circuitry WC5 are wirelessly connected, the fourth wireless communicator circuitry WC4 recognizes signals wirelessly transmitted from the wireless communicator circuitry WC5, and the wireless communicator circuitry WC5 recognizes signals wirelessly transmitted from the fourth wireless communicator circuitry WC4.

The electric device ED5 is configured to be, in response to a disconnection operation, in a fourth disconnection state where the fourth wireless communicator circuitry WC4 and the wireless communicator circuitry WC5 are paired and where the fourth wireless communicator circuitry WC4 and the wireless communicator circuitry WC5 are wirelessly disconnected. In the fourth disconnection state, the electronic controller circuitry EC5 stores the fourth pairing information ID4 of the fourth electric device ED4, and the fourth electronic controller circuitry EC4 stores the pairing information ID51 of the electric device ED5. In the fourth disconnection state, however, the fourth wireless communicator circuitry WC4 does not recognize signals wirelessly transmitted from the wireless communicator circuitry WC5, and the wireless communicator circuitry WC5 does not recognize signals wirelessly transmitted from the fourth wireless communicator circuitry WC4. The fourth disconnection state includes the fourth paired state.

For example, the disconnection operation includes at least one of detaching the electric power source ED55 from the power source holder ED56, turning the electric device ED5 off, receiving a user disconnection input by the fourth user interface ED48, detaching the fourth electric power source ED45 from the fourth power source holder ED46, turning the fourth electric device ED4 off, receiving a user disconnection input by the fourth user interface ED48, and separating one of the electric device ED5 and the fourth electric device ED4 from the other of the electric device ED5 and the fourth electric device ED4 beyond a maximum communication distance.

Figure 34:
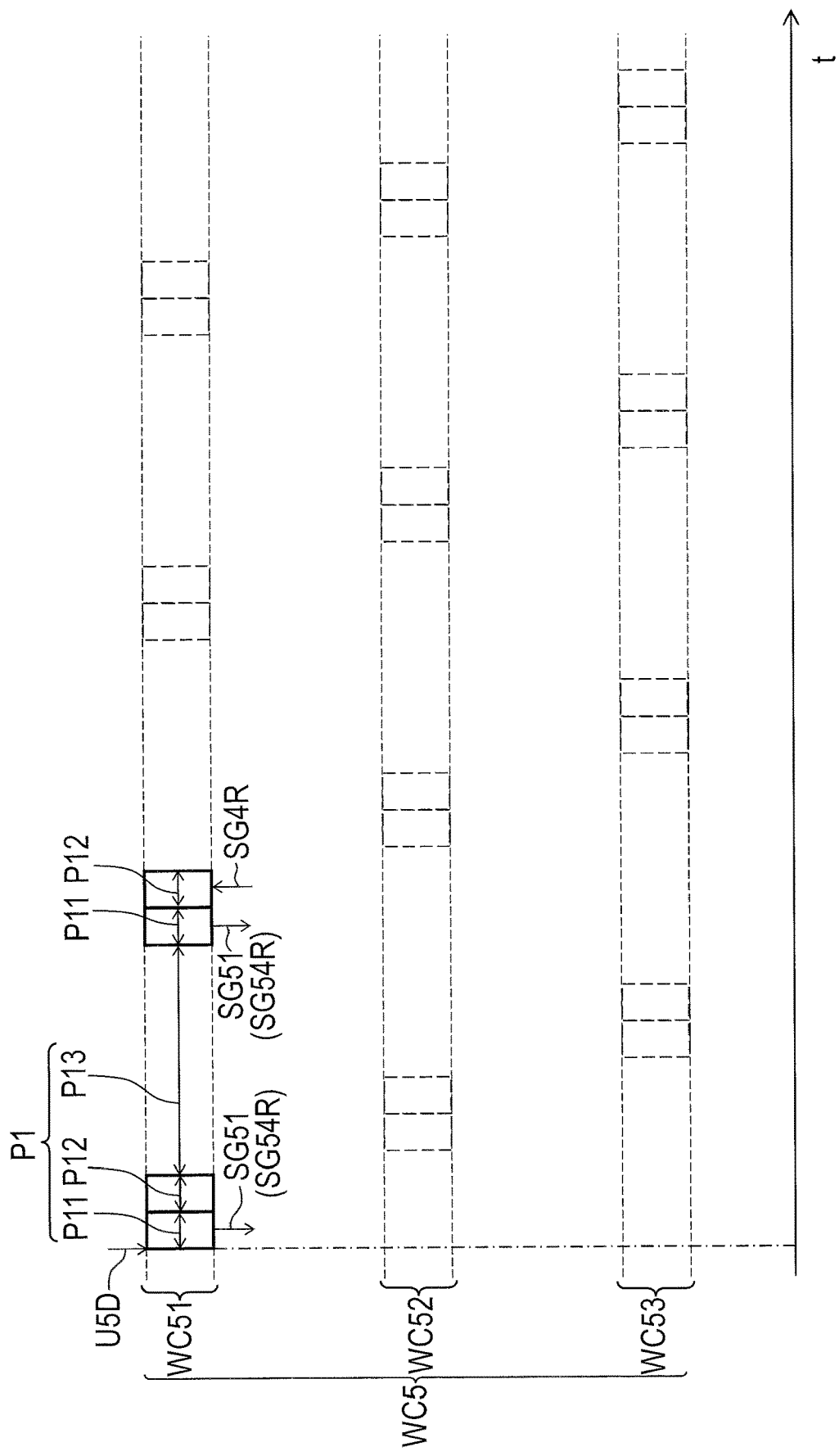
FIG. 34 is a schematic time chart showing the repairing process of the electric devices of the control system illustrated in FIG. 2 in the case where the electric device is paired with the fourth electric device.
Figure 35:
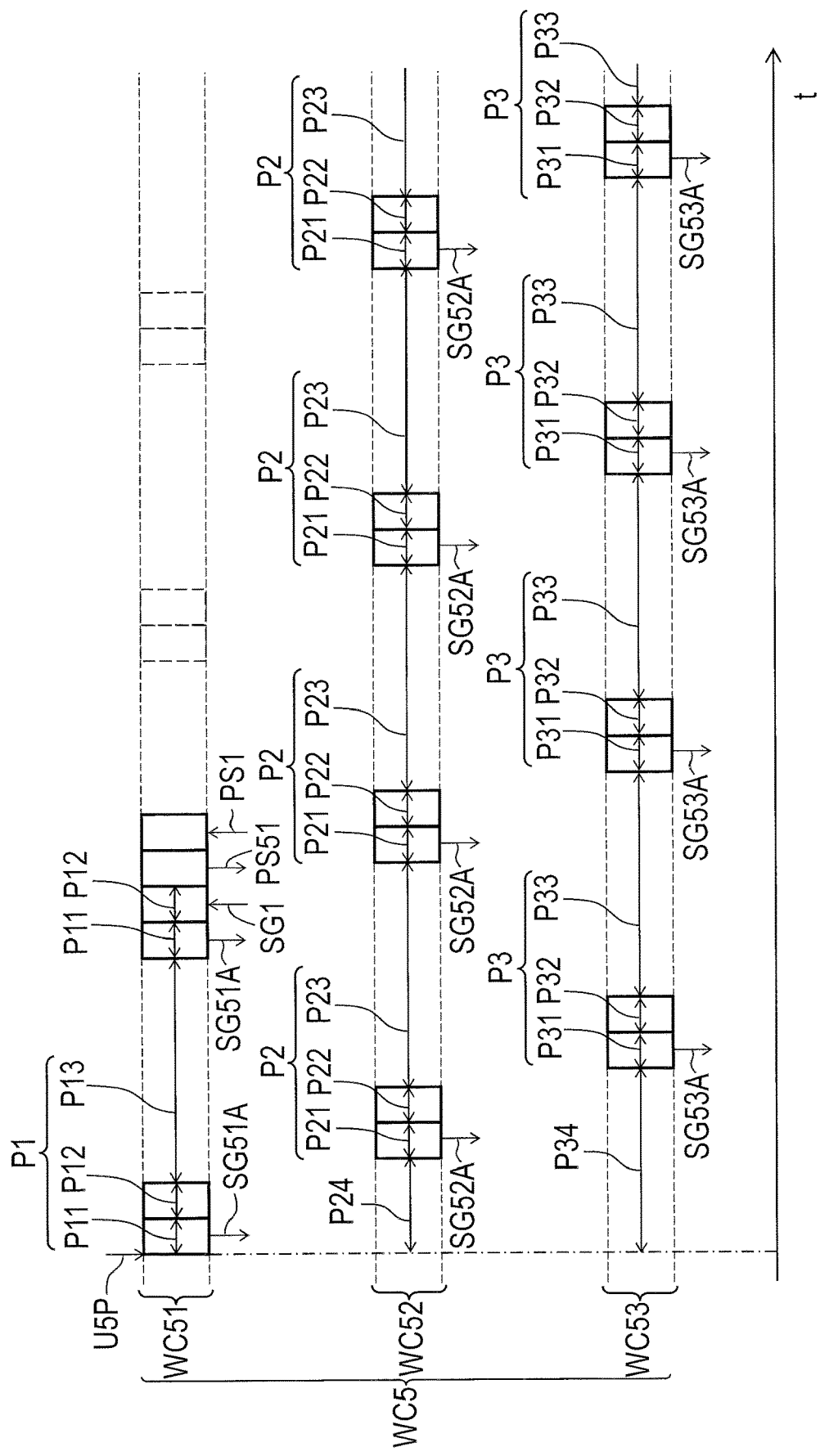
FIG. 35 is a schematic time chart showing the pairing process of the electric device in accordance with a modification in a case where the electric device is paired with the first electric device.
Figure 36:
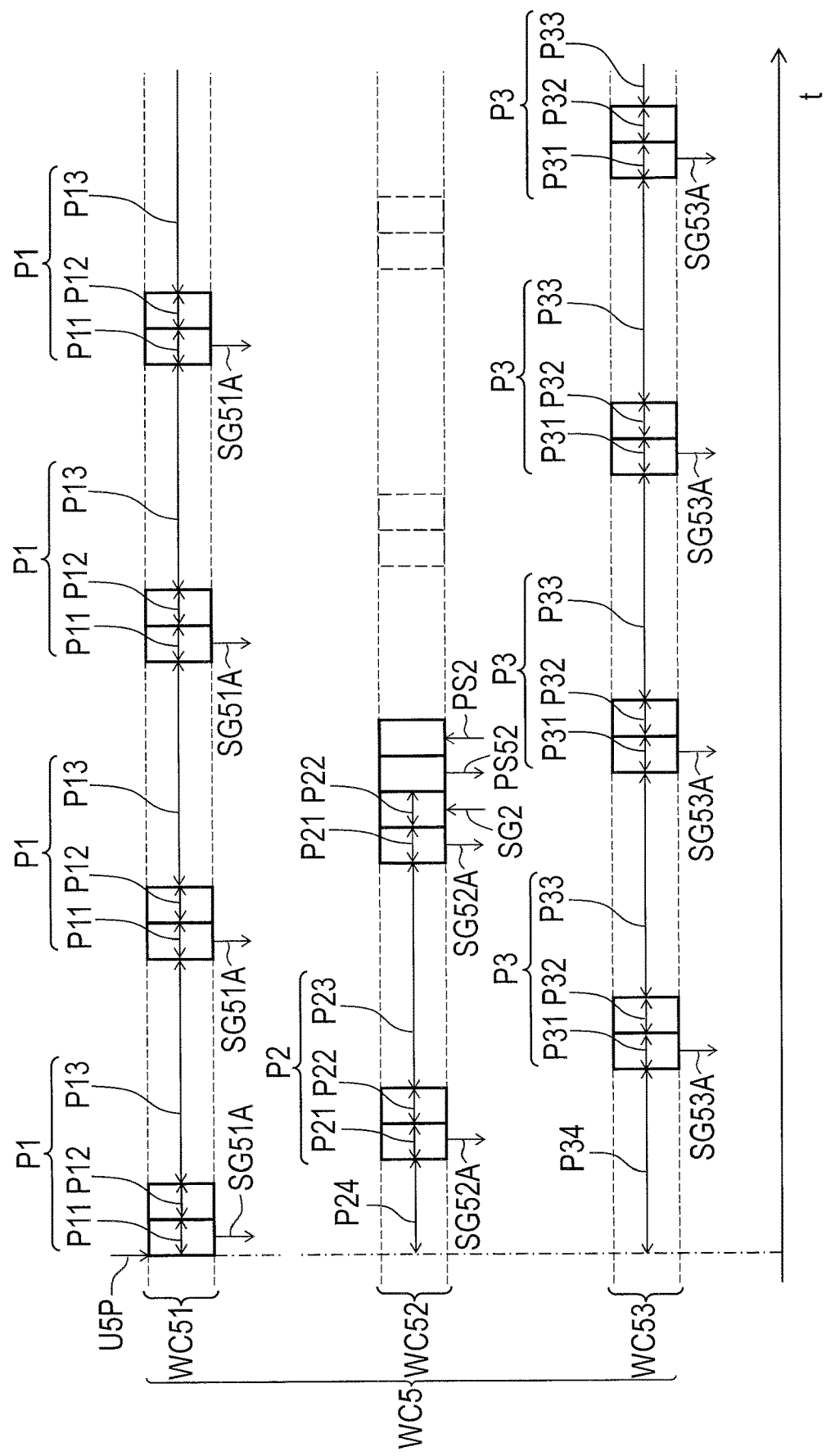
FIG. 36 is a schematic time chart showing the pairing process of the electric device in accordance with a modification in a case where the electric device is paired with the second electric device.
Figure 37:
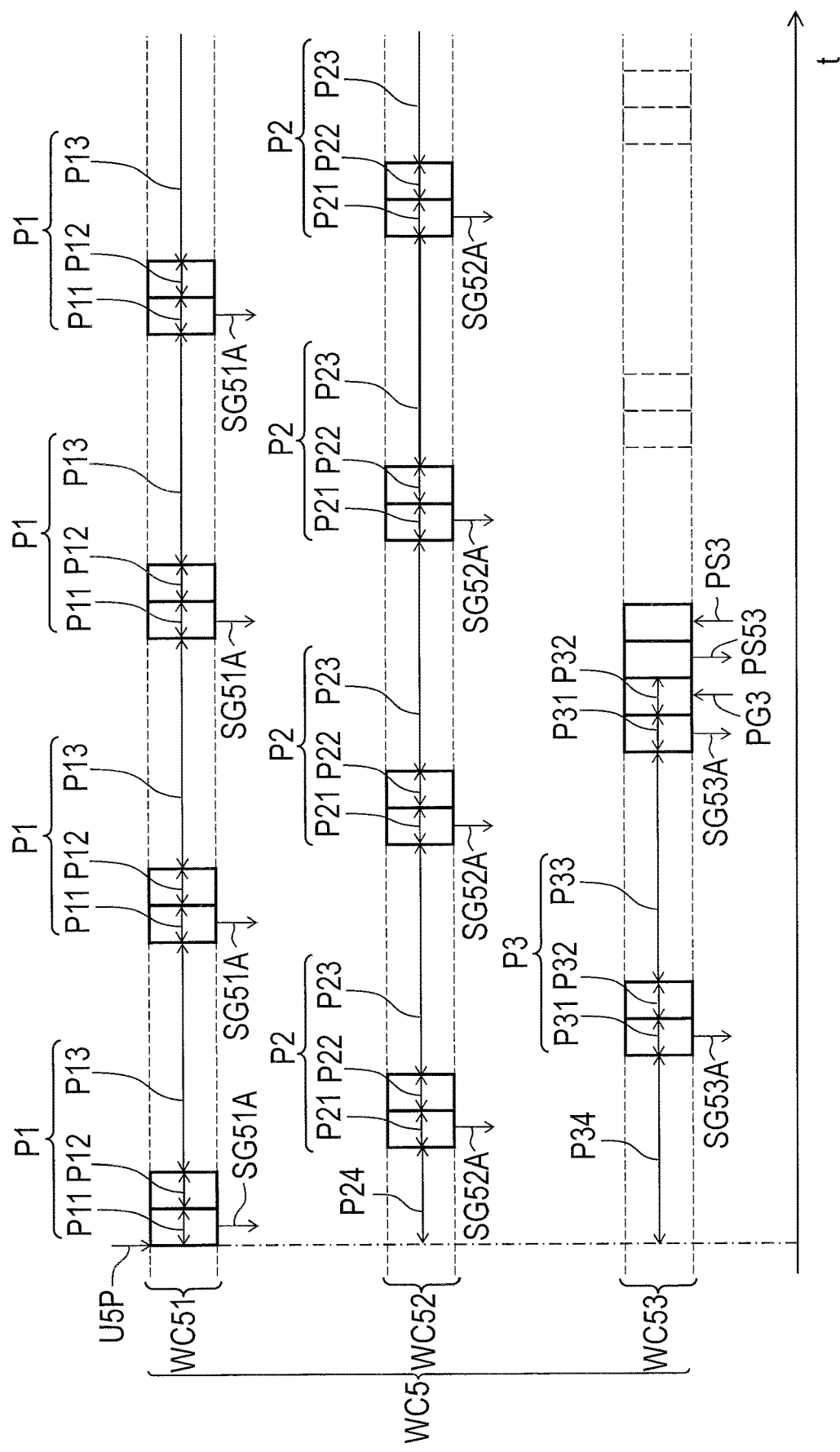
FIG. 37 is a schematic time chart showing the pairing process of the electric device in accordance with a modification in a case where the electric device is paired with the third electric device.
Figure 38:
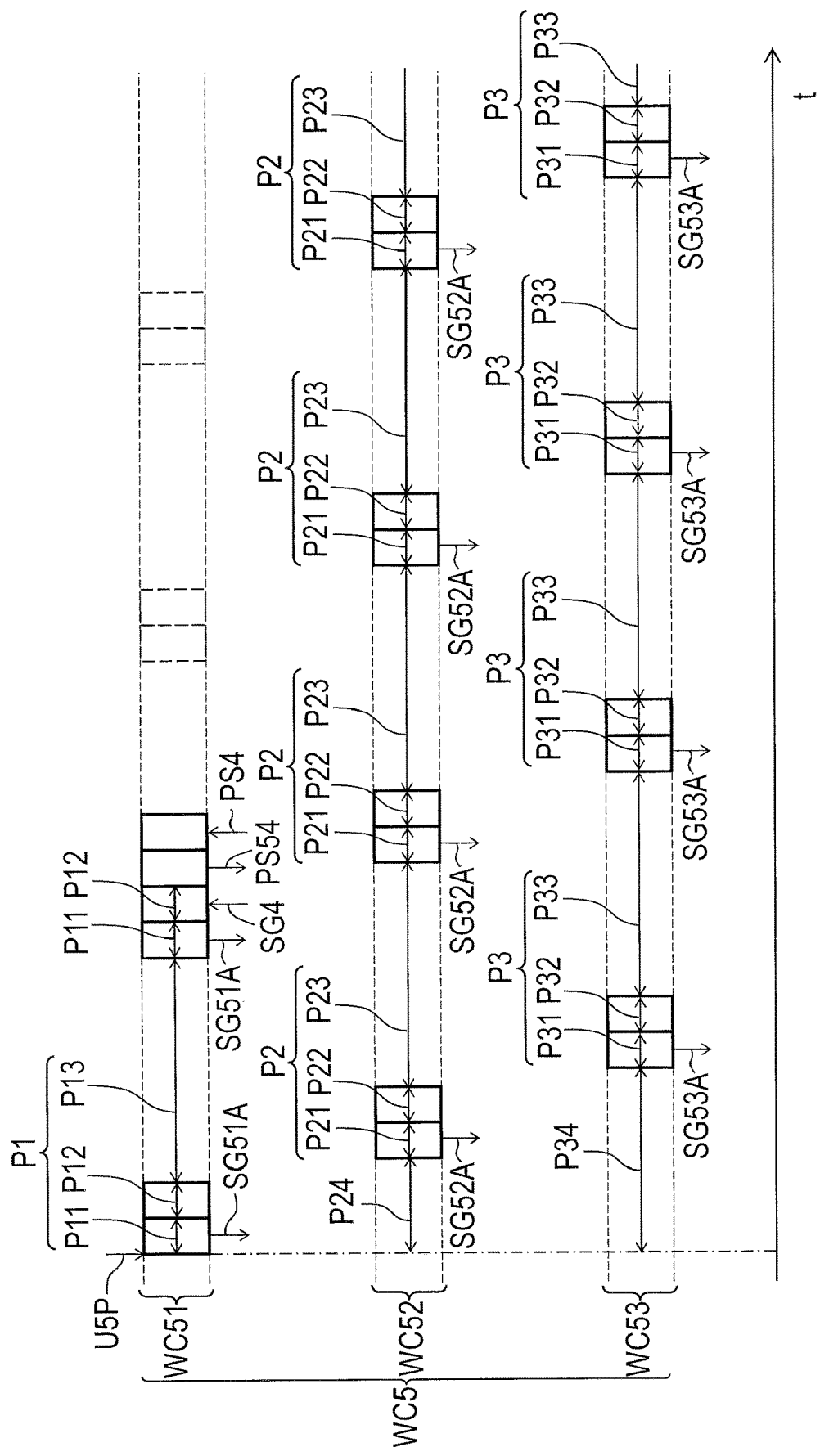
FIG. 38 is a schematic time chart showing the pairing process of the electric device in accordance with a modification in a case where the electric device is paired with the fourth electric device.
Figure 39:
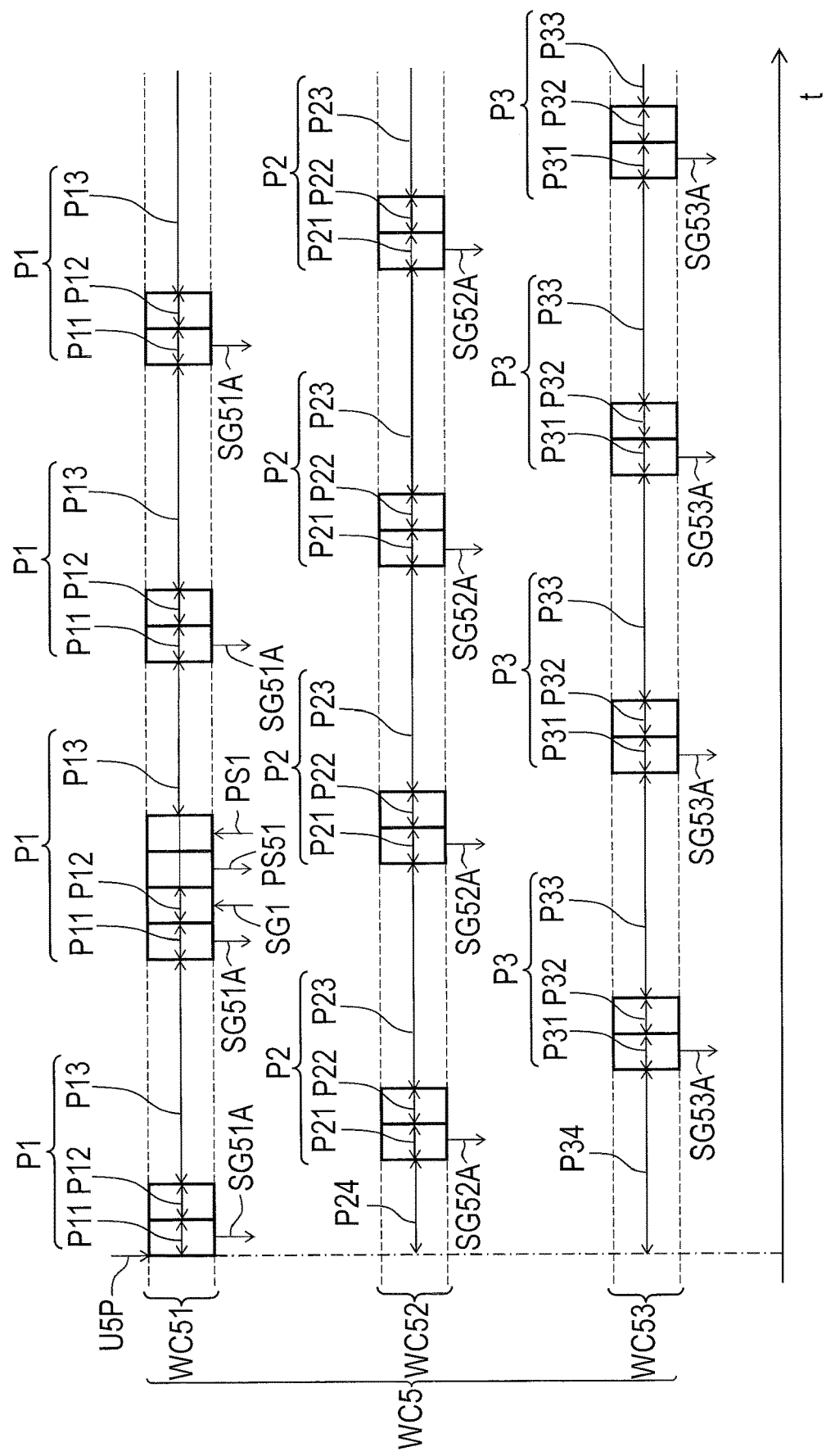
FIG. 39 is a schematic time chart showing the pairing process of the electric device in accordance with a modification in a case where the electric device is paired with the first electric device.
Figure 40:
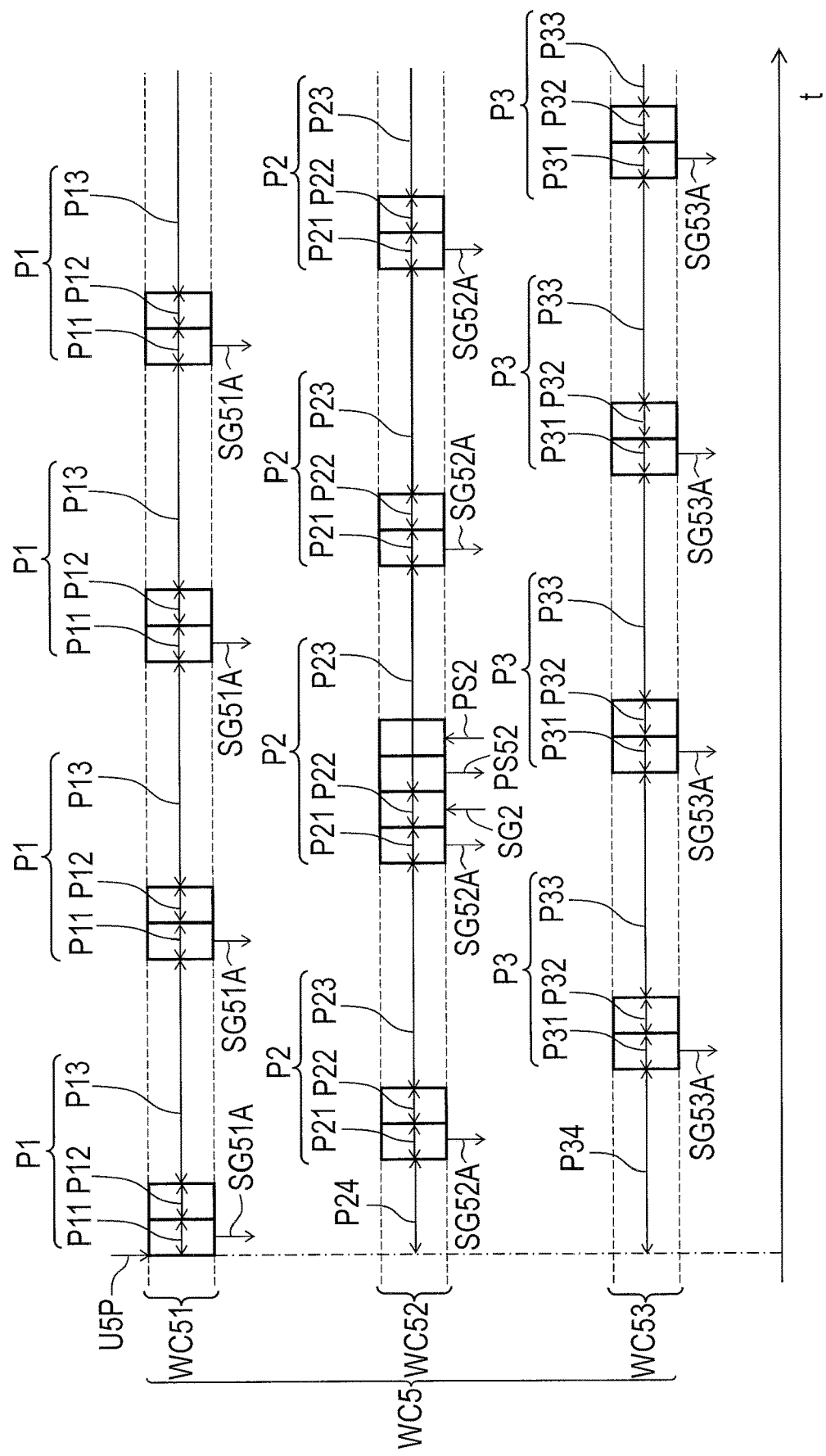
FIG. 40 is a schematic time chart showing the pairing process of the electric device in accordance with a modification in a case where the electric device is paired with the second electric device.
Figure 41:
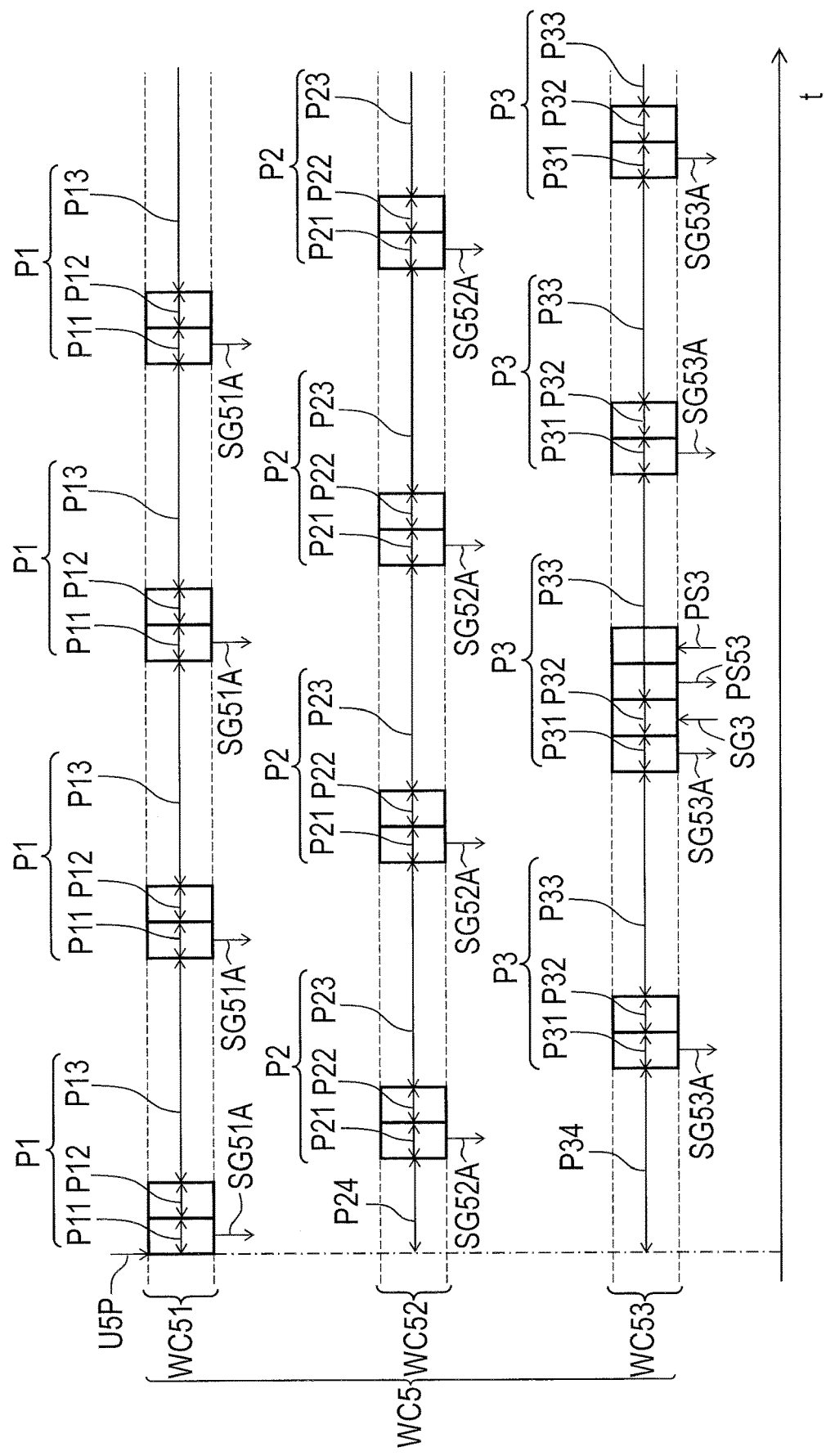
FIG. 41 is a schematic time chart showing the pairing process of the electric device in accordance with a modification in a case where the electric device is paired with the third electric device.
Figure 42:
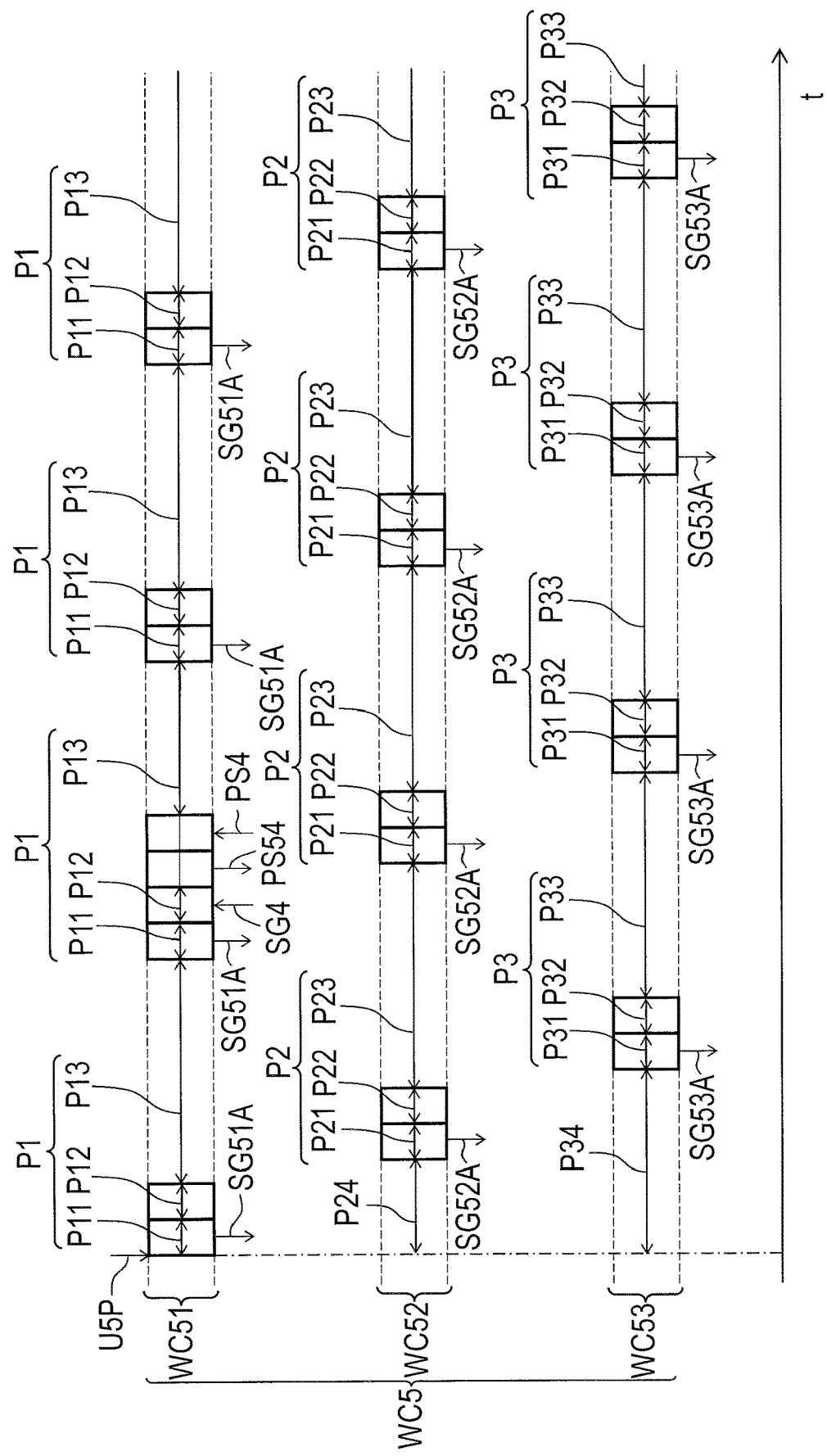
FIG. 42 is a schematic time chart showing the pairing process of the electric device in accordance with a modification in a case where the electric device is paired with the fourth electric device.

As seen in FIGS. 33 and 34, the electronic controller circuitry EC5 is configured to execute repairing between the fourth electric device ED4 and the electric device ED5 which are paired in response to the repairing user input USD in the fourth disconnection state.

The electronic controller circuitry EC5 is configured to control the wireless communicator circuitry WC5 to wirelessly transmit the first signal SG51 without transmitting the second signal SG52 in response to the repairing user input USD in a case where the electric device ED5 is paired with the fourth electric device ED4. The electronic controller circuitry EC5 is configured to control the wireless communicator circuitry WC5 to wirelessly transmit the first signal SG51 without transmitting the third signal SG53 in response to the repairing user input USD in the case where the electric device ED5 is paired with the fourth electric device ED4.

The first signal SG51 includes a fourth repairing signal SG54R. The fourth repairing signal SG54R can have a specified recipient such as the fourth electric device ED4. For example, the fourth repairing signal SG54R includes repairing information indicative of repairing between the fourth electric device ED4 and the electric device ED5. The fourth repairing signal SG54R can include at least one of the identification information and the cryptographic key information of the pairing information ID54. In the present embodiment, the fourth repairing signal SG54R is identical to at least one of the first request signal SG51A and the first repairing signal SG51R. However, the fourth repairing signal SG54R can be different from at least one of the first request signal SG51A and the first repairing signal SG51R if needed or desired.

The electronic controller circuitry EC5 is configured to control the wireless communicator circuitry WC5 to wirelessly transmit the fourth repairing signal SG54R without transmitting the second signal SG52 and the third signal SG53 in response to the repairing user input USD in the fourth disconnection state where the fourth wireless communicator circuitry WC4 and the wireless communicator circuitry WC5 are paired and where the fourth wireless communicator circuitry WC4 and the wireless communicator circuitry WC5 are wirelessly disconnected. However, the electronic controller circuitry EC5 can be configured to control the wireless communicator circuitry WC5 to wirelessly transmit at least one of the second signal SG52 and the third signal SG53 along with the fourth repairing signal SG54R in response to the repairing user input USD in the fourth disconnection state if needed or desired.

The fourth electronic controller circuitry EC4 is configured to detect the first signal SG51 via the fourth wireless communicator circuitry WC4 in the fourth disconnection state. The fourth electronic controller circuitry EC4 is configured to detect the fourth repairing signal SG54R via the fourth wireless communicator circuitry WC4 in the fourth disconnection state. The fourth electronic controller circuitry EC4 is configured to recognize that the electric device ED5 is ready to reconnect with the fourth electric device ED4 based on in the fourth repairing signal SG54R.

The fourth electronic controller circuitry EC4 is configured to control the fourth wireless communicator circuitry WC4 to wirelessly transmit a fourth repairing response signal SG4R in response to the fourth repairing signal SG54R. The fourth repairing response signal SG4R includes repairing information indicative of repairing between the fourth electric device ED4 and the electric device ED5. The fourth repairing response signal SG4R can include at least one of the fourth identification information and the fourth cryptographic key information of the fourth pairing information ID4. In the present embodiment, the fourth repairing response signal SG4R is identical to the fourth response signal SG4. However, the fourth repairing response signal SG4R can be different from the fourth response signal SG4 if needed or desired.

The electronic controller circuitry EC5 is configured to detect the fourth repairing response signal SG4R via the fourth wireless communicator circuitry WC4 in the fourth disconnection state. The electronic controller circuitry EC5 is configured to recognize that the fourth electric device ED4 is ready to reconnect with the electric device ED5 based on in the fourth repairing response signal SG4R. Thus, the fourth electric device ED4 and the electric device ED5 are reconnected and enters the fourth connection state.

The fourth repairing signal SG54R can be used to execute pairing between the electric device ED5 and another fourth electric device which uses the first communication protocol in a case where the fourth electric device ED4 is replaced with the other fourth electric device. As with the pairing between the electric device ED5 and the fourth electric device ED4, for example, the fourth response signal SG4, the fourth pairing signal PS54, and the fourth pairing response signal PS4 are used to execute pairing between the electric device ED5 and the other fourth electric device.

As seen in FIG. 27, 29, 31, or 33, the electronic controller circuitry EC5 is configured to store the pairing information ID1, ID2, ID3, or ID4 indicative of another electric device which is paired with the electric device ED5. The electronic controller circuitry EC5 is configured to store at least one of the first pairing information ID1, the second pairing information ID2, the third pairing information ID3, and the fourth pairing information ID4 which is indicative of at least one of the first electric device ED1, the second electric device ED2, the third electric device ED3, and the fourth electric device ED4 which is paired with the electric device ED5.

The user interface ED51 is configured to receive a reset user input USE. The user input U5 includes the reset user input USE. The reset user input USE is different from the user input USA and USB, the pairing user input USP, and the repairing user input U5D. The electronic controller circuitry EC5 is configured to reset the pairing information ID1, ID2, ID3, or ID4 in response to the reset user input USE. The electronic controller circuitry EC5 is configured to remove pairing information of another electric device from the memory EC52 in response to the reset user input USE. For example, the electronic controller circuitry EC5 is configured to remove the pairing information ID1, ID2, ID3, or ID4 from the memory EC52 in response to the reset user input USE. At least one of the first paired state, the second paired state, and the third paired state can be reset to an initial state where the electric device ED5 is not paired with any electric device. For example, FIGS. 4 and 5 shows the initial state of the electric device ED5.

However, the electronic controller circuitry EC5 can be configured to reset the pairing information ID1, ID2, ID3, or ID4 in response to another trigger other than the reset user input USE if needed or desired. For example, the electronic controller circuitry EC5 can be configured to reset the pairing information ID1, ID2, ID3, or ID4 in response to the reset user input USE and attachment of the electric power source ED55 to the power source holder ED56. The electronic controller circuitry EC5 can be configured to reset the pairing information ID1, ID2, ID3, or ID4 in a case where the electric power source ED55 is attached to the power source holder ED56 while the user interface ED51 is continuously receiving the reset user input USE.

As seen in FIGS. 7, 11, 15, and 19, the electronic controller circuitry EC5 is configured to inform another electric device that the electric device ED5 is not ready to be paired with at least one of the first electric device ED1, the second electric device ED2, the third electric device ED3, and the fourth electric device ED4 in a case where the electric device ED5 is paired with another of the first electric device ED1, the second electric device ED2, the third electric device ED3, and the fourth electric device ED4. However, the electronic controller circuitry EC5 can be configured to be free of informing another electric device that the electric device ED5 is not ready to be paired with at least one of the first electric device ED1, the second electric device ED2, the third electric device ED3, and the fourth electric device ED4 in a case where the electric device ED5 is paired with another of the first electric device ED1, the second electric device ED2, the third electric device ED3, and the fourth electric device ED4 if needed or desired.

As seen in FIG. 7, the electronic controller circuitry EC5 is configured to inform the second electric device ED2 and the third electric device ED3 via the wireless communicator circuitry WC5 that the electric device ED5 is not ready to be paired with the second electric device ED2 and the third electric device ED3 in the first paired state.

For example, the second signal SG52 includes a second restriction signal SG52B. The second restriction signal SG52B is different from the second request signal SG52A. The electronic controller circuitry EC5 is configured to control the wireless communicator circuitry WC5 to wirelessly transmit the second restriction signal SG52B to inform the second electric device ED2 that the electric device ED5 is not ready to be paired with the second electric device ED2. The electronic controller circuitry EC5 is configured to control the wireless communicator circuitry WC5 to wirelessly transmit the second restriction signal SG52B after the electronic controller circuitry EC5 receives the first response signal SG1. The second electronic controller circuitry EC2 is configured to recognize, based on the second restriction signal SG52B, that the electric device ED5 is not ready to be paired with the second electric device ED2. The second electronic controller circuitry EC2 is configured to be free of controlling the second wireless communicator circuitry WC2 to wirelessly transmit the second response signal SG2 in response to the second restriction signal SG52B.

As with the second signal SG52, the third signal SG53 includes a third restriction signal SG53B. The third restriction signal SG53B is different from the third request signal SG53A. The electronic controller circuitry EC5 is configured to control the wireless communicator circuitry WC5 to wirelessly transmit the third restriction signal SG53B to inform the third electric device ED3 that the electric device ED5 is not ready to be paired with the third electric device ED3. The electronic controller circuitry EC5 is configured to control the wireless communicator circuitry WC5 to wirelessly transmit the third restriction signal SG53B after the electronic controller circuitry EC5 receives the third response signal SG3. The third electronic controller circuitry EC3 is configured to recognize, based on the third restriction signal SG53B, that the electric device ED5 is not ready to be paired with the third electric device ED3. The third electronic controller circuitry EC3 is configured to be free of controlling the third wireless communicator circuitry WC3 to wirelessly transmit the third response signal SG3 in response to the third restriction signal SG53B.

As seen in FIG. 11, the electronic controller circuitry EC5 is configured to inform the first electric device ED1 and the third electric device ED3 via the wireless communicator circuitry WC5 that the electric device ED5 is not ready to be paired with the first electric device ED1 and the third electric device ED3 in the second paired state.

For example, the first signal SG51 includes a first restriction signal SG51B. The first restriction signal SG51B is different from the first request signal SG51A. The electronic controller circuitry EC5 is configured to control the wireless communicator circuitry WC5 to wirelessly transmit the first restriction signal SG51B to inform the first electric device ED1 that the electric device ED5 is not ready to be paired with the first electric device ED1. The electronic controller circuitry EC5 is configured to control the wireless communicator circuitry WC5 to wirelessly transmit the first restriction signal SG51B after the electronic controller circuitry EC5 receives the first response signal SG1. The first electronic controller circuitry EC1 is configured to recognize, based on the first restriction signal SG51B, that the electric device ED5 is not ready to be paired with the first electric device ED1. The first electronic controller circuitry EC1 is configured to be free of controlling the first wireless communicator circuitry WC1 to wirelessly transmit the first response signal SG21 in response to the first restriction signal SG51B.

As with the first signal SG51 or the embodiment depicted in FIG. 7, the third signal SG53 includes the third restriction signal SG53B in the embodiment depicted in FIG. 11. The description relating to the third restriction signal SG53B in the embodiment depicted in FIG. 7 can be utilized as the description relating to the third restriction signal SG53B in the embodiment depicted in FIG. 11.

As seen in FIG. 15, the electronic controller circuitry EC5 is configured to inform the first electric device ED1 and the second electric device ED2 via the wireless communicator circuitry WC5 that the electric device ED5 is not ready to be paired with the first electric device ED1 and the second electric device ED2 in the third paired state.

As with the embodiment depicted in FIG. 11, the first signal SG51 includes the first restriction signal SG51B in the embodiment depicted in FIG. 15. The description relating to the first request signal SG51B in the embodiment depicted in FIG. 11 can be utilized as the description relating to the first request signal SG51B in the embodiment depicted in FIG. 15.

As with the embodiment depicted in FIG. 7, the second signal SG52 includes the second restriction signal SG52B in the embodiment depicted in FIG. 15. The description relating to the second request signal SG52B in the embodiment depicted in FIG. 7 can be utilized as the description relating to the second request signal SG52B in the embodiment depicted in FIG. 15.

As with the embodiment depicted in FIG. 7, as seen in FIG. 19, the electronic controller circuitry EC5 is configured to inform the second electric device ED2 and the third electric device ED3 via the wireless communicator circuitry WC5 that the electric device ED5 is not ready to be paired with the second electric device ED2 and the third electric device ED3 in the fourth paired state.

As seen in FIGS. 23 to 26, the first restriction signal SG51B, the second restriction signal SG52B, and the third restriction signal SG53B can be applied to the embodiment depicted in FIGS. 23 to 26.

As seen in FIGS. 35 to 38, the electronic controller circuitry EC5 can be configured to be free of informing another electric device that the electric device ED5 is not ready to be paired with at least one of the first electric device ED1, the second electric device ED2, the third electric device ED3, and the fourth electric device ED4 in a case where the electric device ED5 is paired with another of the first electric device ED1, the second electric device ED2, the third electric device ED3, and the fourth electric device ED4 if needed or desired. The first request signal SG51A can be wirelessly transmitted instead of the first restriction signal SG51B if needed or desired. The second request signal SG52A can be wirelessly transmitted instead of the second restriction signal SG52B if needed or desired. The third request signal SG53A can be wirelessly transmitted Instead of the third restriction signal SG53B if needed or desired.

As seen in FIGS. 39 to 42, the modification depicted in FIGS. 35 to 38 can be applied to the modification depicted in FIGS. 23 to 26.

As seen in FIG. 4, the electric device ED5 further comprises an indicator ED57. The electronic controller circuitry EC5 is electrically connected to the indicator ED57 to control the indicator ED57. The indicator ED57 includes a light emitter configured to emit light. For example, the light emitter includes a light-emitting diode (LED). The indicator ED57 is configured to indicate information relating to the electric device ED5. For example, the indicator ED57 is configured to indicate protocol information indicative of a communication protocol used in the electric device ED5. The indicator ED57 is configured to indicate protocol information indicative of a communication protocol used between the electric device ED5 and another electric device paired with the electric device ED5.

The user interface ED51 is configured to receive an indicator user input U5F. The user input U5 includes the indicator user input U5F. The indicator user input U5F is different from the user input U5A and U5B, the pairing user input U5P, the repairing user input U5D, and the reset user input U5E. The electronic controller circuitry EC5 is configured to control the indicator ED57 to indicate the first communication protocol in a case where the electric device ED5 is paired with the first electric device ED1. The electronic controller circuitry EC5 is configured to control the indicator ED57 to indicate the second communication protocol in a case where the electric device ED5 is paired with the second electric device ED2. The electronic controller circuitry EC5 is configured to control the indicator ED57 to indicate the third communication protocol in a case where the electric device ED5 is paired with the third electric device ED3.

The electronic controller circuitry EC5 is configured to control the indicator ED57 to indicate the first communication protocol in a first manner in the case where the electric device ED5 is paired with the first electric device ED1. The electronic controller circuitry EC5 is configured to control the indicator ED57 to indicate the second communication protocol in a second manner in the case where the electric device ED5 is paired with the second electric device ED2. The electronic controller circuitry EC5 is configured to control the indicator ED57 to indicate the third communication protocol in a third manner in the case where the electric device ED5 is paired with the third electric device ED3.

The second manner is different from the first manner. The third manner is different from the first manner and the second manner. For example, the first manner includes a manner that the indicator ED57 blinks once in response to the indicator user input U5F. The second manner includes a manner that the indicator ED57 blinks twice in response to the indicator user input U5F. The third manner includes a manner that the indicator ED57 blinks three times in response to the indicator user input U5F. The first manner, the second manner, and the third manner are not limited to the above manners. For example, the first manner, the second manner, and the third manner can be different in terms of at least one of a lighting pattern, a lighting time, and a color of light. The indicator ED57 can include other structures other than the light emitter if needed or desired.

The indicator user input U5F can include a first indicator user input, a second indicator user input, and a third indicator user input. The second indicator user input is different from the first indicator user input. The third indicator user input is different from the first indicator user input and the second indicator user input. The indicator ED57 is configured to indicate the first communication protocol in the first manner in response to the first indicator user input in a case where the electronic controller circuitry EC5 is paired with the first electric device ED1. The indicator ED57 is configured to indicate the second communication protocol in the second manner in response to the second indicator user input in a case where the electronic controller circuitry EC5 is paired with the second electric device ED2. The indicator ED57 is configured to indicate the third communication protocol in the third manner in response to the third indicator user input in a case where the electronic controller circuitry EC5 is paired with the third electric device ED3.

In the present embodiment, the electronic controller circuitry EC5 is configured to control the indicator ED57 to indicate the first communication protocol in the first manner in each of the first connection state and the first disconnection state. The electronic controller circuitry EC5 is configured to control the indicator ED57 to indicate the second communication protocol in the second manner in each of the second connection state and the second disconnection state. The electronic controller circuitry EC5 is configured to control the indicator ED57 to indicate the third communication protocol in the third manner in each of the third connection state and the third disconnection state.

However, the electronic controller circuitry EC5 can be configured to control the indicator ED57 to indicate the first communication protocol in the first manner in only one or none of the first connection state and the first disconnection state if needed or desired. The electronic controller circuitry EC5 can be configured to control the indicator ED57 to indicate the second communication protocol in the second manner in only one or none of the second connection state and the second disconnection state if needed or desired. The electronic controller circuitry EC5 can be configured to control the indicator ED57 to indicate the third communication protocol in the third manner in only one or none of the third connection state and the third disconnection state if needed or desired. The indicator ED57 can be omitted from the electric device ED5 if needed or desired.

Figure 43:
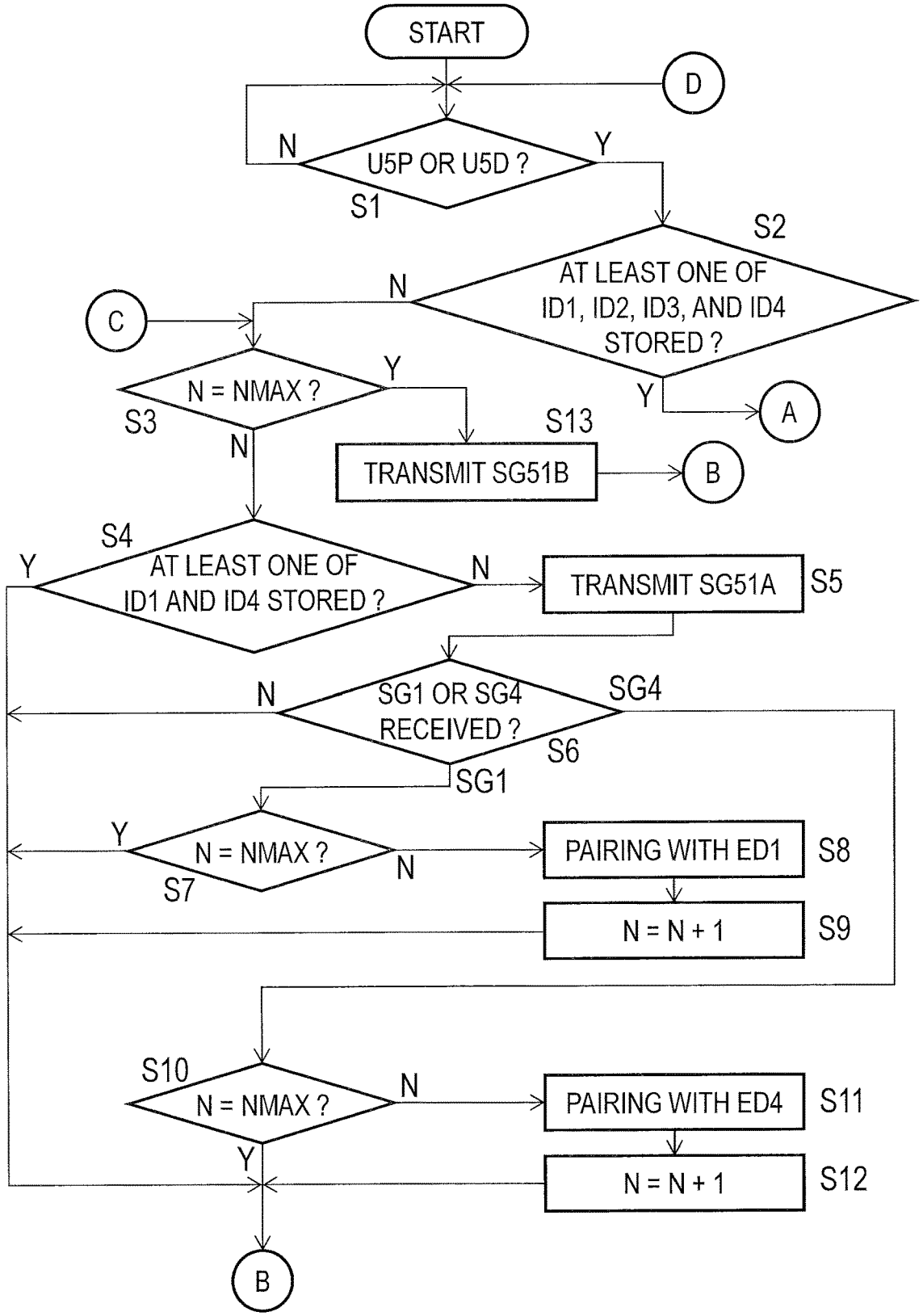
FIGS. 43 and 44 are flowcharts showing the pairing process between the electric devices of the control system illustrated in FIG. 2.

The pairing process will be described in detail here referring to FIGS. 43 and 44. The flowcharts depicted in FIGS. 43 and 44 correspond to the embodiments and the modifications depicted in FIGS. 7 to 22. As seen in FIG. 43, the electronic controller circuitry EC5 determines whether the user interface ED51 receives the pairing user input U5P or the repairing user input USD (step S1). The electronic controller circuitry EC5 determines whether any pairing information of another electric device is stored in the memory EC52 in a case where the user interface ED51 receives the pairing user input U5P or the repairing user input USD (step S2).

Before the pairing process which uses the first communication protocol, the electronic controller circuitry EC5 determines whether a total number N of at least one electric device which is currently paired with the electric device ED5 in the same period reaches the maximum number NMAX of at least one electric device which can be paired with the electric device ED5 in the same period in a case where any pairing information of another electric device is not stored in the memory EC52 (step S3). The electronic controller circuitry EC5 controls the wireless communicator circuitry WC5 to wirelessly transmit the first restriction signal SG51B in a case where the total number N reaches the maximum number NMAX (step S13).

The electronic controller circuitry EC5 determines whether pairing information which uses the first communication protocol is stored in the memory ED52 in a case where the total number N does not reach the maximum number NMAX in the step S3 (step S4). For example, the electronic controller circuitry EC5 determines whether at least one of the first pairing information ID1 and the fourth pairing information ID4 is stored in the memory ED52 (step S4). The electronic controller circuitry EC5 controls the wireless communicator circuitry WC5 to wirelessly transmit the first request signal SG51A in a case where at least one of the first pairing information ID1 and the fourth pairing information ID4 is not stored in the memory ED52 (step S5). The electronic controller circuitry EC5 determines whether the electronic controller circuitry EC5 receives the first response signal SG1 or the fourth response signal SG4 via the wireless communicator circuitry WC5 after transmitting the first request signal SG51A (step S6).

The electronic controller circuitry EC5 determines whether the total number N reaches the maximum number NMAX in a case where the electronic controller circuitry EC5 receives the first response signal SG1 in the step S6 (step S7). The electronic controller circuitry EC5 executes pairing between the electric device ED5 and the first electric device ED1 in a case where the total number N is less than the maximum number NMAX (step S8). For example, the first pairing signal PS51 and the first pairing response signal PS1 are transmitted between the electric device ED5 and the first electric device ED1. The electronic controller circuitry EC5 increments the total number N by one after the electric device ED5 and the first electric device ED1 are paired (step S9).

The electronic controller circuitry EC5 determines whether the total number N reaches the maximum number NMAX in a case where the electronic controller circuitry EC5 receives the fourth response signal SG4 in the step S6 (step S10). The electronic controller circuitry EC5 executes pairing between the electric device ED5 and the fourth electric device ED4 in a case where the total number N is less than the maximum number NMAX (step S11). For example, the fourth pairing signal PS54 and the fourth pairing response signal PS4 are transmitted between the electric device ED5 and the fourth electric device ED4. The electronic controller circuitry EC5 increments the total number N by one after the electric device ED5 and the fourth electric device ED4 are paired (step S12).

Figure 44:
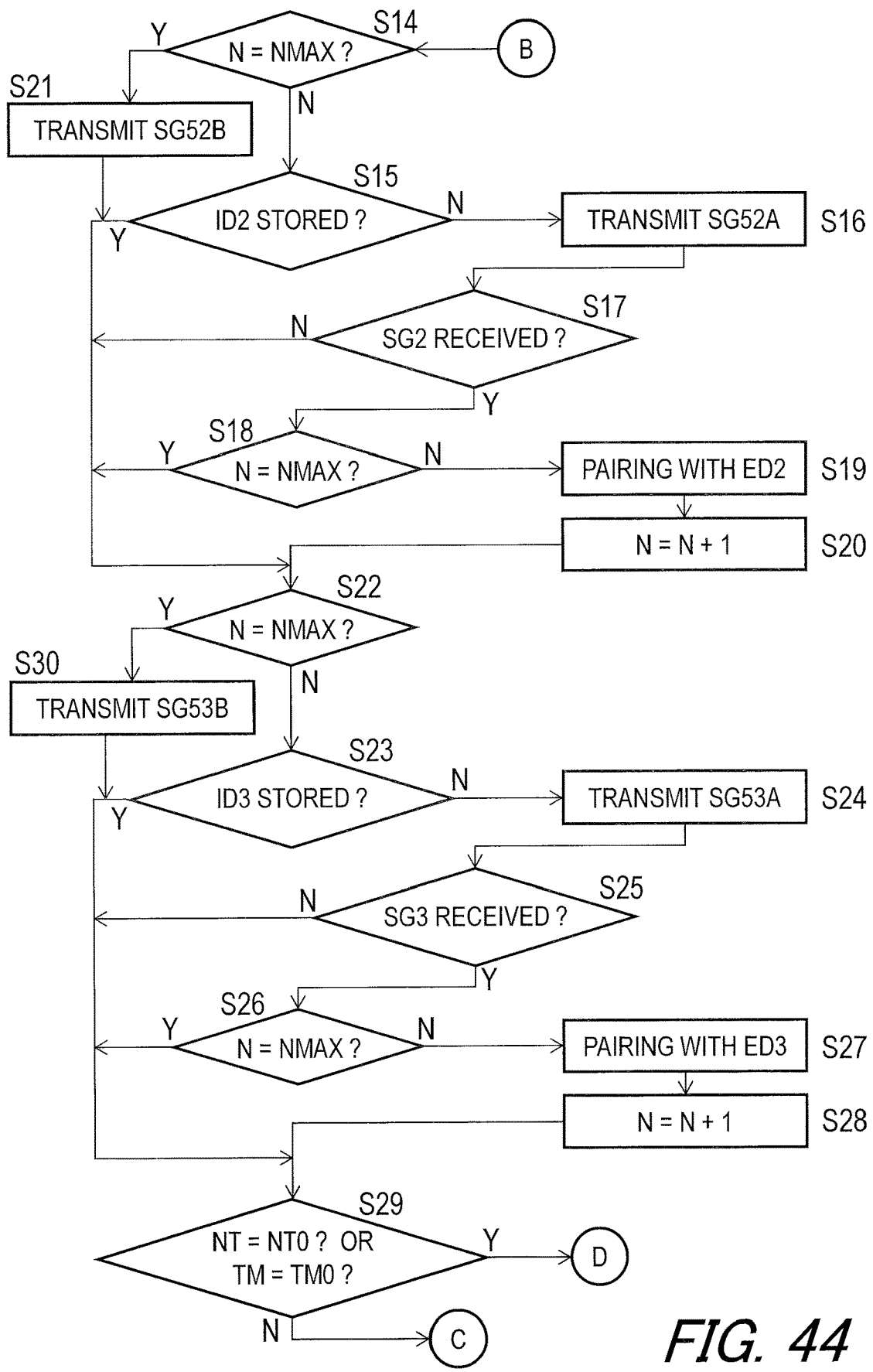

As seen in FIGS. 43 and 44, the process goes to the step S14 after the electronic controller circuitry EC5 increments the total number N by one in the step S9 or S12. The process goes to the step S14 in a case where at least one of the first pairing information ID1 and the fourth pairing information ID4 is stored in the memory ED52 in the step S4 without transmitting the first request signal SG51A. The process goes to the step S14 in a case where the electronic controller circuitry EC5 receives neither the first response signal SG1 nor the fourth response signal SG4 in the step S6. The process goes to the step S14 in a case where the total number N reaches the maximum number NMAX in the step S7 without executing pairing between the electric device ED5 and the first electric device ED1. The process goes to the step S14 in a case where the total number N reaches the maximum number NMAX in the step S10 without executing pairing between the electric device ED5 and the fourth electric device ED4. The process goes to the step S14 after the first restriction signal SG51B is wirelessly transmitted in the step S13.

As seen in FIG. 44, the electronic controller circuitry EC5 determines whether the total number N reaches the maximum number NMAX before the pairing process which uses the second communication protocol (step S14). The electronic controller circuitry EC5 controls the wireless communicator circuitry WC5 to wirelessly transmit the second restriction signal SG52B in a case where the total number N reaches the maximum number NMAX (step S21).

The electronic controller circuitry EC5 determines whether pairing information which uses the second communication protocol is stored in the memory ED52 in a case where the total number N does not reach the maximum number NMAX in the step S14 (step S15). For example, the electronic controller circuitry EC5 determines whether the second pairing information ID2 is stored in the memory ED52 (step S15). The electronic controller circuitry EC5 controls the wireless communicator circuitry WC5 to wirelessly transmit the second request signal SG52A in a case where the second pairing information ID2 is not stored in the memory ED52 (step S16). The electronic controller circuitry EC5 determines whether the electronic controller circuitry EC5 receives the second response signal SG2 via the wireless communicator circuitry WC5 after transmitting the second request signal SG52A (step S17).

The electronic controller circuitry EC5 determines whether the total number N reaches the maximum number NMAX in a case where the electronic controller circuitry EC5 receives the second response signal SG2 in the step S17 (step S18). The electronic controller circuitry EC5 executes pairing between the electric device ED5 and the second electric device ED2 in a case where the total number N is less than the maximum number NMAX (step S19). For example, the second pairing signal PS52 and the second pairing response signal PS2 are transmitted between the electric device ED5 and the second electric device ED2. The electronic controller circuitry EC5 increments the total number N by one after the electric device ED5 and the second electric device ED2 are paired (step S20).

The process goes to the step S22 after the electronic controller circuitry EC5 increments the total number N by one in the step S20. The process goes to the step S22 in a case where the second pairing information ID2 is stored in the memory ED52 in the step S15 without transmitting the second request signal SG52A. The process goes to the step S22 in a case where the electronic controller circuitry EC5 does not receive the second response signal SG2 in the step S17. The process goes to the step S22 in a case where the total number N reaches the maximum number NMAX in the step S18 without executing pairing with the second electric device ED2.

As seen in FIG. 44, the electronic controller circuitry EC5 determines whether the total number N reaches the maximum number NMAX before the pairing process which uses the third communication protocol (step S22). The electronic controller circuitry EC5 controls the wireless communicator circuitry WC5 to wirelessly transmit the second restriction signal SG52B in a case where the total number N reaches the maximum number NMAX (step S30).

The electronic controller circuitry EC5 determines whether pairing information which uses the third communication protocol is stored in the memory ED52 in a case where the total number N does not reach the maximum number NMAX in the step S24 (step S23). For example, the electronic controller circuitry EC5 determines whether the third pairing information ID3 is stored in the memory ED52 (step S23). The electronic controller circuitry EC5 controls the wireless communicator circuitry WC5 to wirelessly transmit the third request signal SG53A in a case where the third pairing information ID3 is not stored in the memory ED52 (step S24). The electronic controller circuitry EC5 determines whether the electronic controller circuitry EC5 receives the third response signal SG3 via the wireless communicator circuitry WC5 after transmitting the third request signal SG53A (step S25).

The electronic controller circuitry EC5 determines whether the total number N reaches the maximum number NMAX in a case where the electronic controller circuitry EC5 receives the third response signal SG3 in the step S25 (step S26). The electronic controller circuitry EC5 executes pairing between the electric device ED5 and the third electric device ED3 in a case where the total number N is less than the maximum number NMAX (step S27). For example, the third pairing signal PS53 and the third pairing response signal PS3 are transmitted between the electric device ED5 and the third electric device ED3. The electronic controller circuitry EC5 increments the total number N by one after the electric device ED5 and the third electric device ED3 are paired (step S28).

The process goes to the step S29 after the electronic controller circuitry EC5 increments the total number N by one in the step S28. The process goes to the step S29 in a case where the third pairing information ID3 is stored in the memory ED52 in the step S23 without transmitting the third request signal SG53A. The process goes to the step S29 in a case where the electronic controller circuitry EC5 does not receive the third response signal SG3 in the step S25. The process goes to the step S29 in a case where the total number N reaches the maximum number NMAX in the step S26 without executing pairing with the third electric device ED3.

As seen in FIG. 44, the electronic controller circuitry EC5 determines whether a total number of times NT at which the steps S3 to S28 are executed reaches the reference number of times NT0 or whether an elapsed time TM reaches the reference period TM0 (step S29). The process returns to the step S4 and the steps S3 to S28 are executed in a case where the total number of times NT does not reach the reference number of times NT0 or where the elapsed time TM does not reach the reference period TM0 (step S29). The process returns to the step S1 in a case where the total number of times NT reaches the reference number of times NT0 or where the elapsed time TM reaches the reference period TM0 (step S29).

Figure 45:
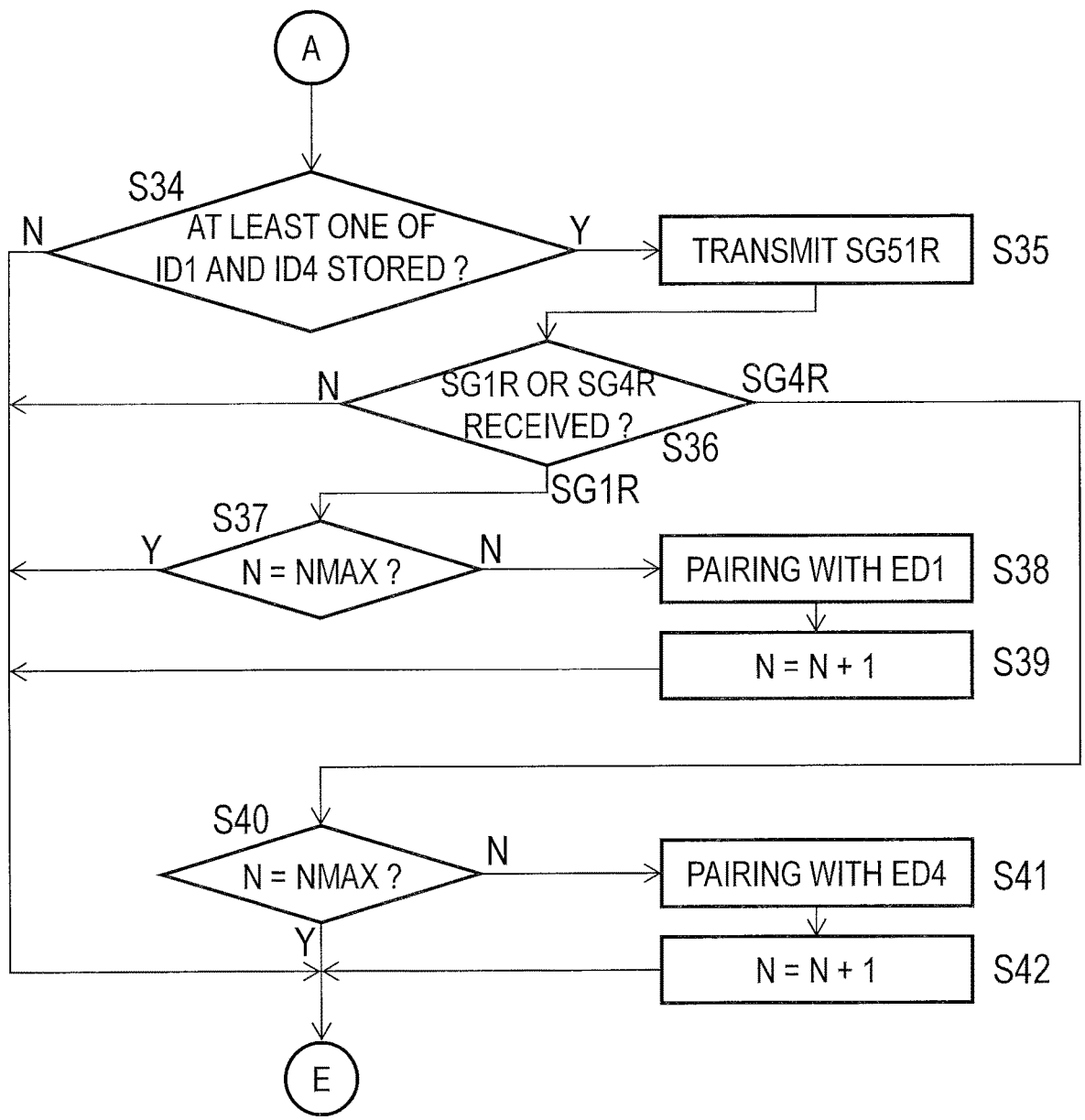
FIGS. 45 and 46 are flowcharts showing the repairing process between the electric devices of the control system illustrated in FIG. 2.

The repairing process will be described in detail here referring to FIGS. 43, 45, and 46. The flowcharts depicted in FIGS. 43, 45, and 46 correspond to the embodiments and the modifications depicted in FIGS. 28, 30, 32, and 34. As seen in FIG. 43, the electronic controller circuitry EC5 determines whether the user interface ED51 receives the pairing user input U5P or the repairing user input USD (step S1). The electronic controller circuitry EC5 determines whether any pairing information of another electric device is stored in the memory EC52 in a case where the user interface ED51 receives the pairing user input U5P or the repairing user input USD (step S2). As seen in FIGS. 43 and 45, the process goes to the step S34 in a case where any pairing information of another electric device is stored in the memory EC52 (step S2). For example, the process goes to the step S34 in a case where at least one of the first pairing information ID1, the second pairing information ID2, the third pairing information ID3, and the fourth pairing information ID4 is stored in the memory EC52 (step S2).

As seen in FIG. 45, the electronic controller circuitry EC5 determines whether pairing information which uses the first communication protocol is stored in the memory ED52 in a case where any pairing information of another electric device is stored in the memory EC52 in the step S2 (step S34). For example, the electronic controller circuitry EC5 determines whether at least one of the first pairing information ID1 and the fourth pairing information ID4 is stored in the memory ED52 (step S34). To execute repairing, the electronic controller circuitry EC5 controls the wireless communicator circuitry WC5 to wirelessly transmit the first repairing signal SG51R in a case where at least one of the first pairing information ID1 and the fourth pairing information ID4 is stored in the memory ED52 (step S35). The electronic controller circuitry EC5 determines whether the electronic controller circuitry EC5 receives the first repairing response signal SG1R or the fourth repairing response signal SG4R via the wireless communicator circuitry WC5 after transmitting the first request signal SG51A (step S36).

The electronic controller circuitry EC5 determines whether the total number N reaches the maximum number NMAX of at least one electric device which can be paired with the electric device ED5 in the same period in a case where the electronic controller circuitry EC5 receives the first repairing response signal SG1R (step S37). The electronic controller circuitry EC5 executes pairing between the electric device ED5 and the first electric device ED1 in a case where the total number N is less than the maximum number NMAX (step S38). For example, the first pairing signal PS51 and the first pairing response signal PS1 are transmitted between the electric device ED5 and the first electric device ED1. The electronic controller circuitry EC5 increments the total number N by one after the electric device ED5 and the first electric device ED1 are paired (step S39).

The electronic controller circuitry EC5 determines whether the total number N reaches the maximum number NMAX of at least one electric device which can be paired with the electric device ED5 in the same period in a case where the electronic controller circuitry EC5 receives the fourth repairing response signal SG4R (step S40). The electronic controller circuitry EC5 executes pairing between the electric device ED5 and the fourth electric device ED4 in a case where the total number N is less than the maximum number NMAX (step S41). For example, the fourth pairing signal PS54 and the fourth pairing response signal PS4 are transmitted between the electric device ED5 and the fourth electric device ED4. The electronic controller circuitry EC5 increments the total number N by one after the electric device ED5 and the fourth electric device ED4 are paired (step S42).

Figure 46:
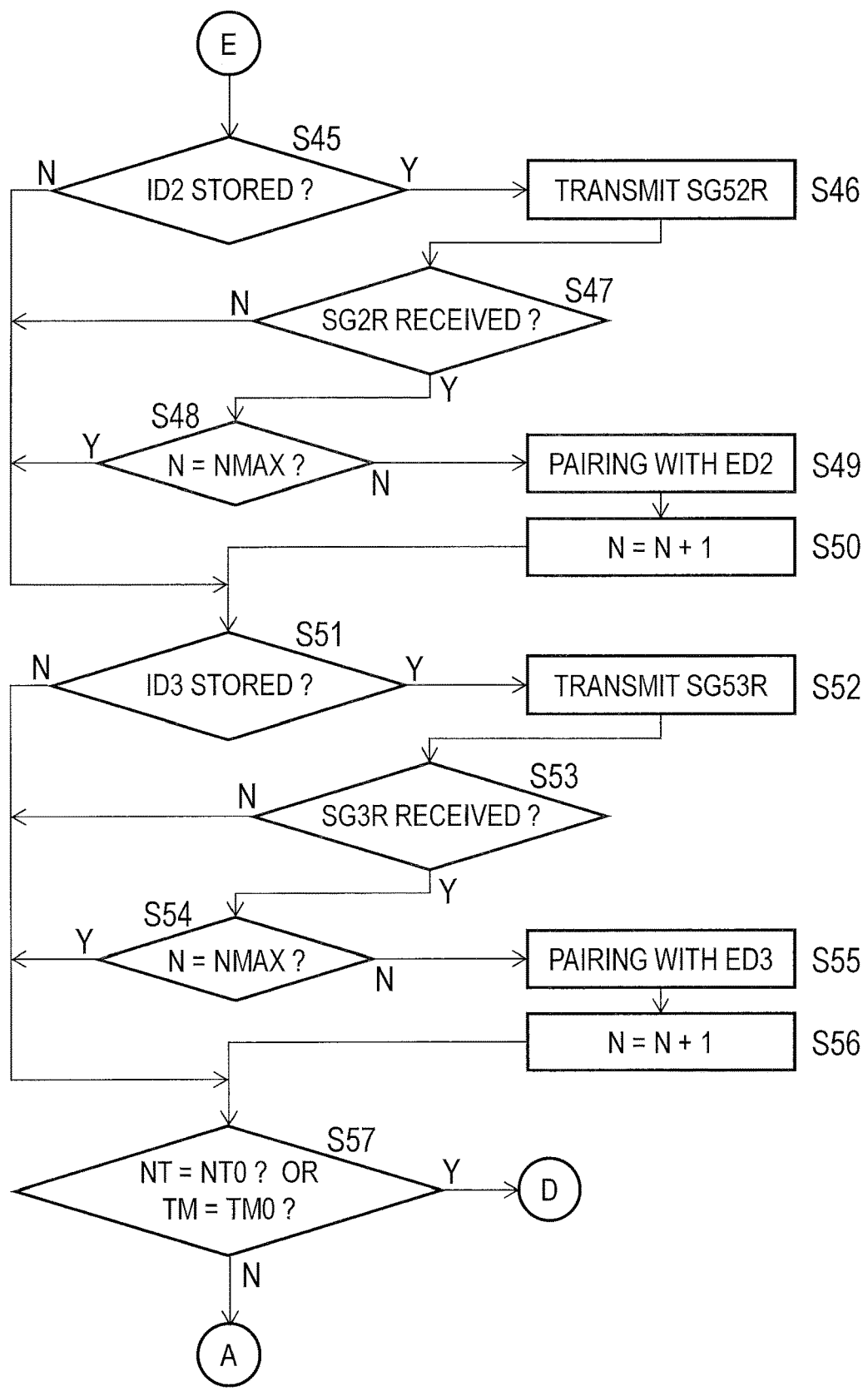

As seen in FIGS. 45 and 46, the process goes to the step S45 after the electronic controller circuitry EC5 increments the total number N by one in the step S39 or S42. The process goes to the step S45 in a case where at least one of the first pairing information ID1 and the fourth pairing information ID4 is not stored in the memory ED52 in the step S34 without transmitting the first repairing signal SG51R. The process goes to the step S45 in a case where the electronic controller circuitry EC5 receives neither the first response signal SG1 nor the fourth response signal SG4 in the step S36. The process goes to the step S45 in a case where the total number N reaches the maximum number NMAX in the step S37 without executing pairing between the electric device ED5 and the first electric device ED1. The process goes to the step S45 in a case where the total number N reaches the maximum number NMAX in the step S40 without executing pairing between the electric device ED5 and the fourth electric device ED4.

As seen in FIG. 46, the electronic controller circuitry EC5 determines whether pairing information which uses the second communication protocol is stored in the memory ED52 (step S45). For example, the electronic controller circuitry EC5 determines whether the second pairing information ID2 is stored in the memory ED52 (step S45). The electronic controller circuitry EC5 controls the wireless communicator circuitry WC5 to wirelessly transmit the second repairing signal SG52R in a case where the second pairing information ID2 is stored in the memory ED52 (step S46). The electronic controller circuitry EC5 determines whether the electronic controller circuitry EC5 receives the second repairing response signal SG2R via the wireless communicator circuitry WC5 after transmitting the second repairing signal SG52R (step S47).

The electronic controller circuitry EC5 determines whether the total number N reaches the maximum number NMAX of at least one electric device which can be paired with the electric device ED5 in the same period in a case where the electronic controller circuitry EC5 receives the second repairing response signal SG2R (step S48). The electronic controller circuitry EC5 executes pairing between the electric device ED5 and the second electric device ED2 in a case where the total number N is less than the maximum number NMAX (step S49). For example, the second pairing signal PS52 and the second pairing response signal PS2 are transmitted between the electric device ED5 and the second electric device ED2. The electronic controller circuitry EC5 increments the total number N by one after the electric device ED5 and the second electric device ED2 are paired (step S50).

The process goes to the step S51 after the electronic controller circuitry EC5 increments the total number N by one in the step S50. The process goes to the step S51 in a case where the second pairing information ID2 is not stored in the memory ED52 in the step S45 without transmitting the second repairing signal SG52R. The process goes to the step S51 in a case where the electronic controller circuitry EC5 does not receive the second repairing response signal SG2R in the step S47. The process goes to the step S51 in a case where the total number N reaches the maximum number NMAX in the step S48 without executing pairing with the second electric device ED2.

As seen in FIG. 46, the electronic controller circuitry EC5 determines whether pairing information which uses the third communication protocol is stored in the memory ED52 (step S51). For example, the electronic controller circuitry EC5 determines whether the third pairing information ID3 is stored in the memory ED52 (step S51). The electronic controller circuitry EC5 controls the wireless communicator circuitry WC5 to wirelessly transmit the third repairing signal SG53R in a case where the third pairing information ID3 is stored in the memory ED52 (step S52). The electronic controller circuitry EC5 determines whether the electronic controller circuitry EC5 receives the third repairing response signal SG3R via the wireless communicator circuitry WC5 after transmitting the third repairing signal SG53R (step S53).

The electronic controller circuitry EC5 determines whether the total number N reaches the maximum number NMAX of at least one electric device which can be paired with the electric device ED5 in the same period in a case where the electronic controller circuitry EC5 receives the third repairing response signal SG3R (step S54). The electronic controller circuitry EC5 executes pairing between the electric device ED5 and the third electric device ED3 in a case where the total number N is less than the maximum number NMAX (step S55). For example, the third pairing signal PS53 and the third pairing response signal PS3 are transmitted between the electric device ED5 and the third electric device ED3. The electronic controller circuitry EC5 increments the total number N by one after the electric device ED5 and the third electric device ED3 are paired (step S56).

The process goes to the step S57 after the electronic controller circuitry EC5 increments the total number N by one in the step S56. The process goes to the step S57 in a case where the third pairing information ID3 is not stored in the memory ED52 in the step S51 without transmitting the third repairing signal SG53R. The process goes to the step S57 in a case where the electronic controller circuitry EC5 does not receive the third repairing response signal SG3R in the step S53. The process goes to the step S57 in a case where the total number N reaches the maximum number NMAX in the step S54 without executing pairing with the third electric device ED3.

As seen in FIG. 46, the electronic controller circuitry EC5 determines whether the total number of times NT at which the steps S4 to S26 are executed reaches the reference number of times NT0 or whether an elapsed time TM reaches the reference period TM0 (step S57). The process returns to the step S34 and the steps S34 to S46 are executed in a case where the total number of times NT does not reach the reference number of times NT0 or where the elapsed time TM does not reach the reference period TM0 (step S57). The process returns to the step S1 in a case where the total number of times NT reaches the reference number of times NT0 or where the elapsed time TM reaches the reference period TM0 (step S57).

In the repairing process depicted in FIGS. 45 and 46, for example, in a case where one of the first pairing information ID1, the second pairing information ID2, the third pairing information ID3, and the fourth pairing information ID4 is stored in the memory EC52, corresponding one of the first signal SG51, the second signal SG52, the third signal SG53, and the fourth signal SG54 is wirelessly transmitted. Namely, the repairing process is used in a case where an initially paired electric device which has been paired with the electric device ED5 is replaced with another electric device which uses the same communication protocol as the communication protocol of the initially paired electric device.

Figure 47:
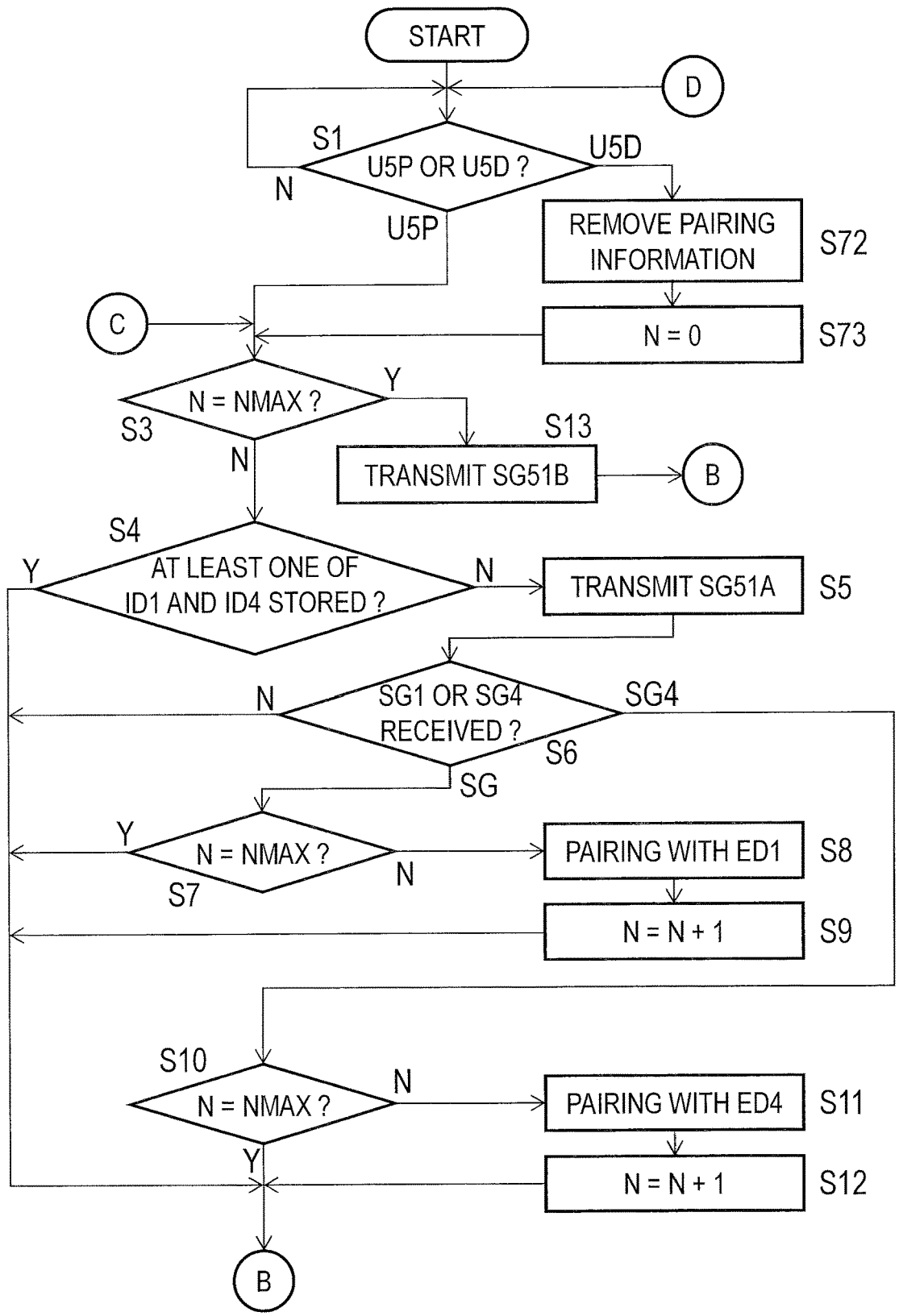
FIG. 47 is a flowchart showing the pairing and repairing processes between the electric devices of the control system in accordance with a modification.

As seen in FIG. 47, however, pairing information can be removed from the memory EC52 in the repairing process if needed or desired. For example, in a case where the user interface ED51 receives the repairing user input USD, the electronic controller circuitry EC5 removes pairing information of another electric device from the memory EC52 (step S72), and the electronic controller circuitry EC5 resets the total number N to zero (step S73). The electronic controller circuitry EC5 executes the steps S3 to S13 as with the pairing process depicted in FIG. 47 in a case where the user interface ED51 receives the pairing user input U5P. The electronic controller circuitry EC5 executes the steps S3 to S13 after resetting the total number N in a case where the user interface ED51 receives the repairing user input USD. Thus, it is possible to execute pairing after the reset of the stored pairing information.

Furthermore, in the process of FIG. 47, it is possible to execute, in response to the pairing user input U5P, pairing between the electric device ED5 and an additional electric device other than an initially paired electric device which has been paired with the electric device ED5.

Figure 48:
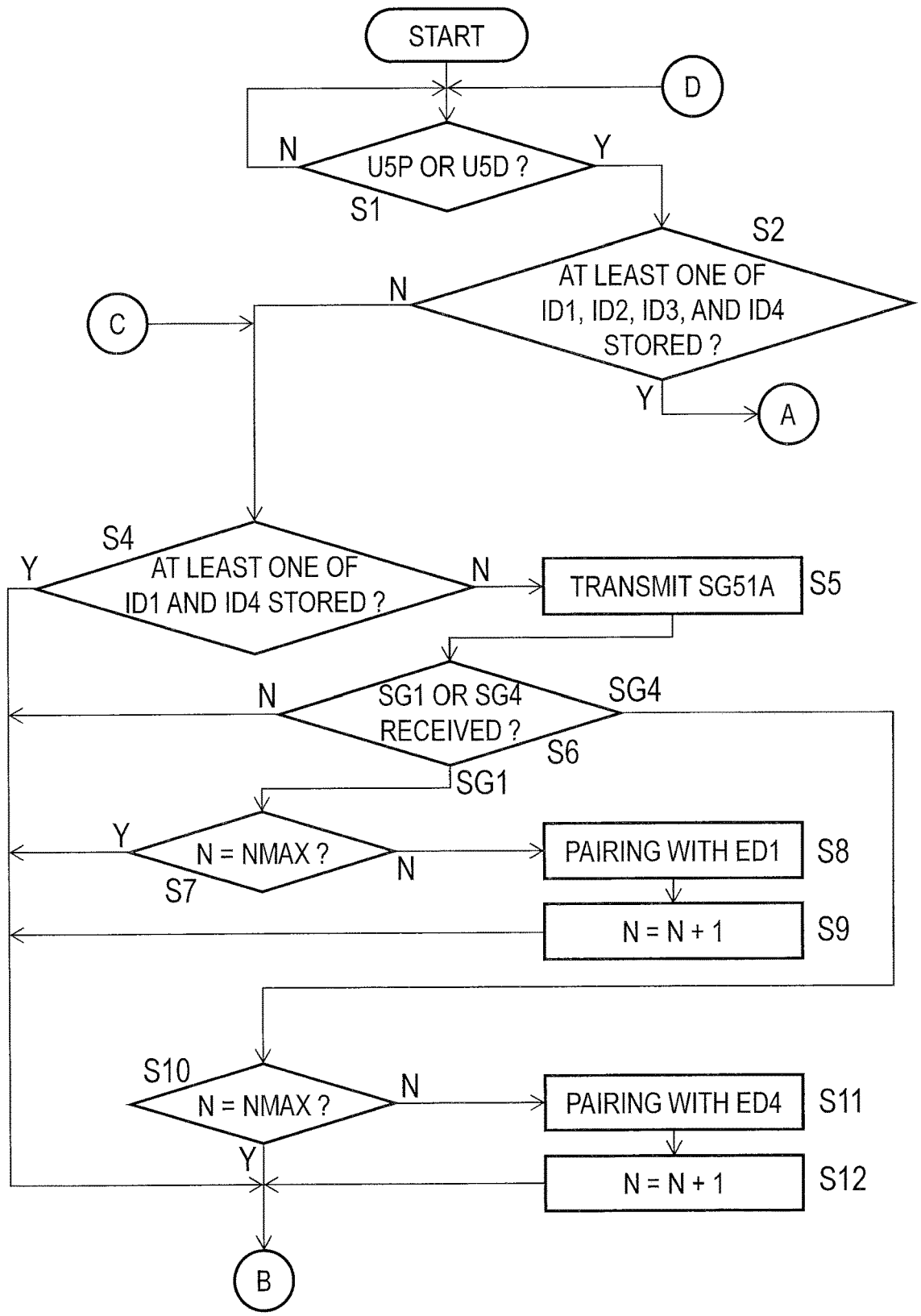
FIGS. 48 and 49 are flowcharts showing the pairing process between the electric devices of the control system in accordance with a modification.
Figure 49:
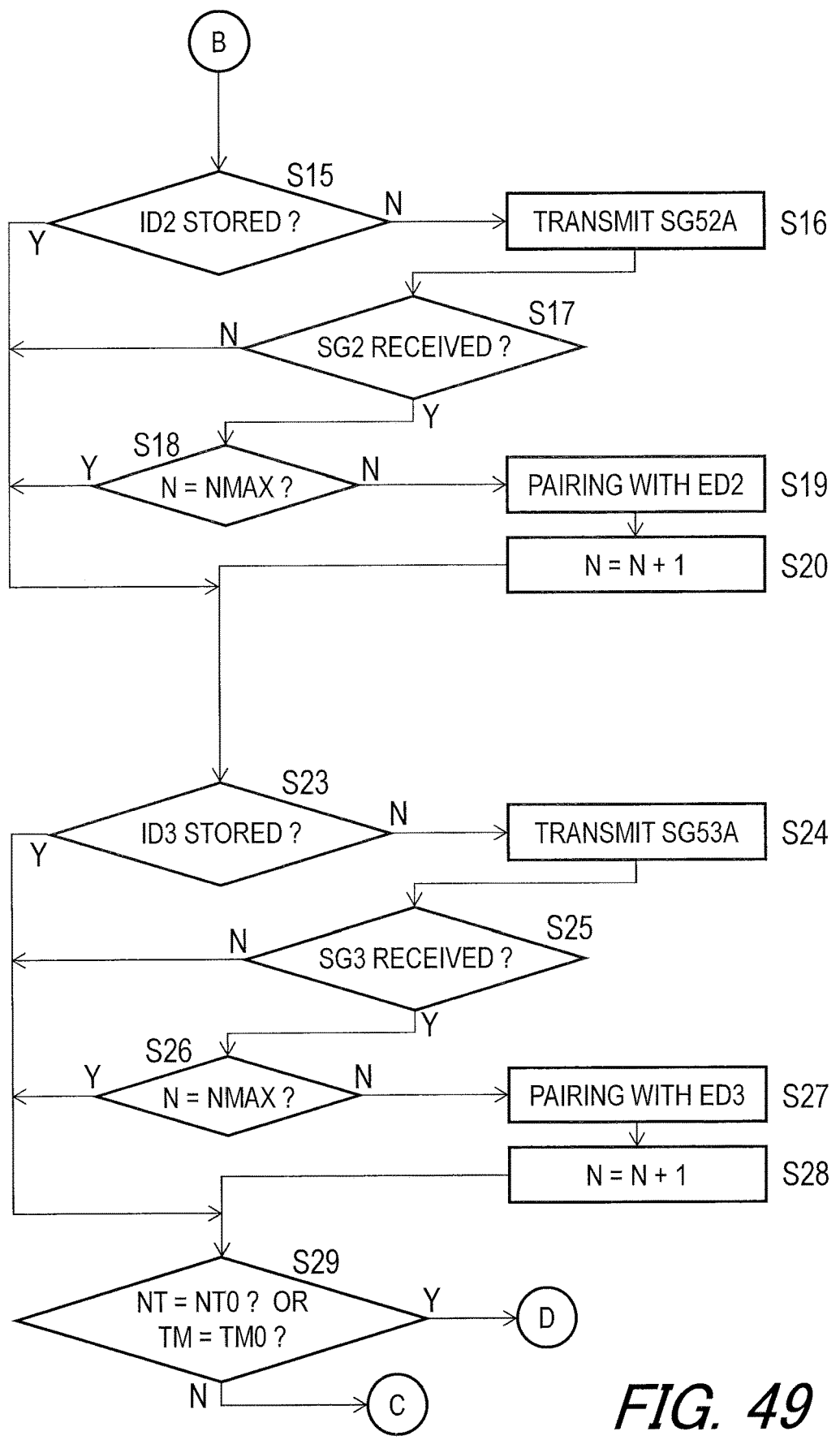

In the flowcharts depicted in FIGS. 43 and 44, the first restriction signal SG51B, the second restriction signal SG52B, and the third restriction signal SG53B are wirelessly transmitted in the steps S13, S21, and S30 in a case where the total number N reaches the maximum number NMAX. As seen in FIGS. 48 and 49, however, at least one of the steps S13, S21, and S30 can be omitted from the flowcharts if needed or desired. The flowcharts depicted in FIGS. 48 and 49 correspond to the modification depicted in FIGS. 35 to 38.

Figure 50:
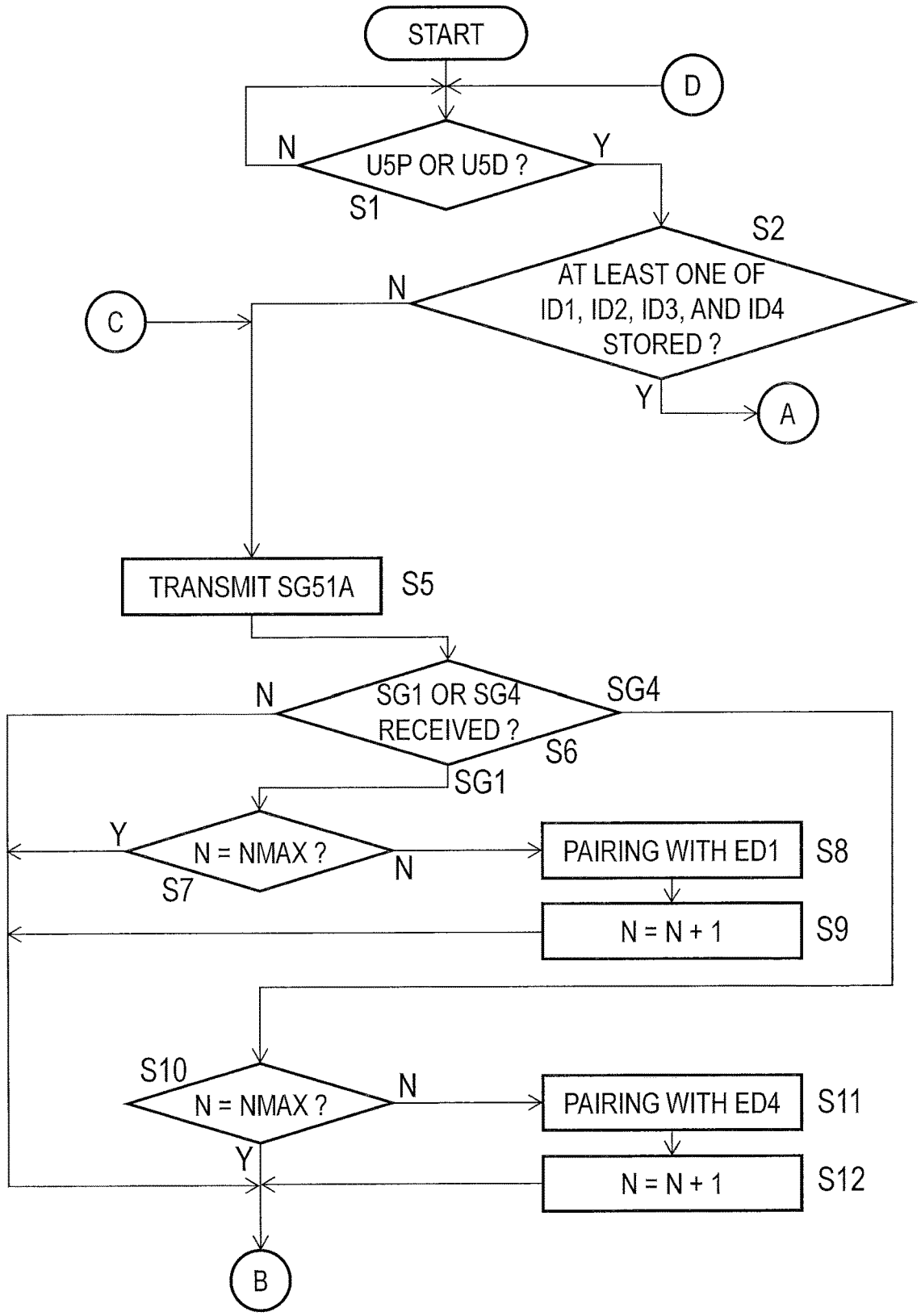
FIGS. 50 and 51 are flowcharts showing the pairing process between the electric devices of the control system in accordance with a modification.
Figure 51:
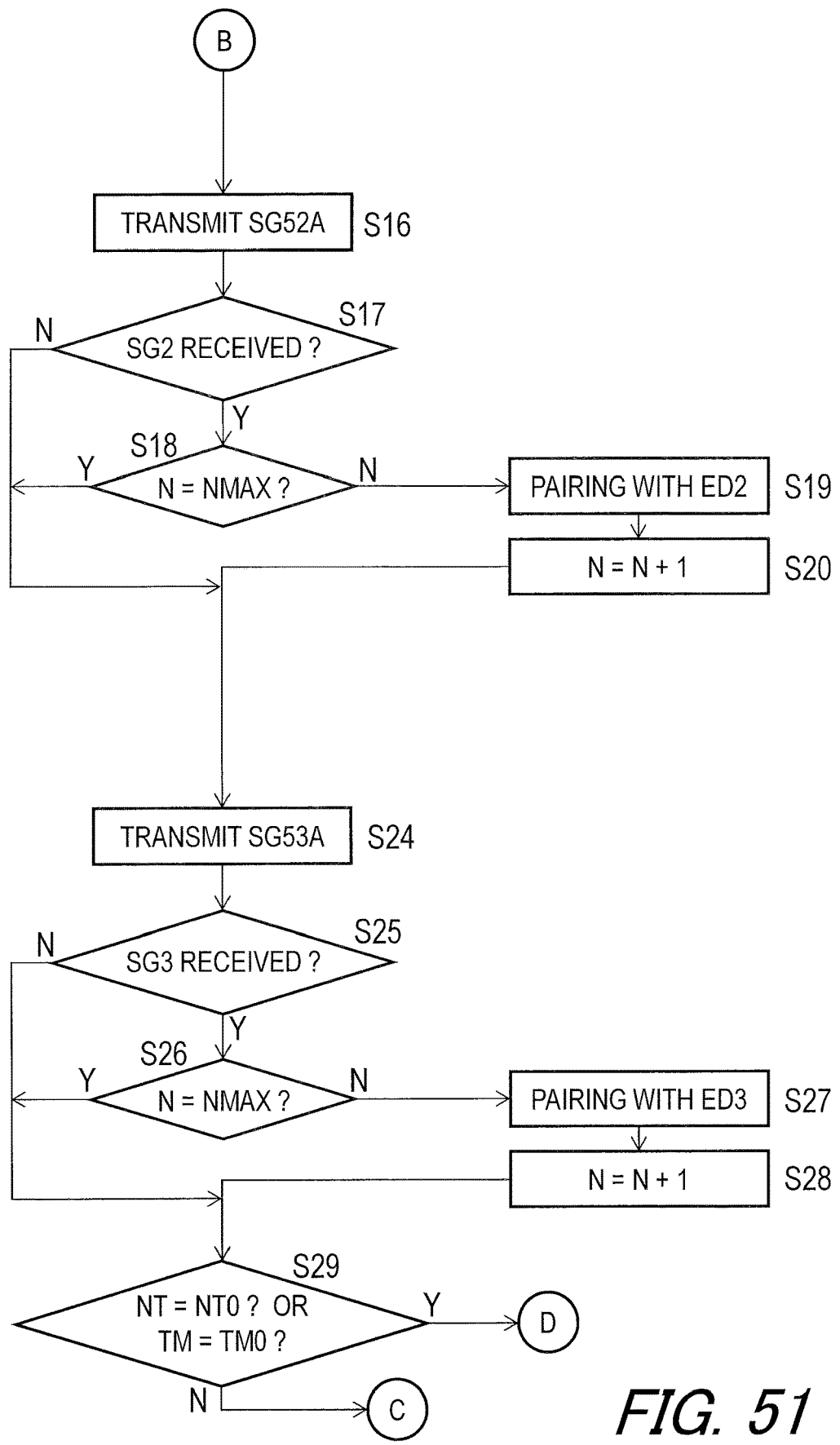

Furthermore, FIGS. 50 and 51 show the flowcharts corresponding to the modification depicted in FIGS. 39 to 42. In FIGS. 50 and 51, the steps S4, S15, and S23 are omitted from the flowcharts depicted in FIGS. 48 and 49.

In the embodiments and the modifications depicted in FIGS. 1 to 42 the maximum number NMAX is defined as a maximum number of at least one electric device which can be paired with the electric device ED5 in the same period using at least one of the first communication protocol, the second communication protocol, and the third communication protocol. The maximum number NMAX is shared between the first communication protocol, the second communication protocol, and the third communication protocol. However, the maximum number NMAX can be set regarding each of at least one of the first communication protocol, the second communication protocol, and the third communication protocol if needed or desired. For example, a first maximum number can be set regarding the first communication protocol. A second maximum number can be set regarding the second communication protocol. A third maximum number can be set regarding the third communication protocol. Furthermore, at least one of the first communication protocol, the second communication protocol, and the third communication protocol can be free of a maximum number of at least one electric device which can be paired with the electric device ED5 in the same period.

Figure 52:
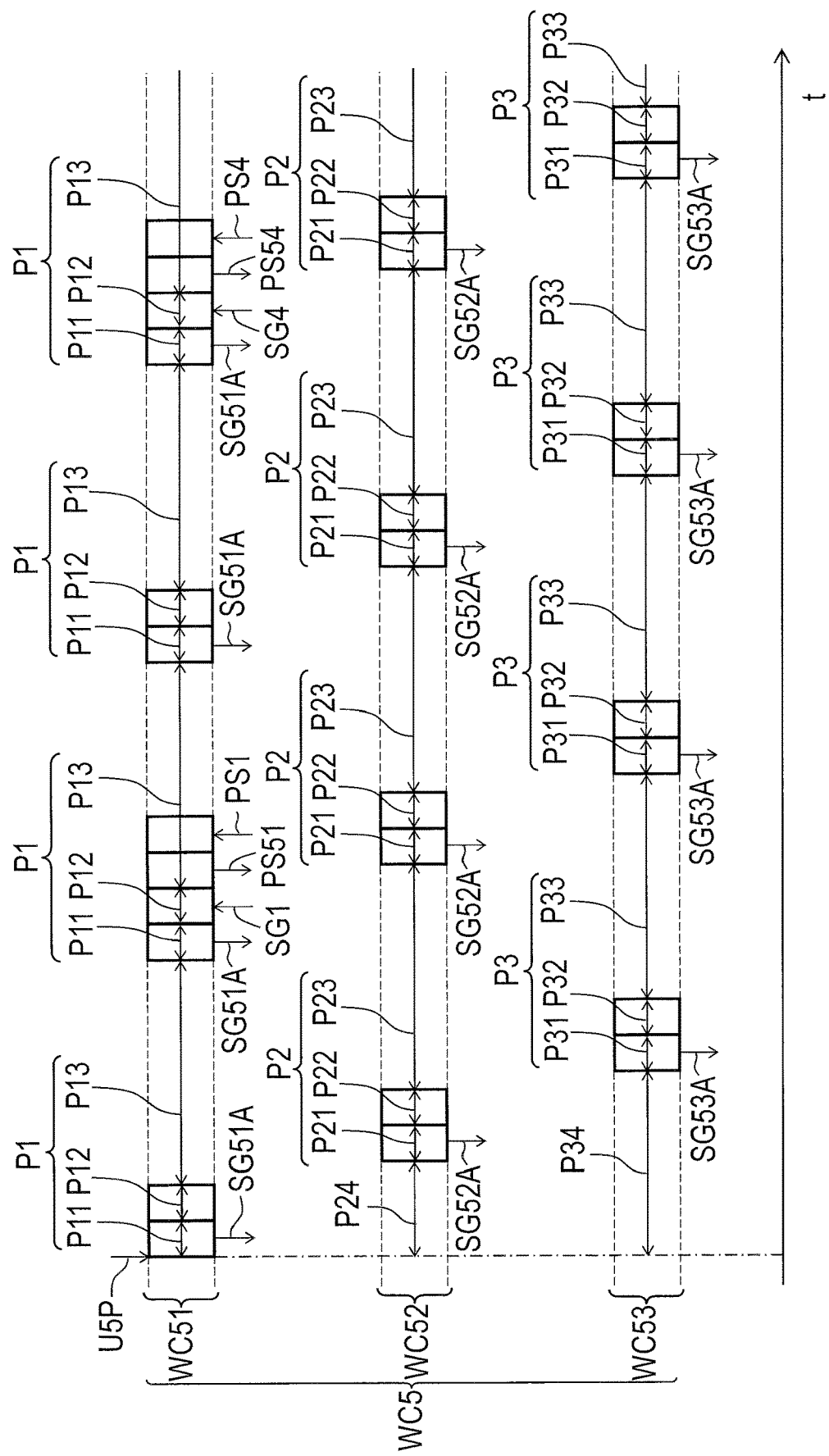
FIG. 52 is a schematic time chart showing the pairing process of the electric device in accordance with a modification in a case where the electric device is paired with the first electric device and the fourth electric device.
Figure 53:
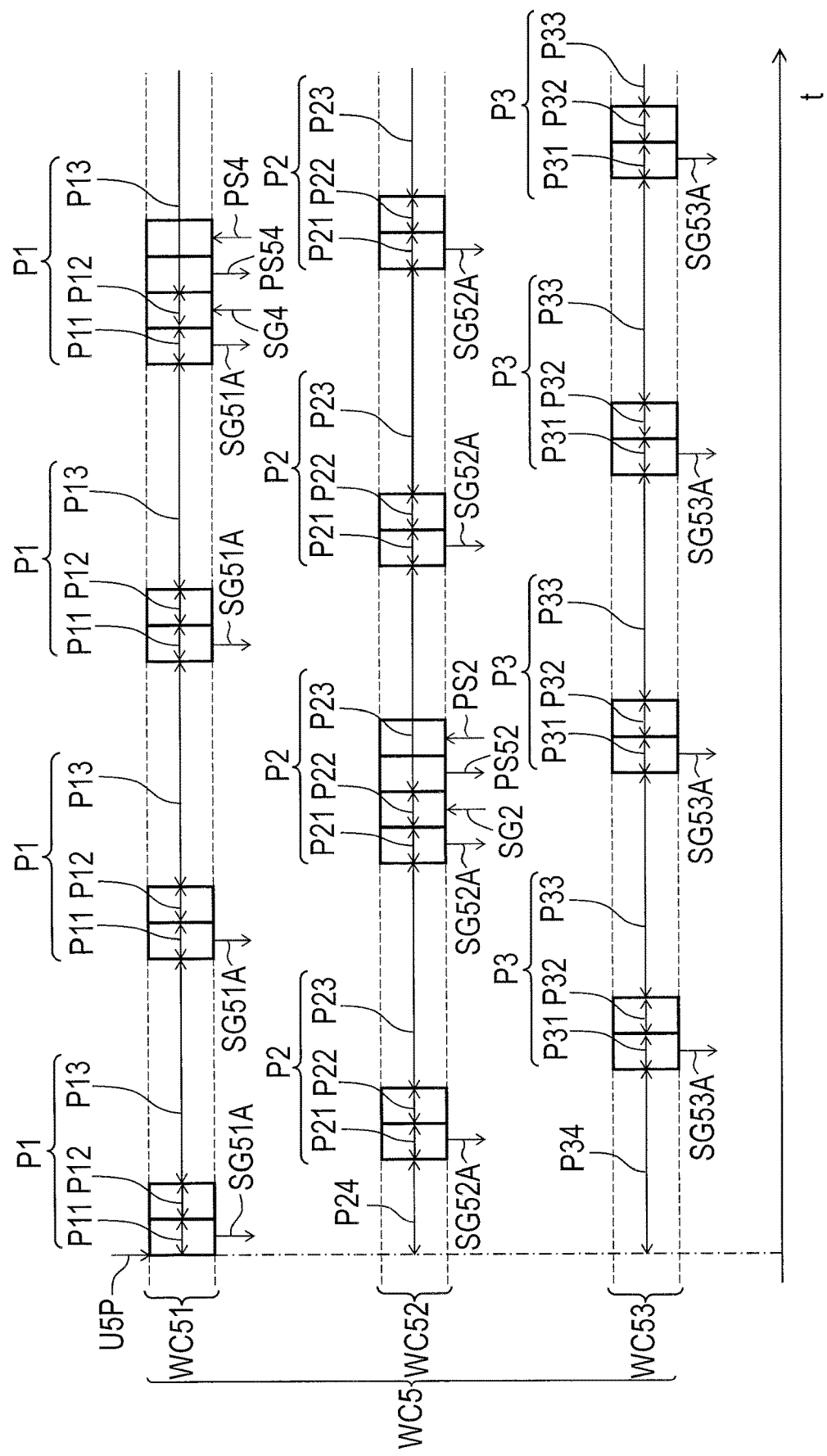
FIG. 53 is a schematic time chart showing the pairing process of the electric device in accordance with a modification in a case where the electric device is paired with the second electric device and the fourth electric device.
Figure 54:
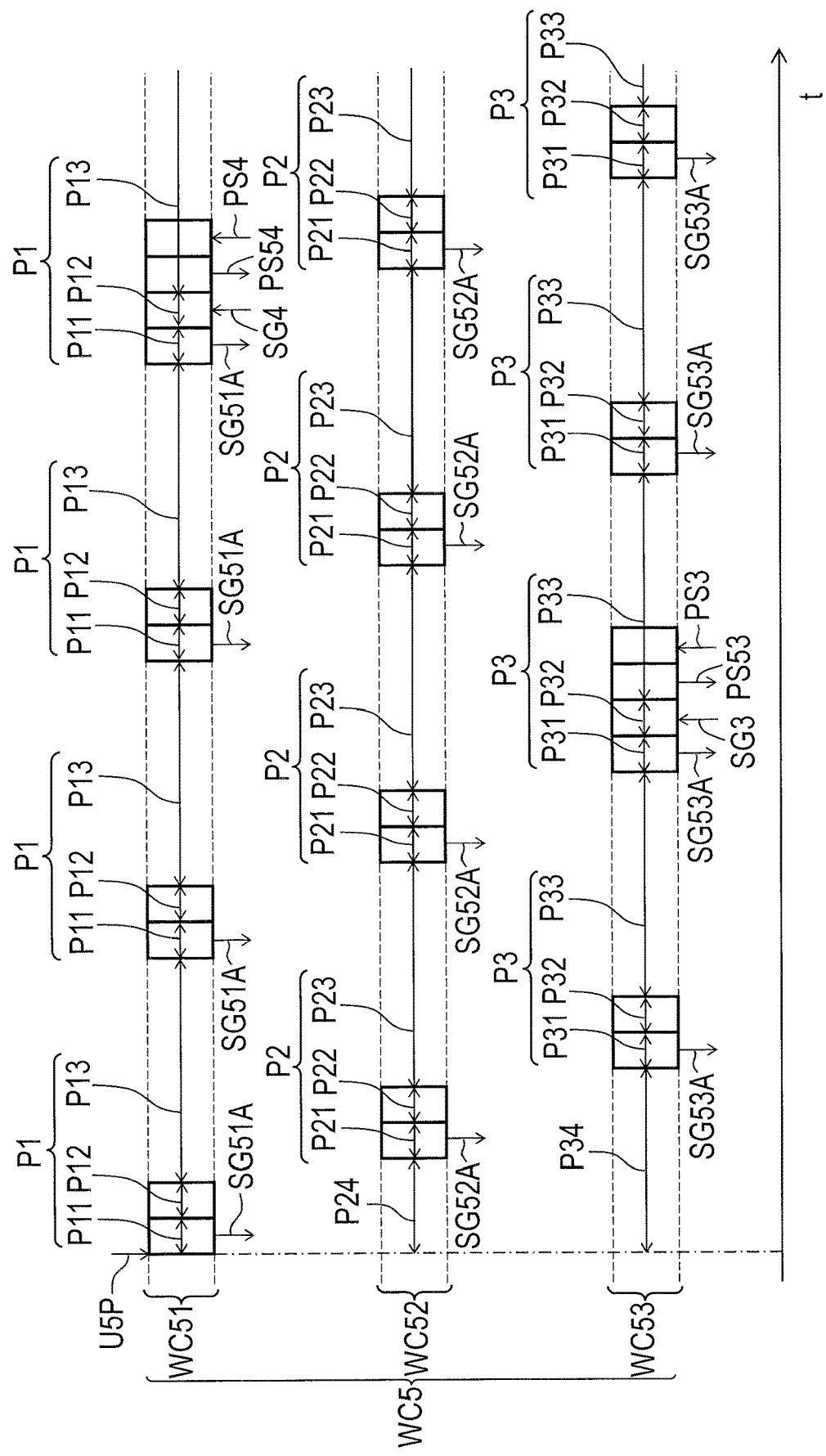
FIG. 54 is a schematic time chart showing the pairing process of the electric device in accordance with a modification in a case where the electric device is paired with the third electric device and the fourth electric device.

A predetermined electric device can be paired with the electric device ED5 regardless of the maximum number NMAX if needed or desired. As seen in FIGS. 52 to 55, for example, the fourth electric device ED4 can be paired with the electric device ED5 regardless of the maximum number NMAX while the maximum number NMAX is one. In the flowcharts depicted in FIG. 55, the steps S10 and S12 are omitted from the flowchart depicted in FIG. 50. The combination of the flowcharts depicted in FIGS. 51 and 55 correspond to the modification depicted in FIGS. 52 to 54. In FIG. 52, after the electric device ED5 is paired with the first electric device ED1, the electrical controller circuitry EC5 keeps transmitting the first request signal SG51A to allow the electric device ED5 to be paired with the fourth electric device ED4. In FIG. 53, after the electric device ED5 is paired with the second electric device ED2, the electrical controller circuitry EC5 keeps transmitting the first request signal SG51A to allow the electric device ED5 to be paired with the fourth electric device ED4. In FIG. 54, after the electric device ED5 is paired with the third electric device ED3, the electrical controller circuitry EC5 keeps transmitting the first request signal SG51A to allow the electric device ED5 to be paired with the fourth electric device ED4. The predetermined electric device can be set by the user via the user interface ED51 or another electric device. At least one of the first electric device ED1, the second electric device ED2, the third electric device ED3, and the fourth electric device ED4 can be the predetermined electric device.

Figure 55:
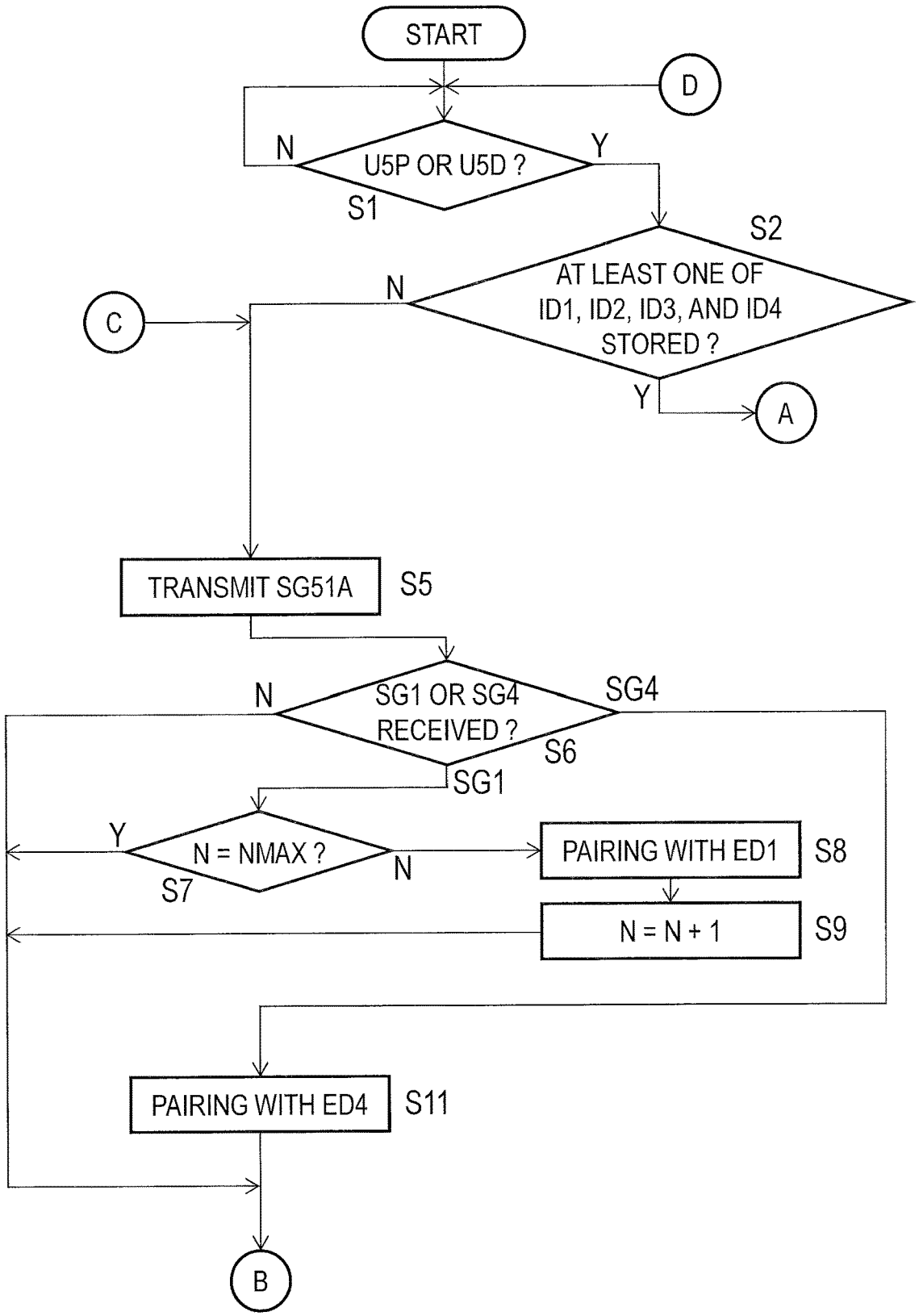
FIG. 55 is a flowchart showing the pairing process between the electric devices of the control system in accordance with a modification.

In FIG. 55, in a case where the electronic controller circuitry EC5 detects the fourth response signal SG4 in the step S6, the electronic controller circuitry EC5 executes pairing between the electric device ED5 and the fourth electric device ED4. The electronic controller circuitry EC5 stores information relating to the predetermined electric device in advance before pairing. For example, the electronic controller circuitry EC5 stores the information relating to the predetermined electric device before shipment. The information can be input by the user via the user interface ED51 or another electric device. In a case where the predetermined electric device includes the fourth electric device ED4, the information includes the fourth identification information indicative of the fourth electric device ED4.

Figure 56:
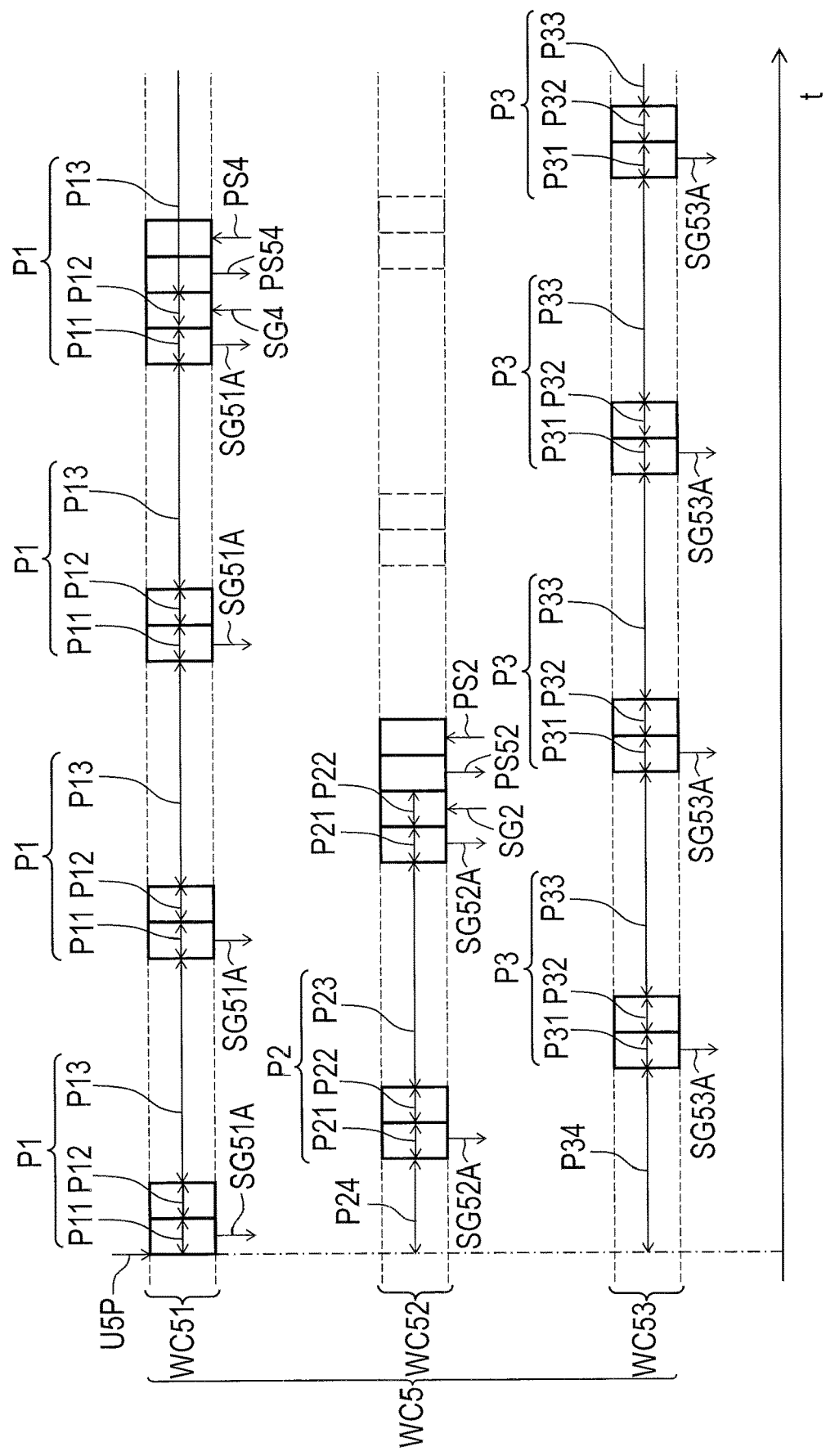
FIG. 56 is a schematic time chart showing the pairing process of the electric device in accordance with a modification in a case where the electric device is paired with the second electric device and the fourth electric device.
Figure 57:
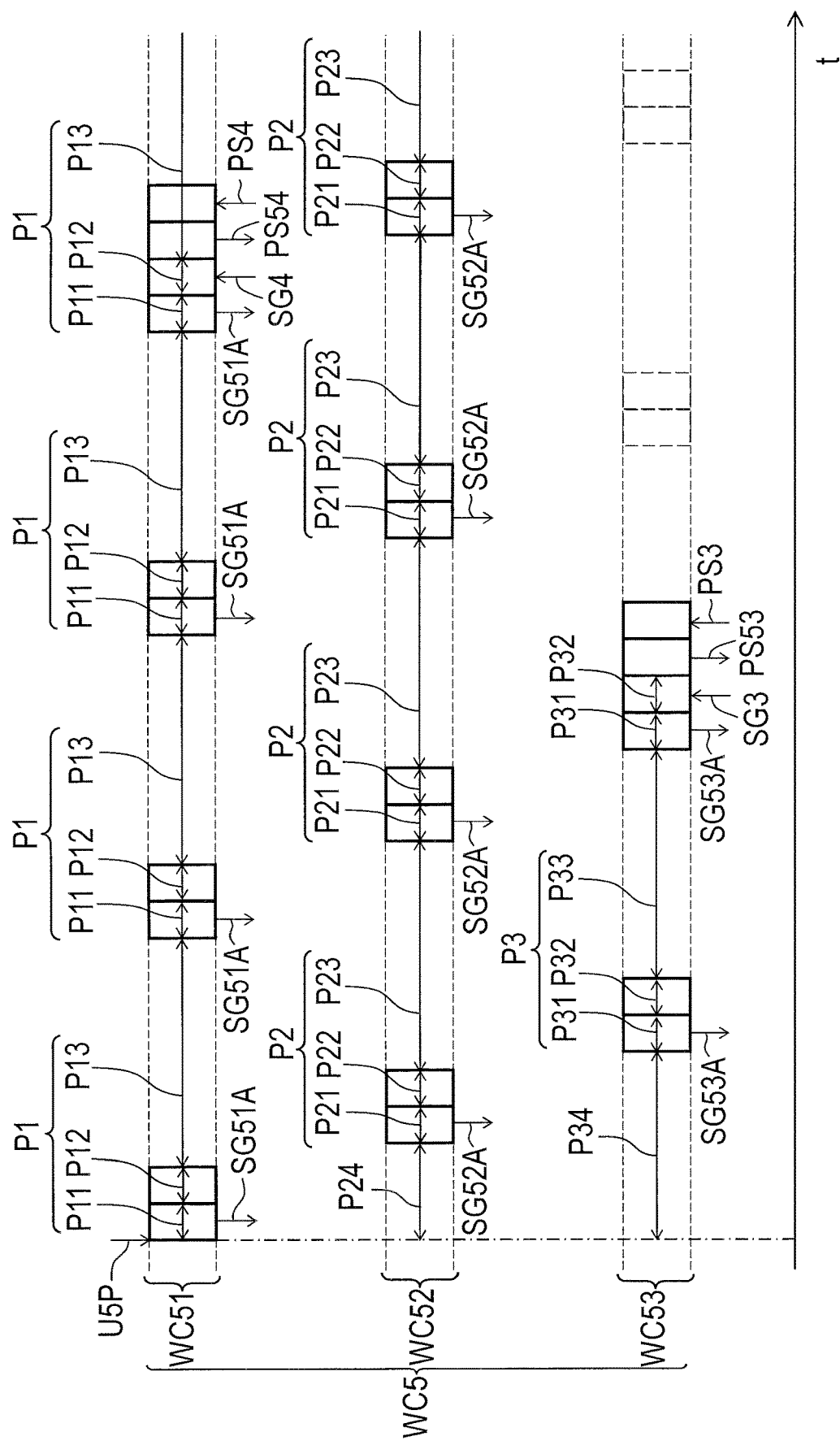
FIG. 57 is a schematic time chart showing the pairing process of the electric device in accordance with a modification in a case where the electric device is paired with the third electric device and the fourth electric device.

The flowchart depicted in FIG. 55 can be combined with the flowchart depicted in FIG. 49 if needed or desired. The combination of the flowcharts depicted in FIGS. 49 and 55 correspond to the modification depicted in FIGS. 52, 56, and 57. In FIG. 52, after the electric device ED5 is paired with the first electric device ED1, the electrical controller circuitry EC5 keeps transmitting the first request signal SG51A to allow the electric device ED5 to be paired with the fourth electric device ED4. In FIG. 56, after the electric device ED5 is paired with the second electric device ED2, the electronic controller circuitry EC5 stops transmitting the second request signal SG52A but keeps transmitting the first request signal SG51A to allow the electric device ED5 to be paired with the fourth electric device ED4. In FIG. 57, after the electric device ED5 is paired with the third electric device ED3, the electrical controller circuitry EC5 stops transmitting the third request signal SG53A but keeps transmitting the first request signal SG51A to allow the electric device ED5 to be paired with the fourth electric device ED4.

The flowchart depicted in FIG. 55 can be combined with the flowchart depicted in FIG. 44 if needed or desired. In the combination of the flowcharts depicted in FIGS. 44 and 55, the fourth electric device ED4 can be paired with the electric device ED5 regardless of the maximum number NMAX while the electronic controller circuitry EC5 controls the wireless communicator circuitry WC5 to wirelessly transmit the second restriction signal SG52B or the third restriction signal SG53B in a case where the total number N reaches the maximum number NMAX.

In a case where the fourth electric device ED4 corresponds to the external device SP, as seen in FIG. 5, the electronic controller circuitry EC5 is configured to control the wireless communicator circuitry WC5 to wirelessly communicate with the external device SP using the first communication protocol. As seen in FIGS. 52 and 55, the electronic controller circuitry EC5 is configured to control the wireless communicator circuitry WC5 to wirelessly transmit the first signal SG51 repeatedly using the first communication protocol at the first number of times or for the first period regardless of receipt of the first response signal SG1. The electronic controller circuitry EC5 is configured to control the wireless communicator circuitry WC5 to wirelessly transmit the first request signal SG51A repeatedly using the first communication protocol at the first number of times or for the first period regardless of receipt of the first response signal SG1 after the electric device ED5 is paired with the first electric device ED1. Thus, the electric device ED5 can be paired with both the first electric device ED1 and the fourth electric device ED4 provided as the external device SP using the first communication protocol.

As seen in FIGS. 53, 55, and 56, the electronic controller circuitry EC5 is configured to control the wireless communicator circuitry WC5 to wirelessly transmit the first signal SG51 repeatedly using the first communication protocol at the first number of times or for the first period regardless of receipt of the second response signal SG2. The electronic controller circuitry EC5 is configured to control the wireless communicator circuitry WC5 to wirelessly transmit the first request signal SG51A repeatedly using the first communication protocol at the first number of times or for the first period regardless of receipt of the second response signal SG2 after the electric device ED5 is paired with the second electric device ED2. Thus, the electric device ED5 can be paired with both the second electric device ED2 and the fourth electric device ED4 provided as the external device SP using the first communication protocol.

As seen in FIGS. 54, 55, and 57, the electronic controller circuitry EC5 is configured to control the wireless communicator circuitry WC5 to wirelessly transmit the first signal SG51 repeatedly using the first communication protocol at the first number of times or for the first period regardless of receipt of the third response signal SG3. The electronic controller circuitry EC5 is configured to control the wireless communicator circuitry WC5 to wirelessly transmit the first request signal SG51A repeatedly using the first communication protocol at the first number of times or for the first period regardless of receipt of the third response signal SG3 after the electric device ED5 is paired with the third electric device ED3. Thus, the electric device ED5 can be paired with both the third electric device ED3 and the fourth electric device ED4 provided as the external device SP using the first communication protocol.

The embodiments and the modifications depicted in FIGS. 1 to 57 correspond to a case where the maximum number NMAX is one.

As seen in FIGS. 58 to 60, however, the maximum number NMAX can be two or more in the embodiment depicted in FIGS. 7 to 10 and the modification depicted in FIGS. 23 to 26 if needed or desired. The patterns PT11, PT12, PT13, PT21, PT22, PT23, PT31, PT32, PT33, PT41, PT42, and PT43 depicted in FIGS. 58 to 60 correspond to a case where the maximum number NMAX is two. In each of the patterns PT11, PT12, PT13, PT21, PT22, PT23, PT31, PT32, PT33, PT41, PT42, and PT43 depicted in FIGS. 58 to 60, after the electric device ED5 is paired with one of the first electric device ED1, the second electric device ED2, the third electric device ED3, and the fourth electric device ED4, the electronic controller circuitry EC5 controls the wireless communicator circuitry WC5 to keep wirelessly transmitting at least one of the first request signal SG51A, the second request signal SG52A, and the third request signal SG53A, and then the electric device ED5 is paired with another of the first electric device ED1, the second electric device ED2, the third electric device ED3, and the fourth electric device ED4.

In the pattern PT11 depicted in FIG. 58, for example, as seen in FIG. 8, the electronic controller circuitry EC5 is configured to be paired, after receipt of the first response signal SG1, with the second electric device ED2 based on the second response signal SG2. The electric device ED5 is paired with the first electric device ED1 and the second electric device ED2 in the same period.

In a case where the maximum number NMAX is three, as with the patterns PT11 to PT33, after the electric device ED5 is paired with one of the first electric device ED1, the second electric device ED2, the third electric device ED3, and the fourth electric device ED4, the electric device ED5 is paired with another of the first electric device ED1, the second electric device ED2, the third electric device ED3, and the fourth electric device ED4, and the electric device ED5 is paired with yet another of the first electric device ED1, the second electric device ED2, the third electric device ED3, and the fourth electric device ED4.

Furthermore, as seen in FIGS. 61 to 63, the modification depicted in FIGS. 35 to 38 can be applied to the modification depicted in FIGS. 58 to 60. The patterns PT11A, PT12A, PT13A, PT21A, PT22A, PT23A, PT31A, PT32A, PT33A, PT41A, PT42A, and PT43A depicted in FIGS. 61 to 63 correspond to the case where the maximum number NMAX is two. In each of the patterns PT11A, PT12A, PT13A, PT21A, PT22A, PT23A, PT31A, PT32A, PT33A, PT41A, PT42A, and PT43A depicted in FIGS. 61 to 63, after the electric device ED5 is paired with one of the first electric device ED1, the second electric device ED2, the third electric device ED3, and the fourth electric device ED4, the electronic controller circuitry EC5 controls the wireless communicator circuitry WC5 to keep wirelessly transmitting at least one of the first request signal SG51A, the second request signal SG52A, and the third request signal SG53A, and then the electric device ED5 is paired with another of the first electric device ED1, the second electric device ED2, the third electric device ED3, and the fourth electric device ED4. After the electric device ED5 is paired with two of the first electric device ED1, the second electric device ED2, the third electric device ED3, and the fourth electric device ED4, the electronic controller circuitry EC5 controls the wireless communicator circuitry WC5 to wirelessly transmit at least one of the first restriction signal SG51R, the second restriction signal SG52R, and the third restriction signal SG53R.

In a case where the maximum number NMAX is three, as with the patterns PT11A to PT43A depicted in FIGS. 61 to 63, after the electric device ED5 is paired with three of the first electric device ED1, the second electric device ED2, the third electric device ED3, and the fourth electric device ED4, the electronic controller circuitry EC5 controls the wireless communicator circuitry WC5 to wirelessly transmit at least one of the first restriction signal SG51R, the second restriction signal SG52R, and the third restriction signal SG53R.

In the embodiments and the modifications depicted in FIGS. 1 to 63, the electronic controller circuitry EC5 is configured to control the wireless communicator circuitry WC5 to wirelessly transmit one of the first repairing signal SG51R, the second repairing signal SG52R, and the third repairing signal SG53R without transmitting another of the first repairing signal SG51R, the second repairing signal SG52R, and the third repairing signal SG53R in response to the repairing user input USD in the case where the maximum number NMAX is one and where the electric device ED5 is paired with one of the first electric device ED1, the second electric device ED2, the third electric device ED3, and the fourth electric device ED4. As seen in FIG. 64, however, in a case where the maximum number NMAX is two and where the electric device ED5 is paired with two of the first electric device ED1, the second electric device ED2, the third electric device ED3, and the fourth electric device ED4, the electronic controller circuitry EC5 can be configured to control the wireless communicator circuitry WC5 to wirelessly transmit two of the first repairing signal SG51R, the second repairing signal SG52R, and the third repairing signal SG53R without transmitting another of the first repairing signal SG51R, the second repairing signal SG52R, and the third repairing signal SG53R in response to the repairing user input USD. The same can be applied to a case where the maximum number NMAX is three or more.

Furthermore, as seen in FIG. 65, in a case where the electric device ED5 has been paired with at least one of the first electric device ED1, the second electric device ED2, the third electric device ED3, and the fourth electric device ED4, the electronic controller circuitry EC5 can be configured to control the wireless communicator circuitry WC5 to be free of wireless transmission of at least one of the first repairing signal SG51R, the second repairing signal SG52R, and the third repairing signal SG53R corresponding to the at least one of the first electric device ED1, the second electric device ED2, the third electric device ED3, and the fourth electric device ED4 if needed or desired. In the modifications depicted in FIG. 65, in a case where the electric device ED5 has been paired with the third electric device ED3, the electronic controller circuitry EC5 is configured to control the wireless communicator circuitry WC5 to be free of wireless transmission of the third repairing signal SG53R in response to the repairing user input USD. For example, the electronic controller circuitry EC5 is configured to determine a non-repairing electric device based on non-repairing information stored in the memory EC52. The non-repairing information can be stored in the memory EC52 before shipment. The non-repairing information can be set or changed based on a user operation via the user interface ED11 or another device such as the external device SP.

Figure 66:
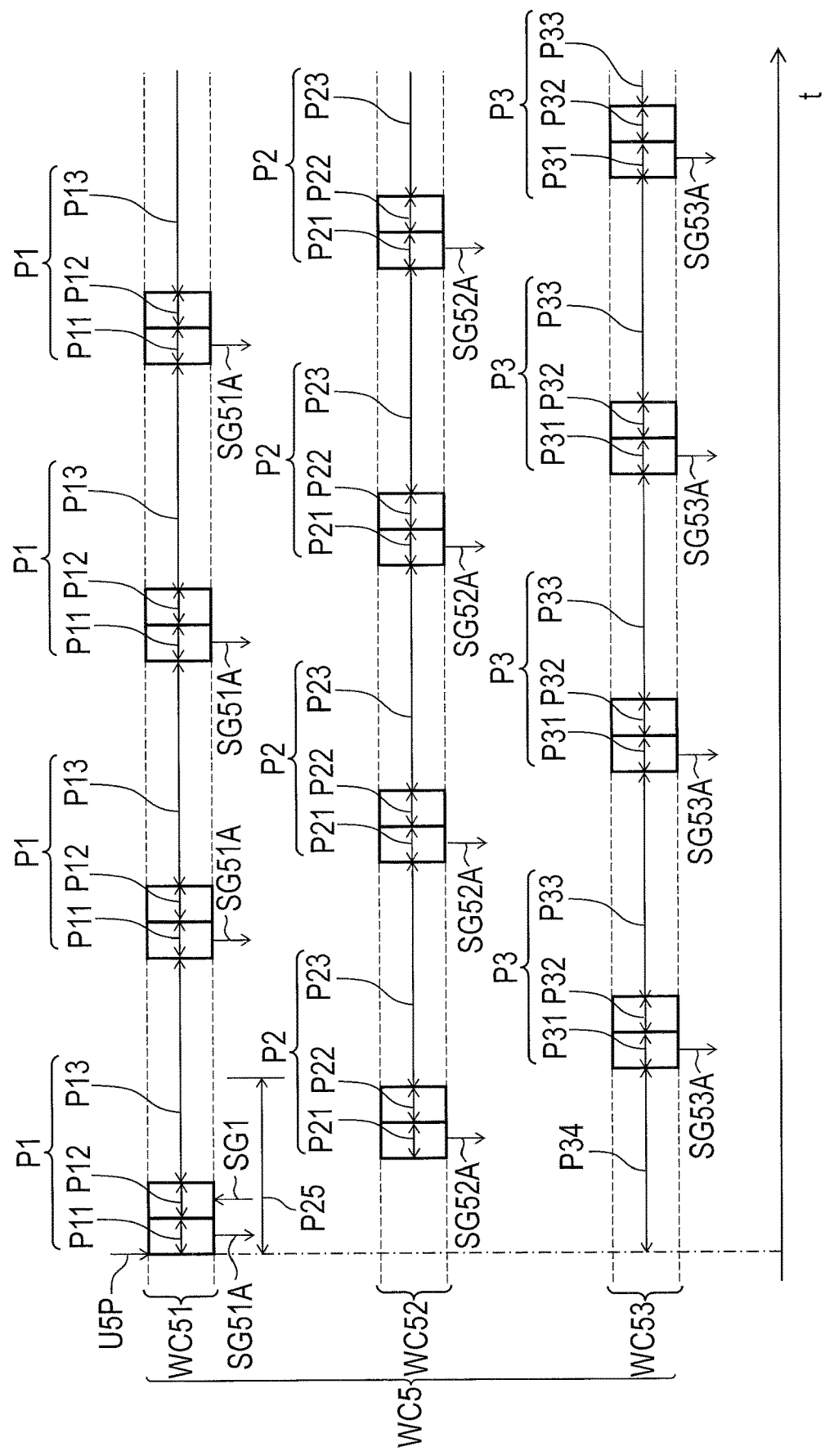
FIG. 66 is a schematic time chart showing the pairing process between the electric devices in accordance with a modification.

In the embodiments and the modifications depicted in FIGS. 1 to 65, the electronic controller circuitry EC5 is configured to control the wireless communicator circuitry WC5 to wirelessly transmit the second signal SG52 using the second communication protocol in the case where the second waiting period P24 elapses from the pairing user input U5P. As seen in FIG. 66, however, the electronic controller circuitry EC5 can be configured to control the wireless communicator circuitry WC5 to wirelessly transmit the second signal SG52 using the second communication protocol in a case where the electronic controller circuitry EC5 receives the first response signal SG1 before a predetermined period P25 elapses from the pairing user input U5P. The same can be applied to the third signal SG53 or each of the above-mentioned modifications.

In the embodiments and the modifications depicted in FIGS. 1 to 66, the electronic controller circuitry EC5 is configured to control the wireless communicator circuitry WC5 to start wireless transmission of the second signal SG52 or the third signal SG53 in response to the pairing user input U5P at the timing different from the timing of the start of the wireless transmission of the first signal SG51. The electronic controller circuitry EC5 is configured to control the wireless communicator circuitry WC5 to start wireless transmissions of the first signal SG51, the second signal SG52, and the third signal SG53 in this order. However, the electronic controller circuitry EC5 can be configured to control the wireless communicator circuitry WC5 to start wireless transmissions of the first signal SG51, the second signal SG52, and the third signal SG53 in another order different from the above order if needed or desired. Furthermore, as seen in FIG. 67, the electronic controller circuitry EC5 can be configured to control the wireless communicator circuitry WC5 to start wireless transmission of at least one of the first signal SG51, the second signal SG52, and the third signal SG53 in response to the pairing user input USP at the same timing as the timing of the start of the wireless transmission of another of the first signal SG51, the second signal SG52, and the third signal SG53 if needed or desired.

Figure 67:
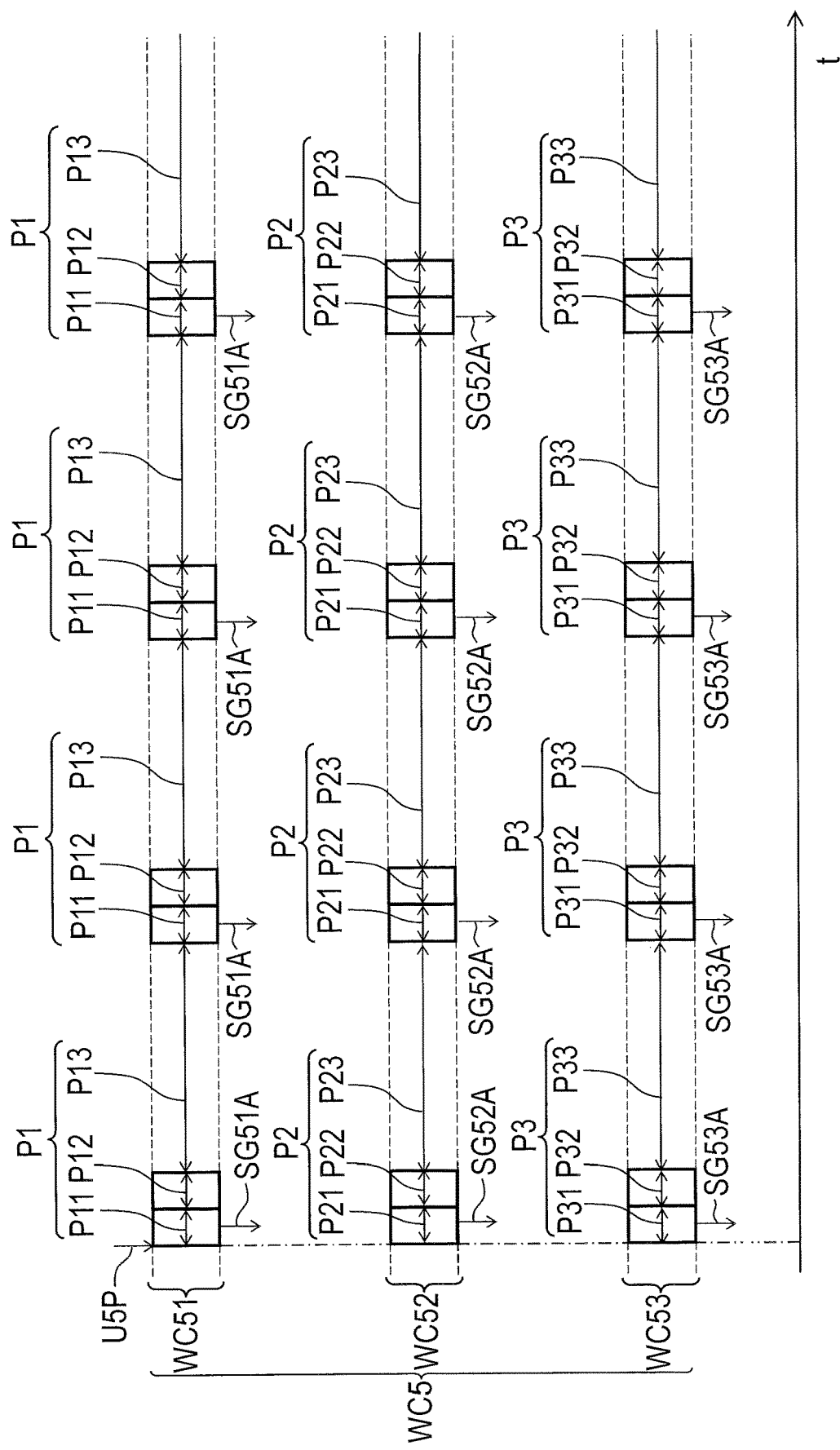
FIG. 67 is a schematic time chart showing the pairing process between the electric devices in accordance with a modification.
Figure 68:
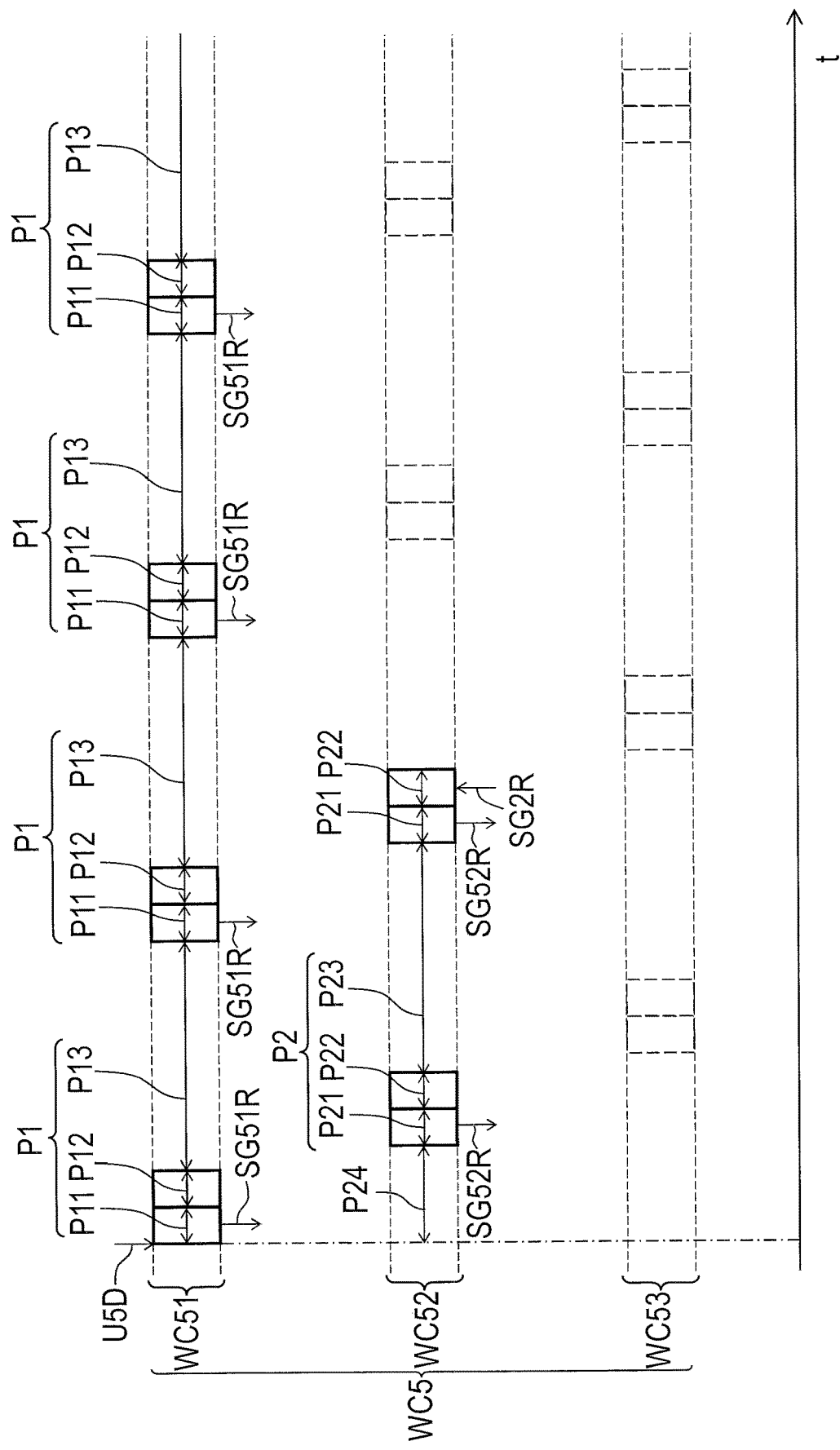
FIG. 68 is a schematic time chart showing the repairing process of the electric device in accordance with a modification in a case where the electric device is paired with the second electric device.
Figure 69:
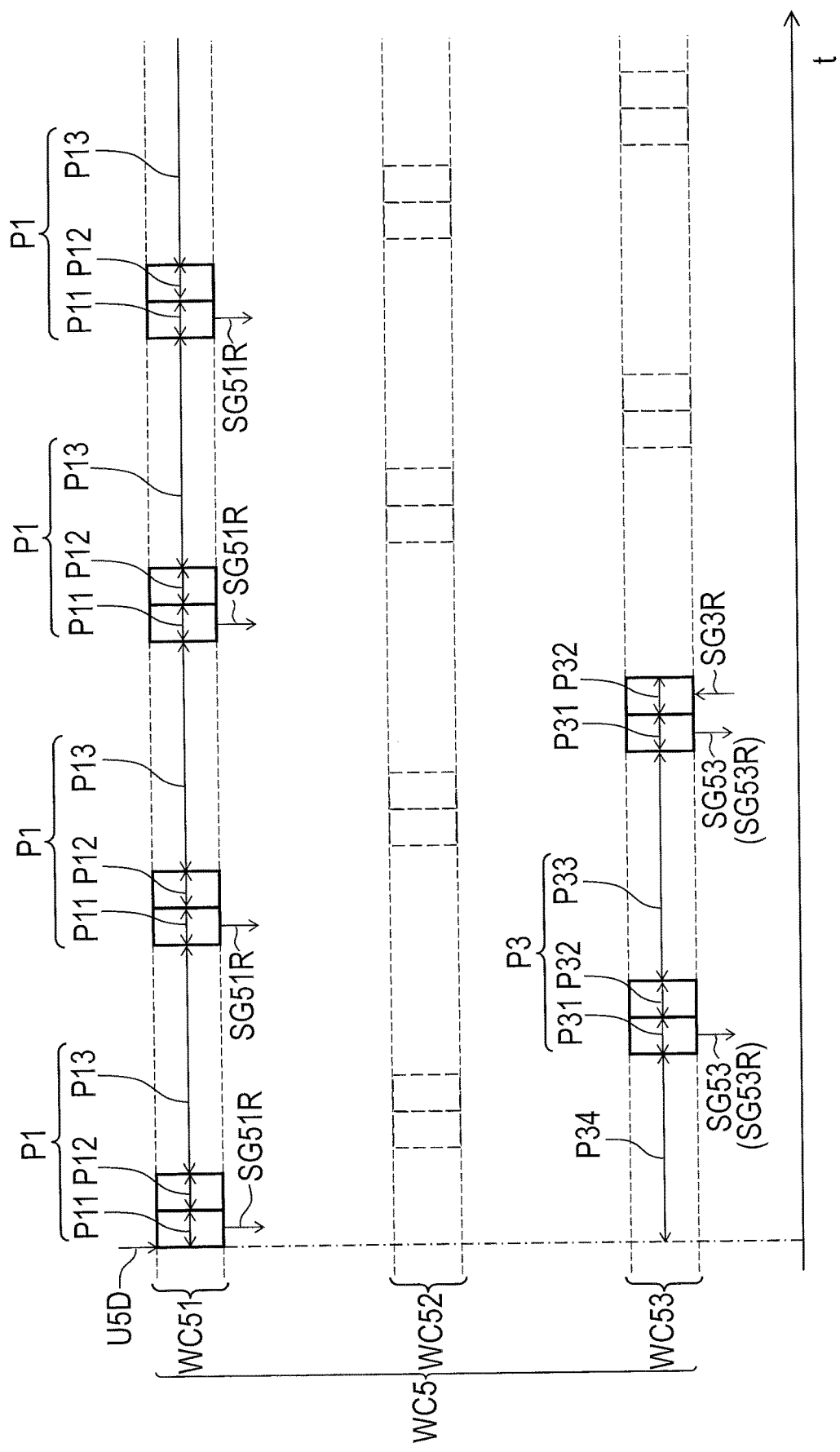
FIG. 69 is a schematic time chart showing the repairing process of the electric device in accordance with a modification in a case where the electric device is paired with the third electric device.
Figure 70:
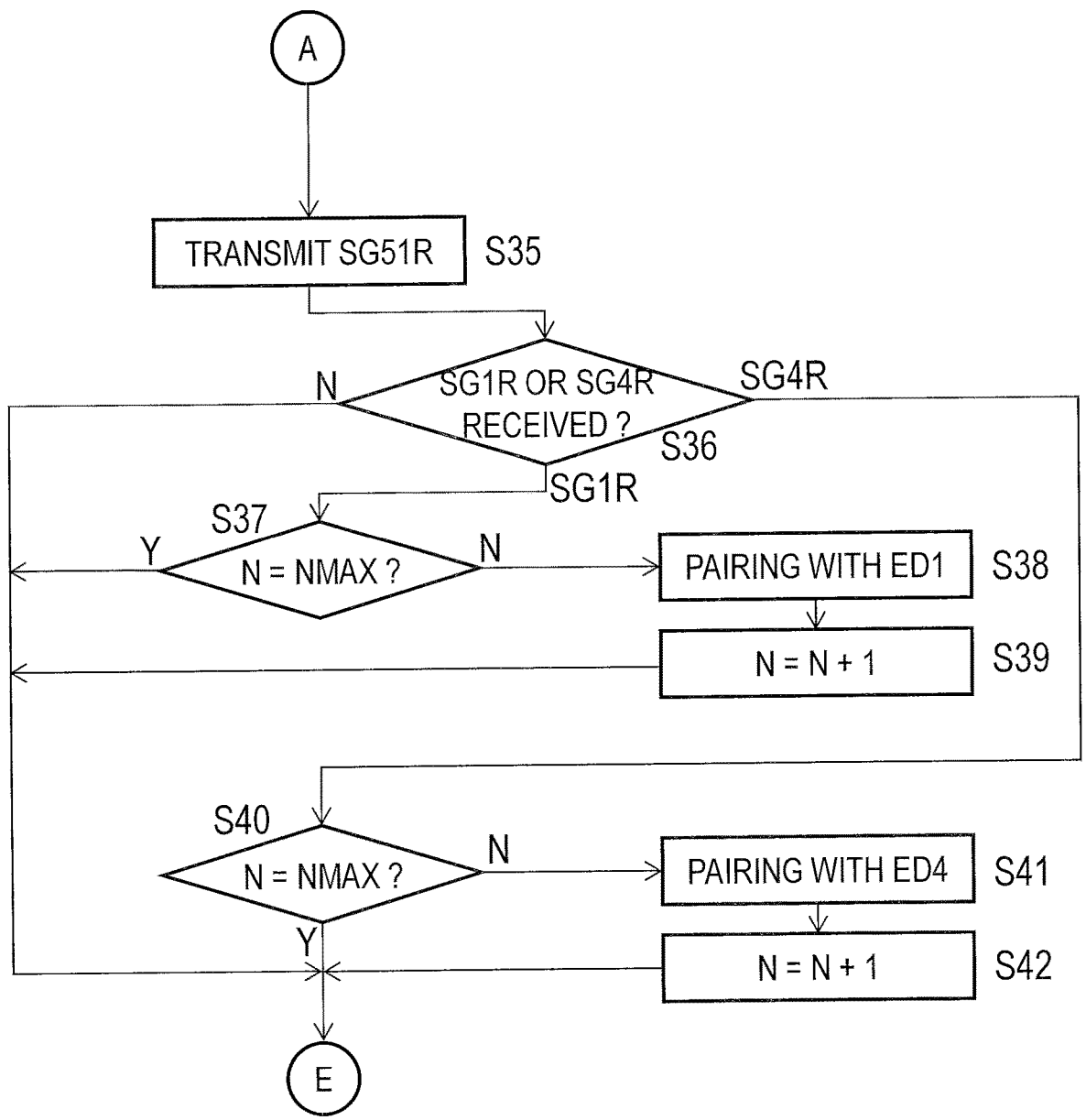
FIG. 70 is a flowchart showing the repairing processes between the electric devices of the control system in accordance with the modification.

In the embodiments and the modifications depicted in FIGS. 1 to 67, only one of the first repairing signal SG51R, the second repairing signal SG52R, and the third repairing signal SG53R is wirelessly transmitted in the repairing process while the maximum number NMAX is one. As seen in FIGS. 46 and 68 to 70, however, at least one of the first repairing signal SG51R, the second repairing signal SG52R, and the third repairing signal SG53R can be wirelessly transmitted regardless of whether another of the first repairing signal SG51R, the second repairing signal SG52R, and the third repairing signal SG53R is wirelessly transmitted. In FIG. 70, the step S34 is omitted from the flowchart depicted in FIG. 45. Thus, the first repairing signal SG51R is wirelessly transmitted in the repairing process whether another of the second repairing signal SG52R and the third repairing signal SG53R is wirelessly transmitted. The same can be applied to a case where one of the second repairing signal SG52R and the third repairing signal SG53R is wirelessly transmitted regardless of the first repairing signal SG51R or the other of the second repairing signal SG52R and the third repairing signal SG53R.

As seen in FIG. 4, in the first connection state, the first wireless communicator circuitry WC1 recognizes the control signal CS5 wirelessly transmitted from the wireless communicator circuitry WC5. The first electric device ED1 includes a first actuator driver ED17. The first actuator driver ED17 is electrically connected to the first electric actuator ED13 and the first electronic controller circuitry EC1. The first actuator driver ED17 is configured to control the first electric actuator ED13 based on a first command generated by the first electronic controller circuitry EC1. The first electronic controller circuitry EC1 is configured to generate the first command based on the control signal CS5 in the first connection state.

In the second connection state, the second wireless communicator circuitry WC2 recognizes the control signal CS5 wirelessly transmitted from the wireless communicator circuitry WC5. The second electric device ED2 includes a second actuator driver ED27. The second actuator driver ED27 is electrically connected to the second electric actuator ED23 and the second electronic controller circuitry EC2. The second actuator driver ED27 is configured to control the second electric actuator ED23 based on a second command generated by the second electronic controller circuitry EC2. The second electronic controller circuitry EC2 is configured to generate the second command based on the control signal CS5 in the second connection state.

In the third connection state, the third wireless communicator circuitry WC3 recognizes the control signal CS5 wirelessly transmitted from the wireless communicator circuitry WC5. The third electric device ED3 includes a third actuator driver ED37. The third actuator driver ED37 is electrically connected to the third electric actuator ED33 and the third electronic controller circuitry EC3. The third actuator driver ED37 is configured to control the third electric actuator ED33 based on a third command generated by the third electronic controller circuitry EC3. The third electronic controller circuitry EC3 is configured to generate the third command based on the control signal CS5 in the third connection state.

Figure 71:
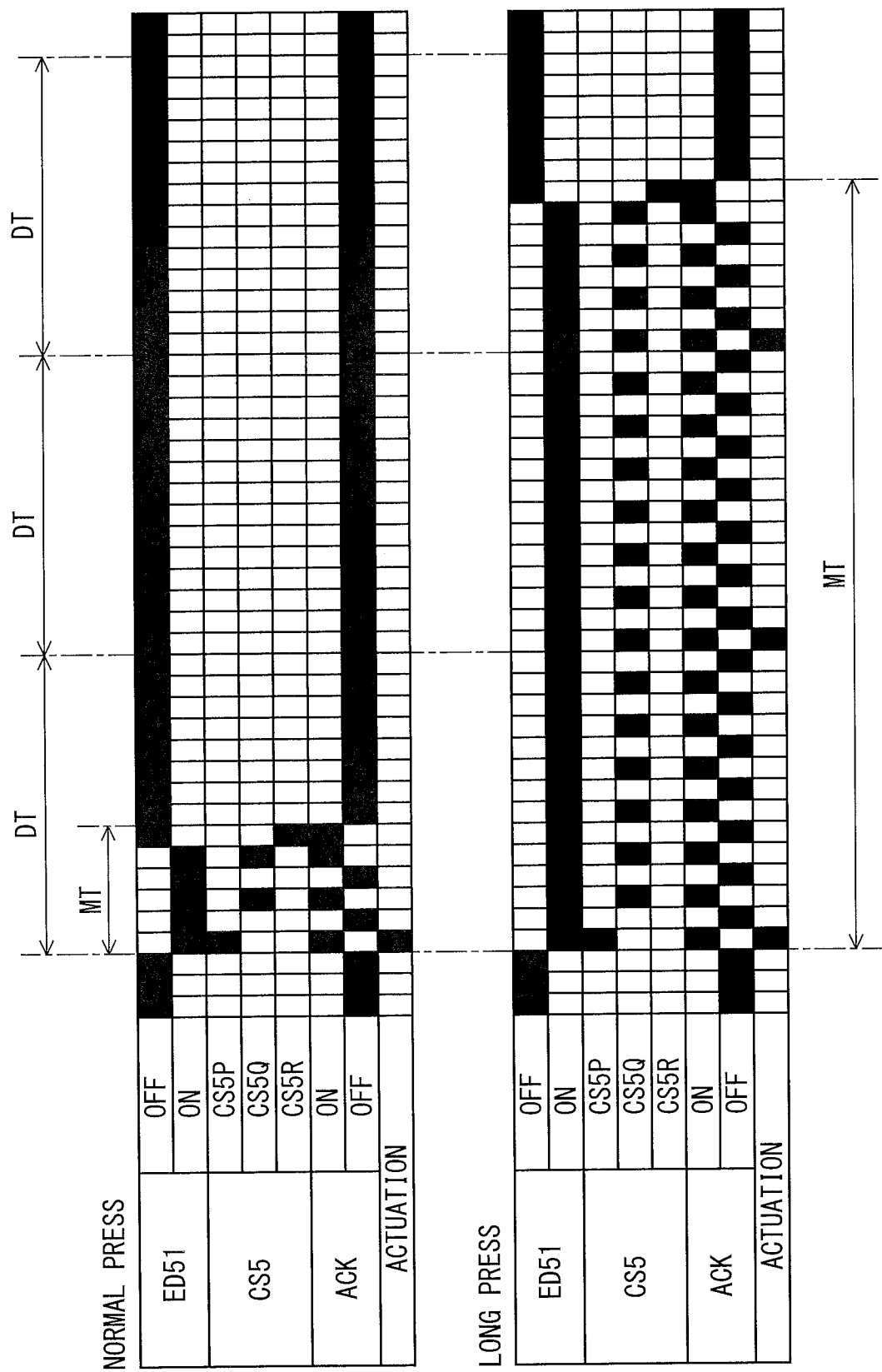
FIG. 71 is a schematic time chart showing a relationship between a control signal, a measured time, and a determination time for determining a single action or multiple actions of an actuated device.

As seen in FIG. 71, the electronic controller circuitry EC5 is configured to control the wireless communicator WC5 to wirelessly transmit the control signal CS5 in response to the user input U5. The electronic controller circuitry EC5 is configured to control the wireless communicator WC5 to wirelessly transmit the control signal CS5 at regular intervals while the user interface ED51 keeps receiving the user input U5.

The control signal CS5 includes a first control signal CS5P, a second control signal CS5Q, and a third control signal CS5R. The first control signal CS5P indicates that the user interface ED51 receives the user input U5. The second control signal CS5Q indicates that the user interface ED51 keeps receiving the user input U5. The third control signal CS5R indicates that the user input U5 ends.

The electronic controller circuitry EC5 is configured to control the wireless communicator WC5 to wirelessly transmit the first control signal CS5P at a timing at which the electronic controller circuitry EC5 recognizes the user input U5 via the user interface ED51.

The electronic controller circuitry EC5 is configured to control the wireless communicator WC5 to wirelessly transmit the second control signal CS5Q at regular intervals while the electronic controller circuitry EC5 keeps recognizing the user input U5 via the user interface ED51.

The electronic controller circuitry EC5 is configured to control the wireless communicator WC5 to wirelessly transmit the third control signal CS5R in response to the end of the user input U5.

For example, the first electronic controller circuitry EC1 receives the first control signal CS5P, the second control signal CS5Q, or the third control signal CS5R via the first wireless communicator circuitry WC1 in the first connection state. The first electronic controller circuitry EC1 is configured to control the first electric actuator ED13 to generate an actuation force in response to the first control signal CS5P.

The first electronic controller circuitry EC1 is configured to monitor the second control signal CS5Q after receipt of the first control signal CS5P. The first electronic controller circuitry EC1 is configured to start to measure a time when receiving the first control signal CS5P. The first electronic controller circuitry EC1 is configured to determine whether the measured time MT reaches a determination time DT while keeping receiving the control signal CS5 continuously. The first electronic controller circuitry EC1 is configured to determine whether the measured time MT reaches a determination time DT while keeping receiving the control signal CS5 continuously.

The first electronic controller circuitry EC1 is configured to be free of controlling the first electric actuator ED13 to generate the actuation force in a case where the receipt of the second control signal CS5Q ends before the measured time MT reaches the determination time DT.

The first electronic controller circuitry EC1 is configured to control the first electric actuator ED13 to generate the actuation force in a case where the first electronic controller circuitry EC1 keeps receiving the second control signal CS5Q at regular intervals when the measured time MT reaches the determination time DT. The first electronic controller circuitry EC1 is configured to control the first electric actuator ED13 to generate the actuation force every time the measured time MT reaches the integral multiples of the determination time DT while the first electronic controller circuitry EC1 keeps receiving the second control signal CS5Q at regular intervals.

The first electronic controller circuitry EC1 is configured to stop measuring the measured time MT in a case where the first electronic controller circuitry EC1 recognizes the third control signal CS5R. The first electric device ED1 can execute at least two actions continuously.

The first electronic controller circuitry EC1 is configured to control the wireless communicator circuitry WC1 to wirelessly transmit an acknowledge signal ACK in response to the control signal CS5. The first electronic controller circuitry EC1 is configured to control the wireless communicator circuitry WC1 to wirelessly transmit an acknowledge signal ACK in response to each of the first control signal CS5P, the second control signal CS5Q, and the third control signal CS5R.

In a case where the first electric device ED1 corresponds to the electric device FS or RS provided as a suspension, the first electric device ED1 has at least two states. For example, the at least two states include at least two flexibilities defined from the most flexible to the most rigid. The first electronic controller circuitry EC1 is configured to control the first electric actuator ED13 to continuously change the state of the first electric device ED1 between the most flexible and the most rigid in response to the first control signal CS5P or the second control signal CS5Q.

In a case where the first electric device ED1 corresponds to the electric device AS provided as an adjustable seatpost, the first electric device ED1 has at least two lengths defined from the shortest to the longest. The first electronic controller circuitry EC1 is configured to control the first electric actuator ED13 to continuously change the length of the first electric device ED1 between the shortest and the longest in response to the first control signal CS5P or the second control signal CS5Q.

In a case where the first electric device ED1 corresponds to the electric device DU provided as an assist drive unit, the first electric device ED1 has at least two assist ratios. The first electronic controller circuitry EC1 is configured to control the first electric actuator ED13 to continuously change the assist ratio of the first electric device ED1 between the at least two assist ratios in response to the first control signal CS5P or the second control signal CS5Q.

In a case where the first electric device ED1 corresponds to the electric device RD provided as a gear changer, the first electric device ED1 has at least two gear positions. The first electronic controller circuitry EC1 is configured to control the first electric actuator ED13 to continuously change the gear position of the first electric device ED1 between the at least two gear positions in response to the first control signal CS5P or the second control signal CS5Q.

The control depicted in FIG. 71 can be applied to the second electric device ED2 and the third electric device ED3.

As seen in FIG. 72, the external device SP is configured to display at least two settings of another electric device which is paired with the external device SP. The at least two settings include assignments of the user interface ED51. The external device SP enables the user to change the assignments of the user interface ED51 in a state where the electric device ED5 is paired with the external device SP. For example, the assignments of the user interface ED51 includes upshifting, downshifting, displaying a remaining level of the electric power source ED55, starting a pairing mode, indicating a communication protocol, and indicating a wireless connection state. The wireless connection state includes a state where the electric device ED5 is paired with an additional electric device and where the electric device ED5 is wirelessly connected to the additional electric device, a state where the electric device ED5 is paired with the additional electric device and where the electric device ED5 is wirelessly disconnected from the additional electric device, and a state where the electric device ED5 is not paired with the additional electric device.

For example, the external device SP enables the user to select one of the above assignments to at least one of the normal press of the electric switch SW5A, the normal press of the electric switch SW5B, the long press of the electric switch SW5A, the long press of the electric switch SW5B, and the concurrent press of the electric switches SW5A and SW5B. At least two actions can be assigned to one user input if needed or desired.

In the embodiments and the modifications depicted in FIGS. 1 to 72, the user interface ED51 includes the electric switches SW51A and SW51B. However, the user interface ED51 can include an additional electric switch or another electric part configured to receive the user input U5 if needed or desired.

In the above embodiments and the modifications thereof, the electronic controller circuitry EC5 is configured to control the wireless communicator circuitry WC5 to start wireless transmission of the first signal SG51 in response to the pairing user input U5P without a waiting period from receipt of the pairing user input USP. However, the electronic controller circuitry EC5 can be configured to control the wireless communicator circuitry WC5 to start wireless transmission of the first signal SG51 after a first waiting period elapses from receipt of the pairing user input USP as with the second waiting period P24 or the third waiting period P34.

In the above embodiments and the modifications thereof, the electronic controller circuitry EC5 is configured to control the wireless communicator circuitry WC5 to wirelessly transmit the first signal SG51 repeatedly using the first communication protocol at the first number of times or for the first period. The electronic controller circuitry EC5 is configured to control the wireless communicator circuitry WC5 to wirelessly transmit the second signal SG52 repeatedly using the second communication protocol at the second number of times or for the second period. The electronic controller circuitry EC5 is configured to control the wireless communicator circuitry WC5 to wirelessly transmit the third signal SG53 repeatedly using the third communication protocol at the third number of times or for the third period. However, the electronic controller circuitry EC5 can be configured to control the wireless communicator circuitry WC5 to wirelessly transmit the first signal SG51 repeatedly while the user interface ED51 is receiving the pairing user input USP if needed or desired. The electronic controller circuitry EC5 can be configured to control the wireless communicator circuitry WC5 to wirelessly transmit the second signal SG52 repeatedly while the user interface ED51 is receiving the pairing user input U5P if needed or desired. The electronic controller circuitry EC5 can be configured to control the wireless communicator circuitry WC5 to wirelessly transmit the third signal SG53 repeatedly while the user interface ED51 is receiving the pairing user input USP if needed or desired. Namely, a time length of the first period can depend on a period during which the user interface ED51 is receiving the pairing user input U5P. A time length of the second period can depend on the period during which the user interface ED51 is receiving the pairing user input USP. A time length of the third period can depend on the period during which the user interface ED51 is receiving the pairing user input U5P. A time length of the reference period TM0 can depend on the period during which the user interface ED51 is receiving the pairing user input U5P.

In the above embodiments and the modifications thereof, the wireless communicator circuitry WC5 is configured to wirelessly transmit the first signal SG51, the second signal SG52, or the third signal SG53 using the first communication protocol, the second communication protocol, or the third communication protocol. However, the third communication protocol can be omitted from the communication protocol of the wireless communicator circuitry WC5 if needed or desired. In such modifications, the third electric device ED3 can be omitted from the control system 24 depicted in at least one of FIGS. 1 to 72. The wireless communicator WC53 corresponding to the third communication protocol can be omitted from the wireless communicator circuitry WC5 of the electric device ED5 depicted in at least one of FIGS. 1 to 72. The steps S22 to S28 and S30 can be omitted from the flowcharts depicted in FIGS. 44, 49, and 51. The steps S51 to S56 can be omitted from the flowchart depicted in FIG. 46.

In the above embodiments and the modifications thereof, the control system 24 includes the first electric device ED1 and the fourth electric device ED4 as an electric device which uses the first communication protocol. However, the fourth electric device ED4 can be omitted from the control system 24 if needed or desired. The control system 24 can include only the electric device ED5, the first electric device ED1, and the second electric device ED2. The control system 24 can include only the electric device ED5, the first electric device ED1, the second electric device ED2, and the third electric device ED3. The control system 24 can include only the electric device ED5, the first electric device ED1, the second electric device ED2, and the fourth electric device ED4.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electric device of a human-powered vehicle, the electric device comprising:
wireless communicator circuitry configured to wirelessly communicate with first wireless communicator circuitry of a first electric device using a first communication protocol, the wireless communicator circuitry being configured to wirelessly communicate with second wireless communicator circuitry of a second electric device using a second communication protocol;
electronic controller circuitry configured to control the wireless communicator circuitry to wirelessly transmit a first signal to the first wireless communicator circuitry of the first electric device using the first communication protocol, the electronic controller circuitry being configured to execute pairing between the electric device and the first electric device based on a first response signal, the first response signal being wirelessly transmitted from the first wireless communicator circuitry of the first electric device in a case where a condition is satisfied; and
the electronic controller circuitry being configured to control the wireless communicator circuitry to wirelessly transmit a second signal to the second wireless communicator circuitry of the second electric device using the second communication protocol regardless of the first response signal.

2. The electric device according to claim 1, wherein
the electronic controller circuitry is configured to control the wireless communicator circuitry to wirelessly transmit the second signal using the second communication protocol in a case where a condition is satisfied, and
the condition is free of whether the wireless communicator circuitry receives the first response signal.

3. The electric device according to claim 1, wherein
the electronic controller circuitry is configured to control the wireless communicator circuitry to wirelessly transmit the first signal repeatedly using the first communication protocol at a first number of times or for a first period regardless of whether the electronic controller circuitry receives the first response signal.

4. The electric device according to claim 1, wherein
the electronic controller circuitry is configured to control the wireless communicator circuitry to wirelessly transmit the second signal repeatedly using the second communication protocol at a second number of times or for a second period regardless of whether the electronic controller circuitry receives the first response signal.

5. The electric device according to claim 4, wherein
the second signal includes a second request signal and a second restriction signal different from the second request signal,
the electronic controller circuitry is configured to control the wireless communicator circuitry to wirelessly transmit the second request signal to inform the second electric device that the electric device is ready to be paired with the second electric device,
the electronic controller circuitry is configured to control the wireless communicator circuitry to wirelessly transmit the second request signal before the electronic controller circuitry is received the first response signal, and
the electronic controller circuitry is configured to control the wireless communicator circuitry to wirelessly transmit the second restriction signal after the electronic controller circuitry receives the first response signal.

6. The electric device according to claim 1, wherein the electronic controller circuitry is configured to control the wireless communicator circuitry to stop transmitting the first signal in response to receipt of the first response signal before the wireless communicator circuitry completes transmitting the first signal repeatedly at the first number of times or for the first period.

7. The electric device according to claim 1, wherein the electronic controller circuitry is configured to execute pairing between the electric device and the second electric device based on a second response signal, and the second response signal is wirelessly transmitted from the second wireless communicator circuitry of the second electric device.

8. The electric device according to claim 7, wherein the electronic controller circuitry is configured to control the wireless communicator circuitry to wirelessly transmit the second signal using the second communication protocol regardless of the second response signal.

9. The electric device according to claim 7, wherein the electronic controller circuitry is configured to control the wireless communicator circuitry to stop transmitting the second signal in response to receipt of the second response signal before the wireless communicator circuitry completes transmitting the second signal repeatedly at the second number of times or for the second period.

10. The electric device according to claim 7, wherein the electronic controller circuitry is configured to be paired with the first electric device based on the first response signal, and the electronic controller circuitry is configured to be paired, after receipt of the first response signal, with the second electric device based on the second response signal.

11. The electric device according to claim 7, wherein the wireless communicator circuitry is configured to wirelessly communicate with third wireless communicator circuitry of a third electric device using a third communication protocol, and the electronic controller circuitry is configured to control the wireless communicator circuitry to wirelessly transmit a third signal using the third communication protocol regardless of the first response signal.

12. The electric device according to claim 11, wherein the electronic controller circuitry is configured to control the wireless communicator circuitry to stop transmitting at least one of the second signal and the third signal in response to receipt of at least one of the second response signal and the third response signal, and the electronic controller circuitry is configured to control the wireless communicator circuitry to keep wirelessly transmitting the first signal using the first communication protocol after the wireless communicator circuitry stops transmitting the second signal.

13. The electric device according to claim 1, wherein the electronic controller circuitry is configured to control the wireless communicator circuitry to wirelessly communicate with an external device using the first communication protocol, and the electronic controller circuitry is configured to control the wireless communicator circuitry to wirelessly transmit the first signal repeatedly using the first communication protocol at a first number of times or for a first period regardless of receipt of the first response signal.

14. The electric device according to claim 1, further comprising
a user interface configured to receive a pairing user input,
the electronic controller circuitry being configured to control the wireless communicator circuitry to start wireless transmission of the first signal in response to the pairing user input.

15. The electric device according to claim 14, wherein the electronic controller circuitry is configured to control the wireless communicator circuitry to start wireless transmission of the second signal in response to the pairing user input.

16. The electric device according to claim 15, wherein the electronic controller circuitry is configured to control the wireless communicator circuitry to start wireless transmission of the second signal in response to the pairing user input at a timing different from a timing of a start of the wireless transmission of the first signal.

17. The electric device according to claim 1, further comprising
a user interface configured to receive a repairing user input,
the electronic controller circuitry being configured to control the wireless communicator circuitry to wirelessly transmit the first signal without transmitting the second signal in response to the repairing user input in a case where the electric device is paired with the first electric device.

18. The electric device according to claim 1, further comprising
a user interface configured to receive a reset user input,
the electronic controller circuitry being configured to store pairing information indicative of another electric device which is paired with the electric device, and
the electronic controller circuitry being configured to reset the pairing information in response to the reset user input.

19. The electric device according to claim 1, further comprising
an indicator configured to indicate protocol information indicative of a communication protocol used in the electric device.

20. The electric device according to claim 1, wherein the condition includes that the first wireless communicator circuitry of the first electric device receives the first signal, and
the first response signal is wirelessly transmitted from the first wireless communicator circuitry of the first electric device in response to the first signal.

21. An electric device of a human-powered vehicle, the electric device comprising:
wireless communicator circuitry configured to wirelessly communicate with first wireless communicator circuitry of a first electric device using a first communication protocol, the wireless communicator circuitry being configured to wirelessly communicate with second wireless communicator circuitry of a second electric device using a second communication protocol;
electronic controller circuitry configured to control the wireless communicator circuitry to wirelessly transmit a first signal to the first wireless communicator circuitry of the first electric device using the first communication protocol, the electronic controller circuitry being configured to execute pairing between the electric device and the first electric device based on a first response signal, the first response signal being wirelessly transmitted from the first wireless communicator circuitry of the first electric device in a case where a condition is satisfied; and the electronic controller circuitry being configured to control the wireless communicator circuitry to wirelessly transmit a second signal to the second wireless communicator circuitry of the second electric device using the second communication protocol after the wireless communicator circuitry receives the first response signal.

22. The electric device according to claim 21, wherein the condition includes that the first wireless communicator circuitry of the first electric device receives the first signal, and the first response signal is wirelessly transmitted from the first wireless communicator circuitry of the first electric device in response to the first signal.

\* \* \* \* \*